(12) United States Patent
Kimura et al.

(10) Patent No.: US 10,513,574 B2
(45) Date of Patent: Dec. 24, 2019

(54) GRAFT POLYMER, RESIN COLORED MATTER, METHOD FOR PRODUCING SAME, AND RESIN COMPOSITION CONTAINING RESIN COLORED MATTER

(71) Applicants: WAKO PURE CHEMICAL INDUSTRIES, LTD., Osaka-shi, Osaka (JP); RHOMBIC CORPORATION, Yokkaichi-shi, Mie (JP)

(72) Inventors: Tatsuhiko Kimura, Yokkaichi (JP); Masayuki Tomida, Yokkaichi (JP); Taeyeon Kim, Kawagoe (JP); Yosuke Suzuki, Kawagoe (JP); Masahiro Takano, Kawagoe (JP)

(73) Assignees: FUJIFILM WAKO PURE CHEMICAL CORPORATION, Osaka (JP); RHOMBIC CORPORATION, Yokkaichi-Shi, Mie (JP)

( * ) Notice: Subject to any disclaimer, the term of this patent is extended or adjusted under 35 U.S.C. 154(b) by 328 days.

(21) Appl. No.: 15/323,204

(22) PCT Filed: Jul. 1, 2015

(86) PCT No.: PCT/JP2015/069005
§ 371 (c)(1),
(2) Date: Dec. 30, 2016

(87) PCT Pub. No.: WO2016/002842
PCT Pub. Date: Jan. 7, 2016

(65) Prior Publication Data
US 2017/0137553 A1    May 18, 2017

(30) Foreign Application Priority Data

Jul. 3, 2014 (JP) .................. 2014-137853
Jan. 27, 2015 (JP) .................. 2015-013689

(51) Int. Cl.
| C08F 255/02 | (2006.01) |
| C08F 8/30 | (2006.01) |
| C08L 101/00 | (2006.01) |
| C08L 23/00 | (2006.01) |
| C09B 11/28 | (2006.01) |
| C09B 69/10 | (2006.01) |
| C09B 11/12 | (2006.01) |
| C09B 11/24 | (2006.01) |
| C09B 23/16 | (2006.01) |

(52) U.S. Cl.
CPC ............. C08F 255/02 (2013.01); C08F 8/30 (2013.01); C08L 23/00 (2013.01); C08L 101/00 (2013.01); C09B 11/12 (2013.01); C09B 11/24 (2013.01); C09B 23/164 (2013.01); C09B 69/103 (2013.01); C09B 69/105 (2013.01); C09B 69/109 (2013.01)

(58) Field of Classification Search
CPC ........ C08F 255/02; C08F 8/30; C08L 101/00; C08L 23/00; C09B 11/12; C09B 11/24; C09B 23/164; C09B 69/103; C09B 69/105; C09B 69/109
See application file for complete search history.

(56) References Cited

U.S. PATENT DOCUMENTS

| 4,137,243 A * | 1/1979 | Farmer ................. C09B 69/101 |
| | | 552/240 |
| 5,410,053 A | 4/1995 | Hahn et al. |
| 5,461,113 A | 10/1995 | Marczinke et al. |
| 5,728,776 A | 3/1998 | Takemura et al. |
| 5,772,894 A | 6/1998 | Ward et al. |
| 5,919,880 A | 7/1999 | Imafuku et al. |
| 2009/0044349 A1 | 2/2009 | Lennartz et al. |
| 2016/0040013 A1* | 2/2016 | Shida ..................... C07C 309/30 |
| | | 526/266 |
| 2016/0215239 A1* | 7/2016 | Batchelor ............. C09B 69/101 |

(Continued)

FOREIGN PATENT DOCUMENTS

| EP | 0713891 A1 | 5/1996 |
| EP | 0799864 A1 | 10/1997 |
| JP | 6-49371 A | 2/1994 |

(Continued)

OTHER PUBLICATIONS

International Search Report dated Aug. 4, 2015, issued in counterpart application No. PCT/JP2015/069005. (2 pages).

(Continued)

*Primary Examiner* — Irina S Zemel
*Assistant Examiner* — Jeffrey S Lenihan
(74) *Attorney, Agent, or Firm* — Westerman, Hattori, Daniels & Adrian, LLP

(57) ABSTRACT

The present invention relates to: (1) a graft polymer that has a polyolefin (A) as the main chain, and a polymer (B) polymerized a dye (b) having a radical reactive functional group, in a side chain; (2) the graft polymer which is characterized in that the dye (b) having the radical reactive functional group is a cationic rhodamine derivative, a cationic triarylmethane-type dye derivative or a cationic cyanine-type dye derivative, having an ethylenically unsaturated group; (3) a colored resin consisting of the graft polymer; as well as (4) a method for producing the colored resin, which is characterized by mixing the polyolefin (A), the dye (b) having the radical reactive functional group, and the radical reaction initiator (C), and subjecting a radical reaction of the mixture; and the like.

20 Claims, No Drawings

(56) References Cited

U.S. PATENT DOCUMENTS

| | | | |
|---|---|---|---|
| 2017/0015765 A1* | 1/2017 | Shida | C08F 120/68 |
| 2017/0233509 A1* | 8/2017 | Onouchi | C08F 210/02 |
| | | | 136/257 |

FOREIGN PATENT DOCUMENTS

| | | | |
|---|---|---|---|
| JP | 6-172422 A | 6/1994 | |
| JP | 6-340723 A | 12/1994 | |
| JP | 7-62040 A | 3/1995 | |
| JP | 7-316239 A | 12/1995 | |
| JP | 8-73666 A | 3/1996 | |
| JP | 9-272814 A | 10/1997 | |
| JP | 2000-169529 A | 6/2000 | |
| JP | 2000-290313 A | 10/2000 | |
| JP | 2000-514855 A | 11/2000 | |
| JP | 2002-34841 A | 2/2002 | |
| JP | 2008-274216 A | 11/2008 | |
| JP | 2009-522463 A | 6/2009 | |
| JP | 2009-179665 A | 8/2009 | |
| JP | 2011-237790 A | 11/2011 | |
| WO | WO-2016031421 A1 * | 3/2016 | |

OTHER PUBLICATIONS

Calgari, S. et al, "Photochemical Grafting of Acrylated Azo Dyes onto Polymeric Surfaces. V. Grafting of Some Acryloxy-Substituted Aromatic Diazenes as Model Molecules onto Polypropylene, Polycaprolactam, and Poly(ethylene Terephthalate) Films", Journal of Applied Polymer Science, Jan. 1, 1982, vol. 27, No. 2, pp. 527-533; cited in Extended (supplementary) European Search Report dated Sep. 8, 2017.

Extended (supplementary) European Search Report dated Sep. 8, 2017, issued in counterpart European Application No. 15814405.5. (5 pages).

* cited by examiner

GRAFT POLYMER, RESIN COLORED MATTER, METHOD FOR PRODUCING SAME, AND RESIN COMPOSITION CONTAINING RESIN COLORED MATTER

TECHNICAL FIELD

The present invention relates to a novel graft polymer, a colored resin, a method for producing the same, and a resin composition containing the colored resin, and more specifically the present invention relates to the graft polymer that is free from color migration or fading caused by bleed-out after coloring, which is a defect of a dye, without impairing vivid color development and transparency of the dye; the colored resin as an application thereof; the method for producing the colored resin; and the resin composition containing the colored resin.

BACKGROUND ART

Conventionally, in coloration of a polyolefin, such as polyethylene and polypropylene, an inorganic pigment, such as an oxide, a sulfide and a sulfate of various metals, and an organic pigment, such as a phthalocyanine-type one, a quinacridone-type one and a benzidine-type one have been used usually.

However, the inorganic pigment has a problem of lacking in colorability, dispersibility and vividness, although it is excellent in heat resistance, weatherability, solvent resistance and chemical resistance. In addition, the organic pigment has a problem of color change due to decomposition or receiving change of a crystal structure caused by heat, in coloring the polyolefin requiring a high molding temperature. Because of these problems, among resin processing manufacturers, there has been extraordinary difficulty in the selection of the pigment to be used for coloring the polyolefin.

On the other hand, an organic dye has been used little, because of color migration or fading caused by bleed-out after coloring, although it shows vivid color development and transparency as compared with a pigment.

Big reason thereof is that, in the case of the dye, kneading of the dye and the polyolefin becomes insufficient, because a structure of the polyolefin itself is a chain-like structure composed of carbon and hydrogen, as well as the polyolefin has a relatively hydrophobic surface layer; and therefore, there is a problem of insufficient dispersion of the dye in the polyolefin, and no immobilization.

As a method for integrating other organic substances with the polyolefin, techniques for subjecting other reactive organic substances to a graft reaction are known, for example, as shown by the following (1) to (3):
(1) A method for producing a modified polyolefin by compounding a radical polymerizable monomer, such as acrylic acid, methacrylic acid and maleic anhydride, and a radical polymerization initiator, to a polyolefin, and then carrying out a graft reaction under melting (refer to PATENT LITERATURE 1);
(2) A method for continuously producing a modified polyolefin by the addition of a vinyl monomer, such as styrene, acrylonitrile and (meth)acrylic acid to a polyolefin, and then carrying out a graft polymerization, in the presence of a radical polymerization initiator, by using a bulk polymerization method, a bulk-suspension polymerization method, or a solution polymerization method (refer to PATENT LITERATURE 2);
(3) A method for producing a modified polyethylene by a graft polymerization of N,N-diethylacrylamide to a polyethylene, in the presence of a radical initiator, in a molten state of polyethylene (refer to PATENT LITERATURE 3).

However, these techniques are not the methods for producing the colored substance integrating the polyolefin and the dye, because in any of them the reactive organic substances are other monomers, and not a coloring compound such as the dye.

In addition, a technique for producing a colored polymer has also been known, which a monomer mixture containing a specific reactive dye represented by the next formula (1), mixed in alkyl (meth)acrylates, a hydrophilic monomer, or the like, is copolymerized in the presence of a cross-linking agent (refer to PATENT LITERATURE 4).

(Formula 1)

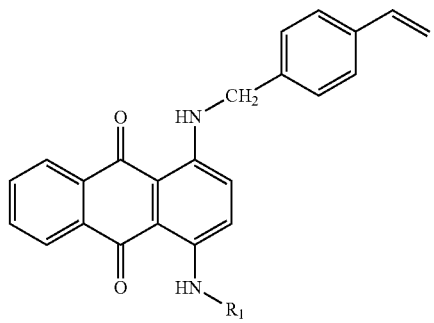

However, this technique is the one applicable to a monomer stage, as well as a target resin is the one other than the polyolefin, which limit applications thereof, and therefore, it was the one never utilizable as a master batch for coloring other resins.

On the other hand, as a method for integrating the dye into the polyolefin, there has been known, for example, a polypropylene colored composition for producing a vivid color article containing nylon, a compatibilizing agent and a dye in polypropylene (refer to PATENT LITERATURE 5), or a colored polyolefin-type resin composition containing a sorbitol-type compound and a metal-containing dye in a polyolefin-type resin (refer to PATENT LITERATURE 6).

However, these techniques are not the ones where the polyolefin and the dye are organically bonded, and thus cannot be said that the dye is sufficiently adhered to the polyolefin, and had a problem in view of fastness, of possibility of bleed-out, or the like.

Under such circumstances, research and development has been desired, in coloring the polyolefin, for the colored resin that is free from color migration or fading caused by bleed-out after coloring, which is the defect of the dye, without impairing vivid color development and transparency of the dye.

CITATION LIST

Patent Literature

[PATENT LITERATURE 1] JP-A-7-316239
[PATENT LITERATURE 2] JP-A-2000-169529
[PATENT LITERATURE 3] JP-A-7-62040
[PATENT LITERATURE 4] JP-A-9-272814
[PATENT LITERATURE 5] JP-A-2002-3484
[PATENT LITERATURE 6] JP-A-8-73666

SUMMARY OF INVENTION

Technical Problem

In view of the problems of the conventional technology, it is an object of the present invention to provide the graft polymer that is free from color migration or fading caused by bleed-out after coloring, which is the defect of the dye, without impairing vivid color development and transparency of the dye; the colored resin as an application thereof; the method for producing the colored resin; and the resin composition containing the colored resin.

Solution to Problem

The present inventors, as a result of intensive study to solve the problems, have discovered that the graft polymer or the colored resin, that is free from color migration or fading caused by bleed-out after coloring, which is the defect of the dye, without impairing vivid color development and transparency of the dye, can be obtained, by mixing a dye having a radical reactive functional group, and a radical reaction initiator in the polyolefin, heating the resulting reactive mixture to generate a radical reaction, and forming the resin colored composition containing the graft polymer; and have completed the present invention, based on these knowledge.

In addition, the present inventors have discovered that, when the colored resin is used as a master batch, it can be used in various colored molding articles showing unique vivid color development of the dye, as compared with a conventional pigment, in a wide range of applications such as automobiles, household electric appliances, everyday sundries, and the like, and have completed the present invention.

That is, according to the first aspect of the present invention, a graft polymer having a polyolefin (A), as a main chain, and a polymer (B) polymerized a dye (b) having a radical reactive functional group, as a side chain, is provided.

In addition, according to the second aspect of the present invention, a graft polymer reacted a reactive mixture containing a polyolefin (A), a dye (b) having a radical reactive functional group, and a radical reaction initiator (C), is provided.

In addition, according to the third aspect of the present invention, in the first or the second aspect, the graft polymer, wherein the polyolefin (A) is a polymer of an α-olefin having 2 to 15 carbon atoms, is provided.

Further, according to the fourth aspect of the present invention, in the third aspect, the graft polymer, wherein the polyolefin (A) is polyethylene, polypropylene or a copolymer of ethylene and propylene, is provided.

In addition, according to the fifth aspect of the present invention, in any of the first to fourth aspects, the graft polymer, wherein the dye (b) having the radical reactive functional group is a cationic rhodamine derivative having an ethylenically unsaturated group, a cationic triarylmethane-type dye derivative having an ethylenically unsaturated group, or a cationic cyanine-type dye derivative having an ethylenically unsaturated group, is provided.

Further, according to the sixth aspect of the present invention, in the fifth aspect, the graft polymer, wherein the dye (b) having the radical reactive functional group is a compound selected from the group consisting of compounds represented by the following general formula (I), the general formula (II), the general formula (III), the general formula (IV), the general formula (V) and the general formula (VI), is provided.

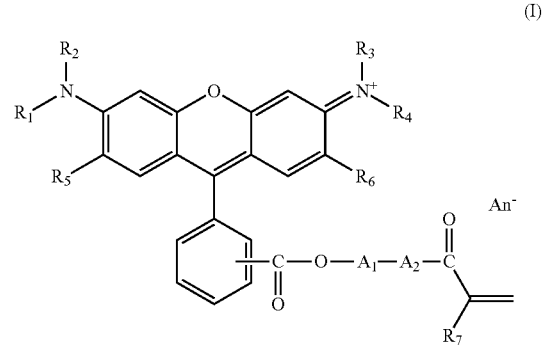

(I)

[where, in the general formula (I), $R_1$ to $R_4$ each independently represent a hydrogen atom, an alkyl group having 1 to 30 carbon atoms, a hydroxyalkyl group having 1 to 6 carbon atoms, a sulfoalkyl group having 1 to 6 carbon atoms, a carboxyalkyl group having 2 to 7 carbon atoms, a cyanoalkyl group having 2 to 7 carbon atoms, an alkoxyalkyl group having 2 to 6 carbon atoms, a halogenoalkyl group having 1 to 6 carbon atoms, a phenyl group having or not having a substituent, or a benzyl group having or not having a substituent; $R_5$ to $R_7$ each independently represent a hydrogen atom or a methyl group; $A_1$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_2$ represents —NH— or —O—. In addition, An⁻ represents an anion.]

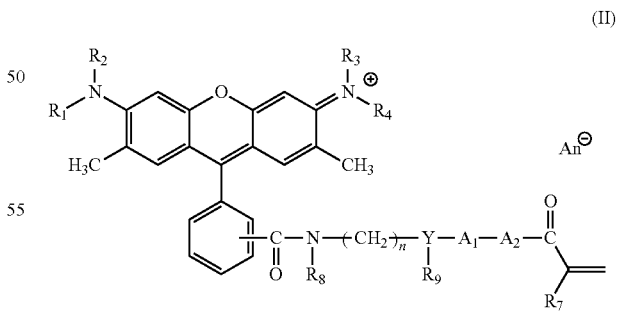

(II)

[where, in the general formula (II), $R_1$ to $R_4$, $R_7$, $A_1$, $A_2$ and An⁻ are the same as those in the general formula (I); $R_8$ represents a hydrogen atom, or an alkyl group having 1 to 30 carbon atoms; $R_9$ represents a hydrogen atom, or an alkyl group having 1 to 6 carbon atoms; n represents an integer of 0 to 3; Y represents a nitrogen atom or a group represented by the following general formula (II-1),

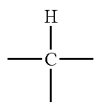

(II-1)

$R_8$ and $R_9$ may form a cyclic structure of a 5 to 6 membered ring together with —N—(CH$_2$)$_n$—Y— bonding thereto.]

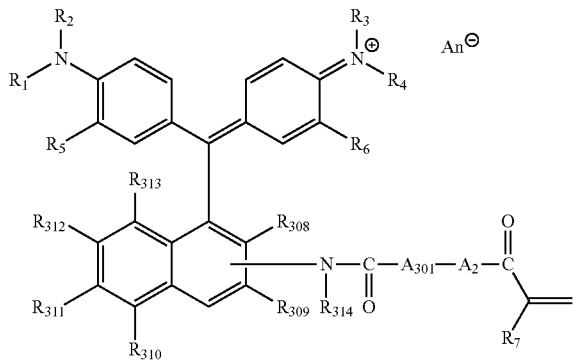

(III)

[where, in the general formula (III), $R_1$ to $R_7$, $A_2$ and An$^-$ are the same as those in the general formula (I); $R_{314}$ represents a hydrogen atom, an alkyl group having 1 to 30 carbon atoms, a phenyl group having or not having a substituent, a naphthyl group having or not having a substituent, or a benzyl group having or not having a substituent; $R_{308}$ to $R_{313}$ each independently represent an alkyl group having 1 to 21 carbon atoms, an aryl group, a hydroxy group, a nitro group, a sulfo group or an alkoxy group having 1 to 3 carbon atoms; $A_{301}$ represents an alkylene group having 1 to 21 carbon atoms which has at least one group of —N($R_{315}$)—, —O—, —OCO—, —COO— or an arylene group in the chain, and also has a hydroxy group as a substituent, an alkylene group having 1 to 21 carbon atoms which has at least one group of —N($R_{315}$)—, —O—, —OCO—, —COO— or an arylene group in the chain, an alkylene group having 1 to 21 carbon atoms which has a hydroxy group as a substituent, or an alkylene group having 1 to 21 carbon atoms; $R_{315}$ represents a hydrogen atom, an alkyl group having 1 to 30 carbon atoms, a phenyl group having or not having a substituent, a naphthyl group having or not having a substituent, or a benzyl group having or not having a substituent.]

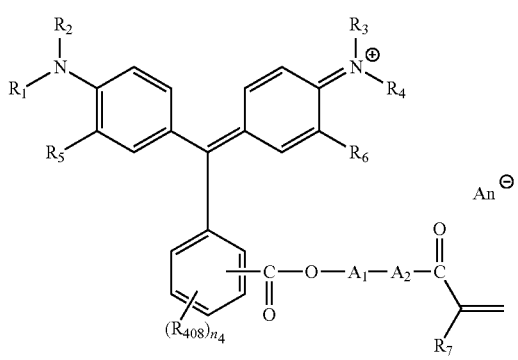

(IV)

[where, in the general formula (IV), $R_1$ to $R_7$, $A_1$, $A_2$ and An$^-$ are the same as those in the general formula (I); $n_4$ pieces of $R_{408}$ each independently represent a halogen atom, an alkyl group having 1 to 21 carbon atoms, an aryl group having 6 to 10 carbon atoms, a hydroxy group, a nitro group, a sulfo group, or an alkoxy group having 1 to 3 carbon atoms; and $n_4$ represents an integer of 0 to 4.]

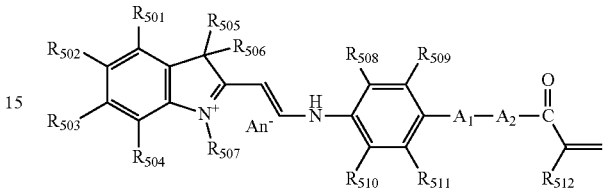

(V)

[where, in the general formula (V), $A_1$, $A_2$ and An$^-$ are the same as those in the general formula (I); $R_{501}$ to $R_{504}$ and $R_{508}$ to $R_{511}$ each independently represent a hydrogen atom, a nitro group, a halogeno group, a cyano group, an amide group, a carboxy group, an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, or an arylcarbonyl group having 7 to 10 carbon atoms; $R_{505}$ and $R_{506}$ each independently represent a hydrogen atom, an alkyl group having 1 to 6 carbon atoms, an arylalkyl group having 7 to 13 carbon atoms, or a phenylalkyl group having 7 to 9 carbon atoms, which has an alkyl group having 1 to 6 carbon atoms, a nitro group, a halogeno group or a cyano group, as a substituent of the phenyl group. $R_{507}$ represents a hydrogen atom, an alkyl group having 1 to 6 carbon atoms, an arylalkyl group having 7 to 13 carbon atoms, an alkyl group having 1 to 6 carbon atoms, which has an alkoxy group having 1 to 6 carbon atoms, a hydroxy group, a carboxy group, a halogeno group, a cyano group, an amide group, or an alkyloxycarbonyl group having 2 to 4 carbon atoms, as a substituent, or a phenylalkyl group having 7 to 9 carbon atoms, which has an alkoxy group having 1 to 6 carbon atoms, a halogeno group, or an amide group, as a substituent of the phenyl group; $R_{512}$ represents a hydrogen atom or a methyl group.]

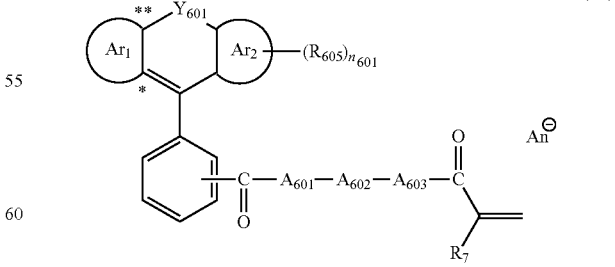

(VI)

[where, in the general formula (VI), $R_7$ and An$^-$ are the same as those in the general formula (I); $A_{601}$ represents —O— or a group represented by the following general formula (VI-2-1),

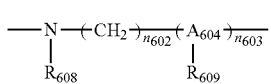
(VI-2-1)

(wherein $R_{608}$ and $R_{609}$ each independently represent a hydrogen atom, or an alkyl group having 1 to 12 carbon atoms; $A_{604}$ represents a nitrogen atom, or a group represented by the following general formula (VI-2-2);

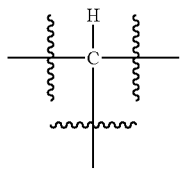
(VI-2-2)

$n_{602}$ represents an integer of 0 to 3; $R_{608}$ and $R_{609}$ may form a cyclic structure of a 5 to 6 membered ring together with —N—$(CH_2)_{n602}$-$(A_{604})_{n603}$- bonding thereto, and when the cyclic structure of the 5 to 6 membered ring is formed by $R_{608}$, $R_{609}$ and —N—$(CH_2)_{n602}$-$(A_{604})_{n603}$-, $n_{603}$ represents 1, and when the cyclic structure of the 5 to 6 membered ring is not formed, $n_{603}$ represents 0 or 1.)

$A_{602}$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_{603}$ represents —$NR_{610}$— or —O—; $R_{610}$ represents a hydrogen atom, or an alkyl group having 1 to 12 carbon atoms; $n_{601}$ pieces of $R_{605}$ each independently represent a halogen atom, an alkyl group having 1 to 20 carbon atoms, an alkoxy group having 1 to 20 carbon atoms, an alkylthio group having 1 to 20 carbon atoms, or an amino group having or not having a substituent; $Y_{601}$ represents an oxygen atom, a sulfur atom, —$NR_{632}$—, —$BR_{633}$— or —$Si(R_{634})_2$—; $R_{632}$, $R_{633}$ and two pieces of $R_{634}$ represent an alkyl group having 1 to 6 carbon atoms; $Ar_1$ represents a cyclic structure represented by the following general formulae (VI-1-1) to (VI-1-7);

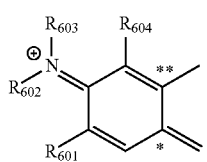
(VI-1-1)

(wherein $R_{601}$ and $R_{604}$ each independently represent a hydrogen atom or a methyl group; $R_{602}$ and $R_{603}$ each independently represent an alkyl group having 1 to 20 carbon atoms; $R_{601}$ and $R_{602}$ together may form an alkylene group having 2 to 4 carbon atoms; $R_{603}$ and $R_{604}$ together may form an alkylene group having 2 to 4 carbon atoms.)

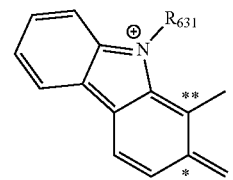
(VI-1-2)

(wherein $R_{631}$ represents an alkyl group having 1 to 20 carbon atoms.)

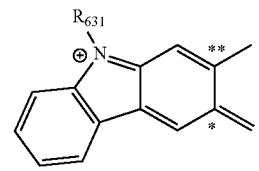
(VI-1-3)

(wherein $R_{631}$ is the same as described above.)

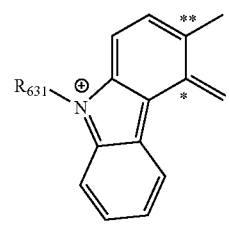
(VI-1-4)

(wherein $R_{631}$ is the same as described above.)

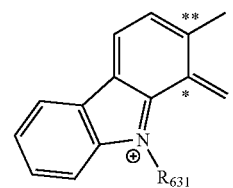
(VI-1-5)

(wherein $R_{631}$ is the same as described above.)

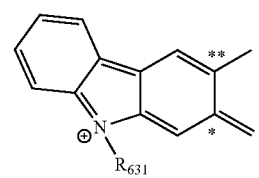
(VI-1-6)

(wherein $R_{631}$ is the same as described above.)

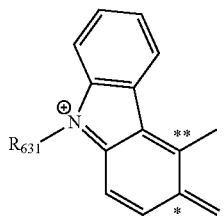

(VI-1-7)

(wherein $R_{631}$ is the same as described above.)

* and ** represent binding positions of each of them; $Ar_2$ represents a benzene ring, a naphthalene ring or an anthracene ring. When $Ar_2$ is the benzene ring, $n_{601}$ represents an integer of 0 to 4, when $Ar_2$ is the naphthalene ring, $n_{601}$ represents an integer of 0 to 6, and when $Ar_2$ is the anthracene ring, $n_{601}$ represents an integer of 0 to 8.]

In addition, according to the seventh aspect of the present invention, in the first aspect, the graft polymer, wherein the polymer (B) polymerized the dye (b) having the radical reactive functional group is the one polymerized 1 to 3 kinds of compounds (D) selected from the group consisting of compounds represented by the following general formula (VII), the general formula (VIII), the general formula (IX) and the general formula (X), and the dye (b) having the radical reactive functional group, is provided.

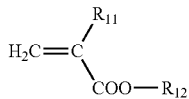

(VII)

[where, in the general formula (VII), $R_{11}$ represents a hydrogen atom or a methyl group; $R_{12}$ represents a hydrogen atom, an alkyl group having 1 to 18 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms which has or does not have oxygen, a dialkylaminoalkyl group having 3 to 9 carbon atoms, a fluoroalkyl group having 1 to 18 carbon atoms, an N-alkylenephthalimide group having 9 to 14 carbon atoms, a group represented by the following general formula (VII-I),

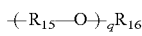

(VII-I)

(wherein $R_{15}$ represents an alkylene group having 1 to 3 carbon atoms, which has a hydroxy group as a substituent or no substituent; $R_{16}$ represents a phenyl group which has a hydroxy group as a substituent or no substituent, or an alkyl group having 1 to 3 carbon atoms; q represents an integer of 1 to 3.), a group represented by the following general formula (VII-II),

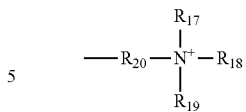

(VII-II)

(wherein $R_{17}$ to $R_{19}$ represent an alkyl group having 1 to 3 carbon atoms; $R_{20}$ represents an alkylene group having 1 to 3 carbon atoms.), or a group represented by the following general formula (VII-III),

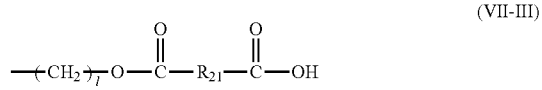

(VII-III)

(wherein l represents an integer of 1 to 6; $R_{21}$ represents a phenylene group or a cyclohexylene group.).]

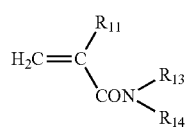

(VIII)

[where, in the general formula (VIII), $R_{11}$ represents a hydrogen atom or a methyl group; $R_{13}$ represents a hydrogen atom, or an alkyl group having 1 to 3 carbon atoms; $R_{14}$ represents a hydrogen atom, an alkyl group having 1 to 3 carbon atoms, a dialkylaminoalkyl group having 3 to 9 carbon atoms, or a hydroxyalkyl group having 1 to 6 carbon atoms; $R_{13}$ and $R_{14}$ may form a morpholino group together with a nitrogen atom adjacent thereto.]

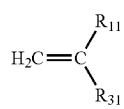

(IX)

[where, in the general formula (IX), $R_{11}$ represents a hydrogen atom or a methyl group; $R_{31}$ represents a phenyl group or a pyrrolidino group.]

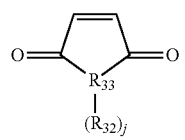

(X)

[where, in the general formula (X), $R_{33}$ represents a nitrogen atom or an oxygen atom; j represents 0 when $R_{33}$ is an oxygen atom, and 1 when $R_{33}$ is a nitrogen atom. $R_{32}$ represents a hydrogen atom, an alkyl group having 1 to 20 carbon atoms, a hydroxyalkyl group having 1 to 10 carbon atoms, a halogenated alkyl group having 1 to 10 carbon atoms, an alkylcycloalkyl group having 1 to 10 carbon atoms, a halogenated cycloalkyl group having 6 to 7 carbon atoms, an aryl group having 6 to 10 carbon atoms, an aryl group having 6 to 10 carbon atoms, which has an alkyl group having 1 to 6 carbon atoms as a substituent, or a halogenated aryl group having 6 to 10 carbon atoms.]

In addition, according to the eighth aspect of the present invention, in the second aspect, the graft polymer, wherein the reactive mixture further comprises 1 to 3 kinds of compounds (D) selected from the group consisting of the compounds represented by the general formula (VII), the general formula (VIII), the general formula (IX) and the general formula (X), is provided.

Further, according to the ninth aspect of the present invention, in the second aspect, the graft polymer, wherein a mixing ratio (weight ratio) of the polyolefin (A) and the dye (b) having the radical reactive functional group is A:b=100:0.01 to 100:10, is provided.

According to the tenth aspect of the present invention, in the second aspect, the graft polymer, wherein the radical reaction initiator (C) is an organic peroxide or an azo compound, is provided.

In addition, according to the eleventh aspect of the present invention, in the tenth aspect, the graft polymer, wherein the radical reaction initiator (C) is an organic peroxide, is provided.

Further, according to the twelfth aspect of the present invention, in the second aspect, the graft polymer, wherein a mixing ratio (weight ratio) of the polyolefin (A) and the radical reaction initiator (C) is A:C=100:0.01 to 100:10, is provided.

In addition, according to the thirteenth aspect of the present invention, a colored resin consisting of the graft polymer of any of the first to the twelfth aspects, is provided.

According to the fourteenth aspect of the present invention, a production method for the colored resin consisting of the graft polymer of the thirteenth aspect, which comprises; mixing a polyolefin (A), a dye (b) having a radical reactive functional group, and a radical reaction initiator (C); and subjecting a radical reaction of the mixture; is provided.

In addition, according to the fifteenth aspect of the present invention, in the fourteenth aspect, the production method for the colored resin, wherein the method comprises; mixing the polyolefin (A), the dye (b) having the radical reactive functional group, and the radical reaction initiator (C), and further 1 to 3 kinds of compounds (D) selected from the group consisting of the compounds represented by the general formula (VII), the general formula (VIII), the general formula (IX) and the general formula (X); and subjecting a radical reaction of the mixture; is provided.

Further, according to the sixteenth aspect of the present invention, in the fourteenth or fifteenth aspect, the production method for the colored resin, wherein a reaction temperature of the radical reaction is 80 to 300° C., is provided.

In addition, according to the seventeenth aspect of the present invention, in any of the fourteenth to sixteenth aspects, the production method for the colored resin, wherein a mixing ratio (weight ratio) of the polyolefin (A) and the dye (b) having the radical reactive functional group is A:b=100:0.01 to 100:10, is provided.

Further, according to the eighteenth aspect of the present invention, in any of the fourteenth to seventeenth aspects, the production method for the colored resin, wherein a mixing ratio (weight ratio) of the polyolefin (A) and the radical reaction initiator (C) is A:C=100:0.01 to 100:10, is provided.

In addition, according to the nineteenth aspect of the present invention, a resin composition containing the colored resin of the thirteenth aspect, is provided.

Further, according to the twentieth aspect of the present invention, in the nineteenth aspect, the resin composition, which is for use as a master batch, is provided.

Advantageous Effects of Invention

The graft polymer of the present invention, and the colored resin composed of the graft polymer have characteristics that is free from color migration or fading caused by bleed-out after coloring (elution of the dye to a solvent, elution of the dye caused by temporal change, or the like), which is the defect of the dye, without impairing vivid color development and transparency of the dye. Utilizing this characteristics, the colored resin of the present invention is suitably usable as a master batch of a thermoplastic resin, especially a polyolefin-type resin; and it can be used in various colored molding articles showing unique vivid color development of the dye, as compared with a conventional pigment, in a wide range of applications such as automobiles, household electric appliances, everyday sundries, and the like. Still more, it can be expected that colored products having consistent quality can be supplied stably in an industrial level.

In addition, according to the production method of the present invention, production of the colored resin of the present invention is possible, using a polyolefin not having a reactive group, as a starting material.

DESCRIPTION OF EMBODIMENTS

The present invention relates to the graft polymer having the polyolefin (A), as a main chain, and the polymer (B) polymerized of a dye (b) having the radical reactive functional group, as a side chain; and specifically the graft polymer reacting a reactive mixture, containing the polyolefin (A), the dye (b) having the radical reactive functional group, and the radical reaction initiator (C) to radical reaction, preferably by heating; as well as the colored resin composed of the graft polymer.

Explanation will be given below item by item in detail on the polyolefin (A), the dye (b) having the radical reactive functional group, and the radical reaction initiator (C), to be used in the graft polymer of the present invention, and the colored resin composed of the graft polymer; the production method for the colored resin of the present invention; the graft polymer obtained from the production method; and the colored resin composed of the graft polymer; and still more the resin composition containing the colored resin of the present invention.

1. Polyolefin (A)

The polyolefin (A) to be used in the present invention includes, as a typical example, a homo-polymer or a copolymer of an α-olefin, particularly, the α-olefin having 2 to 15 carbon atoms, such as ethylene, propylene, 1-butene, 1-pentene, 4-methyl-1-pentene, isobutylene; and among them, polypropylene, polyethylene, an ethylene-α-olefin copolymer such as an ethylene-propylene copolymer, and a propylene-α-olefin copolymer such as a propylene-ethylene copolymer, are preferable, polypropylene and polyethylene are more preferable, and polypropylene is further preferable.

In addition, the polyolefin to be used in the present invention may be used alone or in combination of two or more kinds thereof, and is not especially limited, as long as it is the one containing an α-olefin component in the polymer.

The polyolefin (A) to be used in the present invention may further contain a compound which has a functional group having radical reactivity, in the homo-polymer or the copolymer as a monomer component, for the purpose of improving radical reactivity. The functional group having radical reactivity includes, for example, a vinyl group, an acryloyl group, a methacryloyl group, and the like. Specific examples of the compound which has the functional group having radical reactivity includes, for example, styrene, vinyl chloride, butadiene, an acrylate ester, a methacrylate ester, acrylonitrile, vinyl acetate, and the like; and these may have an epoxy group, a hydroxy group, a carbonyl group, a carboxy group, and the like, as a substituent.

In addition, the polyolefin (A) to be used in the present invention may be further used other components for the purpose of improving resin property (processability, flexibility, handling ability, and the like), resin performance (stability, durability, flame retardance, and the like), and these components are not especially limited, as long as they are the ones not exercising an adverse influence on the dye or the resin.

They specifically include a modifier, such as elastomer (styrene-type elastomer, olefin-type elastomer, and the like), and an alicyclic hydrocarbon resin (a petroleum resin), a dispersing agent, a filler, a plasticizer, an antioxidant, a UV absorber, a light stabilizer, a flame retardant, an antibacterial agent, an antistatic agent, a copper inhibitor, a metal deactivator, a tackifier, a lubricant, an anti-fogging agent, a preservative, a stabilizer, and the like; however, they are not limited only to these.

2. The Dye (b) Having the Radical Reactive Functional Group

The dye (b) having the radical reactive functional group (hereinafter, it may be abbreviated as the dye (b)) is not especially limited, as long as it is the one which has the radical reactive functional group. Specific examples of the radical reactive functional group include, for example, an ethylenically unsaturated group.

Specific examples of the dye (b) having the radical reactive functional group of the present invention includes, for example, a coloring compound having the ethylenically unsaturated group; and the coloring compound includes, for example, a cyanine-type coloring compound, a naphthalocyanine metallic complex-type coloring compound, a dithiol metallic complex-type coloring compound, a naphthoquinone-type coloring compound, an anthraquinone-type coloring compound, an indophenol-type coloring compound, an indoaniline-type coloring compound, a pyrylium-type coloring compound, a thiopyrylium-type coloring compound, a squarylium-type coloring compound, a croconium-type coloring compound, a diphenylmethane-type coloring compound, a triarylmethane-type coloring compound, a triphenylmethane phthalide-type coloring compound, a triarylmethane-type coloring compound, a phenothiazine-type coloring compound, a phenoxazine-type coloring compound, a fluoran-type coloring compound, a thiofluorene-type coloring compound, a xanthene-type coloring compound, an indolyl phthalide-type coloring compound, a spiropyran-type coloring compound, an azaphthalide-type coloring compound, a chromeno pyrazole-type coloring compound, a leucoauramine-type coloring compound, a rhodamine lactam-type coloring compound, a quinazoline-type coloring compound, a diazaxanthene-type coloring compound, a bislactone-type coloring compound, a fluorenone-type coloring compound, a monoazo-type coloring compound, a ketone imine-type coloring compound, a disazo-type coloring compound, a methine-type coloring compound, a polymethine-type coloring compound, a bisazo-type coloring compound, a bisazostilbene-type coloring compound, a bisazooxadiazole-type coloring compound, a bisazofluorenone-type coloring compound, a bisazohydroxyperynone-type coloring compound, an azochromium complex salt-type coloring compound, a trisazotriphenylamine-type coloring compound, a thioindigo-type coloring compound, a perylene-type coloring compound, a nitroso-type coloring compound, a rhodamine-type coloring compound, and the like, and among them, the cyanine-type coloring compound, the triarylmethane-type coloring compound, and the rhodamine-type coloring compound are preferable.

It should be noted that specific examples of the coloring compound may be the ones described in JP-A-05-271567, JP-A-09-272814, JP-A-2001-011336, JP-A-2013-045088, and the like, or the commercially available ones.

Preferable specific examples of the dye (b) having the radical reactive functional group of the present invention include, for example,
(i) a compound having a cationic rhodamine derivative and the ethylenically unsaturated group,
(ii) a compound having a cationic triarylmethane-type dye derivative and the ethylenically unsaturated group,
(iii) a compound having a cationic cyanine-type dye derivative and the ethylenically unsaturated group, and the like.

As (i) the compound having the cationic rhodamine derivative and the ethylenically unsaturated group, the compound represented by the general formula (I), the compound represented by the general formula (II), and the compound represented by the general formula (VI) are preferable (hereinafter, it may be referred to as "the cationic rhodamine derivative having the ethylenically unsaturated group" or just "the cationic rhodamine derivative" of the present invention).

As (ii) the compound having the cationic triarylmethane-type dye derivative and the ethylenically unsaturated group, the compound represented by the general formula (III), and the compound represented by the general formula (IV) are preferable.

In addition, as (iii) the compound having the cationic cyanine-type dye derivative and the ethylenically unsaturated group, the compound represented by the general formula (V) is preferable.

It should be noted that in the present invention, the cationic rhodamine derivative, the cationic triarylmethane-type dye derivative and the cationic cyanine-type dye derivative, which are raw materials before bonding with the ethylenically unsaturated group, represent "the cationic rhodamine derivative", "the cationic triarylmethane-type dye derivative", and "the cationic cyanine-type dye derivative", respectively.

On the other hand, the ones bonding with the ethylenically unsaturated group represent "the cationic rhodamine derivative having the ethylenically unsaturated group" or just "the cationic rhodamine derivative", "the cationic triarylmethane-type dye derivative having the ethylenically unsaturated group" or just "the cationic triarylmethane-type dye derivative", and "the cationic cyanine-type dye derivative having the ethylenically unsaturated group" or just "the cationic cyanine-type dye derivative", respectively.

2-1 On the Compound Represented by the General Formula (I)

Next, the production method for the cationic rhodamine derivative, specific compounds, and the like, are described in detail.

(1) Production Method for the Compound Represented by the General Formula (I)

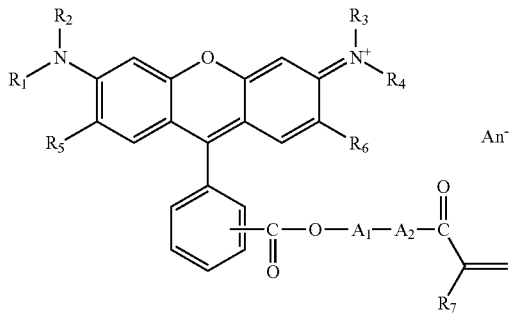

(I)

[where, in the general formula (I), $R_1$ to $R_4$ each independently represent a hydrogen atom, an alkyl group having 1 to 30 carbon atoms, a hydroxyalkyl group having 1 to 6 carbon atoms, a sulfoalkyl group having 1 to 6 carbon atoms, a carboxyalkyl group having 2 to 7 carbon atoms, a cyanoalkyl group having 2 to 7 carbon atoms, an alkoxyalkyl group having 2 to 6 carbon atoms, a halogenoalkyl group having 1 to 6 carbon atoms, a phenyl group having or not having a substituent, or a benzyl group having or not having a substituent; $R_5$ to $R_7$ each independently represent a hydrogen atom or a methyl group; $A_1$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_2$ represents —NH— or —O—. In addition, $An^-$ represents an anion.]

The compound represented by the general formula (I) in the cationic rhodamine derivative of the present invention is produced, for example, by synthesis of a compound represented by the following general formula (I-III) using a method described in the next (i) or (ii), which uses a rhodamine compound represented by the following general formula (I-I) as a starting material, and then by finally carrying out ion exchange of an anion group of the compound represented by the general formula (I-III).

(i) The compound represented by the following general formula (I-III) is obtained by subjecting the rhodamine compound represented by the following general formula (I-I), and a compound represented by the following general formula (I-II) to a reaction, in the presence of a dehydration condensation agent.

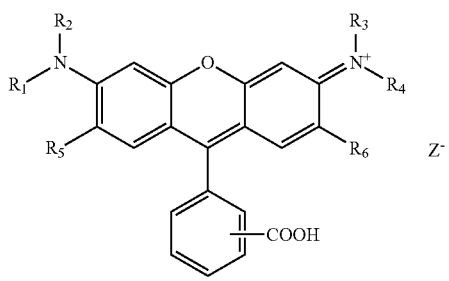

(I-I)

[where, in the general formula (I-I), $R_1$ to $R_6$ are the same as those in the general formula (I); $Z^-$ represents an anion.]

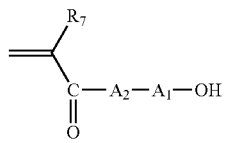

(I-II)

[where, in the general formula (I-II), $R_7$, $A_1$ and $A_2$ are the same as those in the general formula (I).]

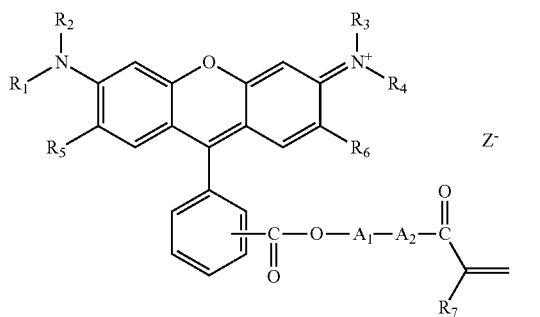

(I-III)

[where, in the general formula (I-III), $R_1$ to $R_7$, $A_1$ and $A_2$ are the same as those in the general formula (I).]

(ii) The compound represented by the general formula (I-III) is obtained by subjecting the rhodamine derivative represented by the general formula (I-I), and a compound represented by the following general formula (I-IV) to a reaction, in the presence of a catalyst.

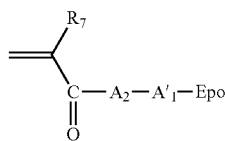

(I-IV)

[where, in the general formula (I-IV), $R_7$ and $A_2$ are the same as those in the general formula (I). $A'_1$ represents an alkylene group having 1 to 21 carbon atoms, having at least one group of —O— or an arylene group in the chain, or an alkylene group having 1 to 21 carbon atoms;

Epo represents a 3,4-epoxy cyclohexyl or an epoxy group.]

The ion exchange method in the final step for obtaining the cationic rhodamine derivative of the present invention is usually carried out as follows.

After obtaining the compound represented by the general formula (I-III), a salt of an anion containing an aryl group having an electron-withdrawing substituent of the present invention (for example, a sodium salt, a potassium salt, a lithium salt, and the like, of the anion) is contacted with the compound represented by the general formula (I-III), in an appropriate solvent, such as dichloromethane, for example, at 10 to 50° C., for 10 to 120 minutes, to carry out the ion exchange reaction of the anion.

Therefore, as a result of the ion exchange, the compound represented by the general formula (I) of the cationic rhodamine derivative having the ethylenically unsaturated group of the present invention can be obtained.

It should be noted that the anion represented by $Z^-$ in the general formula (I-I) and the general formula (I-III) includes $Cl^-$, $NO_3^-$, $SO_4^-$, $PO_4^-$, and the like, and it may be a compound containing these, or an anion represented by $An^-$.

Preferable combinations of $R_1$ to $R_6$ in the general formula (I-I) include the same ones as combinations described in an item of the general formula (I), to be described later.

In addition, preferable combinations of $R_7$, $A_1$ and $A_2$ in the general formula (I-II) include the same ones as combinations described in an item of the general formula (I), to be described later.

In addition, use amount of the compound represented by the general formula (I-II), in the reaction to obtain the compound represented by the general formula (I-III), is usually 1 to 5 times mole, and preferably 1 to 2 times mole of the rhodamine derivative represented by the general formula (I-I).

The dehydration condensation agent in the method for subjecting the rhodamine compound represented by the general formula (I-I), and the compound represented by the general formula (I-II) to a reaction in the method (i) may be, for example, the one generally used as the dehydration condensation agent; and includes an inorganic dehydration condensation agent, for example, diphosphorus pentaoxide, anhydrous zinc chloride, and the like; carbodiimides, for example, dicyclohexylcarbodiimide, diisopropylcarbodiimide, 1-ethyl-3-(3-dimethylaminopropyl)carbodiimide hydrochloride, and the like; for example, polyphosphoric acid; acetic anhydride; sulfuric acid; carbonyl diimidazole; p-toluene sulfonic acid; and the like; and the carbodiimides are preferable.

Use amount of the dehydration condensation agent is 1 to 10 times mole, and preferably 1 to 5 times mole, relative to the compound represented by the general formula (I-II).

In the method for subjecting the rhodamine compound represented by the general formula (I-I), and the compound represented by the general formula (I-II) to a reaction, a catalyst, such as dimethylaminopyridine, may be used to enhance efficiency of the dehydration condensation agent. Use amount of the catalyst is 0.1 to 10 times mole, relative to the compound represented by the general formula (I-II).

The method for subjecting the rhodamine compound represented by the general formula (I-I), and the compound represented by the general formula (I-II) to a reaction is usually carried out at 10 to 50° C., for 5 to 24 hours, in a reaction solvent.

The reaction solvent includes ethers, for example, diethyl ether, diisopropyl ether, ethyl methyl ether, tetrahydrofuran, 1,4-dioxane, dimethoxyethane, and the like; ketones, for example, acetone, dimethyl ketone, methyl ethyl ketone, diethyl ketone, 2-hexanone, tert-butyl methyl ketone, cyclopentanone, cyclohexanone, and the like; halogenated hydrocarbons, for example, chloromethane, chloroform, dichloromethane, dichloroethane, trichloroethane, carbon tetrachloride, chlorobenzene, and the like; hydrocarbons, for example, n-hexane, benzene, toluene, xylene, and the like; esters, for example, ethyl acetate, butyl acetate, methyl propionate, and the like; nitriles, for example, acetonitrile, and the like; amides, for example, N,N-dimethylformamide, and the like; and among them, the ethers, the halogenated hydrocarbons, and the hydrocarbons are preferable, and tetrahydrofuran, toluene, and methylene chloride are more preferable. They may be used alone, or in combination of two or more kinds thereof as appropriate.

Use amount of the reaction solvent is usually 1 to 50 times volume, and preferably 1 to 20 times volume, relative to total volume of the rhodamine derivative represented by the general formula (I-I), and the compound represented by the general formula (I-II).

The alkylene group having 1 to 21 carbon atoms, which has at least one group of —O— or an arylene group in the chain, in $A'_1$ of the compound represented by the general formula (I-IV), includes the same one as the alkylene group having 1 to 21 carbon atoms, which has at least one group of —O— or an arylene group in the chain, in $A_1$.

In addition, the alkylene group having 1 to 21 carbon atoms, in $A'_1$ of the compound represented by the general formula (I-IV), includes the same one as the alkylene group having 1 to 21 carbon atoms, in $A_1$ to be described later.

Preferable combinations of $R_7$, $A'_1$ and $A_2$ in the general formula (I-IV) include the combinations in accordance with the preferable ones of $R_7$, $A_1$ and $A_2$, described in the item of the general formula (I) to be described later.

In addition, use amount of the compound represented by the general formula (I-IV) is 1 to 5 times mole, and preferably 1 to 2 times mole, relative to the rhodamine derivative represented by the general formula (I-I).

The catalyst to be used in the method (ii), that is, in the method for obtaining the general formula (I-III) using the compound represented by the general formula (I-IV), includes, for example, a quaternary salt catalyst, for example, tetraethylammonium bromide, tetrabutylammonium bromide, tetraethylammonium chloride, tetrabutylphosphonium bromide, triphenylbenzylphosphonium chloride, and the like; amines, for example, triethylamine, tributylamine, and the like.

Use amount of the catalyst is 1 to 10 times mole, and preferably 1 to 5 times mole, relative to the compound represented by the general formula (I-I).

The method (ii) is carried out by subjecting to a reaction in a reaction solvent, usually at 10 to 50° C., for 5 to 24 hours.

The reaction solvents include the same ones as described in the method for subjecting the rhodamine compound of the general formula (I-I), and the compound of the general formula (I-II) to a reaction. These may be used alone, or in combination of two or more kinds thereof as appropriate.

Use amount of the reaction solvent is usually 1 to 50 times volume, and preferably 1 to 20 times volume, relative to total volume of the rhodamine derivative of the general formula (I-I), and the compound of the general formula (I-III).

Next, explanation will be given on the rhodamine compound of the general formula (I-I), which becomes a starting raw material of the cationic rhodamine derivative of the present invention.

The rhodamine compound of the present invention includes, for example, a compound represented by the following general formula (XI).

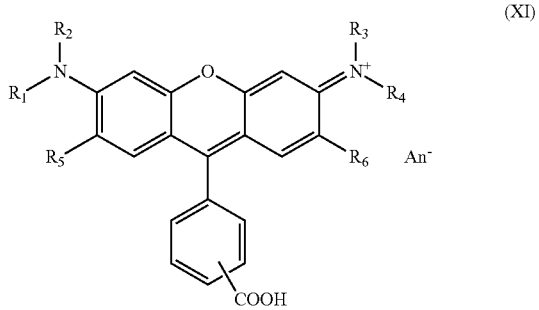

(XI)

[where, in the general formula (XI), $R_1$ to $R_4$ each independently represent a hydrogen atom, an alkyl group having 1 to 30 carbon atoms, a hydroxyalkyl group having 1 to 6 carbon atoms, a sulfoalkyl group having 1 to 6 carbon atoms, a carboxyalkyl group having 2 to 7 carbon atoms, a cyanoalkyl group having 2 to 7 carbon atoms, an alkoxyalkyl group having 2 to 6 carbon atoms, a halogenoalkyl group having 1 to 6 carbon atoms, a phenyl group having or not having a substituent, or a benzyl group having or not having a substituent; $R_5$ to $R_6$ each independently represent a hydrogen atom or a methyl group. $An^-$ represents an anion.]

The alkyl group having 1 to 30 carbon atoms, in $R_1$ to $R_4$, may be any of the linear, branched, or cyclic one, and the one having 1 to 6 carbon atoms is preferable, and the one having 1 to 3 carbon atoms is more preferable.

It specifically includes, for example, a methyl group, an ethyl group, a propyl group, an isopropyl group, a butyl group, a 1-methylpropyl group, an isobutyl group, a tert-butyl group, a pentyl group, a 1-ethylpropyl group, a 1-methylbutyl group, a cyclopentyl group, a hexyl group, a 1-methylpentyl group, a 1-ethylbutyl group, a cyclohexyl group, a 2-heptyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a heneicosyl group, a docosyl group, a tricosyl group, a tetracosyl group, a pentacosyl group, a hexacosyl group, a heptacosyl group, an octacosyl group, a nonacosyl group, a triacontyl group, an isoheptyl group, an isooctyl group, an isononyl group, an isodecyl group, an isoundecyl group, an isododecyl group, an isotridecyl group, an isotetradecyl group, an isopentadecyl group, an isohexadecyl group, an isoheptadecyl group, an isooctadecyl group, an isononadecyl group, an isoaralkyl group, an isoeicosyl group, an isoheneicosyl group, an isodocosyl group, an isotricosyl group, an isotetracosyl group, an isopentacosyl group, an isohexacosyl group, an isoheptacosyl group, an isooctacosyl group, an isononacosyl group, an isotriacontyl group, a 1-methylhexyl group, a 1-ethylheptyl group, a 1-methylheptyl group, a 1-cyclohexylethyl group, a 1-heptyloctyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 2-ethylhexyl group, a 1-adamantyl group, a 2-adamantyl group, and the like; and the methyl group, the ethyl group, the propyl group, the isopropyl group, the butyl group, the pentyl group, the hexyl group, and the like, are preferable; and the methyl group, the ethyl group, the propyl group, and the like, are more preferable.

As the hydroxyalkyl group having 1 to 6 carbon atoms in $R_1$ to $R_4$, the one having 1 to 3 carbon atoms is preferable, and it specifically includes, for example, a hydroxymethyl group, a hydroxyethyl group, a hydroxypropyl group, a hydroxybutyl group, a hydroxypentyl group, a hydroxyhexyl group, and the like.

In addition, as the sulfoalkyl group having 1 to 6 carbon atoms in $R_1$ to $R_4$, the one having 1 to 3 carbon atoms is preferable, and it specifically includes, for example, a sulfomethyl group, a sulfoethyl group, a sulfopropyl group, a sulfobutyl group, a sulfopentyl group, a sulfohexyl group, and the like.

As the carboxyalkyl group having 2 to 7 carbon atoms in $R_1$ to $R_4$, the one having 3 to 6 carbon atoms is preferable; and it specifically includes, for example, a carboxymethyl group, a carboxyethyl group, a carboxypropyl group, a carboxybutyl group, a carboxypentyl group, a carboxyhexyl group, and the like, and the carboxyethyl group is preferable.

In addition, as the cyanoalkyl group having 2 to 7 carbon atoms in $R_1$ to $R_4$, the one having 2 to 4 carbon atoms is preferable; and it specifically includes, for example, a cyanomethyl group, a cyanoethyl group, a cyanopropyl group, a cyanobutyl group, a cyanopentyl group, a cyanohexyl group, and the like, and the cyanoethyl group is preferable.

As the alkoxyalkyl group having 2 to 6 carbon atoms in $R_1$ to $R_4$, the one having 3 to 5 carbon atoms is preferable, and it specifically includes, for example, a methoxymethyl group, a methoxyethyl group, an ethoxymethyl group, an ethoxyethyl group, a propoxymethyl group, a propoxyethyl group, a butoxymethyl group, a butoxyethyl group, and the like.

In addition, as the halogenoalkyl group having 1 to 6 carbon atoms in $R_1$ to $R_4$, the one having 1 to 3 carbon atoms is preferable, and it specifically includes, for example, a trifluoromethyl group, a pentafluoroethyl group, a heptafluoropropyl group, a trichloromethyl group, a tribromomethyl group, a triiodomethyl group, and the like.

The phenyl group or the benzyl group having a substituent, in $R_1$ to $R_4$, has one to five pieces, preferably one to three pieces of the substituents within the benzene ring. The substituent includes, for example, an alkyl group having 1 to 6 carbon atoms such as a methyl group, an ethyl group, a propyl group, an isopropyl group, a butyl group, an isobutyl group, a tert-butyl group, a pentyl group and a hexyl group; a halogen atom such as a fluorine atom, a chlorine atom, a bromine atom and an iodine atom; a sulfo group; an alkoxy group having 1 to 6 carbon atoms, such as a methoxy group, an ethoxy group, a propoxy group, a butoxy group, a tert-butoxy group, a propoxy group and a hexyloxy group; a hydroxyalkyl group having 1 to 6 carbon atoms, such as a hydroxyethyl group and a hydroxypropyl group; an alkoxyalkyl group having 2 to 10 carbon atoms, such as a methoxyethyl group, an ethoxyethyl group, an ethoxypropyl group and a butoxyethyl group; a hydroxyalkoxy group having 1 to 6 carbon atoms, such as a 2-hydroxyethoxy group; an alkoxyalkoxy group having 2 to 10 carbon atoms, such as a 2-methoxyethoxy group and a 2-ethoxyethoxy group; a sulfoalkyl group having 1 to 6 carbon atoms, such as a 2-sulfoethyl group; a carboxyalkyl group having 2 to 7 carbon atoms, such as a carboxymethyl group, a carboxyethyl group, a carboxypropyl group, a carboxybutyl group, a carboxypentyl group and a carboxyhexyl group; a cyanoalkyl group having 2 to 7 carbon atoms, such as a cyanomethyl group, a cyanoethyl group, a cyanopropyl group, a cyanobutyl group, a cyanopentyl group and a cyanohexyl group; and the like.

Among the specific examples of $R_1$ to $R_4$, a hydrogen atom, a methyl group, an ethyl group, a propyl group, an isopropyl group, a butyl group, a pentyl group, a hexyl group, and the like, are preferable; and the hydrogen atom, the methyl group, the ethyl group, the propyl group, and the like, are more preferable; and the hydrogen atom and the ethyl group are particularly preferable.

In addition, $R_5$ and $R_6$ are preferably a hydrogen atom or the methyl group.

Preferable combinations of $R_1$ to $R_6$ include, for example, those described in the following Table 1, and among them, the No. 1 combination is preferable.

TABLE 1

| No. | $R_1$ | $R_2$ | $R_3$ | $R_4$ | $R_5$ | $R_6$ |
|---|---|---|---|---|---|---|
| 1 | ethyl group | ethyl group | ethyl group | ethyl group | hydrogen atom | hydrogen atom |
| 2 | methyl group | methyl group | methyl group | methyl group | hydrogen atom | hydrogen atom |
| 3 | methyl group | ethyl group | methyl group | ethyl group | hydrogen atom | hydrogen atom |
| 4 | hydrogen atom | methyl group | hydrogen atom | methyl group | hydrogen atom | hydrogen atom |
| 5 | hydrogen atom | ethyl group | hydrogen atom | ethyl group | hydrogen atom | hydrogen atom |
| 6 | ethyl group | ethyl group | ethyl group | ethyl group | methyl group | methyl group |
| 7 | methyl group | methyl group | methyl group | methyl group | methyl group | methyl group |
| 8 | methyl group | ethyl group | methyl group | ethyl group | methyl group | methyl group |
| 9 | hydrogen atom | methyl group | hydrogen atom | methyl group | methyl group | methyl group |
| 10 | hydrogen atom | ethyl group | hydrogen atom | ethyl group | methyl group | methyl group |

In addition, the anion represented by $An^-$ is not especially limited, as long as it is an anion, and specifically includes, for example, a halogen ion, a borate anion, a phosphate anion, a carboxylate anion, a sulfate anion, an organic sulfonate anion, a nitrogen anion, a methide anion, a metallic oxide anion, a fluoroantimony anion, a nitrate anion, a perchlorate anion, a cyanogen anion, a cyanate anion, a thiocyanate anion, and the like.

The halogen ion includes a fluoride ion, a chloride ion, a bromide ion, an iodide ion, and the like.

In addition, the borate anion includes, for example, $BF_4^-$, $(CF_3)_4B^-$, $(CF_3)_3BF^-$, $(CF_3)_2BF_2^-$, $(CF_3)BF_3^-$, $(C_2F_5)_4B^-$, $(C_2F_5)_3BF^-$, $(C_2F_5)BF_3^-$, $(C_2F_5)_2BF_2^-$, $(CF_3)(C_2F_5)_2BF^-$, $(C_6F_5)_4B^-$, $[(CF_3)_2C_6H_3]_4B^-$, $(CF_3C_6H_4)_4B^-$, $(C_6F_5)_2BF_2^-$, $(C_6F_5)BF_3^-$, $(C_6H_3F_2)_4B^-$, $B(CN)_4^-$, $B(CN)F_3^-$, $B(CN)_2F_2^-$, $B(CN)_3F^-$, $(CF_3)_3B(CN)^-$, $(CF_3)_2B(CN)_2^-$, $(C_2F_5)_3B(CN)^-$, $(C_2F_5)_2B(CN)_2^-$, $(n-C_3F_7)_3B(CN)^-$, $(n-C_4F_9)_3B(CN)^-$, $(n-C_4F_9)_2B(CN)_2^-$, $(n-C_6F_{13})_3B(CN)^-$, $(CHF_2)_3B(CN)^-$, $(CHF_2)_2B(CN)_2^-$, $(CH_2CF_3)_3B(CN)^-$, $(CH_2CF_3)_2B(CN)_2^-$, $(CH_2C_2F_5)_3B(CN)^-$, $(CH_2C_2F_5)_2B(CN)_2^-$, $(CH_2CH_2C_3F7)_2B(CN)_2^-$, $(n-C_3F_7CH_2)_2B(CN)_2^-$, $(C_6H_5)_3B(CN)^-$, tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl,penrafluorophenyl)borate, [tris(pentafluorophenyl),phenyl]borate, tridecahydride-7,8-dicarbaundecaborate, and the like.

In addition, the phosphate anion includes, for example, $HPO_4^{2-}$, $PO_4^{3-}$, $PF_6^-$, $(C_2F_5)_2PF_4^-$, $(C_2F_5)_3PF_3^-$, $[(CF_3)_2CF]_2PF_4^-$, $[(CF_3)_2CF]_3PF_3$, $(n-C_3F_7)_2PF_4^-$, $(n-C_3F_7)_3PF_3^-$, $(n-C_4F_9)_3PF_3^-$, $(C_2F_5)(CF_3)_2PF_3^-$, $[(CF_3)_2CFCF_2]_2PF_4^-$, $[(CF_3)_2CFCF_2]_3PF_3^-$, $(n-C_4F_9)_2PF_4^-$, $(n-C_4F_9)_3PF_3^-$, $(C_2F_4H)(CF_3)_2PF_3^-$, $(C_2F_3H_2)_3PF_3^-$, $(C_2F_5)(CF_3)_2PF_3^-$, and the like.

In addition, the carboxylate anion includes, for example, an alkyl carboxylate ion such as methylcarboxylate ion, ethylcarboxylate ion and propylcarboxylate ion; benzene carboxylate ion; and the like.

In addition, the sulfate anion includes, for example, a sulfate anion, a sulfite anion.

In addition, the organic sulfonate anion includes, for example, methane sulfonate ion, ethane sulfonate ion, propane sulfonate ion, butane sulfonate ion, pentane sulfonate ion, hexane sulfonate ion, heptane sulfonate ion, octane sulfonate ion, nonane sulfonate ion, decane sulfonate ion, undecane sulfonate ion, dodecane sulfonate ion, trifluoromethane sulfonate ion, nonafluorobutane sulfonate ion, benzenesulfonate ion, dodecylbenzene sulfonate ion, benzene disulfonate ion, p-toluene sulfonate ion, p-trifluoromethyl sulfonate ion, pentafluorobenzene sulfonate ion, naphthalene sulfonate ion, naphthalene disulfonate ion, and the like.

In addition, the nitrogen anion includes, for example, $[(CN)_2N]^-$, $[(FSO_2)_2N]^-$, $[(FSO_2)N(CF_3SO_2)]^-$, $[(CF_3SO_2)_2N]^-$, $[(FSO_2)N(CF_3CF_2SO_2)]^-$, $[(FSO_2)N\{(CF_3)_2CFSO_2\}]^-$, $[(FSO_2)N(CF_3CF_2CF_2SO_2)]^-$, $[(FSO_2)N(CF_3CF_2CF_2CF_2SO_2)]^-$, $[(FSO_2)N\{(CF_3)_2CFCF_2SO_2\}]^-$, $[(FSO_2)N\{CF_3CF_2(CF_3)CFSO_2\}]^-$, $[(FSO_2)N\{(CF_3)_3CSO_2\}]^-$, and the like.

Further, the methide anion includes, for example, $(CF_3SO_2)_3C^-$, $(CF_3CF_2SO_2)_3C^-$, $[(CF_3)_2CFSO_2]_3C^-$, $(CF_3CF_2CF_2SO_2)_3C^-$, $(CF_3CF_2CF_2CF_2SO_2)_3C^-$, $[(CF_3)_2CFCF_2SO_2]_3C^-$, $[CF_3CF_2(CF_3)CFSO_2]_3C^-$, $[(CF_3)_3CSO_2]_3C^-$, $(FSO_2)_3C^-$, and the like.

The metallic oxide anion includes, for example, $AlO_2^-$, $GaO_2^-$, $GeO_2^-$, $InO_2^-$, $SnO_2^-$, $AsO_3^-$, $SbO_3^-$ and $VO_3^-$, and the like.

The fluoroantimony anion includes, for example, antimony hexafluoride anion, antimony pentafluoride anion, and the like.

The anion represented by $An^-$ is preferably the anion containing the aryl group having the electron-withdrawing substituent, the sulfonyl group having the electron-withdrawing substituent, the halogenated alkyl group or the sulfo group.

An anion moiety in the anion containing the aryl group having the electron-withdrawing substituent, the sulfonyl group having the electron-withdrawing substituent, or the halogenated alkyl group includes, for example, a sulfonate anion, a nitrogen anion ($N^-$), a quaternary boron anion, a nitrate ion, a phosphate ion, and the like; and the sulfonate anion, the nitrogen anion and the quaternary boron anion are preferable, and the quaternary boron anion is more preferable.

The electron-withdrawing substituent in the aryl group having the electron-withdrawing substituent, or the sulfonyl group having the electron-withdrawing substituent, includes, for example, a halogenated alkyl group having 1 to 3 carbon atoms, a halogeno group, a nitro group, and the like, and among them, the halogenated alkyl group having 1 to 3 carbon atoms, and the halogeno group are preferable, and the halogeno group is particularly preferable.

The halogenated alkyl group having 1 to 3 carbon atoms, as the electron-withdrawing substituent, includes, for example, a chloroalkyl group such as a chloromethyl group, a trichloromethyl group, a 2-chloroethyl group, a 2,2,2-trichloroethyl group, a pentachloroethyl group, a 2-chloropropyl group, a 3-chloropropyl group, a 2-chloro-2-propyl group and a heptachloropropyl group; a bromoalkyl group such as a bromomethyl group, a tribromomethyl group, a 2-bromoethyl group, a 2,2,2-tribromoethyl group, a pentabromoethyl group, a 2-bromopropyl group, a 3-bromopropyl group, a 2-bromo-2-propyl group and a heptabromopropyl group; an iodoalkyl group such as an iodomethyl group, a triiodomethyl group, a 2-iodoethyl group, a 2,2,2-triiodoethyl group, a pentaiodoethyl group, a 2-iodopropyl group, a 3-iodopropyl group, a 2-iodo-2-propyl group and a heptaiodopropyl group; a fluoroalkyl group such as a fluoromethyl group, a trifluoromethyl group, a 2-fluoroethyl group, a 2,2,2-trifluoroethyl group, a 1,1,2,2-tetrafluoroethyl group, a pentafluoroethyl group, a 3-fluoropropyl group, a 3,3,3-trifluoropropyl group, a 2,2,3,3-tetrafluoropropyl group and a heptafluoropropyl group. Among them, the perhalogenoalkyl group such as the trichloromethyl group, the pentachloroethyl group, the heptachloropropyl group, the tribromomethyl group, the pentabromoethyl group, the heptabromopropyl group, the triiodomethyl group, the pentaiodoethyl group, the heptaiodopropyl group, the trifluoromethyl group, the pentafluoroethyl group and the heptafluoropropyl group, is preferable; and the perfluoroalkyl group such as the trifluoromethyl group, the pentafluoroethyl group and the heptafluoropropyl group, is more preferable, and the trifluoromethyl group is particularly preferable.

The halogeno group, as the electron-withdrawing substituent, includes a fluoro group, a chloro group, a bromo group and an iodo group, and the fluoro group is preferable.

As the electron-withdrawing substituent in the aryl group having the electron-withdrawing substituent, among the specific examples, the one having strong electron-withdrawing force is preferable; and the trifluoromethyl group, the fluoro group and the nitro group are preferable, and the fluoro group is more preferable.

As the electron-withdrawing substituent in the sulfonyl group having the electron-withdrawing substituent, among the specific examples, the trifluoromethyl group, the pentafluoroethyl group, the heptafluoropropyl group and the fluoro group is preferable.

The aryl group in the aryl group having the electron-withdrawing substituent includes, for example, a phenyl group, a naphthyl group, and the like, and the phenyl group is preferable.

Specific examples of the aryl group having the electron-withdrawing substituent include, for example, those represented by the following general formulae (11) and (12).

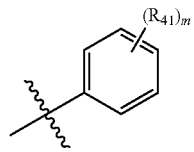

(11)

(wherein m represents an integer of 1 to 5; m pieces of $R_{41}$ each independently represent a halogenated alkyl group having 1 to 3 carbon atoms, a halogen atom or a nitro group.)

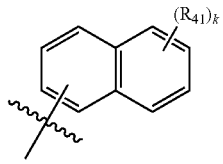

(12)

(wherein k represents an integer of 1 to 7; $R_{41}$ is the same as described above; k pieces of $R_{41}$ may be the same or different.)

In the general formula (11), m is usually an integer of 1 to 5, and in the case where $R_{41}$ is the halogen atom, m is preferably 2 to 5, more preferably 3 to 5, and further preferably 5. In the case where $R_{41}$ is the nitro group, m is preferably an integer of 1 to 3, and more preferably 1. In the case where $R_{41}$ is the halogenated alkyl group, m is preferably an integer of 1 to 5, and more preferably 1 to 3.

In the general formula (12), k is usually an integer of 1 to 7, and in the case where $R_{41}$ is the halogen atom, k is preferably 2 to 7. In the case where $R_{41}$ is the nitro group, k is preferably 1 to 3, and more preferably 1. In the case where $R_{41}$ is the halogenated alkyl group, k is preferably 1 to 7, and more preferably 1 to 3.

The halogenated alkyl group having 1 to 3 carbon atoms, in $R_{41}$ of the general formula (11) and the general formula (12), includes the same one as the halogenated alkyl group having 1 to 3 carbon atoms, as the electron-withdrawing substituent in the anion of the present invention, and the preferable one is also the same.

The halogen atom, in $R_{41}$ of the general formula (11) and the general formula (12), includes a fluorine atom, a chlorine atom, a bromine atom, an iodine atom, and the like, and among them, the fluorine atom is preferable.

Preferable specific examples, in $R_{41}$ of the general formula (11) and the general formula (12), are the same as the preferable ones of the electron-withdrawing substituent in the aryl group having the electron-withdrawing substituent.

The group represented by the general formula (11) specifically includes, for example, a trifluoromethylphenyl group, a di(trifluoromethyl)phenyl group, a tri(trifluoromethyl)phenyl group, a monofluorophenyl group, a difluorophenyl group, a trifluorophenyl group, a perfluorophenyl group, a monochlorophenyl group, a dichlorophenyl group, a trichlorophenyl group, a perchlorophenyl group, a monobromophenyl group, a dibromophenyl group, a tribromophenyl group, a perbromophenyl group, a monoiodophenyl group, a diiodophenyl group, a triiodophenyl group, a periodophenyl group, a nitrophenyl group, a dinitrophenyl group, a trinitrophenyl group, and the like; and the difluorophenyl group, the trifluorophenyl group, the perfluorophenyl group, and the like, are preferable; and the perfluorophenyl group is more preferable.

In addition, the group represented by the general formula (12) specifically includes, for example, a trifluoromethylnaphthyl group, a di(trifluoromethyl)naphthyl group, a tri(trifluoromethyl)naphthyl group, a monofluoronaphthyl group, a difluoronaphthyl group, a trifluoronaphthyl group, a perfluoronaphthyl group, a monochloronaphthyl group, a dichloronaphthyl group, a trichloronaphthyl group, a perchloronaphthyl group, a monobromonaphthyl group, a dibromonaphthyl group, a tribromonaphthyl group, a perbromonaphthyl group, a monoiodonaphthyl group, a diiodonaphthyl group, a triiodonaphthyl group, a periodonaphthyl group, a nitronaphthyl group, a dinitronaphthyl group, a trinitronaphthyl group, and the like.

The aryl group having the electron-withdrawing substituent, among the specific examples, is preferably the group represented by the general formula (11); and specifically, a trifluoromethylphenyl group, a nitrophenyl group, a dinitrophenyl group, a trinitrophenyl group, a monofluorophenyl group, a difluorophenyl group, a trifluorophenyl group and a perfluorophenyl group are preferable, and the difluorophenyl group, the trifluorophenyl group, the nitrophenyl group and the perfluorophenyl group are more preferable, and the perfluorophenyl group is further particularly preferable.

The sulfonyl group having the electron-withdrawing substituent includes, for example, —SO$_2$CF$_3$, —SO$_2$C$_2$F$_5$, —SO$_2$C$_3$F$_7$, —SO$_2$F, —SO$_2$Cl, —SO$_2$Br, —SO$_2$I, and the like.

The halogenated alkyl group in the anion of the present invention includes a halogenated alkyl group having 1 to 3 carbon atoms, and among them, a perhalogenated alkyl group is preferable, and specifically includes, for example, a trifluoromethyl group, a pentafluoroethyl group, a heptafluoropropyl group, a trichloromethyl group, a pentachloroethyl group, a heptachloropropyl group, a tribromomethyl group, a pentabromoethyl group, a heptabromopropyl group, a triiodomethyl group, a pentaiodoethyl group, a heptaiodopropyl group, and the like, and the trifluoromethyl group, the pentafluoroethyl group and the heptafluoropropyl group are preferable.

The anion containing the sulfo group includes the one in which the sulfo group acts as a sulfonate anion.

Specific examples of the anion containing the sulfo group include, for example, an alkylsulfonic acid having 1 to 20 carbon atoms, such as methane sulfonic acid; an haloalkylsulfonic acid having 1 to 20 carbon atoms, such as trifluoromethane sulfonic acid; a benzene sulfonic acid having or not having a substituent, such as benzene sulfonic acid and toluene sulfonic acid; and the like.

Preferable specific examples of the anion containing the aryl group having the electron-withdrawing substituent, the sulfonyl group having the electron-withdrawing substituent, the halogenated alkyl group or the sulfo group, in the anion represented by An$^-$, include, for example, those represented by the following general formulae (XI-I) to (XI-VI).

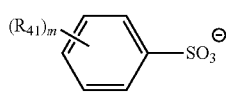
(XI-I)

(where in the general formula (XI-I), $R_{41}$ and m are the same as those in the general formula (11); m pieces of $R_{41}$ may be the same or different.)

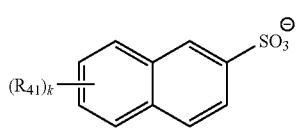
(XI-II)

(where in the general formula (XI-II), $R_{41}$ and k are the same as those in the general formula (12); k pieces of $R_{41}$ may be the same or different.)

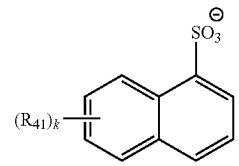
(XI-III)

(where in the general formula (XI-III), $R_{41}$ and k are the same as those in the general formula (12); k pieces of $R_{41}$ may be the same or different.)

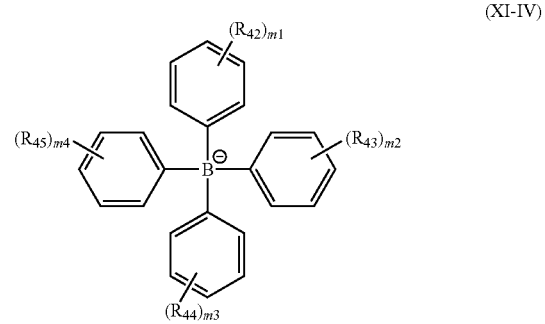
(XI-IV)

(where in the general formula (XI-IV), $R_{42}$ to $R_{45}$ each independently represent a halogenated alkyl group having 1 to 3 carbon atoms, a halogen or a nitro group; $m_1$ to $m_4$ each independently represent an integer of 1 to 5; $m_1$ pieces of $R_{42}$ may be the same or different; $m_2$ pieces of $R_{43}$, $m_3$ pieces of $R_{44}$ and $m_4$ pieces of $R_{45}$ also may each be the same or different.)

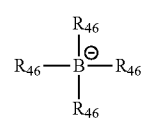
(XI-V)

(where in the general formula (XI-V), $R_{46}$ each independently represent a halogenated alkyl group having 1 to 3 carbon atoms, or a halogen atom; provided that at least one of four $R_{46}$ represents a halogenated alkyl group having 1 to 3 carbon atoms.)

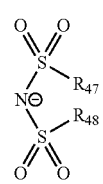
(XI-VI)

(where in the general formula (XI-VI), $R_{47}$ and $R_{48}$ each independently represent a halogenated alkyl group having 1 to 3 carbon atoms, or a halogen atom. $R_{47}$ together with $R_{48}$ may form a halogenated alkylene group having 2 to 3 carbon atoms.)

Combinations of $R_{41}$ and m in the general formula (XI-I) include, for example, those described in the following Table 2.

TABLE 2

| $R_{41}$ | m |
|---|---|
| trifluoromethyl group (—$CF_3$) | 1 to 3 |
| perfluoroethyl group (—$C_2F_5$) | 1 to 3 |
| perfluoropropyl group (—$C_3F_7$) | 1 to 3 |
| fluorine atom | 1 to 5 |
| chlorine atom | 1 to 5 |
| bromine atom | 1 to 5 |
| iodine atom | 1 to 5 |
| nitro group | 1 to 3 |

Preferable specific examples of the anion represented by the general formula (XI-I) include, for example, the following ones, and the like.

In addition, combinations of $R_{41}$ and m in the general formulae (XI-II) and (XI-III) include, for example, those described in the following Table 3.

TABLE 3

| $R_{41}$ | m |
|---|---|
| trifluoromethyl group (—$CF_3$) | 1 to 3 |
| perfluoroethyl group (—$C_2F_5$) | 1 to 3 |
| perfluoropropyl group (—$C_3F_7$) | 1 to 3 |
| nitro group | 1 to 4 |
| fluorine atom | 1 to 7 |
| chlorine atom | 1 to 7 |
| bromine atom | 1 to 7 |
| iodine atom | 1 to 7 |

Preferable specific examples of the anions represented by the general formulae (XI-II) and (XI-III) include, for example, the following ones, and the like.

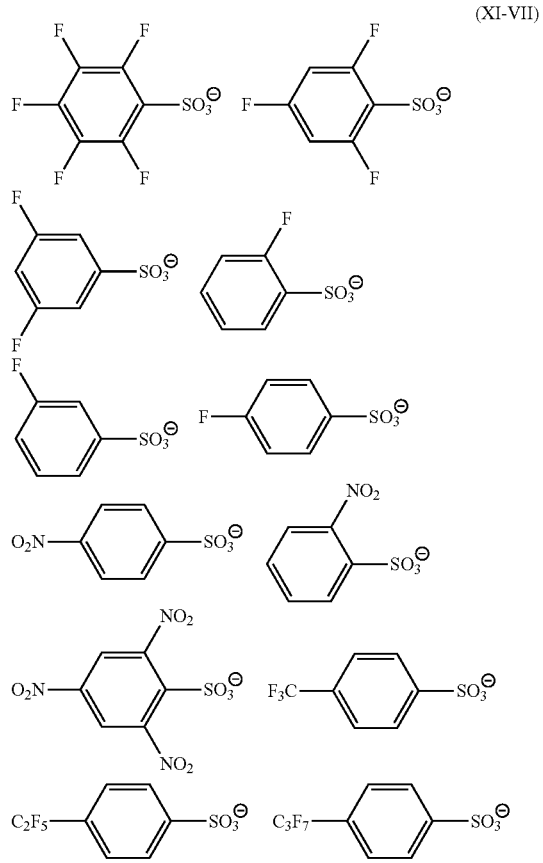

(XI-VII)

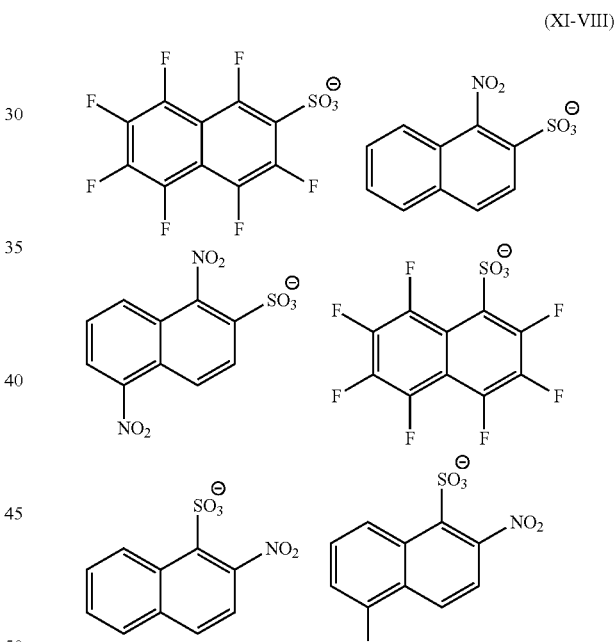

(XI-VIII)

In addition, combinations of $R_{42}$ to $R_{45}$ and $m_1$ to $m_4$ in the general formula (XI-IV) include, for example, those described in the following Table 4.

TABLE 4

| $R_{42}$ | $m_1$ | $R_{43}$ | $m_2$ | $R_{44}$ | $m_3$ | $R_{45}$ | $m_4$ |
|---|---|---|---|---|---|---|---|
| —$CF_3$ | 1 to 3 | —$CF_3$ | 1 to 3 | —$CF_3$ | 1 to 3 | —$CF_3$ | 1 to 3 |
| —$C_2F_5$ | 1 to 3 | —$C_2F_5$ | 1 to 3 | —$C_2F_5$ | 1 to 3 | —$C_2F_5$ | 1 to 3 |
| —$C_3F_7$ | 1 to 3 | —$C_3F_7$ | 1 to 3 | —$C_3F_7$ | 1 to 3 | —$C_3F_7$ | 1 to 3 |
| nitro group | 1 to 3 | nitro group | 1 to 3 | nitro group | 1 to 3 | nitro group | 1 to 3 |
| fluorine | 1 to 5 | fluorine | 1 to 5 | fluorine | 1 to 5 | fluorine | 1 to 5 |
| chlorine | 1 to 5 | chlorine | 1 to 5 | chlorine | 1 to 5 | chlorine | 1 to 5 |
| bromine | 1 to 5 | bromine | 1 to 5 | bromine | 1 to 5 | bromine | 1 to 5 |
| iodine | 1 to 5 | iodine | 1 to 5 | iodine | 1 to 5 | iodine | 1 to 5 |

TABLE 4-continued

| $R_{42}$ | $m_1$ | $R_{43}$ | $m_2$ | $R_{44}$ | $m_3$ | $R_{45}$ | $m_4$ |
|---|---|---|---|---|---|---|---|
| nitro group | 1 to 3 | fluorine | 1 to 5 | fluorine | 1 to 5 | fluorine | 1 to 5 |
| nitro group | 1 to 3 | nitro group | 1 to 5 | fluorine | 1 to 5 | fluorine | 1 to 5 |
| nitro group | 1 to 3 | nitro group | 1 to 5 | nitro group | 1 to 5 | fluorine | 1 to 5 |

Preferable specific examples of the anion represented by the general formula (XI-IV) include, for example, those represented by the following general formula (XI-IX) or the general formula (XI-X), and the like, and those represented by the general formula (XI-XI) are preferable, and those represented by the general formula (XI-XII) are more preferable.

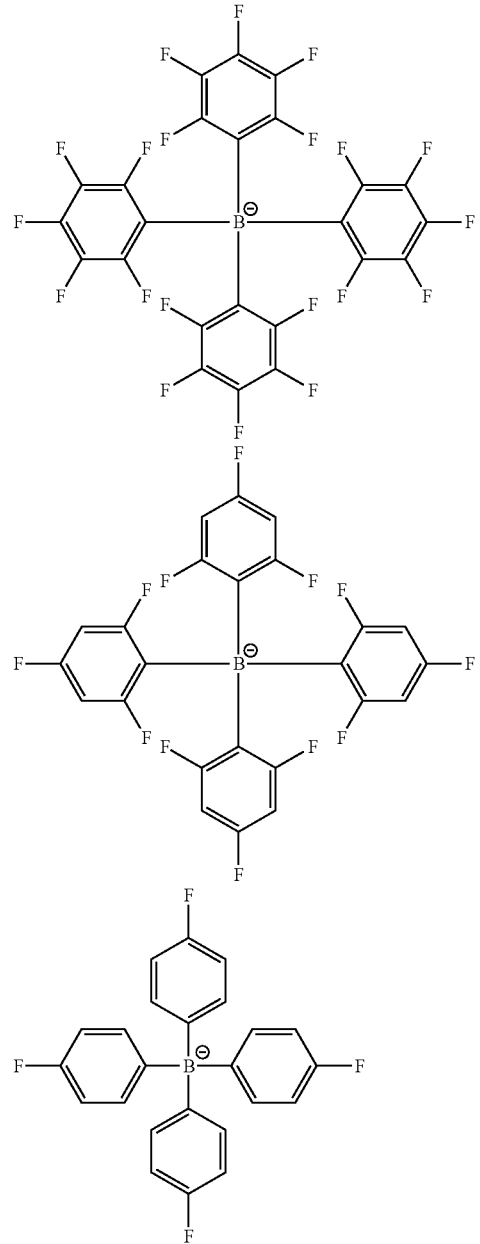

(XI-IX)

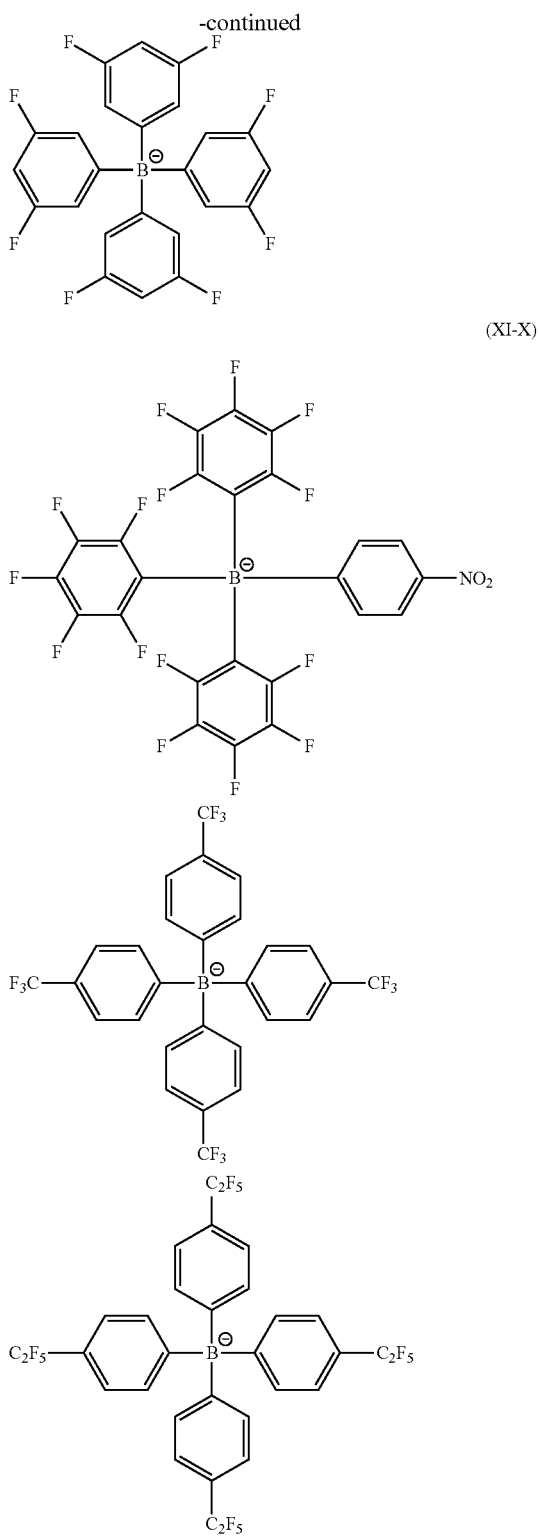

(XI-X)

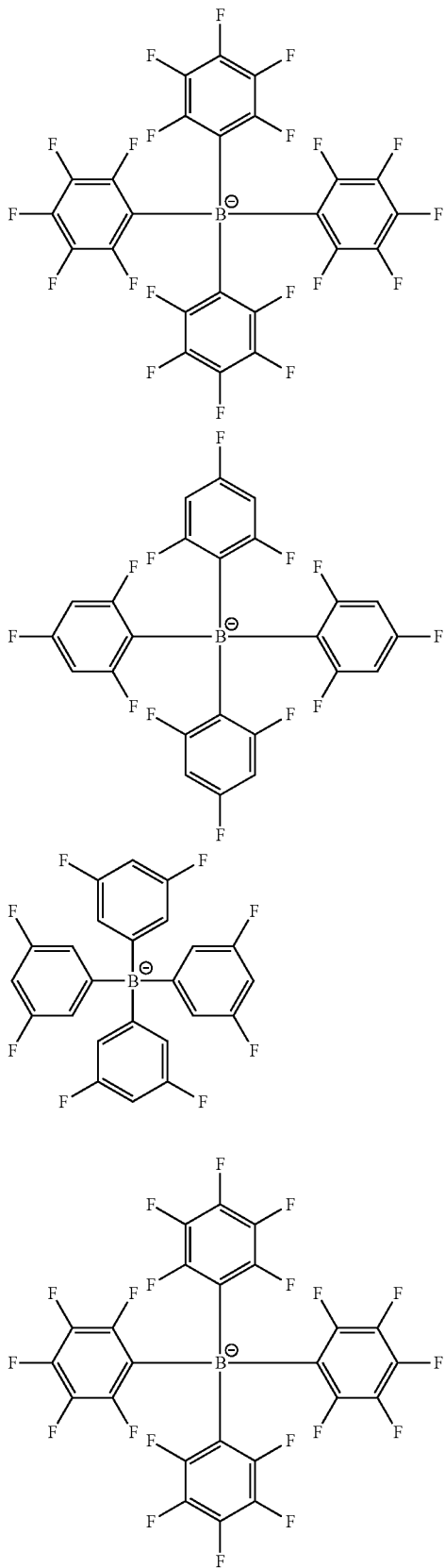

(XI-XI)

(XI-XII)

The halogenated alkyl group having 1 to 3 carbon atoms, in $R_{46}$ of the general formula (XI-V), includes the same one as the halogenated alkyl group having 1 to 3 carbon atoms, as the electron-withdrawing substituent, in the anion of the present invention, and the preferable one is also the same.

The halogen atom, in $R_{46}$ of the general formula (XI-V), includes a fluorine atom, a chlorine atom, a bromine atom, an iodine atom, and the like, and among them, the fluorine atom is preferable.

Preferable specific examples of the anion represented by the general formula (XI-V) include, for example, $CF_3BF_3^-$, $C_2F_5BF_3^-$, $C_3F_7BF_3^-$, $(CF_3)_4B^-$, $(C_2F_5)_4B^-$, $(C_3F_7)_4B^-$, and the like.

The halogenated alkyl group having 1 to 3 carbon atoms, in $R_{47}$ and $R_{48}$ of the general formula (XI-VI), includes the same one as the halogenated alkyl group having 1 to 3 carbon atoms, as the electron-withdrawing substituent, in the anion of the present invention, and the preferable one is also the same.

The halogen atom, in $R_{47}$ and $R_{48}$ of the general formula (XI-VI), includes a fluorine atom, a chlorine atom, a bromine atom, an iodine atom, and the like, and among them, the fluorine atom is preferable.

The halogenated alkylene group having 2 to 3 carbon atoms, formed together with $R_{47}$ and $R_{48}$ of the general formula (XI-VI), includes, for example, a tetrafluoroethylene group, a hexafluoropropylene group, and the like, and the hexafluoropropylene group is preferable.

Preferable specific examples of the anion represented by the general formula (XI-VI) include, for example, the general formula (XI-XIII).

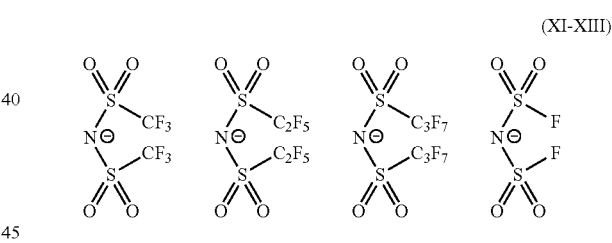

(XI-XIII)

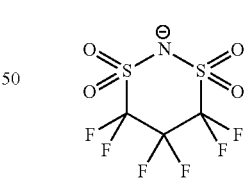

As the anion represented by $An^-$, the one represented by the general formula (XI-IV) or the general formula (XI-VI) is preferable, and the one represented by the general formula (XI-IV) is more preferable. Among the specific examples, the one represented by the following general formula (XI-XIV) is more preferable, and the one represented by the following general formula (XI-XVV) is further preferable, and the one represented by the following general formula (XI-XVI) is particularly preferable.

[XI-XIV]

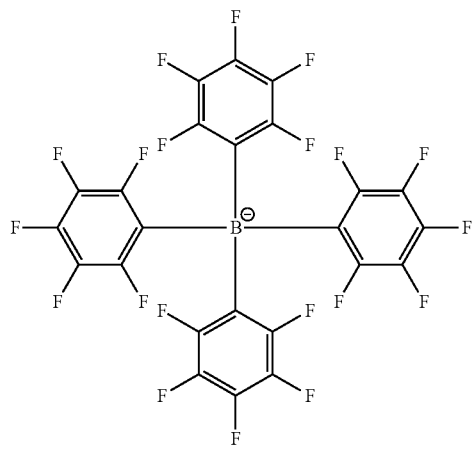

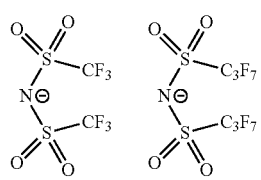

[XI-XV]

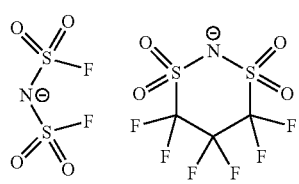

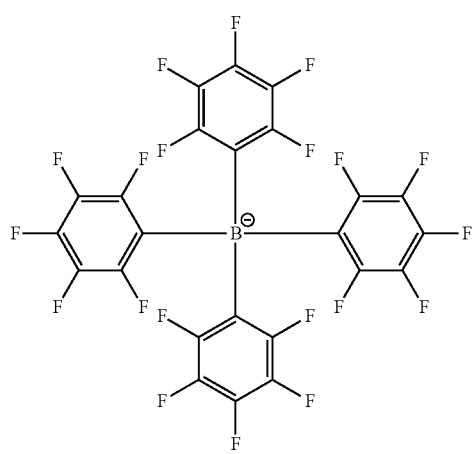

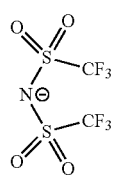

-continued

[XI-XVI]

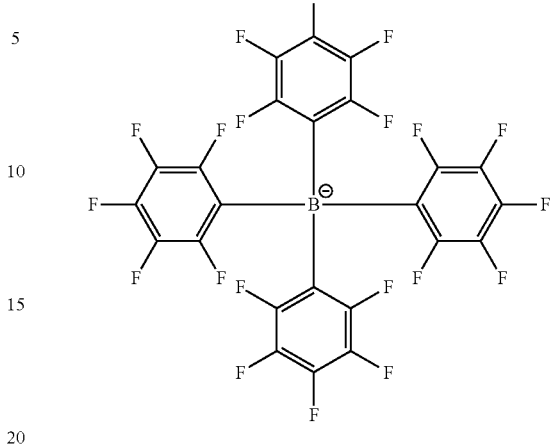

Next, explanation will be given on the ethylenically unsaturated group which the cationic rhodamine derivative of the present invention has, and the like.

The ethylenically unsaturated group may be an ethylenically unsaturated group having polymerizability, and specifically includes a vinyl group not having aromaticity, and the like.

It specifically includes an acryl group [CH$_2$=CH—C(=O)—], a methacryl group [CH$_2$=C(CH$_3$)—C(=O)—], an acrylamide group [CH$_2$=CH—C(=O)—NH—], a methacrylamide group [CH$_2$=C(CH$_3$)—C(=O)—NH—], and the like.

The ethylenically unsaturated group and, for example, the cationic rhodamine derivative of the present invention, and the like, are bonded directly or via a suitable spacer.

The spacer includes, for example, the alkylene group having 1 to 21 carbon atoms which has at least one group of —O—, —OCO—, —COO— or an arylene group in the chain, the alkylene group having 1 to 21 carbon atoms which has at least one group of —O—, —OCO—, —COO— or an arylene group in the chain, and also has a hydroxy group as a substituent, the alkylene group having 1 to 21 carbon atoms, or the alkylene group having 1 to 21 carbon atoms which has a hydroxy group as a substituent, and the like; and specifically includes, for example, a group described in A$_1$ in the general formula (I) to be described later, and the like.

(2) On the Compound Represented by the General Formula (I)

Specific examples of the cationic rhodamine derivative, having the ethylenically unsaturated group of the present invention, specifically includes, as described before, the compound represented by the following general formula (I), and the compound represented by the general formula (II) and the compound represented by the general formula (VI) to be described later.

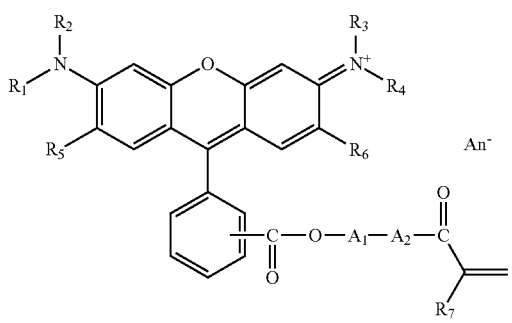

(I)

[where, in the general formula (I), $R_1$ to $R_4$ each independently represent a hydrogen atom, an alkyl group having 1 to 30 carbon atoms, a hydroxyalkyl group having 1 to 6 carbon atoms, a sulfoalkyl group having 1 to 6 carbon atoms, a carboxyalkyl group having 2 to 7 carbon atoms, a cyanoalkyl group having 2 to 7 carbon atoms, an alkoxyalkyl group having 2 to 6 carbon atoms, a halogenoalkyl group having 1 to 6 carbon atoms, a phenyl group having or not having a substituent, or a benzyl group having or not having a substituent; $R_5$ to $R_7$ each independently represent a hydrogen atom or a methyl group; $A_1$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_2$ represents —NH— or —O—. In addition, $An^-$ represents an anion.]

In the general formula (I), $R_7$ is preferably a methyl group.

In addition, in $A_1$ of the general formula (I), the arylene group in "an alkylene group having 1 to 21 carbon atoms which has at least one group selected from the group consisting of —O—, —OCO—, —COO—, —NHCO—, —CONH—, —NHCONH— and an arylene group in the chain" or "an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent" includes the one having 6 to 10 carbon atoms, and specifically includes a phenylene group, a naphthylene group, and the like.

In $A_1$ of the general formula (I), the alkylene group having 1 to 21 carbon atoms, in "an alkylene group having 1 to 21 carbon atoms which has at least one group selected from the group consisting of —O—, —OCO—, —COO—, —NHCO—, —CONH—, —NHCONH— and an arylene group in the chain", "an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent", "an alkylene group having 1 to 21 carbon atoms which has a hydroxy group as a substituent" and "an alkylene group having 1 to 21 carbon atoms" is the linear or branched one, and the one having 1 to 12 carbon atoms is preferable, and the one having 1 to 6 carbon atoms is more preferable, and the one having 1 to 3 carbon atoms is further preferable.

It specifically includes, for example, a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, a methylpentylene group, an n-heptylene group, an n-octylene group, an n-nonylene group, an n-decylene group, an n-undecylene group, an n-dodecylene group, an n-tridecylene group, an n-tetradecylene group, an n-pentadecylene group, an n-hexadecylene group, an n-heptadecylene group, an n-octadecylene group, an n-nonadecylene group, an n-eicosylene group, a cyclopentylene group, a cyclohexylene group, a cycloheptylene group, and the like; and the methylene group, the ethylene group, the propylene group, the butylene group, the pentylene group, the hexylene group, and the like, are preferable, the methylene group, the ethylene group, and the propylene group are more preferable, and the ethylene group is particularly preferable.

"An alkylene group having 1 to 21 carbon atoms which has at least one group selected from the group consisting of —O—, —OCO—, —COO—, —NHCO—, —CONH—, —NHCONH— and an arylene group in the chain", in $A_1$ of the general formula (I), includes, for example, groups represented by the following general formulae (6-1) to (6-4), and the like.

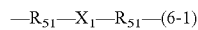

(wherein two $R_{51}$ each independently represent an alkylene group having 1 to 10 carbon atoms; $X_1$ represents —O—, —OCO—, COO— or an arylene group.)

(wherein three $R_{51}$ each independently represent the same one as described above; $X_1$ is the same as described above.)

(wherein two $R_{51}$ each independently represent the same one as described above; p7 represents an integer of 1 to 9.)

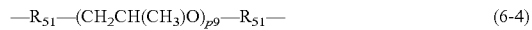

(wherein two $R_{51}$ each independently represent the same one as described above; p9 represents an integer of 1 to 9.)

The alkylene group having 1 to 10 carbon atoms, in $R_{51}$ of the general formula (6-1), is preferably the one having 1 to 6 carbon atoms, and more preferably the one having 1 to 3 carbon atoms. It specifically includes, for example, a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, a methylpentylene group, an n-heptylene group, an n-octylene group, an n-nonylene group, an n-decylene group, a cyclopentylene group, a cyclohexylene group, a cycloheptylene group, and the like; and the methylene group, the ethylene group and the propylene group are more preferable, and the ethylene group is particularly preferable.

The group represented by the general formula (6-1) includes specifically, for example, groups of the following general formulae (wherein $X_{11}$ represents —O—, —OCO—, COO— or an arylene group.).

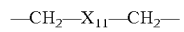

—CH$_2$—X$_{11}$—C$_2$H$_4$—

—CH$_2$—X$_{11}$—C$_3$H$_6$—

—CH$_2$—X$_{11}$—C$_4$H$_8$—

—CH$_2$—X$_{11}$—C$_5$H$_{10}$—

—CH$_2$—X$_{11}$—C$_6$H$_{12}$—

—C$_2$H$_4$—X$_{11}$—CH$_2$—

—C$_2$H$_4$—X$_{11}$—C$_2$H$_4$—

—C$_2$H$_4$—X$_{11}$—C$_3$H$_6$—

—C$_2$H$_4$—X$_{11}$—C$_4$H$_8$—

—C$_2$H$_4$—X$_{11}$—C$_5$H$_{10}$—

—C$_2$H$_4$—X$_{11}$—C$_6$H$_{12}$—

—C$_3$H$_6$—X$_{11}$—CH$_2$—

—C$_3$H$_6$—X$_{11}$—C$_2$H$_4$—

—C$_3$H$_6$—X$_{11}$—C$_4$H$_8$—

—C$_3$H$_6$—X$_{11}$—C$_5$H$_{10}$—

—C$_3$H$_6$—X$_{11}$—C$_6$H$_{12}$—

—C$_2$H$_4$—X$_{11}$—C$_6$H$_{10}$—

—C$_3$H$_6$—X$_{11}$—C$_6$H$_{10}$—

More preferable specific examples of the group represented by the general formula (6-1) include, for example, those of the following formulae.

—CH$_2$—OCO—CH$_2$—

—CH$^2$—OCO—C$_2$H$_4$—

—CH$^2$—OCO—C$_3$H$_6$—

—CH$_2$—OCO—C$_4$H$_8$—

—CH$_2$—OCO—C$_5$H$_{10}$—

—CH$^2$—OCO—C$_6$H$_{12}$—

—C$_2$H$_4$—OCO—CH$_2$—

—C$_2$H$_4$—OCO—C$_2$H$_4$—

—C$_2$H$_4$—OCO—C$_3$H$_6$—

—C$_2$H$_4$—OCO—C$_4$H$_8$—

—C$_2$H$_4$—OCO—C$_5$H$_{10}$—

—C$_2$H$_4$—OCO—C$_6$H$_{12}$—

—C$_3$H$_6$—OCO—CH$_2$—

—C$_3$H$_6$—OCO—C$_2$H$_4$—

—C$_3$H$_6$—OCO—C$_4$H$_8$—

—C$_3$H$_6$—OCO—C$_5$H$_{10}$—

—C$_3$H$_6$—OCO—C$_6$H$_{12}$—

—C$_2$H$_4$—OCO—C$_6$H$_{10}$—

—C$_3$H$_6$—OCO—C$_6$H$_{10}$—

Preferable specific examples of the group represented by the general formula (6-2) include, for example, groups of the following general formulae (wherein X$_{11}$ each independently represent —O—, —OCO—, COO— or a phenylene group.).

—CH$_2$—X$_{11}$—C$_2$H$_4$—X$_{11}$—CH$_2$—

—CH$_2$—X$_{11}$—C$_2$H$_4$—X$_{11}$—C$_2$H$_4$—

—C$_2$H$_4$—X$_{11}$—C$_2$H$_4$—X$_{11}$—CH$_2$—

—C$_2$H$_4$—X$_{11}$—C$_2$H$_4$—X$_{11}$—C$_2$H$_4$—

—C$_2$H$_4$—X$_{11}$—C$_2$H$_4$—X$_{11}$—C$_3$H$_6$—

—C$_2$H$_4$—X$_{11}$—C$_2$H$_4$—X$_{11}$—C$_4$H$_8$—

—C$_2$H$_4$—X$_{11}$—C$_2$H$_4$—X$_{11}$—C$_5$H$_{10}$—

—C$_2$H$_4$—X$_{11}$—C$_2$H$_4$—X$_{11}$—C$_6$H$_{12}$—

—C$_3$H$_6$—X$_{11}$—C$_2$H$_4$—X$_{11}$—CH$_2$—

—C$_3$H$_6$—X$_{11}$—C$_2$H$_4$—X$_{11}$—C$_2$H$_4$—

—C$_3$H$_6$—X$_{11}$—C$_2$H$_4$—X$_{11}$—C$_3$H$_6$—

—C$_3$H$_6$—X$_{11}$—C$_2$H$_4$—X$_{11}$—C$_4$H$_8$—

—C$_3$H$_6$—X$_{11}$—C$_2$H$_4$—X$_{11}$—C$_5$H$_{10}$—

—C$_3$H$_6$—X$_{11}$—C$_2$H$_4$—X$_{11}$—C$_6$H$_{12}$—

—C$_4$H$_8$—X$_{11}$—C$_2$H$_4$—X$_{11}$—CH$_2$—

—C$_4$H$_8$—X$_{11}$—C$_2$H$_4$—X$_{11}$—C$_2$H$_4$—

—C$_4$H$_8$—X$_{11}$—C$_2$H$_4$—X$_{11}$—C$_3$H$_6$—

—C$_4$H$_8$—X$_{11}$—C$_2$H$_4$—X$_{11}$—C$_4$H$_8$—

—C$_4$H$_8$—X$_{11}$—C$_2$H$_4$—X$_{11}$—C$_5$H$_{10}$—

—C$_4$H$_8$—X$_{11}$—C$_2$H$_4$—X$_{11}$—C$_6$H$_{12}$—

—C$_5$H$_{10}$—X$_{11}$—C$_2$H$_4$—X$_{11}$—CH$_2$—

—C$_5$H$_{10}$—X$_{11}$—C$_2$H$_4$—X$_{11}$—CH$_4$—

—C$_5$H$_{10}$—X$_{11}$—C$_2$H$_4$—X$_{11}$—C$_3$H$_6$—

—C$_5$H$_{10}$—X$_{11}$—C$_2$H$_4$—X$_{11}$—C$_4$H$_8$—

—C$_5$H$_{10}$—X$_{11}$—C$_2$H$_4$—X$_{11}$—C$_5$H$_{10}$—

—C$_5$H$_{10}$—X$_{11}$—C$_2$H$_4$—X$_{11}$—C$_4$H$_{12}$—

—C$_6$H$_{12}$—X$_{11}$—C$_2$H$_4$—X$_{11}$—CH$_2$—

—C$_6$H$_{12}$—X$_{11}$—C$_2$H$_4$—X$_{11}$—C$_2$H$_4$—

—C$_6$H$_{12}$—X$_{11}$—C$_2$H$_4$—X$_{11}$—C$_3$H$_6$—

—C$_5$H$_{12}$—X$_{11}$—C$_2$H$_4$—X$_{11}$—C$_4$H$_8$—

—C$_6$H$_{12}$—X$_{11}$—C$_2$H$_4$—X$_{11}$—C$_5$H$_{10}$—

—C$_6$H$_{12}$—X$_{11}$—C$_2$H$_4$—X$_{11}$—C$_6$H$_{12}$—

—CH$_2$—X$_{11}$—C$_3$H$_6$—X$_{11}$—CH$_2$—

—$C_2H_4$—$X_{11}$—$C_3H_6$—$X_{11}$—$C_2H_4$—

—$C_2H_4$—$X_{11}$—$C_3H_6$—$X_{11}$—$C_3H_6$—

—$C_2H_4$—$X_{11}$—$C_3H_6$—$X_{11}$—$C_4H_8$—

—$C_2H_4$—$X_{11}$—$C_3H_6$—$X_{11}$—$C_5H_{10}$—

—$C_2H_4$—$X_{11}$—$C_3H_6$—$X_{11}$—$C_6H_{12}$—

—$C_3H_6$—$X_{11}$—$C_3H_6$—$X_{11}$—$C_2H_4$—

—$C_3H_6$—$X_{11}$—$C_3H_6$—$X_{11}$—$C_3H_6$—

—$C_3H_6$—$X_{11}$—$C_3H_6$—$X_{11}$—$C_4H_8$—

—$C_3H_6$—$X_{11}$—$C_3H_6$—$X_{11}$—$C_5H_{10}$—

—$C_3H_6$—$X_{11}$—$C_3H_6$—$X_{11}$—$C_6H_{12}$—

—$C_4H_8$—$X_{11}$—$C_3H_6$—$X_{11}$—$C_4H_8$—

—$C_5H_{10}$—$X_{11}$—$C_3H_6$—$X_{11}$—$C_5H_{10}$—

—$C_6H_{12}$—$X_{11}$—$C_3H_6$—$X_{11}$—$C_6H_{12}$—

—$C_2H_4$—$X_{11}$—$CH_2$—$X_{11}$—$C_2H_4$—

—$C_2H_4$—$X_{11}$—$C_4H_8$—$X_{11}$—$C_2H_4$—

—$C_2H_4$—$X_{11}$—$C_5H_{10}$—$X_{11}$—$C_2H_4$—

—$C_2H_4$—$X_{11}$—$C_6H_{12}$—$X_{11}$—$C_2H_4$—

—$C_2H_4$—$X_{11}$—$C_6H_{10}$—$X_{11}$—$C_2H_4$—

In addition, more preferable specific examples of the group represented by the general formula (6-2) include, for example, groups of the following formulae.

—$CH^2$—OCO—$C_2H_4$—COO—$C_2H_4$—

—$CH^2$—OCO—$C_3H_6$—COO—$C_3H_6$—

—$C_4H_8$—OCO—$C_2H_4$—COO—$CH_2$—

—$C_4H_8$—OCO—$C_2H_4$—COO—$C_2H_4$—

—$C_4H_8$—OCO—$C_2H_4$—COO—$C_3H_6$—

—$C_4H_8$—OCO—$C_2H_4$—COO—$C_4H_8$—

—$C_4H_8$—OCO—$C_2H_4$—COO—$C_5H_{10}$—

—$C_4H_8$—OCO—$C_2H_4$—COO—$C_6H_{12}$—

—$C_5H_{10}$—OCO—$C_2H_4$—COO—$CH_2$—

—$C_5H_{10}$—OCO—$C_2H_4$—COO—$C_2H_4$—

—$C_5H_{10}$—OCO—$C_2H_4$—COO—$C_3H_6$—

—$C_5H_{10}$—OCO—$C_2H_4$—COO—$C_4H_8$—

—$C_5H_{10}$—OCO—$C_2H_4$—COO—$C_5H_{10}$—

—$C_5H_{10}$—OCO—$C_2H_4$—COO—$C_6H_{12}$—

—$C_6H_{12}$—OCO—$C_2H_4$—COO—$CH_2$—

—$C_6H_{12}$—OCO—$C_2H_4$—COO—$C_2H_4$—

—$C_6H_{12}$—OCO—$C_2H_4$—COO—$C_3H_6$—

—$C_6H_{12}$—OCO—$C_2H_4$—COO—$C_4H_8$—

—$C_6H_{12}$—OCO—$C_2H_4$—COO—$C_5H_{10}$—

—$C_6H_{12}$—OCO—$C_2H_4$—COO—$C_6H_{12}$—

—$CH^2$—OCO—$C_3H_6$—COO—$CH_2$—

—$C_2H_4$—OCO—$C_3H_6$—COO—$C_2H_4$—

—$C_2H_4$—OCO—$C_3H_6$—COO—$C_3H_6$—

—$C_2H_4$—OCO—$C_3H_6$—COO—$C_4H_8$—

—$C_2H_4$—OCO—$C_3H_6$—COO—$C_5H_{10}$—

—$C_2H_4$—OCO—$C_3H_6$—COO—$C_6H_{12}$—

—$C_3H_6$—OCO—$C_3H_6$—COO—$C_2H_4$—

—$C_3H_6$—OCO—$C_3H_6$—COO—$C_3H_6$—

—$C_3H_6$—OCO—$C_3H_6$—COO—$C_4H_8$—

—$C_3H_6$—OCO—$C_3H_6$—COO—$C_5H_{10}$—

—$C_3H_6$—OCO—$C_3H_6$—COO—$C_6H_{12}$—

—$C_4H_8$—OCO—$C_3H_6$—COO—$C_4H_8$—

—$C_5H_{10}$—OCO—$C_3H_6$—COO—$C_5H_{10}$—

—$C_6H_{12}$—OCO—$C_3H_6$—COO—$C_6H_{12}$—

—$C_2H_4$—OCO—$CH_2$—COO—$C_2H_4$—

—$C_2H_4$—OCO—$C_4H_8$—COO—$C_2H_4$—

—$C_2H_4$—OCO—$C_5H_{10}$—COO—$C_2H_4$—

—$C_2H_4$—OCO—$C_6H_{12}$—COO—$C_2H_4$—

—$C_2H_4$—OCO—$C_6H_{10}$—COO—$C_2H_4$—

Preferable specific examples of the group represented by the general formula (6-3) include, for example, groups of the following general formulae (wherein p7 is the same as described above.).

—$CH_2$—$(C_2H_4O)_{p7}$—$CH_2$—

—$CH_2$—$(C_2H_4O)_{p7}$—$C_2H_4$—

—$CH_2$—$(C_2H_4O)_{p7}$—$C_3H_6$—

—$C_2H_4$—$(C_2H_4O)_{p7}$—$CH_2$—

—$C_2H_4$—$(C_2H_4O)_{p7}$—$C_2H_4$—

—$C_2H_4$—$(C_2H_4O)_{p7}$—$C_3H_6$—

—$C_2H_4$—$(C_2H_4O)_{p7}$—$C_4H_8$—

—$C_2H_4$—$(C_2H_4O)_{p7}$—$C_5H_{10}$—

—$C_2H_4$—$(C_2H_4O)_{p7}$—$C_6H_{12}$—

—$C_2H_4$—$(C_2H_4O)_{p7}$—$CH_2$—

—$C_2H_4$—$(C_2H_4O)_{p7}$—$C_2H_4$—

—$C_2H_4$—$(C_2H_4O)_{p7}$—$C_3H_6$—

—$C_3H_6$—$(C_2H_4O)_{p7}$—$CH_2$—

—$C_3H_6$—$(C_2H_4O)_{p7}$—$C_2H_4$—

—$C_3H_6$—$(C_2H_4O)_{p7}$—$C_3H_6$—

Preferable specific examples of the group represented by the general formula (6-4) include, for example, groups of the following general formulae (wherein p9 is the same as described above.).

—$CH_2$—$(CH_2CH(CH_3)O)_{p9}$—$CH_2$—

—$CH_2$—$(CH_2CH(CH_3)O)_{p9}$—$C_2H_4$—

—$CH_2$—$(CH_2CH(CH_3)O)_{p9}$—$C_3H_6$—

—$C_2H_4$—$(CH_2CH(CH_3)O)_{p9}$—$CH_2$—

—$C_2H_4$—$(CH_2CH(CH_3)O)_{p9}$—$C_2H_4$—

—$C_2H_4$—$(CH_2CH(CH_3)O)_{p9}$—$C_3H_6$—

—$C_2H_4$—$(CH_2CH(CH_3)O)_{p9}$—$C_4H_8$—

—$C_2H_4$—$(CH_2CH(CH_3)O)_{p9}$—$C_5H_{10}$—

—$C_2H_4$—$(CH_2CH(CH_3)O)_{p9}$—$C_6H_{12}$—

—$C_2H_4$—$(CH_2CH(CH_3)O)_{p9}$—$CH_2$—

—$C_2H_4$—$(CH_2CH(CH_3)O)_{p9}$—$C_2H_4$—

—$C_2H_4$—$(CH_2CH(CH_3)O)_{p9}$—$C_3H_6$—

—$C_3H_6$—$(CH_2CH(CH_3)O)_{p9}$—$CH_2$—

—$C_3H_6$—$(CH_2CH(CH_3)O)_{p9}$—$C_2H_4$—

—$C_3H_6$—$(CH_2CH(CH_3)O)_{p9}$—$C_3H_6$—

"An alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", in $A_1$ of the general formula (I), includes, for example, a group represented by the following general formula (7-1) or (7-2), and the like.

—$R_{52}$—$X_1$—$R_{52}$—  (7-1)

(wherein two $R_{52}$ each independently represent an alkylene group having 1 to 10 carbon atoms which has a hydroxy group as a substituent, or which does not have a substituent; $X_1$ is the same as described above; provided that at least one of the two $R_{52}$ is an alkylene group having 1 to 10 carbon atoms which has a hydroxy group as a substituent.)

—$R_{52}$—$X_1$—$R_{52}$—$X_1$—$R_{52}$—  (7-2)

(wherein three $R_{52}$ each independently is the same as described above; two $X_1$ each independently are also the same as described above; provided that at least one of the three $R_{52}$ represents an alkylene group having 1 to 10 carbon atoms which has a hydroxy group as a substituent; and total number of carbon atoms in the formula is 21 or less.)

The alkylene group having 1 to 10 carbon atoms which has a hydroxy group as a substituent, in $R_{52}$ of the general formulae (7-1) and (7-2), is preferably the one having 1 to 6 carbon atoms, more preferably the one having 1 to 3 carbon atoms, and it is preferably the one having one or two pieces of hydroxy groups.

It specifically includes, for example, a hydroxymethylene group, a hydroxyethylene group, a hydroxypropylene group, a hydroxybutylene group, a hydroxypentylene group, a hydroxyhexylene group, a hydroxymethylpentylene group, a hydroxy-n-heptylene group, a hydroxy-n-octylene group, a hydroxy-n-nonylene group, a hydroxy-n-decylene group, a hydroxycyclopentylene group, a hydroxycyclohexylene group, dihydroxyethylene group, a dihydroxypropylene group, and the like.

The alkylene group having 1 to 10 carbon atoms which does not have a substituent, in $R_{52}$ of the general formulae (7-1) and (7-2), includes the same as the alkylene group having 1 to 10 carbon atoms, in $R_{51}$ of the general formulae (6-1) and (6-2), and the preferable one is also the same.

In addition, the arylene group, in $X_1$ of the general formulae (7-1) and (7-2), includes a phenylene group and a naphthylene group, and the phenylene group is preferable.

Preferable specific examples of the group represented by the general formula (7-1) include, for example, groups of the following general formulae (wherein $X_{11}$ represents —O—, —OCO—, COO— or a phenylene group.).

—$CH_2$—$X_{11}$—$C_3H_5(OH)$—

—$CH_2$—$X_{11}$—$C_4H_7(OH)$—

—$CH_2$—$X_{11}$—$C_5H_9(OH)$—

—$CH_2$—$X_{11}$—$C_6H_{11}(OH)$—

—$C_2H_4$—$X_{11}$—$C_3H_5(OH)$—

—$C_2H_4$—$X_{11}$—$C_4H_7(OH)$—

—$C_2H_4$—$X_{11}$—$C_5H_9(OH)$—

—$C_2H_4$—$X_{11}$—$C_6H_{11}(OH)$—

—$C_3H_6$—$X_{11}$—$C_3H_5(OH)$—

—$C_3H_6$—$X_{11}$—$C_4H_7(OH)$—

—$C_3H_6$—$X_{11}$—$C_5H_9(OH)$—

—$C_3H_6$—$X_{11}$—$C_6H_{11}(OH)$—

—$C_3H_5(OH)$—$X_{11}$—$CH_2$—

—$C_3H_5(OH)$—$X_{11}$—$C_2H_4$—

—$C_3H_5(OH)$—$X_{11}$—$C_3H_6$—

—$C_3H_5(OH)$—$X_{11}$—$C_4H_8$—

—$C_3H_5(OH)$—$X_{11}$—$C_5H_{10}$—

—$C_3H_5(OH)$—$X_{11}$—$C_6H_{12}$—

—$C_3H_5(OH)$—$X_{11}$—$C_3H_5(OH)$—

—$C_3H_5(OH)$—$X_{11}$—$C_4H_7(OH)$—

—$C_3H_5(OH)$—$X_{11}$—$C_5H_9(OH)$—

—$C_3H_5(OH)$—$X_{11}$—$C_6H_1(OH)$—

Preferable specific examples of the group represented by the general formula (7-2) include, for example, groups of the following general formulae (wherein $X_{11}$ each independently represents —O—, —OCO—, COO— or a phenylene group.).

—$CH_2$—$X_{11}$—$C_3H_5(OH)$—$X_{11}$—$CH_2$—

—$C_2H_4$—$X_{11}$—$C_3H_5(OH)$—$X_{11}$—$C_2H_4$—

—$C_2H_4$—$X_{11}$—$C_3H_5(OH)$—$X_{11}$—$C_3H_6$—

—C$_2$H$_4$—X$_{11}$—C$_3$H$_5$(OH)—X$_{11}$—C$_4$H$_8$—

—C$_2$H$_4$—X$_{11}$—C$_3$H$_5$(OH)—X$_{11}$—C$_5$H$_{10}$—

—C$_2$H$_4$—X$_{11}$—C$_3$H$_5$(OH)—X$_{11}$—C$_6$H$_{12}$—

—C$_3$H$_6$—X$_{11}$—C$_3$H$_5$(OH)—X$_{11}$—C$_2$H$_4$—

—C$_3$H$_6$—X$_{11}$—C$_3$H$_5$(OH)—X$_{11}$—C$_3$H$_6$—

—C$_3$H$_6$—X$_{11}$—C$_3$H$_5$(OH)—X$_{11}$—C$_4$H$_8$—

—C$_3$H$_6$—X$_{11}$—C$_3$H$_5$(OH)—X$_{11}$—C$_5$H$_{10}$—

—C$_3$H$_6$—X$_{11}$—C$_3$H$_5$(OH)—X$_{11}$—C$_6$H$_{12}$—

—C$_4$H$_8$—X$_{11}$—C$_3$H$_5$(OH)—X$_{11}$—C$_4$H$_8$—

—C$_5$H$_{10}$—X$_{11}$—C$_3$H$_5$(OH)—X$_{11}$—C$_5$H$_{10}$—

—C$_6$H$_{12}$—X$_{11}$—C$_3$H$_5$(OH)—X$_{11}$—C$_6$H$_{12}$—

—C$_2$H$_4$—X$_{11}$—C$_3$H$_5$(OH)—X$_{11}$—C$_3$H$_5$(OH)—

—C$_2$H$_4$—X$_{11}$—C$_3$H$_5$(OH)—X$_{11}$—C$_4$H$_7$(OH)—

—C$_2$H$_4$—X$_{11}$—C$_3$H$_5$(OH)—X$_{11}$—C$_5$H$_9$(OH)—

—C$_2$H$_4$—X$_{11}$—C$_3$H$_5$(OH)—X$_{11}$—C$_6$H$_{11}$(OH)—

—C$_3$H$_6$—X$_{11}$—C$_3$H$_5$(OH)—X$_{11}$—C$_2$H$_3$(OH)—

—C$_3$H$_6$—X$_{11}$—C$_3$H$_5$(OH)—X$_{11}$—C$_3$H$_5$(OH)—

—C$_4$H$_8$—X$_{11}$—C$_3$H$_5$(OH)—X$_{11}$—C$_4$H$_7$(OH)—

—C$_5$H$_{10}$—X$_{11}$—C$_3$H$_5$(OH)—X$_{11}$—C$_5$H$_9$(OH)—

—C$_6$H$_{12}$—X$_{11}$—C$_3$H$_5$(OH)—X$_{11}$—C$_6$H$_{11}$(OH)—

"An alkylene group having 1 to 21 carbon atoms which has a hydroxy group as a substituent", in A$_1$ of the general formula (1), includes, for example, a group represented by the following general formula (8), and the like.

—(CH$_2$)$_{p10}$—R$_{56}$—(CH$_2$)$_{p10}$—  (8)

(wherein R$_{56}$ represents an alkylene group having 1 to 9 carbon atoms which has a hydroxy group as a substituent; p10 represents an integer of 0 to 6.)

The alkylene group having 1 to 9 carbon atoms which has a hydroxy group as a substituent, in R$_{56}$ of the general formula (8), is preferably the one having 1 to 6 carbon atoms, and more preferably the one having 1 to 3 carbon atoms.

It specifically includes, for example, a hydroxymethylene group, a hydroxyethylene group, a hydroxypropylene group, a hydroxymethylethylene group, a hydroxybutylene group, a 1-hydroxymethylpropylene group, a 2-hydroxymethylpropylene group, a hydroxypentylene group, a hydroxymethylbutylene group, a 1,2-dihydroxymethylpropylene group, a 1-hydroxyethylpropylene group, a hydroxyhexylene group, a hydroxymethylpentylene group, a hydroxy-n-heptylene group, a hydroxy-n-octylene group, a hydroxy-n-nonylene group, a hydroxycyclopentylene group, a hydroxycyclohexylene group, a hydroxycycloheptylene group, and the like; and the hydroxymethylene group, the hydroxyethylene group and the hydroxypropylene group are more preferable, and the hydroxyethylene group is particularly preferable.

The group represented by the general formula (8) includes specifically, for example, the following groups, and the like.

—CH$_2$—C$_6$H$_9$(OH)—CH$_2$—

—C$_2$H$_4$—C$_6$H$_9$(OH)—C$_2$H$_4$—

—C$_3$H$_6$—C$_6$H$_9$(OH)—C$_3$H$_6$—

—CH$_2$—CH(OH)—C$_2$H$_4$—

—CH$_2$—CH(OH)—C$_3$H$_6$—

—CH$_2$—CH(OH)—C$_4$H$_8$—

—C$_2$H$_4$—CH(OH)—CH$_2$—

—C$_2$H$_4$—CH(OH)—C$_2$H$_4$—

—C$_2$H$_4$—CH(OH)—C$_3$H$_6$—

—CH$_2$—C$_2$H$_4$(OH)—C$_2$H$_4$—

—CH$_2$—C$_2$H$_4$(OH)—C$_3$H$_6$—

—CH$_2$—C$_2$H$_4$(OH)—C$_4$H$_8$—

—C$_2$H$_4$—C$_2$H$_4$(OH)—CH$_2$—

—C$_2$H$_4$—C$_2$H$_4$(OH)—C$_2$H$_4$—

—C$_2$H$_4$—C$_2$H$_4$(OH)—C$_3$H$_6$—

As A$_1$ of the general formula (I), the alkylene group having 1 to 21 carbon atoms which has at least one group selected from —O—, —OCO—, —COO— or an arylene group in the chain, or the alkylene group having 1 to 21 carbon atoms is preferable, and among them, the group represented by the general formula (6-1), the group represented by the general formula (6-2), and the alkylene group having 1 to 12 carbon atoms, are more preferable, and the group represented by the general formula (6-2), and the alkylene group having 1 to 6 carbon atoms, are further preferable.

In addition, as A$_2$ in the general formula (I), —O— is preferable.

Preferable combinations of R$_1$ to R$_7$, A$_1$ and A$_2$ of the general formula (I) include, for example, those described in the following Table 5.

TABLE 5

| R$_1$ | R$_2$ | R$_3$ | R$_4$ | R$_5$ | R$_6$ | R$_7$ | A$_1$ | A$_2$ |
|---|---|---|---|---|---|---|---|---|
| ethyl group | ethyl group | ethyl group | ethyl group | hydrogen atom | hydrogen atom | methyl group or hydrogen atom | ethylene group | oxygen atom |
| ethyl group | ethyl group | ethyl group | ethyl group | hydrogen atom | hydrogen atom | methyl group or hydrogen atom | propylene group | oxygen atom |
| ethyl group | ethyl group | ethyl group | ethyl group | hydrogen atom | hydrogen atom | methyl group or hydrogen atom | 1-methyl propylene group | oxygen atom |
| ethyl group | ethyl group | ethyl group | ethyl group | hydrogen atom | hydrogen atom | methyl group or hydrogen atom | methylethylene group | oxygen atom |
| ethyl group | ethyl group | ethyl group | ethyl group | hydrogen atom | hydrogen atom | methyl group or hydrogen atom | 2-hydroxy propylene group | oxygen atom |

TABLE 5-continued

| R$_1$ | R$_2$ | R$_3$ | R$_4$ | R$_5$ | R$_6$ | R$_7$ | A$_1$ | A$_2$ |
|---|---|---|---|---|---|---|---|---|
| methyl group | methyl group | methyl group | methyl group | hydrogen atom | hydrogen atom | methyl group or hydrogen atom | methylene group | oxygen atom |
| methyl group | methyl group | methyl group | methyl group | hydrogen atom | hydrogen atom | methyl group or hydrogen atom | ethylene group | oxygen atom |
| methyl group | methyl group | methyl group | methyl group | hydrogen atom | hydrogen atom | methyl group or hydrogen atom | propylene group | oxygen atom |
| hydrogen atom | methyl group | hydrogen atom | methyl group | methyl group | methyl group | methyl group or hydrogen atom | ethylene group | oxygen atom |
| hydrogen atom | ethyl group | hydrogen atom | ethyl group | methyl group | methyl group | methyl group or hydrogen atom | ethylene group | oxygen atom |
| hydrogen atom | methyl group | hydrogen atom | methyl group | hydrogen atom | hydrogen atom | methyl group or hydrogen atom | ethylene group | oxygen atom |
| hydrogen atom | ethyl group | hydrogen atom | ethyl group | hydrogen atom | hydrogen atom | methyl group or hydrogen atom | ethylene group | oxygen atom |

2-2. On the Compound Represented by the General Formula (II)

Next, explanation will be given on specific compounds of the compound represented by the general formula (II) in the cationic rhodamine derivative, a production method, and the like.

(1) The Compound Represented by the General Formula (II)

The cationic rhodamine derivative having the ethylenically unsaturated group of the present invention, as described above, includes specifically the compound represented by the following general formula (II), other than the compound represented by the general formula (I) and the compound represented by the general formula (VI).

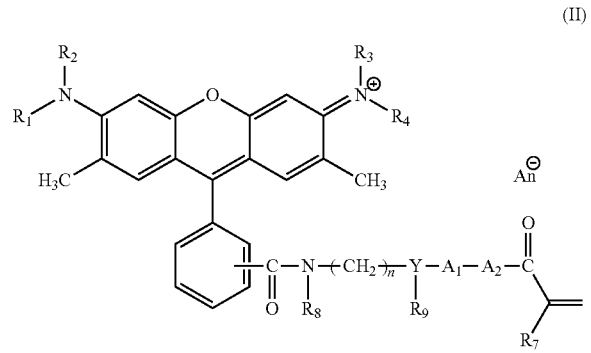

(II)

[where, in the general formula (II), R$_1$ to R$_4$, R$_7$, A$_1$, A$_2$ and An$^-$ are the same as those in the general formula (I); R$_8$ represents a hydrogen atom, or an alkyl group having 1 to 30 carbon atoms; R$_9$ represents a hydrogen atom, or an alkyl group having 1 to 6 carbon atoms; n represents an integer of 0 to 3; Y represents a nitrogen atom or a group represented by the following general formula (II-1),

(II-1)

R$_8$ and R$_9$ may form a cyclic structure of a 5 to 6 membered ring together with —N—(CH$_2$)$_n$—Y— bonding thereto.]

In R$_1$ to R$_4$ of the general formula (II), specific examples and preferable ones of the alkyl group having 1 to 30 carbon atoms, the hydroxyalkyl group having 1 to 6 carbon atoms, the sulfoalkyl group having 1 to 6 carbon atoms, the carboxyalkyl group having 2 to 7 carbon atoms, the cyanoalkyl group having 2 to 7 carbon atoms, the alkoxyalkyl group having 2 to 6 carbon atoms, the halogenoalkyl group having 1 to 6 carbon atoms, the phenyl group having or not having a substituent, or the benzyl group having or not having a substituent are the same as those described in R$_1$ to R$_4$ of the general formula (I).

R$_1$ and R$_4$ in the general formula (II) are preferably a hydrogen atom or an alkyl group having 1 to 30 carbon atoms, and more preferably a hydrogen atom or an alkyl group having 1 to 6 carbon atoms. Specifically, a hydrogen atom, a methyl group, an ethyl group, a propyl group, an isopropyl group, a butyl group, a pentyl group, a hexyl group, and the like, are preferable; and the hydrogen atom, the methyl group, the ethyl group, the propyl group, and the like, are more preferable, and the hydrogen atom is particularly preferable.

In addition, R$_2$ and R$_3$ in the general formula (II) are preferably a hydrogen atom or an alkyl group having 1 to 30 carbon atoms, more preferably a hydrogen atom or the alkyl group having 1 to 6 carbon atoms, and particularly preferably the alkyl group having 1 to 6 carbon atoms. Specifically, a hydrogen atom, a methyl group, an ethyl group, a propyl group, an isopropyl group, a butyl group, a pentyl group, a hexyl group, and the like, are preferable; and the methyl group, the ethyl group, the propyl group, and the like, are more preferable, and the ethyl group is particularly preferable.

R$_7$ of the general formula (II) represents a hydrogen atom or a methyl group, and the methyl group is preferable.

In addition, the alkyl group having 1 to 30 carbon atoms, in R$_8$ of the general formula (II), includes the same one as the alkyl group having 1 to 30 carbon atoms, in R$_1$ to R$_4$ of the general formula (II), and the preferable one is also the same.

R$_8$ in the general formula (II) is preferably a hydrogen atom or an alkyl group having 1 to 6 carbon atoms, and more preferably the hydrogen atom. Specifically, a hydrogen atom, a methyl group, an ethyl group, a propyl group, an isopropyl group, a butyl group, a pentyl group, a hexyl group, and the like, are preferable; and the hydrogen atom, the methyl group, the ethyl group, the propyl group, and the like, are more preferable, and the hydrogen atom is particularly preferable.

The alkyl group having 1 to 6 carbon atoms, in R$_9$ of the general formula (II), may be any of the linear, branched or cyclic one, and is preferably the one having 1 to 3 carbon atoms. It specifically includes, for example, a methyl group, an ethyl group, a propyl group, an isopropyl group, a butyl group, a 1-methylpropyl group, an isobutyl group, a pentyl group, a 1-ethylpropyl group, a 1-methylbutyl group, a cyclopentyl group, a hexyl group, a 1-methylpentyl group, a 1-ethylbutyl group, a cyclohexyl group, and the like; and the methyl group, the ethyl group, the propyl group, the isopropyl group, the butyl group, the pentyl group, the hexyl group, and the like, are preferable, and the methyl group, the ethyl group, the propyl group, and the like, are more preferable.

In addition, among specific examples of $R_9$ in the general formula (II), the hydrogen atom, the methyl group, the ethyl group, the propyl group, the isopropyl group, the butyl group, the pentyl group, the hexyl group, and the like, are preferable; and the hydrogen atom, the methyl group, the ethyl group, the propyl group, and the like, are more preferable, and the hydrogen atom is particularly preferable.

As Y of the general formula (II), the group represented by the general formula (II-1) is preferable.

In the case where $R_8$ and $R_9$ of the general formula (II) form a cyclic structure of a 5 to 6 membered ring together with —N—(CH$_2$)$_n$—Y— bonding thereto, the cyclic structure is the one represented by the following general formula (II-1-2).

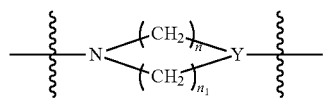
(II-1-2)

(wherein $n_1$ represents an integer of 0 to 4; Y and n are the same as described above; provided that $n+n_1$ is an integer of 3 to 4.)

In the case where the cyclic structure represented by the general formula (II-1-2) is formed, n of the general formula (II) is preferably 2, and in the case where the cyclic structure represented by the general formula (II-1-2) is not formed, n is preferably 1.

In addition, $n_1$ of the general formula (II-1-2) is preferably 2.

Further, the cyclic structure represented by the general formula (II-1-2) represents a 5 to 6 membered ring, and a 6 membered ring is preferable.

Specific examples of the cyclic structure represented by the general formula (II-1-2) include

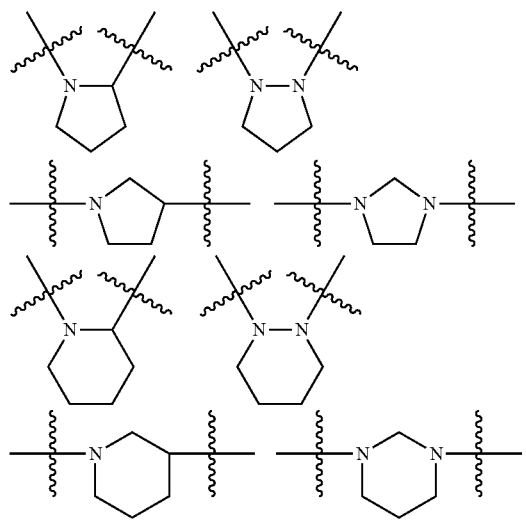

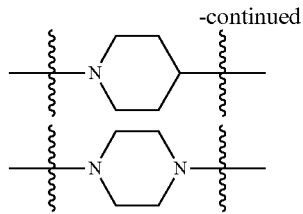

and the like, and the following ones are preferable.

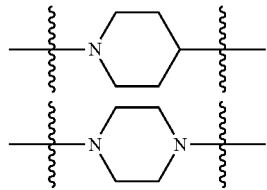

The alkylene group having 1 to 21 carbon atoms, in "an alkylene group having 1 to 21 carbon atoms which has at least one group selected from —O—, —OCO—, —COO—, —NHCO—, —CONH—, —NHCONH— and an arylene group in the chain", "an alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", "an alkylene group having 1 to 21 carbon atoms which has a hydroxy group as a substituent" and "an alkylene group having 1 to 21 carbon atoms", in $A_1$ of the general formula (II), includes the same one as the alkylene group having 1 to 21 carbon atoms, in $A_1$ of the general formula (I), and the preferable one is also the same.

The arylene group in "an alkylene group having 1 to 21 carbon atoms which has at least one group selected from —O—, —OCO—, —COO—, —NHCO—, —CONH—, —NHCONH— and an arylene group in the chain" and "an alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", in $A_1$ of the general formula (II), includes the one having 6 to 10 carbon atoms, and specifically includes a phenylene group, a naphthylene group, and the like.

In addition, "an alkylene group having 1 to 21 carbon atoms which has at least one group selected from —O—, —OCO—, —COO—, —NHCO—, —CONH—, —NHCONH— and an arylene group in the chain", in $A_1$ of the general formula (II), includes, for example, groups represented by the following general formulae (II-21-1) to (II-21-5), and the like.

—(O—R$_{251}$)$_{h1}$— (II-21-1)

(wherein $R_{251}$ represents a linear or branched alkylene group having 1 to 4 carbon atoms; $h_1$ represents an integer of 1 to 10; provided that total number of carbon atoms in the formula is 1 to 21.)

—(CH$_2$)$_{h2}$—OCO—(CH$_2$)$_{h3}$— (II-21-2)

(wherein $h_2$ represents an integer of 1 to 10; $h_3$ represents an integer of 0 to 10.)

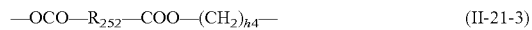
—OCO—R$_{252}$—COO—(CH$_2$)$_{h4}$— (II-21-3)

(wherein R$_{252}$ represents a phenylene group, or an alkylene group having 1 to 7 carbon atoms; h$_4$ represents an integer of 1 to 3.)

—Y$_1$—(CH$_2$)$_{h5}$— (II-21-4)

(wherein Y$_1$ represents —NHCO—, —CONH— or —NHCONH—; h$_5$ represents an integer of 1 to 10.)

—O—CONH—(CH$_2$)$_{h6}$— (II-21-5)

(wherein h$_6$ represents an integer of 1 to 10.)

The linear or branched alkylene group having 1 to 4 carbon atoms, in R$_{251}$ of the general formula (II-21-1), specifically includes, for example, a methylene group, an ethylene group, a methylmethylene group, a propylene group, a methylethylene group, a butylene group, a methylpropylene group, and the like, and the ethylene group and the methylethylene group are preferable.

In addition, the alkylene group having 1 to 7 carbon atoms, in R$_{252}$ of the general formula (II-21-3), specifically includes, for example, a methylene group, an ethylene group, a propylene group, a butylene group, a pentylene group, a hexylene group, a heptylene group, a cyclobutylene group, a cyclopentylene group, a cyclohexylene group, a cycloheptylene group, and the like.

In addition, as Y$_1$ in the general formula (II-21-4), —NHCONH— is preferable.

The group represented by the general formula (II-21-1) specifically includes, for example, the following groups, and the like.

—O—CH$_2$CH$_2$—,

—(O—CH$_2$CH$_2$)$_2$—

—(O—CH$_2$CH$_2$)$_3$—

—(O—CH$_2$CH$_2$)$_4$—

—(O—CH$_2$CH$_2$)$_5$—

—(O—CH$_2$CH$_2$)$_6$—

—(O—CH$_2$CH$_2$)$_7$—

—(O—CH$_2$CH$_2$)$_8$—

—(O—CH$_2$CH$_2$)$_9$—

—(O—CH$_2$CH$_2$)$_{10}$—

—O—CH$_2$CH(CH$_3$)—

—(O—CH$_2$CH(CH$_3$))$_2$—

—(O—CH$_2$CH(CH$_3$))$_3$—

—(O—CH$_2$CH(CH$_3$))$_4$—

—(O—CH$_2$CH(CH$_3$))$_5$—

—(O—CH$_2$CH(CH$_3$))$_6$—

—(O—CH$_2$CH(CH$_3$))$_7$—

—O—CH(CH$_3$)CH$_2$—

—(O—CH(CH$_3$)CH$_2$)$_2$—

—(O—CH(CH$_3$)CH$_2$)$_3$—

—(O—CH(CH$_3$)CH$_2$)$_4$—

—(O—CH(CH$_3$)CH$_2$)$_5$—

—(O—CH(CH$_3$)CH$_2$)$_6$—

—(O—CH(CH$_3$)CH$_2$)$_7$—

In addition, the group represented by the general formula (II-21-2) specifically includes, for example, the following groups, and the like.

—CH$_2$—O—CO—

—CH$_2$—O—CO—(CH$_2$)$_2$—

—(CH$_2$)$_2$—O—CO—

—(CH$_2$)$_2$—O—CO—(CH$_2$)$_2$—

—(CH$_2$)$_3$—O—CO—

(CH$_2$)$_3$—O—CO—(CH$_2$)$_2$—

In addition, the group represented by the general formula (II-21-3) specifically includes, for example, the following groups, and the like.

—O—CO—CH$_2$—CO—O—CH$_2$—

—O—CO—(CH$_2$)$_2$—CO—O—CH$_2$—

—O—CO—(CH$_2$)$_3$—CO—O—CH$_2$—

—O—CO—(CH$_2$)$_4$—CO—O—CH$_2$—

—O—CO—(CH$_2$)$_5$—CO—O—CH$_2$—

—O—CO—(CH$_2$)$_6$—CO—O—CH$_2$—

—O—CO—(CH$_2$)$_7$—CO—O—CH$_2$—

—O—CO—CH$_2$—CO—O—(CH$_2$)$_2$—

—O—CO—(CH$_2$)$_2$—CO—O—(CH$_2$)$_2$—

—O—CO—(CH$_2$)$_3$—CO—O—(CH$_2$)$_2$—

—O—CO—(CH$_2$)$_4$—CO—O—(CH$_2$)$_2$—

—O—CO—(CH$_2$)$_5$—CO—O—(CH$_2$)$_2$—

—O—CO—(CH$_2$)$_6$—CO—O—(CH$_2$)$_2$—

—O—CO—(CH$_2$)$_7$—CO—O—(CH$_2$)$_2$—

—O—CO—CH$_2$—CO—O—(CH$_2$)$_3$—

—O—CO—(CH$_2$)$_2$—CO—O—(CH$_2$)$_3$—

—O—CO—(CH$_2$)$_3$—CO—O—(CH$_2$)$_3$—

—O—CO—(CH$_2$)$_4$—CO—O—(CH$_2$)$_3$—

—O—CO—(CH$_2$)$_5$—CO—O—(CH$_2$)$_3$—

—O—CO—(CH$_2$)$_6$—CO—O—(CH$_2$)$_3$—

—O—CO—(CH$_2$)$_7$—CO—O—(CH$_2$)$_3$—

—O—CO—C$_6$H$_4$—CO—O—CH$_2$—

—O—CO—C$_6$H$_4$—CO—O—(CH$_2$)$_2$—

—O—CO—C$_6$H$_4$—CO—O—(CH$_2$)$_3$—

—O—CO—C$_6$H$_{10}$—CO—O—CH$_2$—

—O—CO—C$_6$H$_{10}$—CO—O—(CH$_2$)$_2$—

—O—CO—C$_6$H$_{10}$—CO—O—(CH$_2$)$_3$—

Among these, —O—CO—CH$_2$—CO—O—CH$_2$—, —O—CO—(CH$_2$)$_2$—CO—O—CH$_2$—, —O—CO—(CH$_2$)$_3$—CO—O—CH$_2$—, —O—CO—(CH$_2$)$_4$—CO—O—CH$_2$—, —O—CO—(CH$_2$)$_5$—CO—O—CH$_2$—, —O—CO—(CH$_2$)$_6$—CO—O—CH$_2$—, —O—CO—(CH$_2$)$_7$—CO—O—CH$_2$—, —O—CO—CH$_2$—CO—O—(CH$_2$)$_2$—, —O—CO—(CH$_2$)$_2$—CO—O—(CH$_2$)$_2$—, —O—CO—(CH$_2$)$_3$—CO—O—(CH$_2$)$_2$—, —O—CO—(CH$_2$)$_4$—CO—O—(CH$_2$)$_2$—, —O—CO—(CH$_2$)$_5$—CO—O—(CH$_2$)$_2$—, —O—CO—(CH$_2$)$_6$—CO—O—(CH$_2$)$_2$—, —O—CO—(CH$_2$)$_7$—CO—O—(CH$_2$)$_2$—, —O—CO—CH$_2$—CO—O—(CH$_2$)$_3$—, —O—CO—(CH$_2$)$_2$—CO—O—(CH$_2$)$_3$—, —O—CO—(CH$_2$)$_3$—CO—O—(CH$_2$)$_3$—, —O—CO—(CH$_2$)$_4$—CO—O—(CH$_2$)$_3$—, —O—CO—(CH$_2$)$_5$—CO—O—(CH$_2$)$_3$—, —O—CO—(CH$_2$)$_6$—CO—O—(CH$_2$)$_3$—, and —O—CO—(CH$_2$)$_7$—CO—O—(CH$_2$)$_3$— are preferable, —O—CO—CH$_2$—CO—O—(CH$_2$)$_2$—, —O—CO—(CH$_2$)$_2$—CO—O—(CH$_2$)$_2$—, —O—CO—(CH$_2$)$_3$—CO—O—(CH$_2$)$_2$—, —O—CO—(CH$_2$)$_4$—CO—O—(CH$_2$)$_2$—, —O—CO—(CH$_2$)$_5$—CO—O—(CH$_2$)$_2$—, —O—CO—(CH$_2$)$_6$—CO—O—(CH$_2$)$_2$—, and —O—CO—(CH$_2$)$_7$—CO—O—(CH$_2$)$_2$— are more preferable, and —O—CO—(CH$_2$)$_2$—CO—O—(CH$_2$)$_2$— is particularly preferable.

The group represented by the general formula (II-21-4) specifically includes, for example, the following groups, and the like.

—NHCO—CH$_2$—

—NHCO—(CH$_2$)$_2$—

—NHCO—(CH$_2$)$_3$—

—NHCO—(CH$_2$)$_4$—

—CONH—CH$_2$—

—CONH—(CH$_2$)$_2$—

—CONH—(CH$_2$)$_3$—

—CONH—(CH$_2$)$_4$—

—NHCONH—CH$_2$—

—NHCONH—(CH$_2$)$_2$—

—NHCONH—(CH$_2$)$_3$—

—NHCONH—(CH$_2$)$_4$—

—NHCONH—(CH$_2$)$_5$—

—NHCONH—(CH$_2$)$_6$—

—NHCONH—(CH$_2$)$_7$—

—NHCONH—(CH$_2$)$_8$—

—NHCONH—(CH$_2$)$_9$—

—NHCONH—(CH$_2$)$_{10}$—

Among these, —NHCONH—CH$_2$—, —NHCONH—(CH$_2$)$_2$—, —NHCONH—(CH$_2$)$_3$—, —NHCONH—(CH$_2$)$_4$—, —NHCONH—(CH$_2$)$_5$—, —NHCONH—(CH$_2$)$_6$—, —NHCONH—(CH$_2$)$_7$—, —NHCONH—(CH$_2$)$_8$—, —NHCONH—(CH$_2$)$_9$— and —NHCONH—(CH$_2$)$_{10}$— are preferable, and —NHCONH—(CH$_2$)$_2$— is more preferable.

The group represented by the general formula (II-21-5) specifically includes, for example, the following groups, and the like.

—O—CONH—CH$_2$—

—O—CONH—(CH$_2$)$_2$—

—O—CONH—(CH$_2$)$_3$—

—O—CONH—(CH$_2$)$_4$—

"An alkylene group having 1 to 21 carbon atoms, which has at least one group selected from —O—, —OCO—, —COO—, —NHCO—, —CONH—, —NHCONH— and an arylene group in the chain, and also has a hydroxy group as a substituent", in A$_1$ of the general formula (II), includes, for example, groups represented by the following general formulae (II-22-1) to (II-22-2), and the like.

—R$_{53}$—(CH$_2$)$_{h7}$—  (II-22-1)

(wherein R$_{53}$ represents an arylene group having 6 to 10 carbon atoms which has a hydroxy group as a substituent; h$_7$ represents an integer of 1 to 4.)

—R$_{54}$—Y$_2$—(CH$_2$)$_{h8}$—  (II-22-2)

(wherein R$_{54}$ represents an alkylene group having 1 to 7 carbon atoms which has a hydroxy group as a substituent, or an arylene group having 6 to 10 carbon atoms which has a hydroxy group as a substituent; Y$_2$ represents —O—, —OCO—, —COO—, —NHCO—, —CONH— or —NHCONH—; h$_8$ represents an integer of 2 to 4.)

The arylene group having 6 to 10 carbon atoms which has a hydroxy group as a substituent, in R$_{53}$ of the general formula (II-22-1), includes a hydroxyphenylene group, a dihydroxyphenylene group, a hydroxynaphthylene group, a dihydroxynaphthylene group, and the like.

In addition, the alkylene group having 1 to 7 carbon atoms which has a hydroxy group as a substituent, in R$_{54}$ of the general formula (II-22-2), includes a hydroxymethylene group, a hydroxyethylene group, a hydroxypropylene group, a hydroxybutylene group, a hydroxypentylene group, a hydroxyhexylene group, a hydroxyheptylene group, a hydroxycyclobutylene group, a hydroxycyclopentylene group, a hydroxycyclohexylene group, a hydroxycycloheptylene group, and the like.

In addition, the arylene group having 6 to 10 carbon atoms which has a hydroxy group as a substituent, in R$_{54}$ of the general formula (II-22-2), includes the same one as the arylene group having 6 to 10 carbon atoms which has a hydroxy group as a substituent, in R$_{53}$ of the general formula (II-22-1).

Preferable specific examples of the group represented by the general formula (II-22-1) include, for example, the following groups, and the like.

—C$_6$H$_3$(OH)—CH$_2$—

—C$_6$H$_3$(OH)—(CH$_2$)$_2$—

—C$_6$H$_3$(OH)—(CH$_2$)$_3$—

—C$_6$H$_3$(OH)—(CH$_2$)$_4$—

—C$_6$H$_2$(OH)$_2$—CH$_2$—

—C$_6$H$_2$(OH)$_2$—(CH$_2$)$_2$—

—C₆H₂(OH)₂—(CH₂)₃—

—C₆H₂(OH)₂—(CH₂)₄—

In addition, preferable specific examples of the group represented by the general formula (II-22-2) include, for example, the following groups, and the like.

—CH(OH)—CH₂—O—(CH₂)₂—

—CH(OH)—CH₂—O—(CH₂)₃—

—CH(OH)—CH₂—O—(CH₂)₄—

—CH(OH)—CH₂—OCO—(CH₂)₂—

—CH(OH)—CH₂—OCO—(CH₂)₃—

—CH(OH)—CH₂—OCO—(CH₂)₄—

—CH(OH)—CH₂—OCO—(CH₂)₂—

—CH(OH)—CH₂—OCO—(CH₂)₃—

—CH(OH)—CH₂—OCO—(CH₂)₄—

—CH(OH)—CH₂—NHCO—(CH₂)₂—

—CH(OH)—CH₂—NHCO—(CH₂)₃—

—CH(OH)—CH₂—NHCO—(CH₂)₄—

—CH(OH)—CH₂—CONH—(CH₂)₂—

—CH(OH)—CH₂—CONH—(CH₂)₃—

—CH(OH)—CH₂—CONH—(CH₂)₄—

—CH(OH)—CH₂—NHCONH—(CH₂)₂—

—CH(OH)—CH₂—NHCONH—(CH₂)₃—

—CH(OH)—CH₂—NHCONH—(CH₂)₄—

"An alkylene group having 1 to 21 carbon atoms which has a hydroxy group as a substituent" in $A_1$ of the general formula (1) includes, for example, a group represented by the following general formula (II-23-1), and the like.

$$—R_{55}—(CH_2)_{h9}— \quad (II\text{-}23\text{-}1)$$

(wherein $R_{55}$ represents an alkylene group having 1 to 7 carbon atoms which has a hydroxy group as a substituent; $h_9$ represents an integer of 1 to 4.)

The alkylene group having 1 to 7 carbon atoms which has a hydroxy group as a substituent, in $R_{55}$ of the general formula (II-23-1), includes the same one as the alkylene group having 1 to 7 carbon atoms which has a hydroxy group as a substituent, in $R_{54}$ of the general formula (II-22-2).

The group represented by the general formulae (II-23-1) specifically includes, for example, the following groups, and the like.

—C₆H₉(OH)—CH₂—

—C₆H₉(OH)—(CH₂)₂—

—C₆H₉(OH)—(CH₂)₃—

—C₆H₉(OH)—(CH₂)₄—

—CH(OH)—CH₂—

—CH(OH)—(CH₂)₂—

—CH(OH)—(CH₂)₃—

—CH(OH)—(CH₂)₄—

As $A_1$ in the general formula (II), the alkylene group having 1 to 21 carbon atoms, which has at least one group selected from —O—, —OCO—, —COO—, —NHCO—, —CONH—, —NHCONH— and an arylene group in the chain, is preferable.

Among them, the groups represented by the general formulae (II-21-3) and (II-21-4) are preferable, and more specifically, —O—CO—CH₂—CO—O—CH₂—, —O—CO—(CH₂)₂—CO—O—CH₂—, —O—CO—(CH₂)₃—CO—O—CH₂—, —O—CO—(CH₂)₄—CO—O—CH₂—, —O—CO—(CH₂)₅—CO—O—CH₂—, —O—CO—(CH₂)₆—CO—O—CH₂—, —O—CO—(CH₂)₇—CO—O—CH₂—, —O—CO—CH₂—CO—O—(CH₂)₂—, —O—CO—(CH₂)₂—CO—O—(CH₂)₂—, —O—CO—(CH₂)₃—CO—O—(CH₂)₂—, —O—CO—(CH₂)₄—CO—O—(CH₂)₂—, —O—CO—(CH₂)₅—CO—O—(CH₂)₂—, —O—CO—(CH₂)₆—CO—O—(CH₂)₂—, —O—CO—(CH₂)₇—CO—O—(CH₂)₂—, —O—CO—CH₂—CO—O—(CH₂)₃—, —O—CO—(CH₂)₂—CO—O—(CH₂)₃—, —O—CO—(CH₂)₃—CO—O—(CH₂)₃—, —O—CO—(CH₂)₄—CO—O—(CH₂)₃—, —O—CO—(CH₂)₅—CO—O—(CH₂)₃—, —O—CO—(CH₂)₆—CO—O—(CH₂)₃—, —O—CO—(CH₂)₇—CO—O—(CH₂)₃—, —NHCONH—CH₂—, —NHCONH—(CH₂)₂—, —NHCONH—(CH₂)₃—, —NHCONH—(CH₂)₄—, —NHCONH—(CH₂)₅—, —NHCONH—(CH₂)₆—, —NHCONH—(CH₂)₇—, —NHCONH—(CH₂)₈—, —NHCONH—(CH₂)₉— and —NHCONH—(CH₂)₁₀— are preferable, —O—CO—CH₂—CO—O—(CH₂)₂—, —O—CO—(CH₂)₂—CO—O—(CH₂)₂—, —O—CO—(CH₂)₃—CO—O—(CH₂)₂—, —O—CO—(CH₂)₄—CO—O—(CH₂)₂—, —O—CO—(CH₂)₅—CO—O—(CH₂)₂—, —O—CO—(CH₂)₆—CO—O—(CH₂)₂—, —O—CO—(CH₂)₇—CO—O—(CH₂)₂—, —NHCONH—CH₂—, —NHCONH—(CH₂)₂—, —NHCONH—(CH₂)₃—, —NHCONH—(CH₂)₄—, —NHCONH—(CH₂)₅—, —NHCONH—(CH₂)₆—, —NHCONH—(CH₂)₇—, —NHCONH—(CH₂)₈—, —NHCONH—(CH₂)₉— and —NHCONH—(CH₂)₁₀— are more preferable, and —O—CO—(CH₂)₂—CO—O—(CH₂)₂— and —NHCONH—(CH₂)₂— are particularly preferable.

In addition, as $A_2$ in the general formula (II), —O— is preferable.

A group represented by the following general formula (II-1-5), bonding to the phenyl group in the fundamental skeleton of rhodamine, in the general formula (II), may be located at any of an ortho position, a meta position or a para position of the phenyl group, and the ortho position is preferable.

Specifically, the group represented by the general formula (II-1-5) is preferably the one which is bonded, as a compound represented by the following general formula (II-1-6), to the phenyl group in the fundamental skeleton of rhodamine.

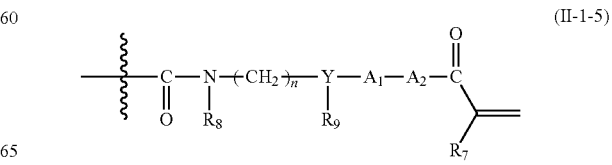

(II-1-5)

(wherein $R_7$ to $R_9$, Y, n, $A_1$ and $A_2$ are the same as described above.)

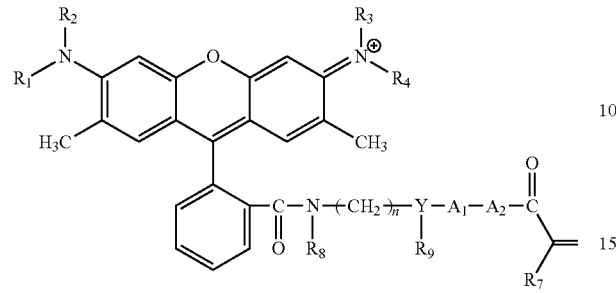

(II-1-6)

(wherein $R_1$ to $R_4$, $R_7$ to $R_9$, Y, n, $A_1$ and $A_2$ are the same as described above.)

Preferable specific examples of the compound represented by the general formula (II) of the present invention include a compound represented by the following general formula (II').

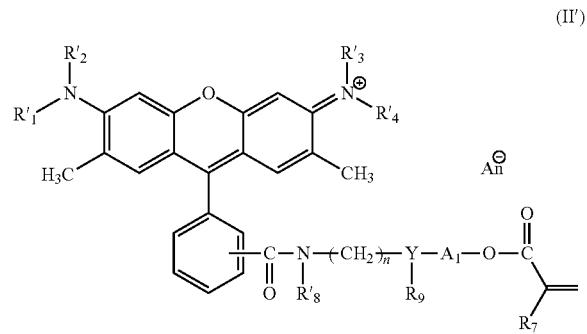

(II')

(wherein $R'_1$ to $R'_4$ and $R'_8$ each independently represent a hydrogen atom or an alkyl group having 1 to 6 carbon atoms; $R_7$, $R_9$, Y, n, $A_1$ and $An^-$ are the same as described above. $R'_8$ and $R_9$ may form a cyclic structure of a 5 to 6 membered ring together with $-N-(CH_2)_n-Y-$ bonding thereto.)

The alkyl group having 1 to 6 carbon atoms, in $R'_1$ to $R'_4$ and $R'_8$ of the general formula (II'), includes the same one as the alkyl group having 1 to 6 carbon atoms, in $R_9$ of the general formula (II), and the preferable one is also the same.

In the case where $R'_8$ and $R_9$ of the general formula (II') form a cyclic structure of a 5 to 6 membered ring together with $-N-(CH_2)_n-Y-$ bonding thereto, the cyclic structure is the one represented by the general formula (II-1-2).

Among specific examples of $R'_1$, $R'_4$ and $R'_8$ in the general formula (II'), a hydrogen atom, a methyl group, an ethyl group and a propyl group are preferable, and the hydrogen atom is more preferable.

In addition, among specific examples of $R'_2$ and $R'_3$ in the general formula (II'), a methyl group, an ethyl group and a propyl group are preferable, and the ethyl group is more preferable.

Among the compound represented by the general formula (II'), preferable specific examples include a compound represented by the following general formula (II").

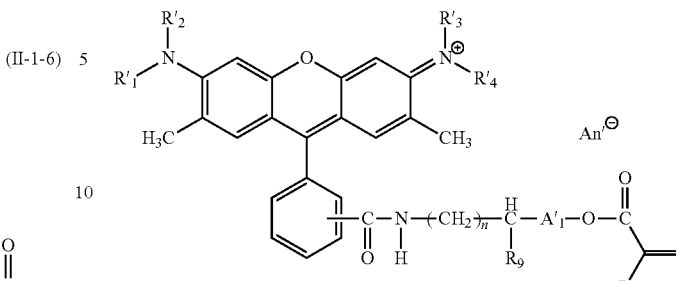

(II")

(wherein $A'_1$ represents an alkylene group having 1 to 21 carbon atoms which has at least one group selected from the group consisting of $-O-$, $-OCO-$, $-COO-$, $-NHCO-$, $-CONH-$, $-NHCONH-$ and an arylene group in the chain; $An'^-$ represents an anion containing an aryl group having a halogeno group, a sulfonyl group having a halogeno group or a halogenated alkyl group; $R'_1$ to $R'_4$, $R_7$, $R_9$ and n are the same as described above.)

"An alkylene group having 1 to 21 carbon atoms which has at least one group selected from the group consisting of $-O-$, $-OCO-$, $-COO-$, $-NHCO-$, $-CONH-$, $-NHCONH-$ and an arylene group in the chain" in $A'_1$ of the general formula (II") includes the same one as "an alkylene group having 1 to 21 carbon atoms which has at least one group selected from the group consisting of $-O-$, $-OCO-$, $-COO-$, $-NHCO-$, $-CONH-$, $-NHCONH-$ and an arylene group in the chain" in $A_1$ of the general formula (II), and the preferable one is also the same.

The anion moiety in the anion containing the aryl group having the halogeno group, the sulfonyl group having the halogeno group, or the halogenated alkyl group, represented by $An'^-$ of the general formula (II"), includes the same one as the anion moiety in the anion of the present invention, and the preferable one is also the same.

The halogeno group in the aryl group having the halogeno group, or the sulfonyl group having the halogeno group, represented by $An'^-$ of the general formula (II"), includes, for example, a fluoro group, a chloro group, a bromo group and an iodo group, and the fluoro group is preferable.

In addition, the aryl group in the aryl group having the halogeno group, represented by $An'^-$ of the general formula (II"), includes, for example, a phenyl group, a naphthyl group, and the like, and the phenyl group is preferable.

Specific examples of the aryl group having a halogeno group, represented by $An'^-$ of the general formula (II"), include, for example, a monofluorophenyl group, a difluorophenyl group, a trifluorophenyl group, a perfluorophenyl group, a monochlorophenyl group, a dichlorophenyl group, a trichlorophenyl group, a perchlorophenyl group, a monobromophenyl group, a dibromophenyl group, a tribromophenyl group, a perbromophenyl group, a monoiodophenyl group, a diiodophenyl group, a triiodophenyl group, a periodophenyl group, a monofluoronaphthyl group, a difluoronaphthyl group, a trifluoronaphthyl group, a perfluoronaphthyl group, a monochloronaphthyl group, a dichloronaphthyl group, a trichloronaphthyl group, a perchloronaphthyl group, a monobromonaphthyl group, a dibromonaphthyl group, a tribromonaphthyl group, a perbromonaphthyl group, a monoiodonaphthyl group, a diiodonaphthyl group, a triiodonaphthyl group, a periodonaphthyl group, and the like; and the monofluorophenyl group, the difluorophenyl group, the trifluorophenyl group, the perfluorophenyl group, the monochlorophenyl group, the dichlorophenyl group, the trichlorophenyl group, the perchlorophenyl group, the monobromophenyl group, the dibromophenyl group, the tribromophenyl group, the perbromophenyl group, the monoiodophenyl group, the diiodophenyl group, the triiodophenyl group and the periodophenyl group are preferable; and the difluorophenyl group, the trifluorophenyl group and the perfluorophenyl group are more preferable; and the perfluorophenyl group is particularly preferable.

The sulfonyl group having the halogeno group, represented by An'⁻ of the general formula (II"), includes, for example, —SO$_2$—F, —SO$_2$—Cl, —SO$_2$—Br, —SO$_2$—I, and the like.

In addition, the halogenated alkyl group, represented by An'⁻ of the general formula (II"), includes the same one as the halogenated alkyl group in the anion of the present invention, and the preferable one is also the same.

The anion containing the aryl group having the halogeno group, the sulfonyl group having the halogeno group, or the halogenated alkyl group, represented by An'⁻ of the general formula (II"), specifically includes, for example, the ones represented by the general formulae (X-I) to (XI-VI), and the preferable one is also the same.

Preferable combinations of R'$_1$ to R'$_4$, R$_7$, R$_9$, n and A'$_1$ in the general formula (II") include, for example, those described in the following Table 6.

It should be noted that formulae (P) and (Q) in the A'$_1$ column represent groups represented by the following formulae (P) and (Q).

—O—CO—(CH$_2$)$_2$—CO—O—(CH$_2$)$_2$—  (P)

—NHCONH—(CH$_2$)$_2$—  (Q)

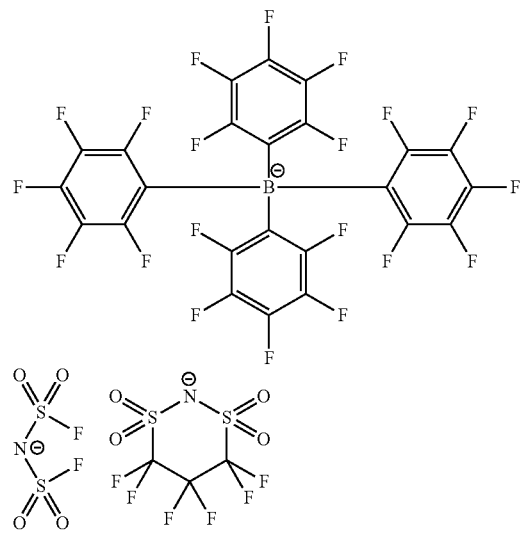

(2) Production Method for the Compound Represented by the General Formula (II)

Among the compound represented by the general formula (II) of the present invention, for example, the one where R$_8$ in the general formula (II) is hydrogen atom, as well as Y is the group represented by the formula (II-1-1) {a compound represented by the following general formula (II-1-3)} can be produced by a method shown in the next scheme [I].

That is, after subjecting a compound represented by the following general formula (II-31), and a compound represented by the following general formula (II-32) to a reaction to obtain a compound represented by the following general formula (II-33), followed by subjecting the compound rep-

TABLE 6

| R$_1$' | R$_2$' | R$_3$' | R$_4$' | R$_7$ | R$_9$ | n | A$_1$' |
|---|---|---|---|---|---|---|---|
| hydrogen atom | methyl group | methyl group | hydrogen atom | hydrogen atom or methyl group | hydrogen atom | 1 | formula (P) or (Q) |
| hydrogen atom | ethyl group | ethyl group | hydrogen atom | hydrogen atom or methyl group | hydrogen atom | 1 | formula (P) or (Q) |
| hydrogen atom | ethyl group | ethyl group | hydrogen atom | hydrogen atom or methyl group | methyl group | 1 | formula (P) or (Q) |
| hydrogen atom | ethyl group | ethyl group | hydrogen atom | hydrogen atom or methyl group | hydrogen atom | 2 | formula (P) or (Q) |
| hydrogen atom | n-propyl group | n-propyl group | hydrogen atom | hydrogen atom or methyl group | hydrogen atom | 1 | formula (P) or (Q) |
| hydrogen atom | isopropyl group | isopropyl group | hydrogen atom | hydrogen atom or methyl group | hydrogen atom | 1 | formula (P) or (Q) |
| methyl group | methyl group | methyl group | methyl group | hydrogen atom or methyl group | hydrogen atom | 1 | formula (P) or (Q) |
| methyl group | ethyl group | ethyl group | methyl group | hydrogen atom or methyl group | hydrogen atom | 1 | formula (P) or (Q) |
| methyl group | n-propyl group | n-propyl group | methyl group | hydrogen atom or methyl group | hydrogen atom | 1 | formula (P) or (Q) |
| methyl group | isopropyl group | isopropyl group | methyl group | hydrogen atom or methyl group | hydrogen atom | 1 | formula (P) or (Q) |
| ethyl group | ethyl group | ethyl group | ethyl group | hydrogen atom or methyl group | hydrogen atom | 1 | formula (P) or (Q) |
| ethyl group | n-propyl group | n-propyl group | ethyl group | hydrogen atom or methyl group | hydrogen atom | 1 | formula (P) or (Q) |
| ethyl group | isopropyl group | isopropyl group | ethyl group | hydrogen atom or methyl group | hydrogen atom | 1 | formula (P) or (Q) |
| n-propyl group | n-propyl group | n-propyl group | n-propyl group | hydrogen atom or methyl group | hydrogen atom | 1 | formula (P) or (Q) |

An'⁻ to be used together with the combinations in the Table 6 includes, for example, the following ones, and the like.

resented by the general formula (II-33), and a compound represented by the following general formula (II-34) to a reaction in the presence of a dehydration condensation agent, a resulting compound represented by the following general formula (II-36) may be subjected to a salt formation reaction.

In addition, in the reaction to obtain the compound represented by the general formula (II-36) from the compound represented by the general formula (II-33), the compound represented by the general formula (II-36) can be obtained also by subjecting the compound represented by the general formula (II-33), and a compound represented by the following general formula (II-35) to a reaction, instead of the method for using the compound represented by the general formula (II-34).

—OCONH— or —NHCONH—; $A_{1-2}$ represents an alkylene group having 1 to 21 carbon atoms which has at least one group selected from —O—, —OCO—, —COO—, —NHCO—, —CONH—, —NHCONH— and an arylene group in the chain; an alkylene group having 1 to 21 carbon atoms which has at least one group selected from —O—, —OCO—, —COO—, —NHCO—, —CONH—, —NHCONH— and an arylene group in the chain, and also has a hydroxy group as a substituent; an alkylene group having 1 to 21 carbon atoms which has a hydroxy group as a substituent; or an alkylene group having 1 to 21 carbon atoms; and $Z^-$ represents an anion.)

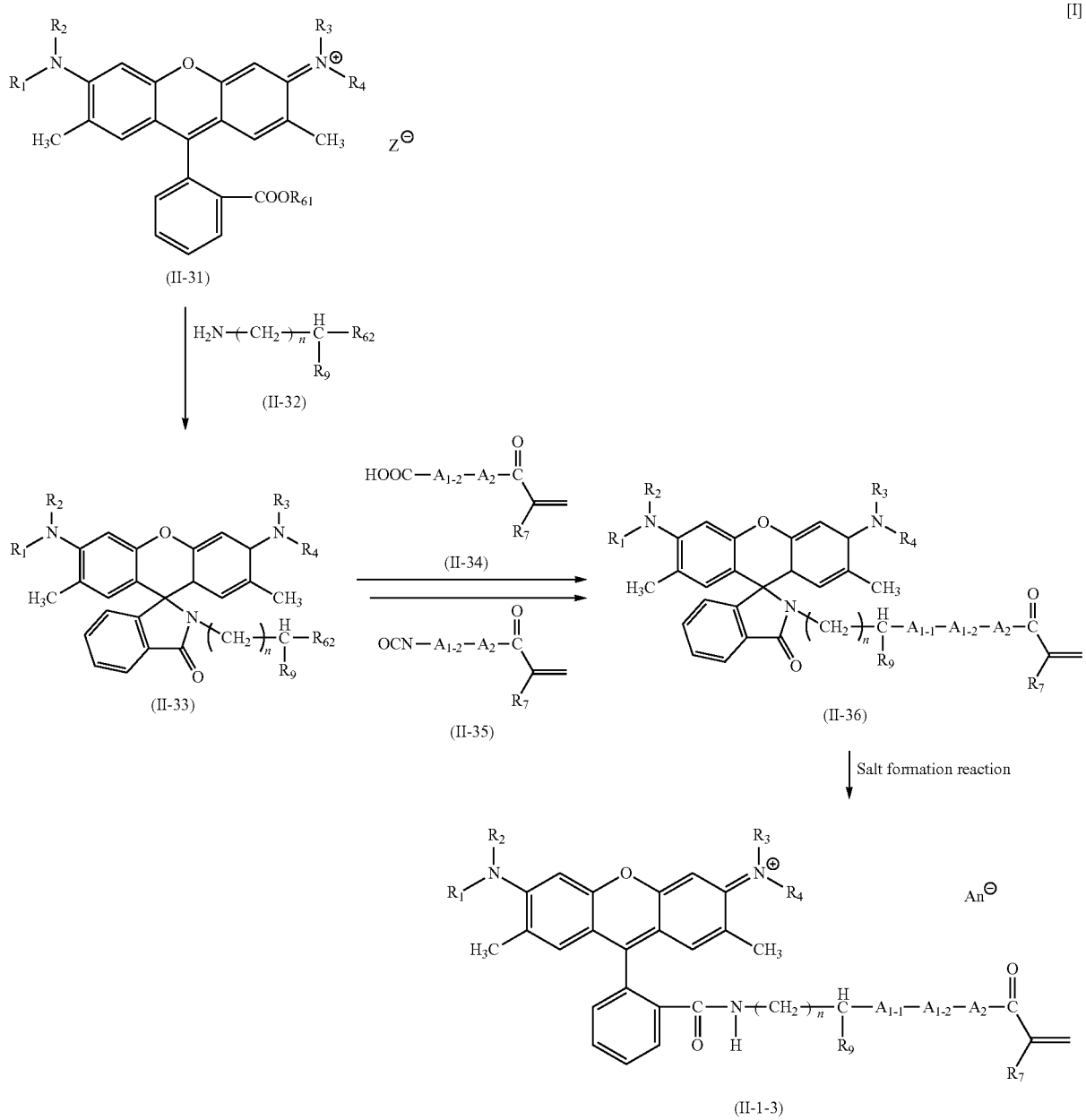

(where, in the scheme, $R_1$ to $R_4$, $R_7$, $R_9$, n, $A_2$ and $An^-$ are the same as described above; $R_{61}$ represents an alkyl group having 1 to 6 carbon atoms; $R_{62}$ represents a hydroxy group or an amino group; $A_{1-1}$ represents —OCO—, —NHCO—, The anion represented by $Z^-$ in the general formula (II-31) includes $Cl^-$, $NO_3^-$, $SO_4^{2-}$, $HSO_4^-$, $ClO_4^-$ and the anion of the present invention, and the like, and among them, $Cl^-$ is preferable.

The alkyl group having 1 to 6 carbon atoms, in $R_{61}$ of the general formula (II-31), includes the same one as the alkyl group having 1 to 6 carbon atoms, in $R_9$ of the general formula (II-II), and the preferable ones are also the same.

$A_{1-1}$ in the general formulae (II-36) and (II-1-3) is specified by kinds of a compound subjected to a reaction with the general formula (II-33), and kinds of $R_{62}$, and combinations thereof are shown in the following Table 7.

TABLE 7

| $A_{1-1}$ | compound subjected to a reaction with the general formula (II-33) | $R_{62}$ |
|---|---|---|
| —OCO— | compound represented by the general formula (II-34) | hydroxy group |
| —NHCO— | | amino group |
| —OCONH— | compound represented by the general formula (II-35) | hydroxy group |
| —NHCONH— | | amino group |

The alkylene group having 1 to 21 carbon atoms, in "an alkylene group having 1 to 21 carbon atoms which has at least one group selected from —O—, —OCO—, —COO—, —NHCO—, —CONH—, —NHCONH— and an arylene group in the chain", "an alkylene group having 1 to 21 carbon atoms which has at least one group selected from —O—, —OCO—, —COO— or an arylene group in the chain, and also has a hydroxy group as a substituent", "an alkylene group having 1 to 21 carbon atoms which has a hydroxy group as a substituent" and "an alkylene group having 1 to 21 carbon atoms", in $A_{1-2}$ of the general formulae (II-34) to (II-36) and (II-1-3), includes the same one as the alkylene group having 1 to 21 carbon atoms, in $A_1$ of the general formula (II-II), and the preferable one is also the same.

The arylene group in "an alkylene group having 1 to 21 carbon atoms which has at least one group selected from —O—, —OCO—, —COO—, —NHCO—, —CONH—, —NHCONH— and an arylene group in the chain" and "an alkylene group having 1 to 21 carbon atoms which has at least one group selected from —O—, —OCO—, —COO— or an arylene group in the chain, and also has a hydroxy group as a substituent", in $A_{1-2}$ of the general formulae (II-34) to (II-36) and (II-1-3), includes the one having 6 to 10 carbon atoms, and specifically includes a phenylene group, a naphthylene group, and the like.

"An alkylene group having 1 to 21 carbon atoms which has at least one group selected from —O—, —OCO—, —COO—, —NHCO—, —CONH—, —NHCONH— and an arylene group in the chain", in $A_{1-2}$ of the general formulae (II-34) to (II-36) and (II-1-3), includes, for example, groups represented by the following general formulae (II-24-1) to (II-24-2), and the like.

$$-(R_{51}-O)_{h11}-R_{51}-\qquad(\text{II-24-1})$$

(wherein $h_{11}$ represents an integer of 1 to 9, $R_{51}$ is the same as described above; provided that total number of carbon atoms in the formula is 1 to 21.)

$$-R_{52}-COO-(CH_2)_{h5}-\qquad(\text{II-24-2})$$

(wherein $R_{52}$ and $h_5$ are the same as described above.)

The group represented by the general formula (II-24-1) includes specifically, for example, the following groups, and the like.

—CH$_2$CH$_2$—O—(CH$_2$)$_2$—,

—(CH$_2$CH$_2$—O)$_2$—(CH$_2$)$_2$—,

—(CH$_2$CH$_2$—O)$_3$—(CH$_2$)$_2$—,

—(CH$_2$CH$_2$—O)$_4$—(CH$_2$)$_2$—,

—(CH$_2$CH$_2$—O)$_5$—(CH$_2$)$_2$—,

—(CH$_2$CH$_2$—O)$_6$—(CH$_2$)$_2$—,

—(CH$_2$CH$_2$—O)$_7$—(CH$_2$)$_2$—,

—(CH$_2$CH$_2$—O)$_8$—(CH$_2$)$_2$—,

—(CH$_2$CH$_2$—O)$_9$—(CH$_2$)$_2$—,

—CH$_2$CH(CH$_3$)—O—CH$_2$CH(CH$_3$)—,

—(CH$_2$CH(CH$_3$)—O)$_2$—CH$_2$CH(CH$_3$)—,

—(CH$_2$CH(CH$_3$)—O)$_3$—CH$_2$CH(CH$_3$)—,

—(CH$_2$CH(CH$_3$)—O)$_4$—CH$_2$CH(CH$_3$)—,

—(CH$_2$CH(CH$_3$)—O)$_5$—CH$_2$CH(CH$_3$)—,

—(CH$_2$CH(CH$_3$)—O)$_6$—CH$_2$CH(CH$_3$)—,

—(CH$_2$CH(CH$_3$)—O)$_7$—CH$_2$CH(CH$_3$)—,

—CH(CH$_3$)CH$_2$—O—CH(CH$_3$)CH$_2$—,

—(CH(CH$_3$)CH$_2$—O)$_2$—CH(CH$_3$)CH$_2$—,

—(CH(CH$_3$)CH$_2$—O)$_3$—CH(CH$_3$)CH$_2$—,

—(CH(CH$_3$)CH$_2$—O)$_4$—CH(CH$_3$)CH$_2$—,

—(CH(CH$_3$)CH$_2$—O)$_5$—CH(CH$_3$)CH$_2$—,

—(CH(CH$_3$)CH$_2$—O)$_6$—CH(CH$_3$)CH$_2$—,

—(CH(CH$_3$)CH$_2$—O)$_7$—CH(CH$_3$)CH$_2$—.

In addition, the group represented by the general formula (II-24-2) includes specifically, for example, the following groups, and the like.

—CH$_2$—CO—O—CH$_2$—,

—(CH$_2$)$_2$—CO—O—CH$_2$—,

—(CH$_2$)$_3$—CO—O—CH$_2$—,

—(CH$_2$)$_4$—CO—O—CH$_2$—,

—(CH$_2$)$_5$—CO—O—CH$_2$—,

—(CH$_2$)$_6$—CO—O—CH$_2$—,

—(CH$_2$)$_7$—CO—O—CH$_2$—,

—CH$_2$—CO—O—(CH$_2$)$_2$—,

—(CH$_2$)$_2$—CO—O—(CH$_2$)$_2$—,

—(CH$_2$)$_3$—CO—O—(CH$_2$)$_2$—,

—(CH$_2$)$_4$—CO—O—(CH$_2$)$_2$—,

—(CH$_2$)$_5$—CO—O—(CH$_2$)$_2$—,

—(CH$_2$)$_6$—CO—O—(CH$_2$)$_2$—,

—(CH$_2$)$_7$—CO—O—(CH$_2$)$_2$—,

—CH$_2$—CO—O—(CH$_2$)$_3$—,

—(CH$_2$)$_2$—CO—O—(CH$_2$)$_3$—,

—(CH$_2$)$_3$—CO—O—(CH$_2$)$_3$—,

—(CH$_2$)$_4$—CO—O—(CH$_2$)$_3$—,

—(CH$_2$)$_5$—CO—O—(CH$_2$)$_3$—,

—(CH$_2$)$_6$—CO—O—(CH$_2$)$_3$—,

—(CH$_2$)$_7$—CO—O—(CH$_2$)$_3$—,

—C$_6$H$_4$—CO—O—CH$_2$—,

—C$_6$H$_4$—CO—O—(CH$_2$)$_2$—,

—C$_6$H$_4$—CO—O—(CH$_2$)$_3$—,

—C$_6$H$_{10}$—CO—O—CH$_2$—,

—C$_6$H$_{10}$—CO—O—(CH$_2$)$_2$—,

—C$_6$H$_{10}$—CO—O—(CH$_2$)$_3$—

And among them, —CH$_2$—CO—O—CH$_2$—, —(CH$_2$)$_2$—CO—O—CH$_2$—, —(CH$_2$)$_3$—CO—O—CH$_2$—, —(CH$_2$)$_4$—CO—O—CH$_2$—, —(CH$_2$)$_5$—CO—O—CH$_2$—, —(CH$_2$)$_6$—CO—O—CH$_2$—, —(CH$_2$)$_7$—CO—O—CH$_2$—, —CH$_2$—CO—O—(CH$_2$)$_2$—, —(CH$_2$)$_2$—CO—O—(CH$_2$)$_2$—, —(CH$_2$)$_3$—CO—O—(CH$_2$)$_2$—, —(CH$_2$)$_4$—CO—O—(CH$_2$)$_2$—, —(CH$_2$)$_5$—CO—O—(CH$_2$)$_2$—, —(CH$_2$)$_6$—CO—O—(CH$_2$)$_2$—, —(CH$_2$)$_7$—CO—O—(CH$_2$)$_2$—, —CH$_2$—CO—O—(CH$_2$)$_3$—, —(CH$_2$)$_2$—CO—O—(CH$_2$)$_3$—, —(CH$_2$)$_3$—CO—O—(CH$_2$)$_3$—, —(CH$_2$)$_4$—CO—O—(CH$_2$)$_3$—, —(CH$_2$)$_5$—CO—O—(CH$_2$)$_3$—, —(CH$_2$)$_6$—CO—O—(CH$_2$)$_3$— and —(CH$_2$)$_7$—CO—O—(CH$_2$)$_3$— are preferable; —CH$_2$—CO—O—(CH$_2$)$_2$—, —(CH$_2$)$_2$—CO—O—(CH$_2$)$_2$—, —(CH$_2$)$_3$—CO—O—(CH$_2$)$_2$—, —(CH$_2$)$_4$—CO—O—(CH$_2$)$_2$—, —(CH$_2$)$_5$—CO—O—(CH$_2$)$_2$—, —(CH$_2$)$_6$—CO—O—(CH$_2$)$_2$— and —(CH$_2$)$_7$—CO—O—(CH$_2$)$_2$— are more preferable; and —(CH$_2$)$_2$—CO—O—(CH$_2$)$_2$— is particularly preferable.

"An alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", in A$_{1-2}$ of the general formulae (II-34) to (II-36) and (II-1-3), includes the same one as "an alkylene group having 1 to 21 carbon atoms which has at least one group selected from —O—, —OCO—, —COO—, —NHCO—, —CONH—, —NHCONH— and an arylene group in the chain, and also has a hydroxy group as a substituent" in A$_1$ of the general formula (II), and the preferable one is also the same.

The alkylene group having 1 to 21 carbon atoms which has a hydroxy group as a substituent, in A$_{1-2}$ of the general formulae (II-34) to (II-36) and (II-1-3) includes the same one as the alkylene group having 1 to 21 carbon atoms which has a hydroxy group as a substituent, in A$_1$ of the general formula (II), and the preferable one is also the same.

As A$_{1-2}$ of the general formulae (II-34) to (II-36) and (II-1-3), "an alkylene group having 1 to 21 carbon atoms which has at least one group selected from —O—, —OCO—, —COO—, —NHCO—, —CONH—, —NHCONH— and an arylene group in the chain" and "an alkylene group having 1 to 21 carbon atoms" are preferable, and among them, the group represented by the general formula (II-24-2), and the alkylene group having 1 to 21 carbon atoms are preferable.

Preferable specific examples of A$_{1-2}$ include a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, a methylpentylene group, —CH$_2$—CO—O—CH$_2$—, —(CH$_2$)$_2$—CO—O—CH$_2$—, —(CH$_2$)$_3$—CO—O—CH$_2$—, —(CH$_2$)$_4$—CO—O—CH$_2$—, —(CH$_2$)$_5$—CO—O—CH$_2$—, —(CH$_2$)$_6$—CO—O—CH$_2$—, —(CH$_2$)$_7$—CO—O—CH$_2$—, —CH$_2$—CO—O—(CH$_2$)$_2$—, —(CH$_2$)$_2$—CO—O—(CH$_2$)$_2$—, —(CH$_2$)$_3$—CO—O—(CH$_2$)$_2$—, —(CH$_2$)$_4$—CO—O—(CH$_2$)$_2$—, —(CH$_2$)$_5$—CO—O—(CH$_2$)$_2$—, —(CH$_2$)$_6$—CO—O—(CH$_2$)$_2$—, —(CH$_2$)$_7$—CO—O—(CH$_2$)$_2$—, —CH$_2$—CO—O—(CH$_2$)$_3$—, —(CH$_2$)$_2$—CO—O—(CH$_2$)$_3$—, —(CH$_2$)$_3$—CO—O—(CH$_2$)$_3$—, —(CH$_2$)$_4$—CO—O—(CH$_2$)$_3$—, —(CH$_2$)$_5$—CO—O—(CH$_2$)$_3$—, —(CH$_2$)$_6$—CO—O—(CH$_2$)$_3$—, —(CH$_2$)$_7$—CO—O—(CH$_2$)$_3$—, and the like;

the methylene group, the ethylene group, the propylene group, —CH$_2$—CO—O—(CH$_2$)$_2$—, —(CH$_2$)$_2$—CO—O—(CH$_2$)$_2$—, —(CH$_2$)$_3$—CO—O—(CH$_2$)$_2$—, —(CH$_2$)$_4$—CO—O—(CH$_2$)$_2$—, —(CH$_2$)$_5$—CO—O—(CH$_2$)$_2$—, —(CH$_2$)$_6$—CO—O—(CH$_2$)$_2$— and —(CH$_2$)$_7$—CO—O—(CH$_2$)$_2$— are more preferable; and the ethylene group and —(CH$_2$)$_2$—CO—O—(CH$_2$)$_2$— are particularly preferable.

The group where A$_{1-1}$ and A$_{1-2}$ are combined in the scheme [I] provides A$_1$ in the compound represented by the general formula (II). In this case, total number of carbon atoms contained in A$_{1-1}$ and A$_{1-2}$ is 1 to 21.

Preferable specific examples of the compound represented by the general formula (II-1-3) include a compound represented by the following general formula (II'-1-3).

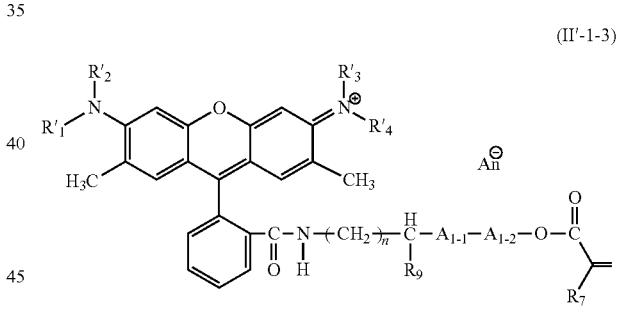

(II'-1-3)

(wherein R'$_1$ to R'$_4$, R$_7$, R$_9$, n, A$_{1-1}$, A$_{1-2}$ and An$^-$ are the same as described above.)

Among the compound represented by the general formula (II'-1-3), preferable specific examples include a compound represented by the following general formula (II''-1-3).

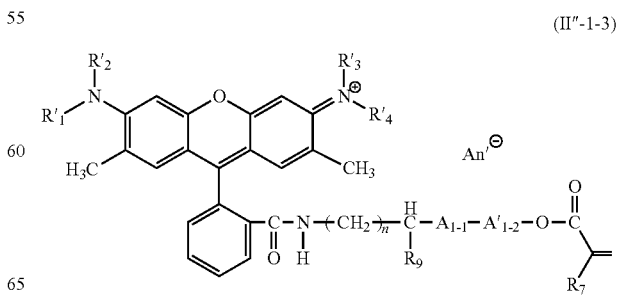

(II''-1-3)

(wherein R'$_1$ to R'$_4$, R$_7$, R$_9$, n, A$_{1-1}$ and An'$^-$ are the same as described above; A'$_{1-2}$ represents an alkylene group having 1 to 21 carbon atoms which has at least one group selected from —O—, —OCO—, —COO—, —NHCO—, —CONH—, —NHCONH— and an arylene group in the chain; or an alkylene group having 1 to 21 carbon atoms.)

The alkylene group having 1 to 21 carbon atoms, in "an alkylene group having 1 to 21 carbon atoms which has at least one group selected from —O—, —OCO—, —COO—, —NHCO—, —CONH—, —NHCONH— and an arylene group in the chain", and "an alkylene group having 1 to 21 carbon atoms", in A'$_{1-2}$ of the general formula (II"-1-3), includes the same one as the alkylene group having 1 to 21 carbon atoms, in A$_1$ of the general formula (II), and the preferable one is also the same.

In addition, "an alkylene group having 1 to 21 carbon atoms which has at least one group selected from —O—, —OCO—, —COO—, —NHCO—, —CONH—, —NHCONH— and an arylene group in the chain", in A'$_{1-2}$ of the general formula (II"-1-3), includes the same one as "an alkylene group having 1 to 21 carbon atoms which has at least one group selected from —O—, —OCO—, —COO—, —NHCO—, —CONH—, —NHCONH— and an arylene group in the chain", in A$_{1-2}$ of the general formula (1-3), and the preferable one is also the same.

Preferable specific examples of A'$_{1-2}$ in the general formula (II"-1-3) include the same ones as the preferable specific examples of A$_{1-2}$ in the general formula (II-3), and the more preferable ones are also the same.

Preferable combinations of R'$_1$ to R'$_4$, R$_7$, R$_9$, n, A$_{1-1}$ and A'$_{1-2}$ of the general formula (II"-1-3) include, for example, those described in the following Table 8.

It should be noted that formula (P') in the A'$_{1-2}$ column represents a group represented by the following formula (P').

$$—(CH_2)_2—CO—O—(CH_2)_2— \quad (P')$$

TABLE 8

| R$_1$' | R$_2$' | R$_3$' | R$_4$' | R$_7$ | R$_9$ | n | A$_{1-1}$ | A'$_{1-2}$ |
|---|---|---|---|---|---|---|---|---|
| hydrogen atom | methyl group | methyl group | hydrogen atom | hydrogen atom or methyl group | hydrogen atom | 1 | —OCO— | formula (P') |
| | methyl group | methyl group | | | hydrogen atom | 1 | —NHCONH— | ethylene group |
| | ethyl group | ethyl group | | | hydrogen atom | 1 | —OCO— | formula (P') |
| | ethyl group | ethyl group | | | hydrogen atom | 1 | —NHCONH— | ethylene group |
| | ethyl group | ethyl group | | | methyl group | 1 | —OCO— | formula (P') |
| | ethyl group | ethyl group | | | methyl group | 1 | —NHCONH— | ethylene group |
| | ethyl group | ethyl group | | | hydrogen atom | 2 | —OCO— | formula (P') |
| | ethyl group | ethyl group | | | hydrogen atom | 2 | —NHCONH— | ethylene group |
| | n-propyl group | n-propyl group | | | hydrogen atom | 1 | —OCO— | formula (P') |
| | n-propyl group | n-propyl group | | | hydrogen atom | 1 | —NHCONH— | ethylene group |
| | isopropyl group | isopropyl group | | | hydrogen atom | 1 | —OCO— | formula (P') |
| | isopropyl group | isopropyl group | | | hydrogen atom | 1 | —NHCONH— | ethylene group |
| methyl group | methyl group | methyl group | methyl group | | hydrogen atom | 1 | —OCO— | formula (P') |
| | methyl group | methyl group | | | hydrogen atom | 1 | —NHCONH— | ethylene group |
| | ethyl group | ethyl group | | | hydrogen atom | 1 | —OCO— | formula (P') |
| | ethyl group | ethyl group | | | hydrogen atom | 1 | —NHCONH— | ethylene group |
| | n-propyl group | n-propyl group | | | hydrogen atom | 1 | —OCO— | formula (P') |
| | n-propyl group | n-propyl group | | | hydrogen atom | 1 | —NHCONH— | ethylene group |
| | isopropyl group | isopropyl group | | | hydrogen atom | 1 | —OCO— | formula (P') |
| | isopropyl group | isopropyl group | | | hydrogen atom | 1 | —NHCONH— | ethylene group |
| ethyl group | ethyl group | ethyl group | ethyl group | | hydrogen atom | 1 | —OCO— | formula (P') |
| | ethyl group | ethyl group | | | hydrogen atom | 1 | —NHCONH— | ethylene group |
| | n-propyl group | n-propyl group | | | hydrogen atom | 1 | —OCO— | formula (P') |
| | n-propyl group | n-propyl group | | | hydrogen atom | 1 | —NHCONH— | ethylene group |
| | isopropyl group | isopropyl group | | | hydrogen atom | 1 | —OCO— | formula (P') |
| | isopropyl group | isopropyl group | | | hydrogen atom | 1 | —NHCONH— | ethylene group |
| n-propyl group | n-propyl group | n-propyl group | n-propyl group | | hydrogen atom | 1 | —OCO— | formula (P') |
| | n-propyl group | n-propyl group | | | hydrogen atom | 1 | —NHCONH— | ethylene group |

An'$^-$ to be used together with the combinations includes the same one as An'$^-$ to be used together with the preferable combinations of R'$_1$ to R'$_4$, R$_7$, R$_9$, n and A'$_1$ in the general formula (II").

Preferable combinations of R$_1$ to R$_4$, R$_{61}$ and Z$^-$ of the general formula (II-31) include, for example, those described in the following Table 9.

TABLE 9

| R$_1$ | R$_2$ | R$_3$ | R$_4$ | R$_{61}$ | Z$^-$ |
|---|---|---|---|---|---|
| hydrogen atom | methyl group | methyl group | hydrogen atom | ethyl group | Cl$^-$ |
| hydrogen atom | ethyl group | ethyl group | hydrogen atom | methyl group | Cl$^-$ |
| hydrogen atom | ethyl group | ethyl group | hydrogen atom | ethyl group | Cl$^-$ |
| hydrogen atom | ethyl group | ethyl group | hydrogen atom | n-propyl group | Cl$^-$ |
| hydrogen atom | ethyl group | ethyl group | hydrogen atom | ethyl group | NO$_3^-$ |
| hydrogen atom | ethyl group | ethyl group | hydrogen atom | ethyl group | SO$_4^{2-}$ |
| hydrogen atom | ethyl group | ethyl group | hydrogen atom | ethyl group | HSO$_4^-$ |
| hydrogen atom | ethyl group | ethyl group | hydrogen atom | ethyl group | ClO$_4^-$ |
| hydrogen atom | n-propyl group | n-propyl group | hydrogen atom | ethyl group | Cl$^-$ |
| hydrogen atom | isopropyl group | isopropyl group | hydrogen atom | ethyl group | Cl$^-$ |

TABLE 9-continued

| R₁ | R₂ | R₃ | R₄ | R₆₁ | Z⁻ |
|---|---|---|---|---|---|
| methyl group | methyl group | methyl group | methyl group | ethyl group | Cl⁻ |
| methyl group | ethyl group | ethyl group | methyl group | ethyl group | Cl⁻ |
| methyl group | n-propyl group | n-propyl group | methyl group | ethyl group | Cl⁻ |
| methyl group | isopropyl group | isopropyl group | methyl group | ethyl group | Cl⁻ |
| ethyl group | ethyl group | ethyl group | ethyl group | ethyl group | Cl⁻ |
| ethyl group | n-propyl group | n-propyl group | ethyl group | ethyl group | Cl⁻ |
| ethyl group | isopropyl group | isopropyl group | ethyl group | ethyl group | Cl⁻ |
| n-propyl group | n-propyl group | n-propyl group | n-propyl group | ethyl group | Cl⁻ |

Preferable specific examples of the general formula (II-32) include, for example, an amino alcohol, such as aminomethanol, 2-aminoethanol, 3-aminopropanol, 2-amino-1-methylethanol, 4-aminobutanol, 3-amino-1-methylpropanol, 3-amino-2-methylpropanol, 5-aminopentanol, 4-amino-1-methylbutanol, 3-amino-1,2-dimethylpropanol, 3-amino-1-ethylpropanol, 6-aminohexanol and 5-amino-1-methylpentanol; and an alkylene diamine, such as methylenediamine, ethylenediamine, propylenediamine, methylethylenediamine, butylenediamine, 1-methylpropylenediamine, 2-methylpropylenediamine, pentylenediamine, methylbutylenediamine, 1,2-dimethylpropylenediamine, 1-ethylpropylenediamine, hexylenediamine and methylpentylenediamine. Among them, aminomethanol, 2-aminoethanol, 3-aminopropanol, 4-aminobutanol, 5-aminopentanol, 6-aminohexanol, methylenediamine, ethylenediamine, propylenediamine, butylenediamine, pentylenediamine and hexylenediamine are preferable; aminomethanol, 2-aminoethanol, 3-aminopropanol, methylenediamine, ethylenediamine and propylenediamine are more preferable; and 2-aminoethanol and ethylenediamine are particularly preferable.

Preferable specific examples of the compound represented by the general formula (II-33) include a compound represented by the following general formula (II-33').

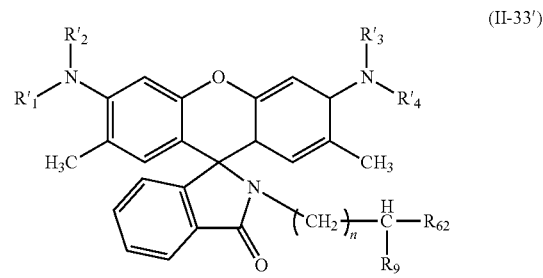

(II-33')

(wherein $R'_1$ to $R'_4$, $R_9$, $R_{62}$ and n are the same as described above.)

Preferable combinations of $R'_1$ to $R'_4$, $R_9$, $R_{62}$ and n of the general formula (II-33') include, for example, those described in the following Table 10.

TABLE 10

| R₁' | R₂' | R₃' | R₄' | R₉ | R₆₂ | n |
|---|---|---|---|---|---|---|
| hydrogen atom | methyl group | methyl group | hydrogen atom | hydrogen atom | —OH or —NH₂ | 1 |
| hydrogen atom | ethyl group | ethyl group | hydrogen atom | hydrogen atom | —OH or —NH₂ | 1 |
| hydrogen atom | ethyl group | ethyl group | hydrogen atom | methyl group | —OH or —NH₂ | 1 |
| hydrogen atom | ethyl group | ethyl group | hydrogen atom | hydrogen atom | —OH or —NH₂ | 2 |
| hydrogen atom | ethyl group | ethyl group | hydrogen atom | hydrogen atom | —OH or —NH₂ | 1 |
| hydrogen atom | ethyl group | ethyl group | hydrogen atom | hydrogen atom | —OH or —NH₂ | 1 |
| hydrogen atom | ethyl group | ethyl group | hydrogen atom | hydrogen atom | —OH or —NH₂ | 1 |
| hydrogen atom | ethyl group | ethyl group | hydrogen atom | hydrogen atom | —OH or —NH₂ | 1 |
| hydrogen atom | n-propyl group | n-propyl group | hydrogen atom | hydrogen atom | —OH or —NH₂ | 1 |
| hydrogen atom | isopropyl group | isopropyl group | hydrogen atom | hydrogen atom | —OH or —NH₂ | 1 |
| methyl group | methyl group | methyl group | methyl group | hydrogen atom | —OH or —NH₂ | 1 |
| methyl group | ethyl group | ethyl group | methyl group | hydrogen atom | —OH or —NH₂ | 1 |
| methyl group | n-propyl group | n-propyl group | methyl group | hydrogen atom | —OH or —NH₂ | 1 |
| methyl group | isopropyl group | isopropyl group | methyl group | hydrogen atom | —OH or —NH₂ | 1 |
| ethyl group | ethyl group | ethyl group | ethyl group | hydrogen atom | —OH or —NH₂ | 1 |
| ethyl group | n-propyl group | n-propyl group | ethyl group | hydrogen atom | —OH or —NH₂ | 1 |
| ethyl group | isopropyl group | isopropyl group | ethyl group | hydrogen atom | —OH or —NH₂ | 1 |
| n-propyl group | n-propyl group | n-propyl group | n-propyl group | hydrogen atom | —OH or —NH₂ | 1 |

Preferable specific examples of the general formula (II-34) include, for example, the following ones, and the like.
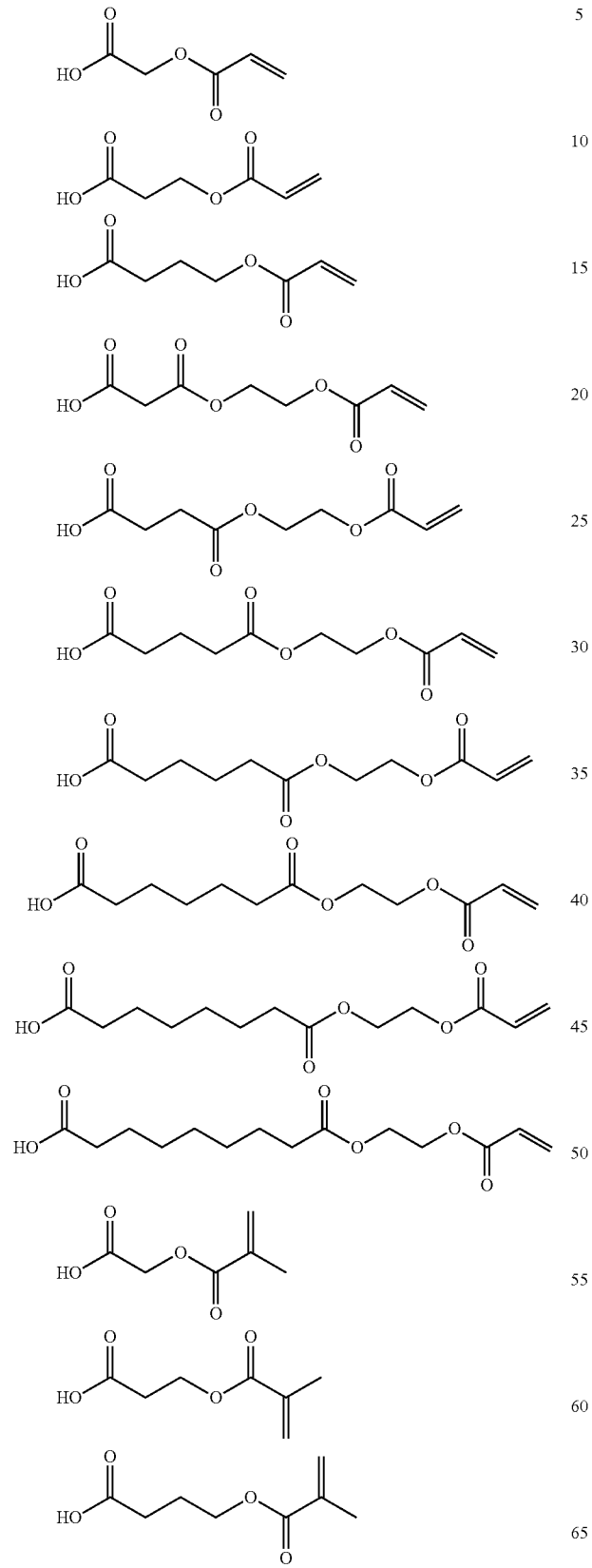
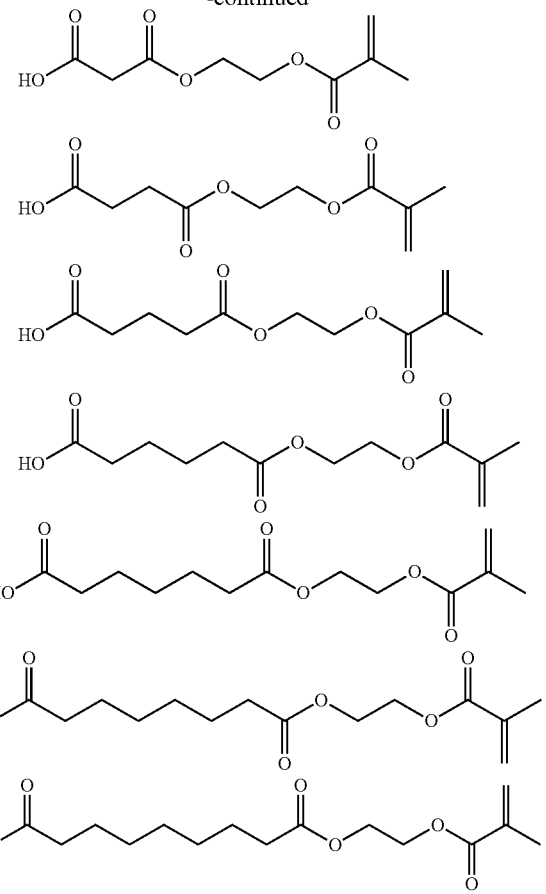
Preferable specific examples of the general formula (II-35) include, for example, the following ones, and the like.
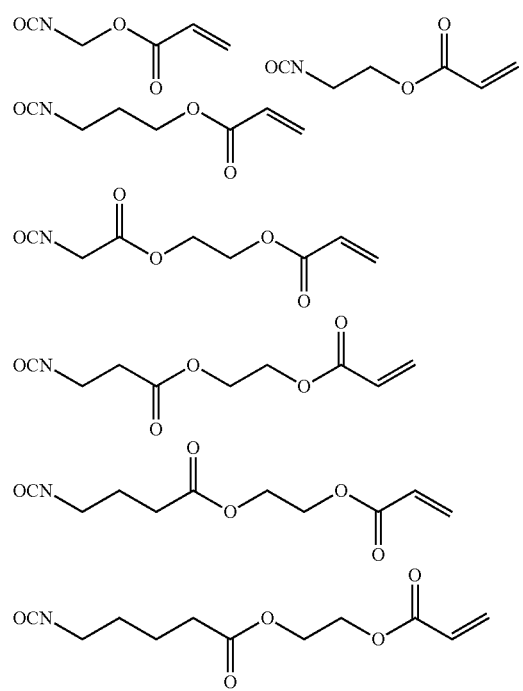

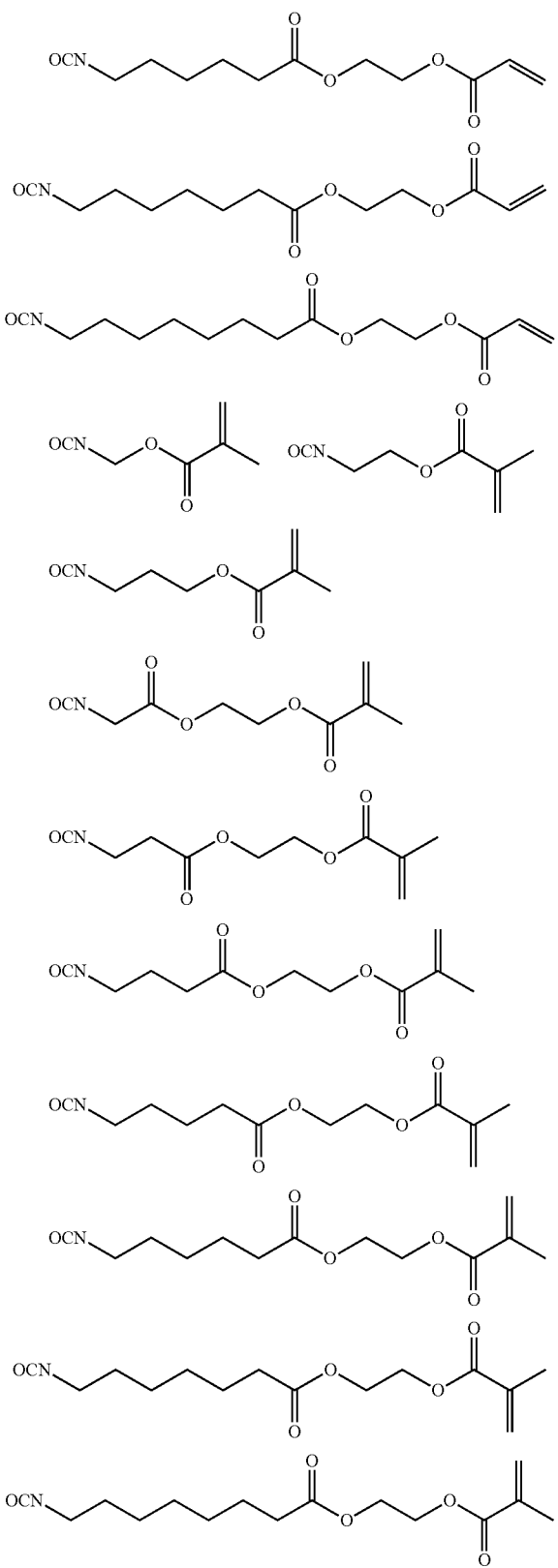

Preferable specific examples of the compound represented by the general formula (II-36) include a compound represented by the following general formula (II-36').

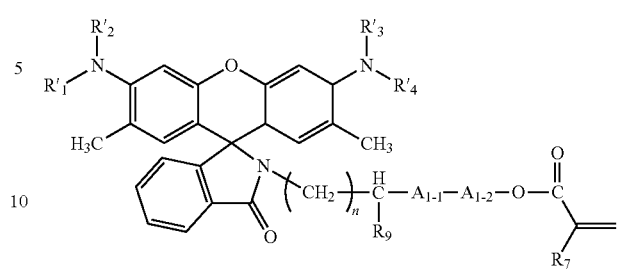

(wherein $R'_1$ to $R'_4$, $R_7$, $R_9$, n, $A_{1-1}$ and $A_{1-2}$ are the same as described above.)

More preferable specific examples among the compound represented by the general formula (II-36') include a compound represented by the following general formula (II-36").

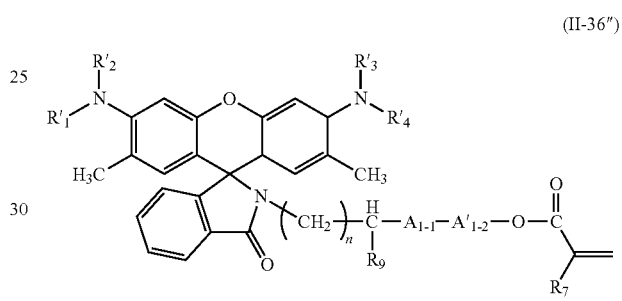

(wherein $R'_1$ to $R'_4$, $R_7$, $R_9$, n, $A_{1-1}$ and $A'_{1-2}$ are the same as described above.)

Preferable combinations of $R'_1$ to $R'_4$, $R_7$, $R_9$, n, $A_{1-1}$ and $A'_{1-2}$ of the general formula (II-36") include the same ones as the preferable combinations of $R'_1$ to $R'_4$, $R_7$, $R_9$, n, $A_{1-1}$ and $A'_{1-2}$ of the general formula (II"-1-3).

In the reaction between the compound represented by the general formula (II-31) and the compound represented by the general formula (II-32), the compound represented by the general formula (II-31) and the compound represented by the general formula (II-32) may be subjected to a reaction in a solvent, usually at 0 to 80° C., preferably at 10 to 50° C., usually for 1 to 24 hours, and preferably for 1 to 8 hours.

In addition, the solvent in the reaction between the compound represented by the general formula (II-31) and the compound represented by the general formula (II-32) includes an organic solvent, such as methanol, ethanol, isopropyl alcohol (IPA), tetrahydrofuran (THF), dioxane, N,N-dimethylformamide (DMF), methylene chloride, dichloroethane, and the like; and among them, ethanol is preferable.

They may be used alone, or in combination of two or more kinds thereof as appropriate. Use amount of the reaction solvent is usually 1 to 50 times volume, and preferably 1 to 20 times volume, relative to total volume of the compound represented by the general formula (II-31) and the compound represented by the general formula (II-32).

Use amount of the compound represented by the general formula (II-32) is usually 1 to 50 equivalents, and preferably 10 to 20 equivalents, relative to mole number of the compound represented by the general formula (II-31).

In the reaction between the compound represented by the general formula (II-33) and the compound represented by the general formula (II-34), the compound represented by the general formula (II-33) and the compound represented by the general formula (II-34) may be subjected to a reaction in a solvent, in the presence of the dehydration condensation agent, usually at 0 to 80° C., preferably at 10 to 50° C., usually for 1 to 48 hours, and preferably for 10 to 36 hours.

In addition, the solvent in the reaction between the compound represented by the general formula (II-33) and the compound represented by the general formula (II-34) includes the same one as the solvent to be used in the method for subjecting the rhodamine compound represented by the general formula (I-I), and the compound represented by the general formula (I-II) to a reaction, and the preferable one is also the same.

They may be used alone, or in combination of two or more kinds thereof as appropriate.

Use amount of the reaction solvent is usually 1 to 50 times volume, and preferably 1 to 20 times volume, relative to total volume of the compound represented by the general formula (II-33) and the compound represented by the general formula (II-34).

The dehydration condensation agent in the reaction between the compound represented by the general formula (II-33) and the compound represented by the general formula (II-34) includes the same one as the dehydration condensation agent to be used in the method for subjecting the rhodamine compound represented by the general formula (I-I), and the compound represented by the general formula (I-II) to a reaction, and the preferable one is also the same.

Use amount of the dehydration condensation agent is usually 1 to 10 equivalents, and preferably 1 to 5 equivalents, relative to mole number of the compound represented by the general formula (II-33).

In the reaction between the compound represented by the general formula (II-33) and the compound represented by the general formula (II-34), a catalyst, such as dimethylaminopyridine, may be used to enhance efficiency of the dehydration condensation agent. Use amount of the catalyst is usually 0.1 to 10 equivalents, relative to mole number of the compound represented by the general formula (II-33).

Use amount of the compound represented by the general formula (II-34) is usually 1 to 2 equivalents, and preferably 1 to 1.5 equivalents, relative to mole number of the compound represented by the general formula (II-33).

The salt formation reaction in the scheme [I] is carried out by making a salt of the anion of the present invention contacted with the compound represented by the general formula (II-36), in a solvent.

The solvent in the salt formation reaction includes an organic solvent, such as methanol, ethanol, isopropyl alcohol (IPA), tetrahydrofuran (THF), dioxane, N,N-dimethylformamide (DMF), methylene chloride, dichloroethane, and the like; and among them, ethanol is preferable.

They may be used alone, or in combination of two or more kinds thereof as appropriate. Use amount of the reaction solvent is usually 1 to 50 times volume, preferably 1 to 20 times volume, relative to volume of the compound represented by the general formula (II-36).

The salt formation reaction may be carried out usually at 0 to 100° C., preferably at 30 to 80° C., usually for 1 to 12 hours, and preferably for 1 to 8 hours.

The salt of the anion of the present invention in the salt formation reaction includes a sodium salt, a potassium salt, a lithium salt, and the like, of the anion of the present invention, and the potassium salt or the lithium salt is preferable.

Use amount of the salt of the anion of the present invention is usually 1 to 2 equivalents, preferably 1 to 1.5 equivalents, relative to mole number of the compound represented by the general formula (II-36).

The reaction between the compound represented by the general formula (II-33) and the compound represented by the general formula (II-35) may be carried out in a solvent, usually at 0 to 80° C., preferably at 10 to 50° C., usually for 1 to 24 hours, and preferably for 1 to 8 hours.

The solvent in the reaction between the compound represented by the general formula (II-33) and the compound represented by the general formula (II-35) includes the same one as the solvent to be used in the method for subjecting the rhodamine compound represented by the general formula (I-I), and the compound represented by the general formula (I-II) to a reaction, and the preferable one is also the same.

They may be used alone, or in combination of two or more kinds thereof as appropriate. Use amount of the reaction solvent is usually 1 to 50 times volume, and preferably 1 to 20 times volume, relative to total volume of the compound represented by the general formula (II-33) and the compound represented by the general formula (II-35).

Use amount of the compound represented by the general formula (II-35) is usually 1 to 2 equivalents, and preferably 1 to 1.5 equivalents, relative to mole number of the compound represented by the general formula (II-33).

Pressure in a series of the reactions is not especially limited, as long as the series of the reactions is carried out without delay, and the reactions may be carried out, for example, under normal pressure.

The resulting reactants and products obtained after the series of the reactions can be isolated by a general post-treatment operation and purification operation usually carried out in this field. Specifically, for example, the resulting reactants and products may be isolated by carrying out, as needed, filtration, washing, extraction, concentration under reduced pressure, recrystallization, distillation, column chromatography, or the like.

Among the compound represented by the general formula (II), for example, the one where $R_8$ is an alkyl group having 1 to 30 carbon atoms, or the one where $R_8$ and $R_9$ form a cyclic structure of a 5 to 6 membered ring together with —N—$(CH_2)_n$—Y— bonding thereto {a compound represented by the following general formula (II-1-4)} can be produced by a method shown in the next scheme [II].

That is, after hydrolysis of a compound represented by the following general formula (II-31), a resulting acid derived from the compound represented by the general formula (II-31) and a compound represented by the following general formula (II-37) are subjected to a reaction to obtain an intermediate represented by the following general formula (II-38). Then, after a reaction between the intermediate represented by the general formula (II-38) and a compound represented by the following general formula (II-39), a salt formation reaction is carried out, and a resulting compound represented by the general formula (II-40) and the compound represented by the general formula (II-34) may be subjected to a reaction, in the presence of a dehydration condensation agent.

In addition, in the reaction to obtain the compound represented by the general formula (II-1-4), from the compound represented by the general formula (II-40), the compound represented by the general formula (II-1-4) can be obtained also by subjecting the compound represented by the general formula (II-40), and the compound represented by the following general formula (II-35) to a reaction, instead of the method for using the compound represented by the general formula (II-34).

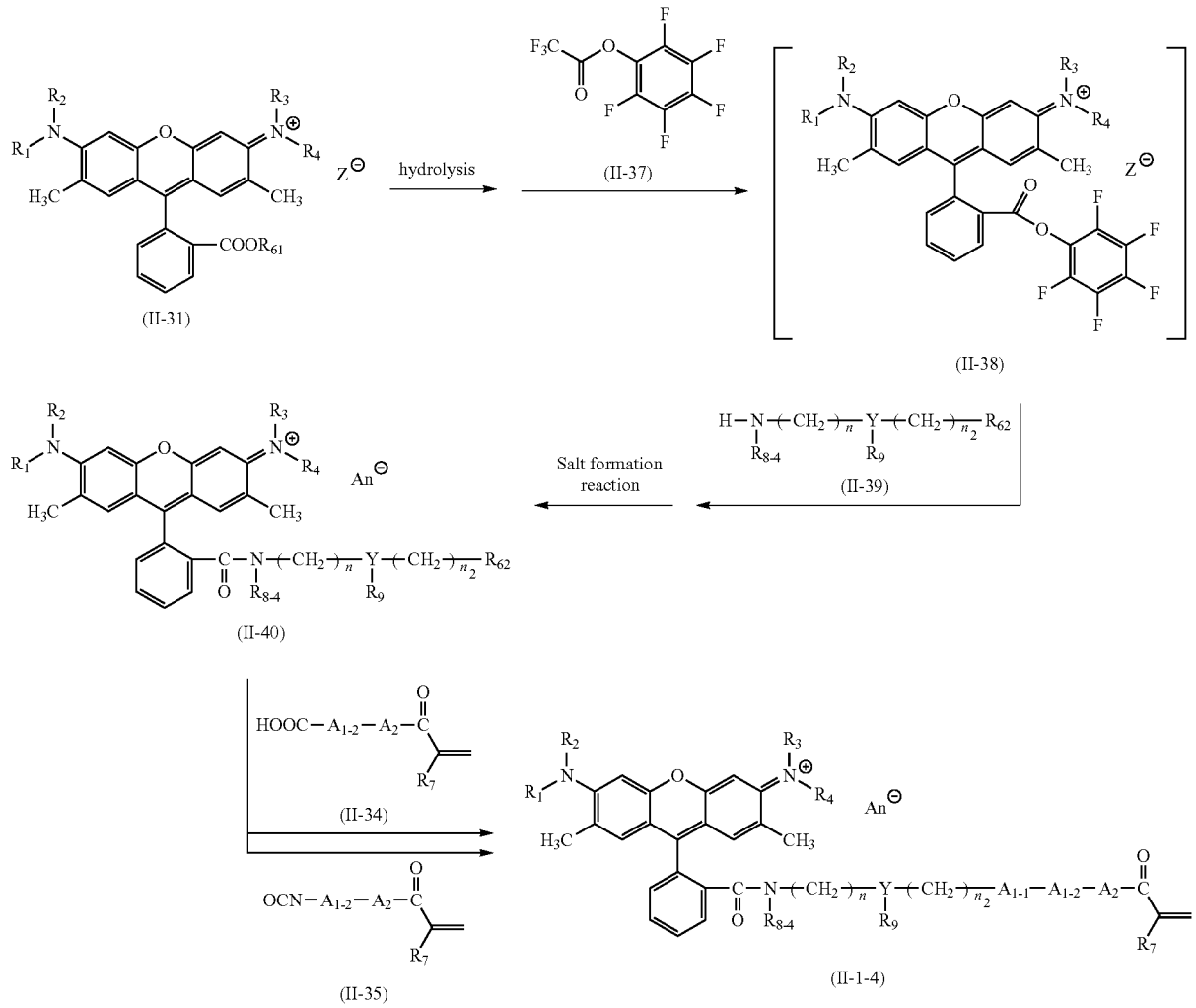

(where, in the scheme, $R_1$ to $R_4$, $R_7$, $R_9$, $R_{61}$, $R_{62}$, n, $A_{1-1}$, $A_{1-2}$, $A_2$, $Z^-$ and $An^-$ are the same as described above; $R_{8-4}$ represents an alkyl group having 1 to 30 carbon atoms; $n_2$ represents an integer of 0 to 3. $R_{8-4}$ and $R_9$ may form a cyclic structure of a 5 to 6 membered ring together with —N—$(CH_2)_n$—Y— bonding thereto.)

The alkyl group having 1 to 30 carbon atoms, in $R_{8-4}$ of the general formulae (II-1-4), (II-39) and (II-40), includes the same one as the alkyl group having 1 to 30 carbon atoms, in $R_1$ to $R_4$ of the general formula (II), and the preferable one is also the same.

In addition, in the case where $R_{8-4}$ and $R_9$ in the general formulae (II-1-4), (II-39) and (II-40) form a cyclic structure of a 5 to 6 membered ring together with —N—$(CH_2)_n$—Y— bonding thereto, the cyclic structure is the one represented by the general formula (II-1-2).

The group where —$(CH_2)_{n2}$—, $A_{1-1}$ and $A_{1-2}$ are combined, in the scheme [II], provides $A_1$ in the compound represented by the general formula (II). In this case, total number of carbon atoms contained in —$(CH_2)_{n2}$—, $A_{1-1}$ and $A_{1-2}$ is 1 to 21.

Preferable specific examples of the compound represented by the general formula (II-1-4) include a compound represented by the following general formula (II-1'-4).

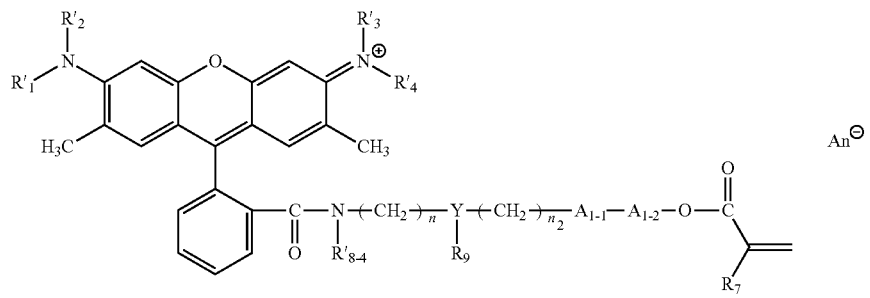

(wherein $R'_1$ to $R'_4$, $R_7$, $R_9$, Y, n, $n_2$, $A_{1-1}$, $A_{1-2}$ and $An^-$ are the same as described above; $R'_{8-4}$ represents an alkyl group having 1 to 6 carbon atoms. $R'_{8-4}$ and $R_9$ may form a cyclic structure of a 5 to 6 membered ring together with —N—$(CH_2)_n$—Y— bonding thereto.)

The alkyl group having 1 to 6 carbon atoms, in $R'_{8-4}$ of the general formula (II-1'-4), includes the same one as the alkyl group having 1 to 6 carbon atoms, in $R_9$ of the general formula (II), and the preferable one is also the same.

In addition, in the case where $R'_{8-4}$ and $R_9$ in the general formula (II-1'-4) form a cyclic structure of a 5 to 6 membered ring together with —N—$(CH_2)_n$—Y— bonding thereto, the cyclic structure is the one represented by the general formula (II-1-2).

Preferable specific examples among the compound represented by the general formula (II-1'-4) include a compound represented by the following general formula (II-1"-4).

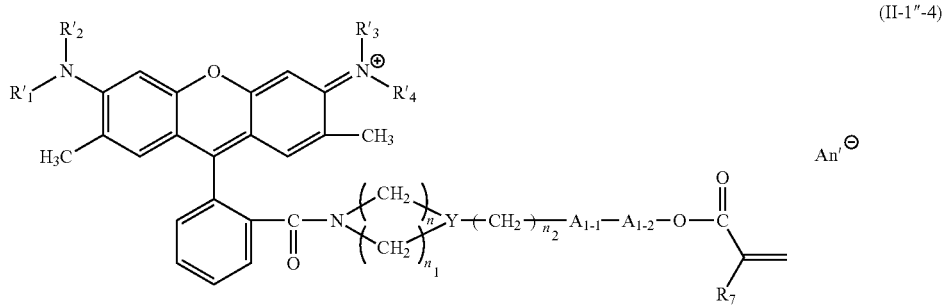

(II-1"-4)

(wherein $R'_1$ to $R'_4$, $R_7$, Y, n, $n_1$, $n_2$, $A_{1-1}$, $A'_{1-2}$ and $An'^-$ are the same as described above.)

Preferable combinations of $R'_1$ to $R'_4$, $R_7$, Y, n, $n_1$, $n_2$, $A_{1-1}$ and $A'_{1-2}$ of the general formula (II-1"-4) include those described in the following Table 11.

TABLE 11

| $R_1'$ | $R_2'$ | $R_3'$ | $R_4'$ | $R_7$ | Y | n | $n_1$ | $n_2$ | $A_{1-1}$ | $A'_{1-2}$ |
|---|---|---|---|---|---|---|---|---|---|---|
| hydrogen atom | methyl group | methyl group | hydrogen atom | hydrogen atom or methyl group | formula (1-1) or nitrogen atom | 2 | 2 | 2 | —OCO— | formula (P') |
|  | methyl group | methyl group |  |  |  | 2 | 2 | 2 | —NHCONH— | ethylene group |
|  | ethyl group | ethyl group |  |  |  | 0 | 3 | 2 | —OCO— | formula (P') |
|  | ethyl group | ethyl group |  |  |  | 0 | 3 | 2 | —NHCONH— | ethylene group |
|  | ethyl group | ethyl group |  |  |  | 0 | 4 | 2 | —OCO— | formula (P') |
|  | ethyl group | ethyl group |  |  |  | 0 | 4 | 2 | —NHCONH— | ethylene group |
|  | ethyl group | ethyl group |  |  |  | 1 | 2 | 2 | —OCO— | formula (P') |
|  | ethyl group | ethyl group |  |  |  | 1 | 2 | 2 | —NHCONH— | ethylene group |
|  | ethyl group | ethyl group |  |  |  | 1 | 3 | 2 | —OCO— | formula (P') |
|  | ethyl group | ethyl group |  |  |  | 1 | 3 | 2 | —NHCONH— | ethylene group |
|  | ethyl group | ethyl group |  |  |  | 2 | 2 | 0 | —OCO— | formula (P') |
|  | ethyl group | ethyl group |  |  |  | 2 | 2 | 0 | —NHCONH— | ethylene group |
|  | ethyl group | ethyl group |  |  |  | 2 | 2 | 1 | —OCO— | formula (P') |
|  | ethyl group | ethyl group |  |  |  | 2 | 2 | 1 | —NHCONH— | ethylene group |
|  | ethyl group | ethyl group |  |  |  | 2 | 2 | 2 | —OCO— | formula (P') |
|  | ethyl group | ethyl group |  |  |  | 2 | 2 | 2 | —NHCONH— | ethylene group |
|  | ethyl group | ethyl group |  |  |  | 2 | 2 | 3 | —OCO— | formula (P') |
|  | ethyl group | ethyl group |  |  |  | 2 | 2 | 3 | —NHCONH— | ethylene group |
|  | n-propyl group | n-propyl group |  |  |  | 2 | 2 | 2 | —OCO— | formula (P') |
|  | n-propyl group | n-propyl group |  |  |  | 2 | 2 | 2 | —NHCONH— | ethylene group |
|  | isopropyl group | isopropyl group |  |  |  | 2 | 2 | 2 | —OCO— | formula (P') |
|  | isopropyl group | isopropyl group |  |  |  | 2 | 2 | 2 | —NHCONH— | ethylene group |
| methyl group | methyl group | methyl group | methyl group |  |  | 2 | 2 | 2 | —OCO— | formula (P') |
|  | methyl group | methyl group |  |  |  | 2 | 2 | 2 | —NHCONH— | ethylene group |
|  | ethyl group | ethyl group |  |  |  | 2 | 2 | 2 | —OCO— | formula (P') |
|  | ethyl group | ethyl group |  |  |  | 2 | 2 | 2 | —NHCONH— | ethylene group |
|  | n-propyl group | n-propyl group |  |  |  | 2 | 2 | 2 | —OCO— | formula (P') |
|  | n-propyl group | n-propyl group |  |  |  | 2 | 2 | 2 | —NHCONH— | ethylene group |
|  | isopropyl group | isopropyl group |  |  |  | 2 | 2 | 2 | —OCO— | formula (P') |
|  | isopropyl group | isopropyl group |  |  |  | 2 | 2 | 2 | —NHCONH— | ethylene group |
| ethyl group | ethyl group | ethyl group | ethyl group |  |  | 2 | 2 | 2 | —OCO— | formula (P') |
|  | ethyl group | ethyl group |  |  |  | 2 | 2 | 2 | —NHCONH— | ethylene group |
|  | n-propyl group | n-propyl group |  |  |  | 2 | 2 | 2 | —OCO— | formula (P') |
|  | n-propyl group | n-propyl group |  |  |  | 2 | 2 | 2 | —NHCONH— | ethylene group |
|  | isopropyl group | isopropyl group |  |  |  | 2 | 2 | 2 | —OCO— | formula (P') |
|  | isopropyl group | isopropyl group |  |  |  | 2 | 2 | 2 | —NHCONH— | ethylene group |
| n-propyl group | n-propyl group | n-propyl group | n-propyl group |  |  | 2 | 2 | 2 | —OCO— | formula (P') |
|  | n-propyl group | n-propyl group |  |  |  | 2 | 2 | 2 | —NHCONH— | ethylene group |

An⁻ to be used together with the combinations in the Table 11 includes the same one as An⁻ to be used together with the preferable combinations of R'$_1$ to R'$_4$, R$_7$, R$_9$, n and A'$_1$ in the general formula (II'').

Preferable specific examples among the intermediates represented by the general formula (II-38) include an intermediate represented by the following general formula (II-38').

(wherein R'$_1$ to R'$_4$ and Z⁻ are the same as described above.)

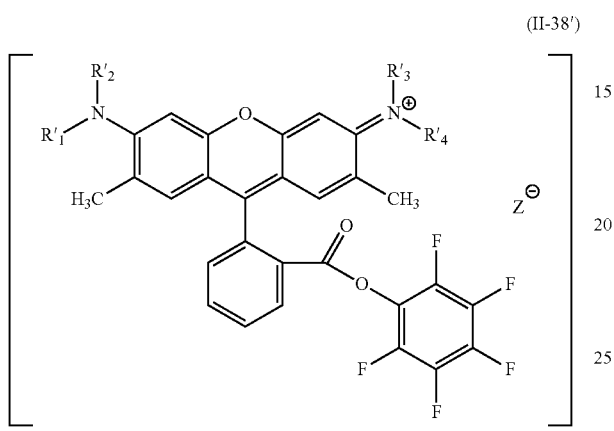

Preferable combinations of R'$_1$ to R'$_4$ and Z⁻ in the general formula (II-38') include, for example, those described in the following Table 12.

TABLE 12

| R$_1$' | R$_2$' | R$_3$' | R$_4$' | Z⁻ |
| --- | --- | --- | --- | --- |
| hydrogen atom | methyl group | methyl group | hydrogen atom | Cl⁻ |
| hydrogen atom | ethyl group | ethyl group | hydrogen atom | Cl⁻ |
| hydrogen atom | ethyl group | ethyl group | hydrogen atom | NO$_3$⁻ |
| hydrogen atom | ethyl group | ethyl group | hydrogen atom | SO$_4$$^{2-}$ |
| hydrogen atom | ethyl group | ethyl group | hydrogen atom | HSO$_4$⁻ |
| hydrogen atom | ethyl group | ethyl group | hydrogen atom | ClO$_4$⁻ |
| hydrogen atom | n-propyl group | n-propyl group | hydrogen atom | Cl⁻ |
| hydrogen atom | isopropyl group | isopropyl group | hydrogen atom | Cl⁻ |
| methyl group | methyl group | methyl group | methyl group | Cl⁻ |
| methyl group | ethyl group | ethyl group | methyl group | Cl⁻ |
| methyl group | n-propyl group | n-propyl group | methyl group | Cl⁻ |
| methyl group | isopropyl group | isopropyl group | methyl group | Cl⁻ |
| ethyl group | ethyl group | ethyl group | ethyl group | Cl⁻ |
| ethyl group | n-propyl group | n-propyl group | ethyl group | Cl⁻ |
| ethyl group | isopropyl group | isopropyl group | ethyl group | Cl⁻ |
| n-propyl group | n-propyl group | n-propyl group | n-propyl group | Cl⁻ |

Specific examples of the compound represented by the general formula (II-39) include the following ones,

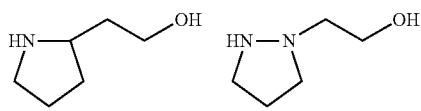

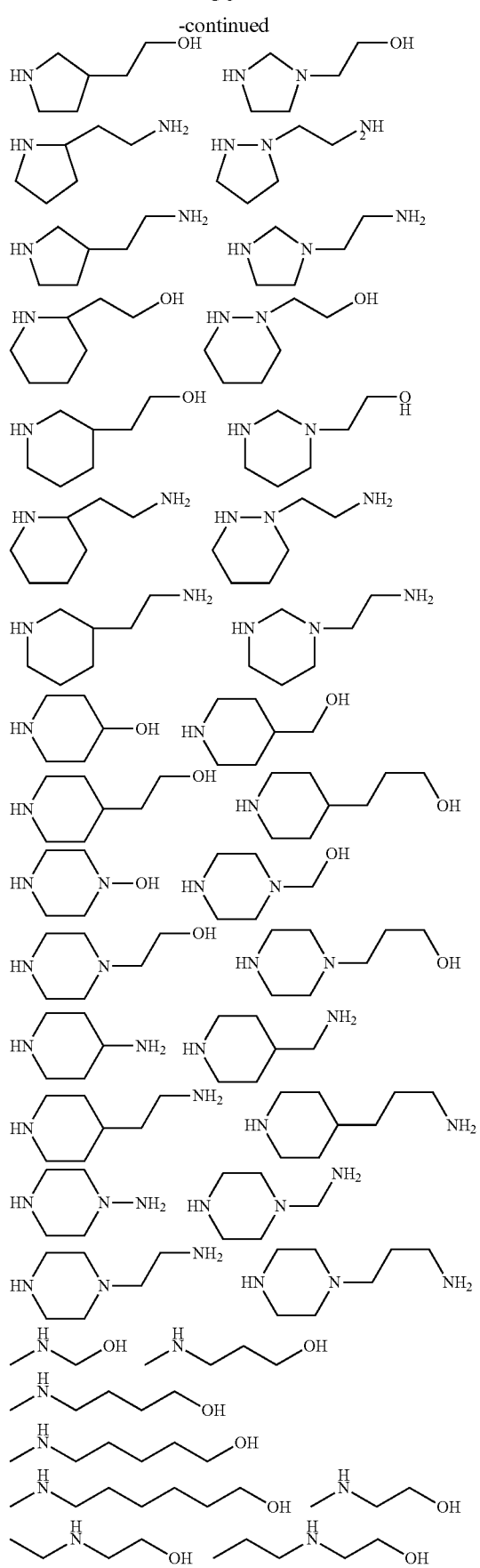

-continued
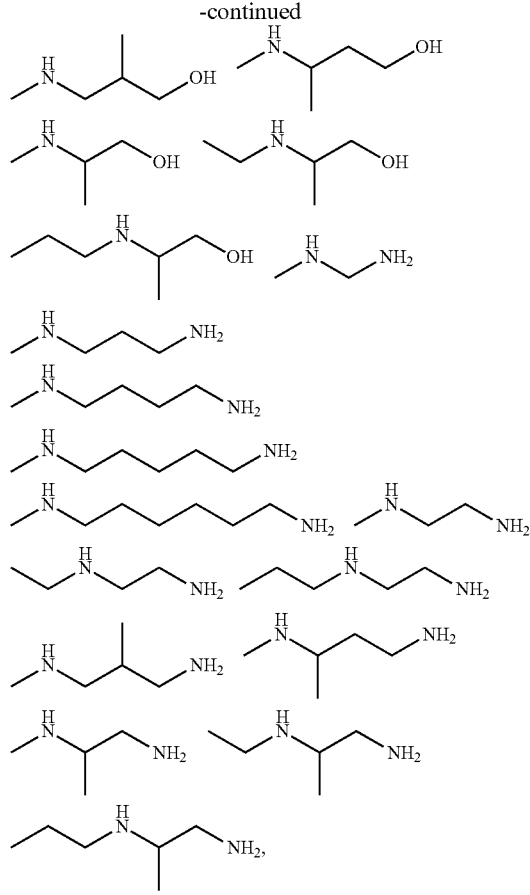
and the like;
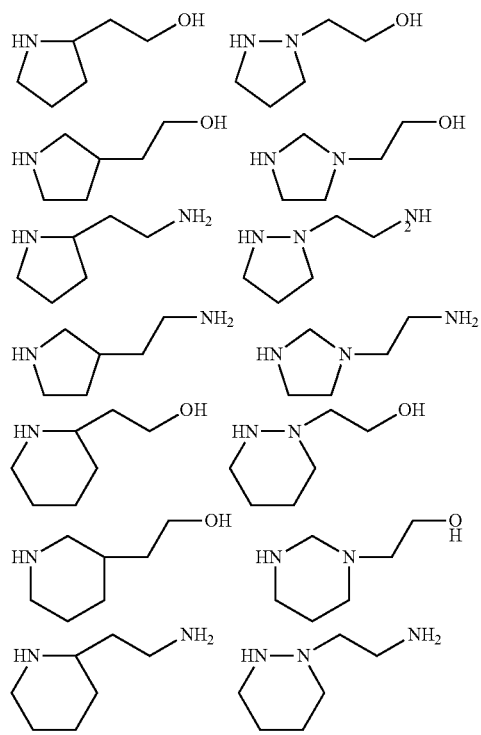
-continued
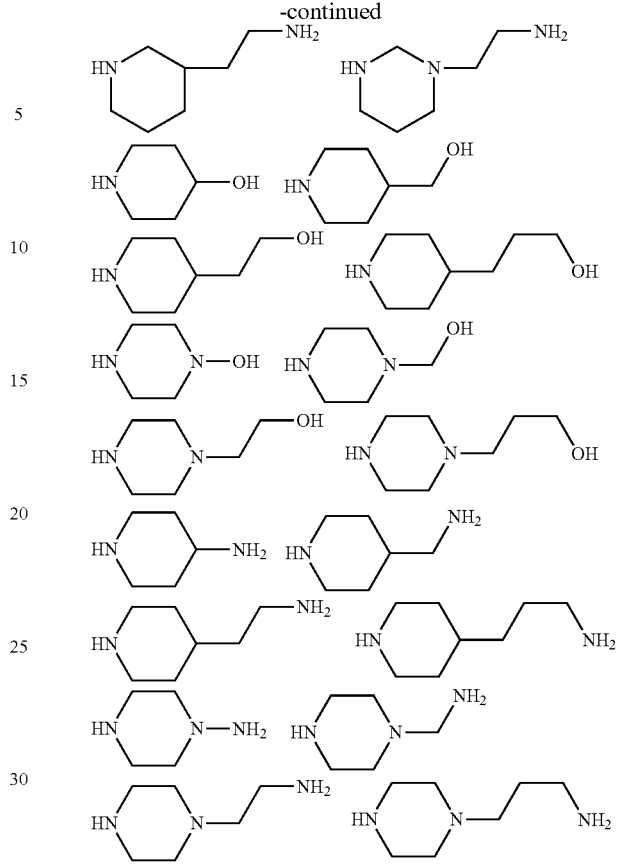
are preferable, and
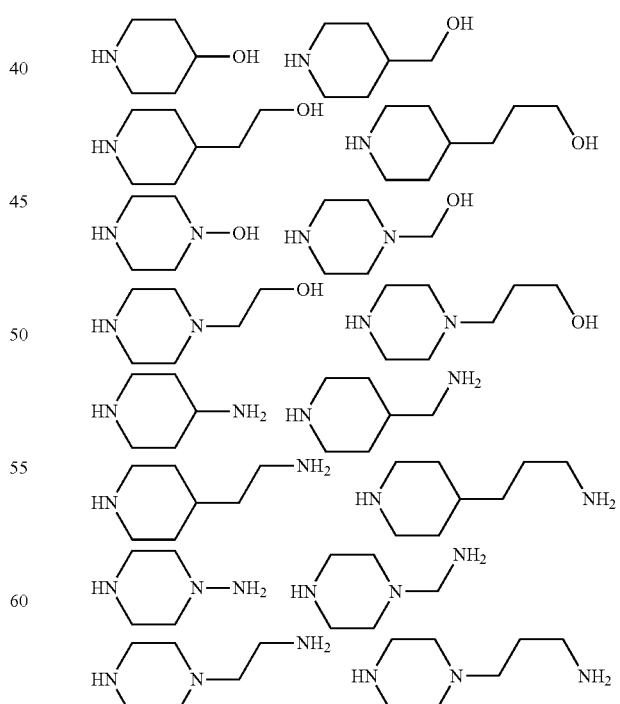
are more preferable.

Preferable specific examples among the compound represented by the general formula (II-40) include a compound represented by the following general formula (II-40').

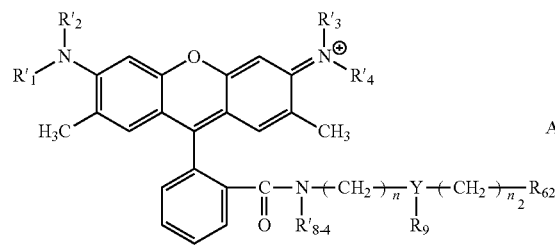

(II-40')

(wherein $R'_1$ to $R'_4$, $R'_{8-4}$, $R_9$, $R_{62}$, Y, n, $n_2$ and $An^-$ are the same as described above; $R'_{8-4}$ and $R_9$ may form a cyclic structure of a 5 to 6 membered ring together with —N—$(CH_2)_n$—Y— bonding thereto.)

Preferable specific examples among the compound represented by the general formula (II-40') include a compound represented by the following general formula (II-40").

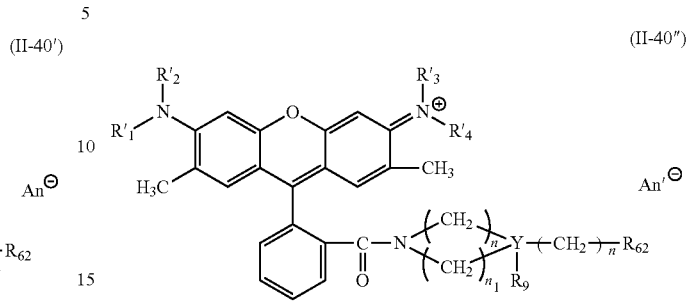

(II-40")

(wherein $R'_1$ to $R'_4$, $R_{62}$, Y, n, $n_1$, $n_2$ and $An'^-$ are the same as described above.)

Preferable combinations of $R'_1$ to $R'_4$, $R_{62}$, Y, n, $n_1$, and $n_2$ in the general formula (II-40") include, for example, those described in the following Table 13.

TABLE 13

| $R_1'$ | $R_2'$ | $R_3'$ | $R_4'$ | $R_{62}$ | Y | n | $n_1$ | $n_2$ |
|---|---|---|---|---|---|---|---|---|
| hydrogen atom | methyl group | methyl group | hydrogen atom | —OH or —NH$_2$ | formula (1-1) or nitrogen atom | 2 | 2 | 2 |
| hydrogen atom | ethyl group | ethyl group | hydrogen atom | —OH or —NH$_2$ | formula (1-1) or nitrogen atom | 0 | 3 | 2 |
| hydrogen atom | ethyl group | ethyl group | hydrogen atom | —OH or —NH$_2$ | formula (1-1) or nitrogen atom | 0 | 4 | 2 |
| hydrogen atom | ethyl group | ethyl group | hydrogen atom | —OH or —NH$_2$ | formula (1-1) or nitrogen atom | 1 | 2 | 2 |
| hydrogen atom | ethyl group | ethyl group | hydrogen atom | —OH or —NH$_2$ | formula (1-1) or nitrogen atom | 1 | 3 | 2 |
| hydrogen atom | ethyl group | ethyl group | hydrogen atom | —OH or —NH$_2$ | formula (1-1) or nitrogen atom | 2 | 2 | 0 |
| hydrogen atom | ethyl group | ethyl group | hydrogen atom | —OH or —NH$_2$ | formula (1-1) or nitrogen atom | 2 | 2 | 1 |
| hydrogen atom | ethyl group | ethyl group | hydrogen atom | —OH or —NH$_2$ | formula (1-1) or nitrogen atom | 2 | 2 | 2 |
| hydrogen atom | ethyl group | ethyl group | hydrogen atom | —OH or —NH$_2$ | formula (1-1) or nitrogen atom | 2 | 2 | 3 |
| hydrogen atom | n-propyl group | n-propyl group | hydrogen atom | —OH or —NH$_2$ | formula (1-1) or nitrogen atom | 2 | 2 | 2 |
| hydrogen atom | isopropyl group | isopropyl group | hydrogen atom | —OH or —NH$_2$ | formula (1-1) or nitrogen atom | 2 | 2 | 2 |
| methyl group | methyl group | methyl group | methyl group | —OH or —NH$_2$ | formula (1-1) or nitrogen atom | 2 | 2 | 2 |
| methyl group | ethyl group | ethyl group | methyl group | —OH or —NH$_2$ | formula (1-1) or nitrogen atom | 2 | 2 | 2 |
| methyl group | n-propyl group | n-propyl group | methyl group | —OH or —NH$_2$ | formula (1-1) or nitrogen atom | 2 | 2 | 2 |
| methyl group | isopropyl group | isopropyl group | methyl group | —OH or —NH$_2$ | formula (1-1) or nitrogen atom | 2 | 2 | 2 |
| ethyl group | ethyl group | ethyl group | ethyl group | —OH or —NH$_2$ | formula (1-1) or nitrogen atom | 2 | 2 | 2 |
| ethyl group | n-propyl group | n-propyl group | ethyl group | —OH or —NH$_2$ | formula (1-1) or nitrogen atom | 2 | 2 | 2 |
| ethyl group | isopropyl group | isopropyl group | ethyl group | —OH or —NH$_2$ | formula (1-1) or nitrogen atom | 2 | 2 | 2 |
| n-propyl group | n-propyl group | n-propyl group | n-propyl group | —OH or —NH$_2$ | formula (1-1) or nitrogen atom | 2 | 2 | 2 |

The hydrolysis reaction of the scheme [II] is carried out by the addition of a base to the compound represented by the general formula (II-31), and then by treatment with an acid.

The hydrolysis reaction may be carried out, usually at 10 to 100° C., preferably at 60 to 100° C., usually for 1 to 24 hours, and preferably for 6 to 12 hours.

In addition, the base in the hydrolysis reaction includes, for example, sodium hydroxide, potassium hydroxide, and the like. Use amount of the base is usually 1 to 10 equivalents, relative to mole number of the compound represented by the general formula (II-31).

A method for treatment with the acid in the hydrolysis reaction is carried out by the addition of an acid such as hydrochloric acid, sulfuric acid, nitric acid, perchloric acid, and the like, into a reaction system in which the base is added to the compound represented by the general formula (II-31). The acid added into the reaction system may be used alone, or in combination of two or more kinds thereof as appropriate. Amount of the acid added into the reaction system may be any amount as long as pH of the reaction system is 4 or less, and it is usually 1 to 50 times volume, preferably 1 to 20 times volume, relative to volume of the compound represented by the general formula (II-31).

In the reaction between the acid derived from the compound represented by the general formula (II-31), obtained by the hydrolysis reaction of the scheme [II], and the compound represented by the formula (II-37), the acid derived from the compound represented by the general formula (II-31) and the compound represented by the formula (II-37) may be subjected to a reaction, in a solvent, usually at 0 to 100° C., preferably at 10 to 50° C., usually for 1 to 48 hours, and preferably for 2 to 10 hours.

In addition, the solvent in the reaction between the acid derived from the compound represented by the general formula (II-31) and the compound represented by the formula (II-37) includes, for example, tetrahydrofuran (THF), dioxane, N,N-dimethylformamide (DMF), methylene chloride, and the like. They may be used alone, or in combination of two or more kinds thereof as appropriate. Use amount of the reaction solvent is usually 1 to 50 times volume, and preferably 1 to 20 times volume, relative to total volume of the acid derived from the compound represented by the general formula (II-31) and the compound represented by the formula (II-37).

Use amount of the compound represented by the general formula (II-37) is usually 1 to 2 equivalents, and preferably 1 to 1.5 equivalents, relative to mole number of the acid derived from the compound represented by the general formula (II-31).

In the reaction between the intermediate represented by the general formula (II-38) and the compound represented by the general formula (II-39), the intermediate represented by the general formula (II-38) and the compound represented by the general formula (II-39) may be subjected to a reaction, in a solvent, usually at 0 to 80° C., preferably at 10 to 50° C., usually for 1 to 48 hours, and preferably for 5 to 10 hours.

In addition, the solvent in the reaction between the intermediate represented by the general formula (II-38) and the compound represented by the general formula (II-39) includes, for example, tetrahydrofuran (THF), dioxane, N,N-dimethylformamide (DMF), methylene chloride, and the like.

They may be used alone, or in combination of two or more kinds thereof as appropriate. Use amount of the reaction solvent is usually 1 to 50 times volume, and preferably 1 to 20 times volume, relative to total volume of the intermediate represented by the general formula (II-38) and the compound represented by the general formula (II-39).

Use amount of the compound represented by the general formula (II-39) is usually 1 to 2 equivalents, and preferably 1 to 1.5 equivalents, relative to mole number of the intermediate represented by the general formula (II-38).

The salt formation reaction in the scheme [II] may be carried out similarly as in the salt formation reaction in the scheme [I], and a reaction temperature, reaction time, the salt of the anion of the present invention and a solvent are the same as described above.

The reaction between the compound represented by the general formula (II-40) and the compound represented by the general formula (II-34) may be carried out similarly as in the reaction between the compound represented by the general formula (II-33) and the compound represented by the general formula (II-34), and a reaction temperature, reaction time, a solvent, a dehydration condensation agent and a catalyst are the same as described above.

In addition, the reaction between the compound represented by the general formula (II-40) and the compound represented by the general formula (II-35) may be carried out similarly as in the reaction between the compound represented by the general formula (II-33) and the compound represented by the general formula (II-35), and a reaction temperature, reaction time and a solvent are the same as described above.

Pressure in a series of the reactions is not especially limited, as long as the series of the reactions is carried out without delay, and the reactions may be carried out, for example, under normal pressure.

In addition, the resulting reactants and products after the series of the reactions can be isolated by a general post-treatment operation and purification operation usually carried out in this field. Specifically, for example, the resulting reactants and products may be isolated by carrying out, as needed, filtration, washing, extraction, concentration under reduced pressure, recrystallization, distillation, column chromatography, or the like.

2-3. On the Compound Represented by the General Formula (III)

Next, explanation will be given on specific compounds of the compound represented by the general formula (III), as the compound having the cationic triarylmethane-type dye derivative and the ethylenically unsaturated group, a production method, and the like.

(1) Compound Represented by the General Formula (III)

The compound having the cationic triarylmethane-type dye derivative and the ethylenically unsaturated group of the present invention, as described above, includes specifically the compound represented by the following general formula (III), and the compound represented by the general formula (IV) to be described later.

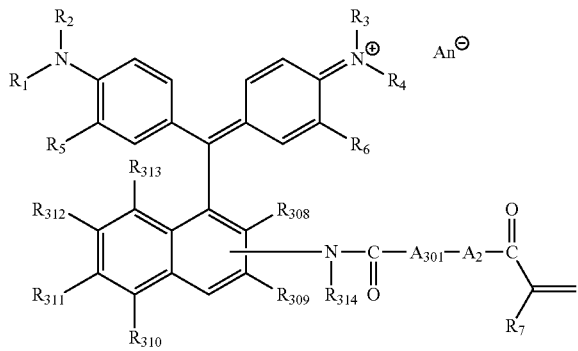

(III)

[where, in the general formula (III), $R_1$ to $R_7$, $A_2$ and $An^-$ are the same as those in the general formula (I); $R_{314}$ represents a hydrogen atom, an alkyl group having 1 to 30 carbon atoms, a phenyl group having or not having a substituent, a naphthyl group having or not having a substituent, or a benzyl group having or not having a substituent; $R_{308}$ to $R_{313}$ each independently represent an alkyl group having 1 to 21 carbon atoms, an aryl group, a hydroxy group, a nitro group, a sulfo group, or an alkoxy group having 1 to 3 carbon atoms. $A_{301}$ represents an alkylene group having 1 to 21 carbon atoms which has at least one group of —N($R_{315}$)—, —O—, —OCO—, —COO— or an arylene group in the chain, and also has a hydroxy group as a substituent, an alkylene group having 1 to 21 carbon atoms which has at least one group of —N($R_{315}$)—, —O—, —OCO—, —COO— or an arylene group in the chain, an alkylene group having 1 to 21 carbon atoms which has a hydroxy group as a substituent, or an alkylene group having 1 to 21 carbon atoms; $R_{315}$ represents a hydrogen atom, an alkyl group having 1 to 30 carbon atoms, a phenyl group having or not having a substituent, a naphthyl group having or not having a substituent, or a benzyl group having or not having a substituent.]

Specific examples and preferable ones of the alkyl group having 1 to 30 carbon atoms, the hydroxyalkyl group having 1 to 6 carbon atoms, the sulfoalkyl group having 1 to 6 carbon atoms, the carboxyalkyl group having 2 to 7 carbon atoms, the cyanoalkyl group having 2 to 7 carbon atoms, the alkoxyalkyl group having 2 to 6 carbon atoms, the halogenoalkyl group having 1 to 6 carbon atoms, the phenyl group having or not having a substituent, or the benzyl group having or not having a substituent, in $R_1$ to $R_4$ and $R_{314}$ of the general formula (III), are the same as those described in $R_1$ to $R_4$ of the general formula (I).

Among the specific examples of $R_1$ to $R_4$ and $R_{314}$, a methyl group, an ethyl group, an n-propyl group, an isopropyl group, an n-butyl group, a 1-methylpropyl group, an isobutyl group, a sec-butyl group, a tert-butyl group, an n-pentyl group, a 1-ethylpropyl group, a 2-methylbutyl group, a 1,2-dimethylpropyl group, a cyclopentyl group, an isopentyl group, a sec-pentyl group, a tert-pentyl group, a neopentyl group, an n-hexyl group, a 2-methylpentyl group, a 1-ethylbutyl group, a 1,2-dimethylbutyl group, a 2,3-dimethylbutyl group, a cyclohexyl group, an isohexyl group, a sec-hexyl group, a tert-hexyl group, a neohexyl group, and the like, are preferable; and the methyl group, the ethyl group, the n-propyl group, the isopropyl group, and the like, are more preferable, and the methyl group and the ethyl group are particularly preferable.

$R_5$ to $R_7$ of the general formula (III) represent a hydrogen atom or a methyl group, and the hydrogen atom is preferable.

In addition, the alkyl group having 1 to 21 carbon atoms, in $R_{308}$ to $R_{313}$ of the general formula (III), may be the linear, branched or cyclic one, and is preferably the one having 1 to 12 carbon atoms, more preferably the one having 1 to 6 carbon atoms, and further preferably the one having 1 to 3 carbon atoms.

It specifically includes, for example, a methyl group, an ethyl group, an n-propyl group, an isopropyl group, an n-butyl group, a 1-methylpropyl group, an isobutyl group, a sec-butyl group, a tert-butyl group, an n-pentyl group, a 1-ethylpropyl group, a 2-methylbutyl group, a 1,2-dimethylpropyl group, a cyclopentyl group, an isopentyl group, a sec-pentyl group, a tert-pentyl group, a neopentyl group, an n-hexyl group, a 2-methylpentyl group, a 1-ethylbutyl group, a 1,2-dimethylbutyl group, a 2,3-dimethylbutyl group, a cyclohexyl group, an isohexyl group, a sec-hexyl group, a tert-hexyl group, a neohexyl group, a 2-heptyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an aralkyl group, an eicosyl group, a heneicosyl group, an isoheptyl group, an isooctyl group, an isononyl group, an isodecyl group, an isoundecyl group, an isododecyl group, an isotridecyl group, an isotetradecyl group, an isopentadecyl group, an isohexadecyl group, an isoheptadecyl group, an isooctadecyl group, an isononadecyl group, an isoaralkyl group, an isoeicosyl group, an isoheneicosyl group, a 1-methylhexyl group, a 1-ethylheptyl group, a 1-methylheptyl group, a 1-cyclohexylethyl group, a 1-heptyloctyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-t-butylcyclohexyl group, a 2-ethylhexyl group, and the like; and the methyl group, the ethyl group, the n-propyl group, the isopropyl group, the n-butyl group, the 1-methylpropyl group, the isobutyl group, the sec-butyl group, the tert-butyl group, the n-pentyl group, the 1-ethylpropyl group, the 2-methylbutyl group, the 1,2-dimethylpropyl group, the cyclopentyl group, the isopentyl group, the sec-pentyl group, the tert-pentyl group, the neopentyl group, the n-hexyl group, the 2-methylpentyl group, the 1-ethylbutyl group, the 1,2-dimethylbutyl group, the 2,3-dimethylbutyl group, the cyclohexyl group, the isohexyl group, the sec-hexyl group, the tert-hexyl group, the neohexyl group, and the like, are preferable; and the methyl group, the ethyl group, the n-propyl group, the isopropyl group, and the like, are more preferable.

The aryl group, in $R_{308}$ to $R_{313}$ of the general formula (III), includes the one having 6 to 10 carbon atoms; and for example, a phenyl group, a naphthyl group, and the like, are included, and the phenyl group is preferable.

The alkoxy group having 1 to 3 carbon atoms, in $R_{308}$ to $R_{313}$ of the general formula (III), includes a methoxy group, an ethoxy group, an n-propoxy group, an isopropoxy group, and the like.

The alkyl group having 1 to 30 carbon atoms, in $R_{315}$ of the general formula (III), includes the same one as the alkyl group having 1 to 30 carbon atoms, in the $R_1$ to $R_4$ and $R_{314}$, and the preferable one is also the same.

In addition, the phenyl group, the naphthyl group or the benzyl group, having or not having a substituent, in $R_{315}$ of the general formula (III), includes the same one as the phenyl group, the naphthyl group or the benzyl group, having or not having a substituent, in the $R_1$ to $R_4$ and $R_{314}$, and the preferable one is also the same.

The arylene group which the alkylene chain having 1 to 21 carbon atoms has in the chain, in $A_{301}$ of the general formula (III), includes a phenylene group, and a naphthylene group, and the phenylene group is preferable.

The alkylene group having 1 to 21 carbon atoms, in "an alkylene group having 1 to 21 carbon atoms which has at least one group of $-N(R_{315})-$, $-O-$, $-OCO-$, $-COO-$ or an arylene group in the chain, and also has a hydroxy group as a substituent", "an alkylene group having 1 to 21 carbon atoms which has at least one group of $-N(R_{315})-$, $-O-$, $-OCO-$, $-COO-$ or an arylene group in the chain", "an alkylene group having 1 to 21 carbon atoms which has a hydroxy group as a substituent" and "an alkylene group having 1 to 21 carbon atoms", in $A_{301}$ of the general formal (III), is the same one as the alkylene group having 1 to 21 carbon atoms, in $A_1$ of the general formula (I), and the preferable one is also the same.

"An alkylene group having 1 to 21 carbon atoms which has at least one group of $-N(R_{315})-$, $-O-$, $-OCO-$, $-COO-$ or an arylene group in the chain, and also has a hydroxy group as a substituent", in $A_{301}$ of the general formula (III), includes, for example, groups represented by the following general formulae (III-6-1) to (III-6-4).

$-N(R_{315})-R_{351}-(CH_2)_{p301}-$      (III-6-1)

(wherein $R_{315}$ is the same as described above; $R_{351}$ represents an alkylene group having 1 to 7 carbon atoms which has a hydroxy group as a substituent, or an arylene group having 6 to 10 carbon atoms which has a hydroxy group as a substituent; p301 represents an integer of 1 to 3.)

$-N(R_{315})-R_{351}-X_{301}-(CH_2)_{p302}-$      (III-6-2)

(wherein $R_{315}$ and $R_{351}$ are the same as described above; $X_{301}$ represents $-O-$, $-OCO-$ or $-COO-$; and p302 represents an integer of 1 to 3.)

$-R_{352}-(CH_2)_{p303}-$      (III-6-3)

(wherein $R_{352}$ represents an arylene group having 6 to 10 carbon atoms which has a hydroxy group as a substituent; and p303 represents an integer of 1 to 3.)

$-R_{351}-X_{301}-(CH_2)_{p304}-$      (III-6-4)

(wherein $R_{351}$ and $X_{301}$ are the same as described above; and p304 represents an integer of 1 to 3.)

The alkylene group having 1 to 7 carbon atoms which has a hydroxy group as a substituent, in $R_{51}$ of the general formulae (III-6-1), (III-6-3) and (III-6-4), includes a hydroxymethylene group, a hydroxyethylene group, a hydroxypropylene group, a hydroxybutylene group, a hydroxypentylene group, a hydroxyhexylene group, a hydroxycyclobutylene group, a hydroxycyclopentylene group, a hydroxycyclohexylene group, a hydroxycycloheptylene group, and the like.

The arylene group having 6 to 10 carbon atoms which has a hydroxy group as a substituent, in $R_{51}$ of the general formulae (III-6-1), (III-6-3) and (III-6-4), includes a hydroxyphenylene group, a dihydroxyphenylene group, a hydroxynaphthylene group, a dihydroxynaphthylene group, and the like.

In addition, the arylene group having 6 to 10 carbon atoms which has a hydroxy group as a substituent, in $R_{352}$ of the general formula (III-6-3), includes the same one as the arylene group which has the hydroxy group as a substituent in $R_{51}$.

Preferable specific examples of the group represented by the general formula (III-6-1) include, for example, $-NH-C_6H_9(OH)-CH_2-$, $-NH-C_6H_9(OH)-C_2H_5-$, $-NH-C_6H_9(OH)-C_3H_7-$, $-NH-C_4H_3(OH)-CH_2-$, $-NH-C_4H_3(OH)-C_2H_5-$, $-NH-C_4H_3(OH)-C_3H_7-$, $-NH-CH_2-CH(OH)-CH_2-NH-CH_2-CH(OH)-C_2H_5-$, $-NH-CH_2-CH(OH)-C_3H_7-$, $-N(CH_3)-C_6H_9(OH)-CH_2-$, $-N(CH_3)-C_6H_9(OH)-C_2H_5-$, $-N(CH_3)-C_6H_9(OH)-C_3H_7-$, $-N(CH_3)-C_4H_3(OH)-CH_2-$, $-N(CH_3)-C_4H_3(OH)-C_2H_5-$, $-N(CH_3)-C_4H_3(OH)-C_3H_7-$, $-N(CH_3)-CH_2-CH(OH)-CH_2-$, $-N(CH_3)-CH_2-CH(OH)-C_2H_5-$, $-N(CH_3)-CH_2-CH(OH)-C_3H_7-$, and the like.

Preferable specific examples of the group represented by the general formula (III-6-2) include, for example, $-NH-CH_2-CH(OH)-CH_2-O-(CH_2)_2-$, $-NH-CH_2-CH(OH)-CH_2-O-(CH_2)_3-$, $-NH-CH_2-CH(OH)-CH_2-O-(CH_2)_4-$, $-N(CH_3)-CH_2-CH(OH)-CH_2-O-(CH_2)_2-$, $-N(CH_3)-CH_2-CH(OH)-CH_2-O-(CH_2)_3-$, $-N(CH_3)-CH_2-CH(OH)-CH_2-O-(CH_2)_4-$, $-NH-CH_2-CH(OH)-CH_2-OCO-(CH_2)_2-$, $-NH-CH_2-CH(OH)-CH_2-OCO-(CH_2)_3-$, $-NH-CH_2-CH(OH)-CH_2-OCO-(CH_2)_4-$, $-N(CH_3)-CH_2-CH(OH)-CH_2-OCO-(CH_2)_2-$, $-N(CH_3)-CH_2-CH(OH)-CH_2-OCO-(CH_2)_3-$, $-N(CH_3)-CH_2-CH(OH)-CH_2-OCO-(CH_2)_4-$, $-NH-CH_2-CH(OH)-CH_2-OCO-(CH_2)_2-$, $-NH-CH_2-CH(OH)-CH_2-OCO-(CH_2)_3-$, $-NH-CH_2-CH(OH)-CH_2-OCO-(CH_2)_4-$, $-N(CH_3)-CH_2-CH(OH)-CH_2-OCO-(CH_2)_2-$, $-N(CH_3)-CH_2-CH(OH)-CH_2-OCO-(CH_2)_3-$, $-N(CH_3)-CH_2-CH(OH)-CH_2-OCO-(CH_2)_4-$, and the like.

Preferable specific examples of the group represented by the general formula (III-6-3) include, for example, $-C_4H_3(OH)-CH_2-$, $-C_4H_3(OH)-C_2H_5-$, $-C_4H_3(OH)-C_3H_7-$, $-C_4H_2(OH)_2-CH_2-$, $-C_4H_2(OH)_2-C_2H_5-$, $-C_4H_2(OH)_2-C_3H_7-$, and the like.

Preferable specific examples of the group represented by the general formula (III-6-4) include, for example, $-CH_2-CH(OH)-CH_2-O-(CH_2)_2-$, $-CH_2-CH(OH)-CH_2-O-(CH_2)_3-$, $-CH_2-CH(OH)-CH_2-O-(CH_2)_4-$, $-CH_2-CH(OH)-CH_2-O-(CH_2)_2-$, $-CH_2-CH(OH)-CH_2-O-(CH_2)_3-$, $-CH_2-CH(OH)-CH_2-O-(CH_2)_4-$, $-CH_2-CH(OH)-CH_2-OCO-(CH_2)_2-$, $-CH_2-CH(OH)-CH_2-OCO-(CH_2)_3-$, $-CH_2-CH(OH)-CH_2-OCO-(CH_2)_4-$, $-CH_2-CH(OH)-CH_2-OCO-(CH_2)_2-$, $-CH_2-CH(OH)-CH_2-OCO-(CH_2)_3-$, $-CH_2-CH(OH)-CH_2-OCO-(CH_2)_4-$, $-CH_2-CH(OH)-CH_2-OCO-(CH_2)_2-$, $-CH_2-CH(OH)-CH_2-OCO-(CH_2)_3-$, $-CH_2-CH(OH)-CH_2-OCO-(CH_2)_4-$, and the like.

"An alkylene group having 1 to 21 carbon atoms which has at least one group selected from $-N(R_{315})-$, $-O-$, $-OCO-$, $-COO-$ or an arylene group in the chain", in $A_{301}$ of the general formula (III), includes, for example, groups represented by the following general formulae (III-7-1) to (III-7-9), and the like.

$-N(R_{315})-R_{355}-$      (III-7-1)

(wherein $R_{315}$ is the same as described above; $R_{355}$ represents an alkylene group having 1 to 21 carbon atoms.)

$$-N(R_{315})-(CH_2)_{p305}-OCO-R_{353}-COO-$$
$$(CH_2)_{p306}- \quad (III-7-2)$$

(wherein $R_{315}$ is the same as described above; $R_{353}$ represents a phenylene group, an alkylene group having 1 to 7 carbon atoms; p305 and p306 each independently represent an integer of 1 to 3.)

$$-N(R_{315})-(C_2H_4O)_{p307}-(CH_2)_{p308}- \quad (III-7-3)$$

(wherein $R_{315}$ is the same as described above; p307 represents an integer of 1 to 9; p308 represents an integer of 1 to 3.)

$$-N(R_{315})-(CH_2CH(CH_3)O)_{p309}-R_{354}- \quad (III-74)$$

(wherein $R_{315}$ is the same as described above; p309 represents an integer of 1 to 9; $R_{354}$ represents a branched alkylene group having 1 to 4 carbon atoms.)

$$-(CH_2)_{p305}-OCO-R_{353}-COO-(CH_2)_{p306}- \quad (III-7-5)$$

(wherein $R_{353}$, p305 and p306 are the same as described above.)

$$-(C_2H_4O)_{p305}-(CH_2)_{p306}- \quad (III-7-6)$$

(wherein p307 and p309 are the same as described above.)

$$-(CH_2CH(CH_3)O)_{p309}-R_{354} \quad -(III-7-7)$$

(wherein p309 and $R_{354}$ are the same as described above.)

$$-(CH_2)_{p312}-OCO-(CH_2)_{p313}- \quad (III-7-8)$$

(wherein p312 and p313 each independently represent an integer of 1 to 4.)

$$-(CH_2)_{p312}-COO-(CH_2)_{p313}- \quad (III-7-9)$$

(wherein p312 and p313 each independently represent an integer of 1 to 4.)

The alkylene group having 1 to 21 carbon atoms, in $R_{355}$ of the general formula (III-7-1), includes the same one as "an alkylene group having 1 to 21 carbon atoms which has at least one group of $-N(R_{315})-$, $-O-$, $-OCO-$, $-COO-$ or an arylene group in the chain", in $A_{301}$ of the general formula (III), and the preferable one is also the same.

The alkylene group having 1 to 7 carbon atoms which has a hydroxy group as a substituent, in $R_{53}$ of the general formula (III-7-2) and the general formula (III-7-5), includes the same one as the alkylene group having 1 to 7 carbon atoms which has a hydroxy group as a substituent, in $R_{351}$.

In addition, the branched alkylene group having 1 to 4 carbon atoms, represented by $R_{54}$ of the general formula (III-7-4) and the general formula (III-7-7), includes a methylmethylene group, a methylethylene group, a methylpropylene group, and the like.

In the general formula (III-7-8) and the general formula (III-7-9), p312 and p313 each independently are preferably 2 to 3, and more preferably 2.

The group represented by the general formula (III-7-1) includes specifically, for example, $-NH-CH_2-$, $-NH-C_2H_4-$, $-NH-C_3H_6-$, $-NH-C_4H_8-$, $-NH-C_5H_{10}-$, $-NH-C_6H_{12}-$, $-NH-C_7H_{14}-$, $-NH-C_8H_{16}-$, $-NH-C_9H_{18}-$, $-NH-C_{10}H_{20}-$, $-NH-C_{11}H_{22}-$, $-NH-C_{12}H_{24}-$, $-NH-C_{13}H_{26}-$, $-NH-C_{14}H_{28}-$, $-NH-C_{15}H_{30}-$, $-NH-C_{16}H_{32}-$, $-NH-C_{17}H_{34}-$, $-NH-C_{18}H_{36}-$, $-NH-C_{19}H_{38}-$, $-NH-C_{20}H_{40}-$, $-NH-C_{21}H_{42}-$, $-N(CH_3)-CH_2-$, $-N(CH_3)-C_2H_4-$, $-N(CH_3)-C_3H_6-$, $-N(CH_3)-C_4H_8-$, $-N(CH_3)-C_5H_{10}-$, $-N(CH_3)-C_6H_{12}-$, $-N(CH_3)-C_7H_{14}-$, $-N(CH_3)-C_8H_{16}-$, $-N(CH_3)-C_9H_{18}-$, $-N(CH_3)-C_{10}H_{20}-$, $-N(CH_3)-C_{11}H_{22}-$, $-N(CH_3)-C_{12}H_{24}-$, $-N(CH_3)-C_{13}H_{26}-$, $-N(CH_3)-C_{14}H_{28}-$, $-N(CH_3)-C_{15}H_{30}-$, $-N(CH_3)-C_{16}H_{32}-$, $-N(CH_3)-C_{17}H_{34}-$, $-N(CH_3)-C_{18}H_{36}-$, $-N(CH_3)-C_{19}H_{38}-$, $-N(CH_3)-C_{20}H_{40}-$, $-N(CH_3)-C_{21}H_{42}-$, $-N(C_2H_5)-CH_2-$, $-N(C_2H_5)-C_2H_4-$, $-N(C_2H_5)-C_3H_6-$, $-N(C_2H_5)-C_4H_8-$, $-N(C_2H_5)-C_5H_{10}-$, $-N(C_2H_5)-C_6H_{12}-$, and the like; $-NH-CH_2-$, $-NH-C_2H_4-$, $-NH-C_3H_6-$, $-NH-C_4H_8-$, $-NH-C_5H_{10}-$, $-NH-C_6H_{12}-$, and the like, are preferable; and $-NH-CH_2-$, $-NH-C_2H_4-$, $-NH-C_3H_6-$ and $-NH-C_4H_8-$ are more preferable.

The group represented by the general formula (III-7-2) includes specifically, for example, $-NH-CH_2CH_2-O-CO-C_6H_4-CO-O-CH_2CH_2-$, $-NH-CH_2CH_2-O-CO-C_6H_{10}-CO-O-CH_2CH_2-$, $-N(CH_3)-CH_2CH_2-O-CO-C_6H_4-CO-O-CH_2CH_2-$, $-N(CH_3)-CH_2CH_2-O-CO-C_6H_{10}-CO-O-CH_2CH_2-$, and the like.

The group represented by the general formula (III-7-3) includes specifically, for example, $-NH-(CH_2CH_2O)-CH_2CH_2-$, $-NH-(CH_2CH_2O)_2-CH_2CH_2-$, $-NH-(CH_2CH_2O)_3-CH_2CH_2-$, $-NH-(CH_2CH_2O)_4-CH_2CH_2-$, $-NH-(CH_2CH_2O)_5-CH_2CH_2-$, $-NH-(CH_2CH_2O)_6-CH_2CH_2-$, $-NH-(CH_2CH_2O)_7-CH_2CH_2-$, $-NH-(CH_2CH_2O)_8-CH_2CH_2-$, $-NH-(CH_2CH_2O)_9-CH_2CH_2-$, $-N(CH_3)-(CH_2CH_2O)-CH_2CH_2-$, $-N(CH_3)-(CH_2CH_2O)_2-CH_2CH_2-$, $-N(CH_3)-(CH_2CH_2O)_3-CH_2CH_2-$, $-N(CH_3)-(CH_2CH_2O)_4-CH_2CH_2-$, $-N(CH_3)-(CH_2CH_2O)_5-CH_2CH_2-$, $-N(CH_3)-(CH_2CH_2O)_6-CH_2CH_2-$, $-N(CH_3)-(CH_2CH_2O)_7-CH_2CH_2-$, $-N(CH_3)-(CH_2CH_2O)_8-CH_2CH_2-$, $-N(CH_3)-(CH_2CH_2O)_9-CH_2CH_2-$, and the like.

The group represented by the general formula (III-7-4) includes specifically, for example, $-NH-(CH_2CH(CH_3)O)-CH_2CH(CH_3)-$, $-NH-(CH_2CH(CH_3)O)_2-CH_2CH(CH_3)-$, $-NH-(CH_2CH(CH_3)O)_3-CH_2CH(CH_3)-$, $-NH-(CH_2CH(CH_3)O)_4-CH_2CH(CH_3)-$, $-NH-(CH_2CH(CH_3)O)_5-CH_2CH(CH_3)-$, $-NH-(CH_2CH(CH_3)O)_6-CH_2CH(CH_3)-$, $-NH-(CH_2CH(CH_3)O)_7-CH_2CH(CH_3)-$, $-NH-(CH_2CH(CH_3)O)_8-CH_2CH(CH_3)-$, $-NH-(CH_2CH(CH_3)O)_9-CH_2CH(CH_3)-$, $-NH-CH(CH_3)CH_2-O-CH_2CH(CH_3)-$, $-N(CH_3)-(CH_2CH(CH_3)O)-CH_2CH(CH_3)-$, $-N(CH_3)-(CH_2CH(CH_3)O)_2-CH_2CH(CH_3)-$, $-N(CH_3)-(CH_2CH(CH_3)O)_3-CH_2CH(CH_3)-$, $-N(CH_3)-(CH_2CH(CH_3)O)_4-CH_2CH(CH_3)-$, $-N(CH_3)-(CH_2CH(CH_3)O)_5-CH_2CH(CH_3)-$, $-N(CH_3)-(CH_2CH(CH_3)O)_6-CH_2CH(CH_3)-$, $-N(CH_3)-(CH_2CH(CH_3)O)_7-CH_2CH(CH_3)-$, $-N(CH_3)-(CH_2CH(CH_3)O)_8-CH_2CH(CH_3)-$, $-N(CH_3)-(CH_2CH(CH_3)O)_9-CH_2CH(CH_3)-$, $-N(CH_3)-CH(CH_3)CH_2-O-CH_2CH(CH_3)-$, and the like.

The group represented by the general formula (III-7-5) includes specifically, for example, $-CH_2CH_2-O-CO-C_6H_4-CO-O-CH_2CH_2-$, $-CH_2CH_2-O-CO-C_6H_{10}-CO-O-CH_2CH_2-$, and the like.

The group represented by the general formula (III-7-6) includes specifically, for example, $-(CH_2CH_2O)-CH_2CH_2-$, $-(CH_2CH_2O)_2-CH_2CH_2-$, $-(CH_2CH_2O)_3-CH_2CH_2-$, $-(CH_2CH_2O)_4-CH_2CH_2-$, $-(CH_2CH_2O)_5-CH_2CH_2-$, $-(CH_2CH_2O)_6-CH_2CH_2-$, $-(CH_2CH_2O)_7-CH_2CH_2-$, $-(CH_2CH_2O)_8-CH_2CH_2-$, $-(CH_2CH_2O)_9-CH_2CH_2-$, and the like.

The group represented by the general formula (III-7-7) includes specifically, for example, $-(CH_2CH(CH_3)O)-CH_2CH(CH_3)-$, $-(CH_2CH(CH_3)O)_2-CH_2CH(CH_3)-$, —(CH$_2$CH(CH$_3$)O)$_3$—CH$_2$CH(CH$_3$)—, —(CH$_2$CH(CH$_3$)O)$_4$—CH$_2$CH(CH$_3$)—, —(CH$_2$CH(CH$_3$)O)$_5$—CH$_2$CH(CH$_3$)—, —(CH$_2$CH(CH$_3$)O)$_6$—CH$_2$CH(CH$_3$)—, —(CH$_2$CH(CH$_3$)O)$_7$—CH$_2$CH(CH$_3$)—, —(CH$_2$CH(CH$_3$)O)$_8$—CH$_2$CH(CH$_3$)—, —(CH$_2$CH(CH$_3$)O)$_9$—CH$_2$CH(CH$_3$)—, —CH(CH$_3$)CH$_2$—O—CH$_2$CH(CH$_3$)—, and the like.

The group represented by the general formula (III-7-8) includes specifically, for example, —CH$_2$—OCO—CH$_2$—, —(CH$_2$)$_2$—OCO—(CH$_2$)$_2$—, —(CH$_2$)$_3$—OCO—(CH$_2$)$_3$—, —(CH$_2$)$_4$—OCO—(CH$_2$)$_4$—, —CH$_2$—OCO—(CH$_2$)$_2$—, —CH$_2$—OCO—(CH$_2$)$_3$—, —CH$_2$—OCO—(CH$_2$)$_4$—, —(CH$_2$)$_2$—OCO—(CH$_2$)$_3$—, —(CH$_2$)$_2$—OCO—(CH$_2$)$_4$—, —(CH$_2$)$_3$—OCO—(CH$_2$)$_4$—, —(CH$_2$)$_2$—OCO—CH$_2$—, —(CH$_2$)$_3$—OCO—CH$_2$—, —(CH$_2$)$_4$—OCO—CH$_2$—, —(CH$_2$)$_3$—OCO—(CH$_2$)$_2$—, —(CH$_2$)$_4$—OCO—(CH$_2$)$_2$—, —(CH$_2$)$_4$—OCO—(CH$_2$)$_3$—, and the like, and among them, —CH$_2$—OCO—CH$_2$—, —(CH$_2$)$_2$—OCO—(CH$_2$)$_2$—, —(CH$_2$)$_3$—OCO—(CH$_2$)$_3$— and —(CH$_2$)$_4$—OCO—(CH$_2$)$_4$— are preferable, —(CH$_2$)$_2$—OCO—(CH$_2$)$_2$— and —(CH$_2$)$_3$—OCO—(CH$_2$)$_3$— are more preferable, and —(CH$_2$)$_2$—OCO—(CH$_2$)$_2$— is particularly preferable.

The group represented by the general formula (III-7-9) includes specifically, for example, —CH$_2$—COO—CH$_2$—, —(CH$_2$)$_2$—COO—(CH$_2$)$_2$—, —(CH$_2$)$_3$—COO—(CH$_2$)$_3$—, —(CH$_2$)$_4$—COO—(CH$_2$)$_4$—, —CH$_2$—OCO—(CH$_2$)$_2$—, —CH$_2$—OCO—(CH$_2$)$_3$—, —CH$_2$—OCO—(CH$_2$)$_4$—, —(CH$_2$)$_2$—COO—(CH$_2$)$_3$—, —(CH$_2$)$_2$—COO—(CH$_2$)$_4$—, —(CH$_2$)$_3$—COO—(CH$_2$)$_4$—, —(CH$_2$)$_2$—COO—CH$_2$—, —(CH$_2$)$_3$—COO—CH$_2$—, —(CH$_2$)$_4$—COO—CH$_2$—, —(CH$_2$)$_3$—COO—(CH$_2$)$_2$—, —(CH$_2$)$_4$—COO—(CH$_2$)$_2$—, —(CH$_2$)$_4$—COO—(CH$_2$)$_3$—, and the like, and among them, —CH$_2$—COO—CH$_2$—, —(CH$_2$)$_2$—COO—(CH$_2$)$_2$—, —(CH$_2$)$_3$—COO—(CH$_2$)$_3$— and —(CH$_2$)$_4$—COO—(CH$_2$)$_4$— are preferable, —(CH$_2$)$_2$—COO—(CH$_2$)$_2$— and —(CH$_2$)$_3$—COO—(CH$_2$)$_3$— are more preferable, and —(CH$_2$)$_2$—COO—(CH$_2$)$_2$— is particularly preferable.

"An alkylene group having 1 to 21 carbon atoms which has a hydroxy group as a substituent", in $A_{301}$ of the general formula (III), includes, for example, a group represented by the following general formula (III-8-1), and the like.

—R$_{356}$—(CH$_2$)$_{p310}$— (III-8-1)

(wherein R$_{356}$ represents an alkylene group having 1 to 7 carbon atoms which has a hydroxy group as a substituent; p310 represents an integer of 1 to 4.)

The alkylene group having 1 to 7 carbon atoms which has a hydroxy group as a substituent, in R$_{356}$ of the general formula (III-8-1), includes the same one as the alkylene group having 1 to 7 carbon atoms which has a hydroxy group as a substituent, in R$_{351}$.

The group represented by the general formula (III-8-1) includes specifically, for example, —C$_6$H$_9$(OH)—CH$_2$—, —C$_6$H$_9$(OH)—C$_2$H$_5$—, —C$_6$H$_9$(OH)—C$_3$H$_7$—, —CH$_2$—CH(OH)—CH$_2$—, —CH$_2$—CH(OH)—C$_2$H$_5$—, —CH$_2$—CH(OH)—C$_3$H$_7$—, —CH$_2$—CH(OH)—C$_4$H$_9$—, and the like.

As A$_{301}$ in the general formula (III), the alkylene group having 1 to 21 carbon atoms, which has at least one of —N(R$_{315}$)—, —O—, —OCO—, —COO— or an arylene group in the chain, is preferable.

Among these, the group represented by the general formula (III-7-1) and the group represented by the general formula (III-7-9) are preferable, and specifically, —NH—CH$_2$—, —NH—C$_2$H$_4$—, —NH—C$_3$H$_6$—, —NH—C$_4$H$_8$—, —NH—C$_5$H$_{10}$—, —NH—C$_6$H$_{12}$—, —NH—C$_7$H$_{14}$—, —NH—C$_8$H$_{16}$—, —NH—C$_9$H$_{18}$—, —NH—C$_{10}$H$_{20}$—, —NH—C$_{11}$H$_{22}$—, —NH—C$_{12}$H$_{24}$—, —NH—C$_{13}$H$_{26}$—, —NH—C$_{14}$H$_{28}$—, —NH—C$_{15}$H$_{30}$—, —NH—C$_{16}$H$_{32}$—, —NH—C$_{17}$H$_{34}$—, —NH—C$_{18}$H$_{36}$—, —NH—C$_{19}$H$_{38}$—, —NH—C$_{20}$H$_{40}$—, —NH—C$_{21}$H$_{42}$—, —CH$_2$—COO—CH$_2$—, —(CH$_2$)$_2$—COO—(CH$_2$)$_2$—, —(CH$_2$)$_3$—COO—(CH$_2$)$_3$—, —(CH$_2$)$_4$—COO—(CH$_2$)$_4$—, —CH$_2$—COO—(CH$_2$)$_2$—, —CH$_2$—COO—(CH$_2$)$_3$—, —CH$_2$—COO—(CH$_2$)$_4$—, —(CH$_2$)$_2$—COO—(CH$_2$)$_3$—, —(CH$_2$)$_2$—COO—(CH$_2$)$_4$—, —(CH$_2$)$_3$—COO—(CH$_2$)$_4$—, —(CH$_2$)$_2$—COO—CH$_2$—, —(CH$_2$)$_3$—COO—CH$_2$—, —(CH$_2$)$_4$—COO—CH$_2$—, —(CH$_2$)$_3$—COO—(CH$_2$)$_2$—, —(CH$_2$)$_4$—COO—(CH$_2$)$_2$—, —(CH$_2$)$_4$—COO—(CH$_2$)$_3$—, and the like, are preferable, —NH—CH$_2$—, —NH—C$_2$H$_4$—, —NH—C$_3$H$_6$—, —NH—C$_4$H$_8$—, CH$_2$—COO—CH$_2$—, —(CH$_2$)$_2$—COO—(CH$_2$)$_2$—, —(CH$_2$)$_3$—COO—(CH$_2$)$_3$—, —(CH$_2$)$_4$—COO—(CH$_2$)$_4$—, and the like, are more preferable, and —NH—C$_2$H$_4$—, —(CH$_2$)$_2$—COO—(CH$_2$)$_2$—, and the like, are particularly preferable.

As A$_2$ in the general formula (III), —O— is preferable.

As the compound represented by the general formula (III), a compound represented by the following general formula (III') is more preferable.

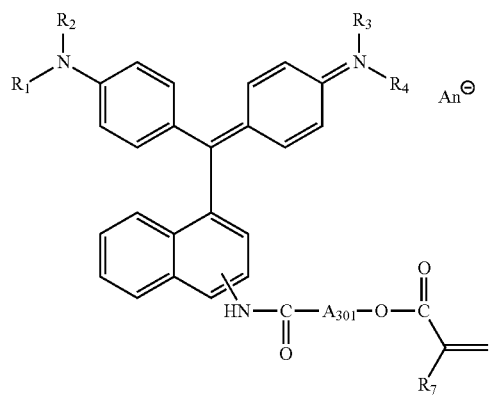

(III')

(wherein R$_1$ to R$_4$, R$_7$, A$_{301}$ and An$^-$ are the same as described above.)

Preferable combinations of the R$_1$ to R$_4$, R$_7$ and A$_{301}$ include, for example, those described in the following Table 14.

It should be noted that p11 in the A$_{301}$ column represents an integer of 1 to 12; p12 and p13 each independently represent an integer of 1 to 4; and R$_1$ to R$_4$ are each independent, and the case where they are the same is preferable.

TABLE 14

| $R_1$ | $R_2$ | $R_3$ | $R_4$ | $R_7$ | $A_{301}$ |
|---|---|---|---|---|---|
| hydrogen atom | hydrogen atom | hydrogen atom | hydrogen atom | methyl group | $-NH-(CH_2)_{p11}-$ |
| hydrogen atom | methyl group | hydrogen atom | methyl group | methyl group | $-NH-(CH_2)_{p11}-$ |
| hydrogen atom | ethyl group | hydrogen atom | ethyl group | methyl group | $-NH-(CH_2)_{p11}-$ |
| methyl group | methyl group | hydrogen atom | hydrogen atom | methyl group | $-NH-(CH_2)_{p11}-$ |
| methyl group | methyl group | methyl group | methyl group | methyl group | $-NH-(CH_2)_{p11}-$ |
| ethyl group | ethyl group | ethyl group | ethyl group | methyl group | $-NH-(CH_2)_{p11}-$ |
| n-propyl group | n-propyl group | n-propyl group | n-propyl group | methyl group | $-NH-(CH_2)_{p11}-$ |
| isopropyl group | isopropyl group | isopropyl group | isopropyl group | methyl group | $-NH-(CH_2)_{p11}-$ |
| hydrogen atom | hydrogen atom | hydrogen atom | hydrogen atom | hydrogen atom | $-NH-(CH_2)_{p11}-$ |
| hydrogen atom | methyl group | hydrogen atom | methyl group | hydrogen atom | $-NH-(CH_2)_{p11}-$ |
| hydrogen atom | ethyl group | hydrogen atom | ethyl group | hydrogen atom | $-NH-(CH_2)_{p11}-$ |
| methyl group | methyl group | hydrogen atom | hydrogen atom | hydrogen atom | $-NH-(CH_2)_{p11}-$ |
| methyl group | methyl group | methyl group | methyl group | hydrogen atom | $-NH-(CH_2)_{p11}-$ |
| ethyl group | ethyl group | ethyl group | ethyl group | hydrogen atom | $-NH-(CH_2)_{p11}-$ |
| n-propyl group | n-propyl group | n-propyl group | n-propyl group | hydrogen atom | $-NH-(CH_2)_{p11}-$ |
| isopropyl group | isopropyl group | isopropyl group | isopropyl group | hydrogen atom | $-NH-(CH_2)_{p11}-$ |
| hydrogen atom | hydrogen atom | hydrogen atom | hydrogen atom | methyl group | $-(CH_2)_{p12}-COO-(CH_2)_{p13}-$ |
| hydrogen atom | methyl group | hydrogen atom | methyl group | methyl group | $-(CH_2)_{p12}-COO-(CH_2)_{p13}-$ |
| hydrogen atom | ethyl group | hydrogen atom | ethyl group | methyl group | $-(CH_2)_{p12}-COO-(CH_2)_{p13}-$ |
| methyl group | methyl group | hydrogen atom | hydrogen atom | methyl group | $-(CH_2)_{p12}-COO-(CH_2)_{p13}-$ |
| methyl group | methyl group | methyl group | methyl group | methyl group | $-(CH_2)_{p12}-COO-(CH_2)_{p13}-$ |
| ethyl group | ethyl group | ethyl group | ethyl group | methyl group | $-(CH_2)_{p12}-COO-(CH_2)_{p13}-$ |
| n-propyl group | n-propyl group | n-propyl group | n-propyl group | methyl group | $-(CH_2)_{p12}-COO-(CH_2)_{p13}-$ |
| isopropyl group | isopropyl group | isopropyl group | isopropyl group | methyl group | $-(CH_2)_{p12}-COO-(CH_2)_{p13}-$ |
| hydrogen atom | hydrogen atom | hydrogen atom | hydrogen atom | hydrogen atom | $-(CH_2)_{p12}-COO-(CH_2)_{p13}-$ |
| hydrogen atom | methyl group | hydrogen atom | methyl group | hydrogen atom | $-(CH_2)_{p12}-COO-(CH_2)_{p13}-$ |
| hydrogen atom | ethyl group | hydrogen atom | ethyl group | hydrogen atom | $-(CH_2)_{p12}-COO-(CH_2)_{p13}-$ |
| methyl group | methyl group | hydrogen atom | hydrogen atom | hydrogen atom | $-(CH_2)_{p12}-COO-(CH_2)_{p13}-$ |
| methyl group | methyl group | methyl group | methyl group | hydrogen atom | $-(CH_2)_{p12}-COO-(CH_2)_{p13}-$ |
| ethyl group | ethyl group | ethyl group | ethyl group | hydrogen atom | $-(CH_2)_{p12}-COO-(CH_2)_{p13}-$ |
| n-propyl group | n-propyl group | n-propyl group | n-propyl group | hydrogen atom | $-(CH_2)_{p12}-COO-(CH_2)_{p13}-$ |
| isopropyl group | isopropyl group | isopropyl group | isopropyl group | hydrogen atom | $-(CH_2)_{p12}-COO-(CH_2)_{p13}-$ |

In addition, An⁻ to be used together with the combinations in the Table includes the following anions.

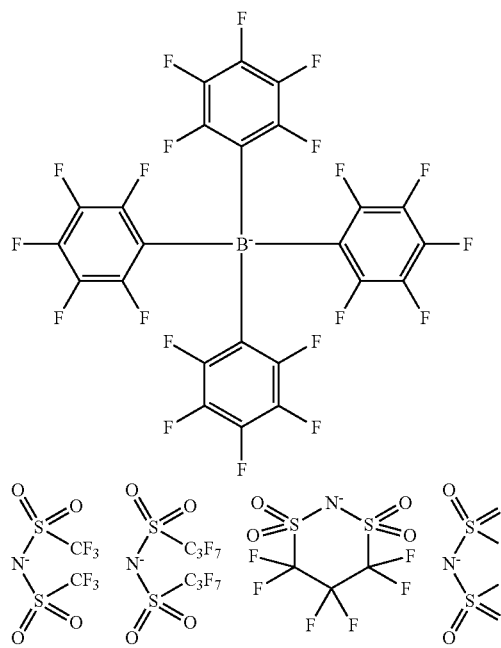

(2) Production Method for the Compound Represented by the General Formula (III)

The compound represented by the general formula (III) of the present invention is produced, after subjecting a compound represented by the following general formula (III-9) and a compound represented by the following general formula (III-10) to a reaction, or after subjecting a compound, obtained by subjecting an aminonaphthalene and a compound represented by the following general formula (III-10) to a reaction, and a compound represented by the following general formula (III-20) to a reaction, and by carrying out an oxidation reaction and a salt exchange reaction.

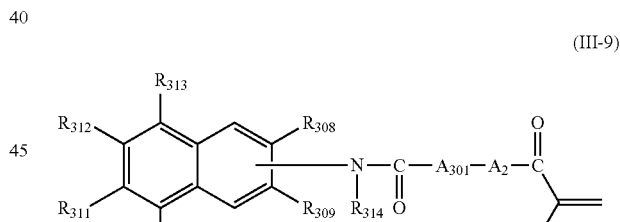

(III-9)

(wherein $R_7$, $R_{308}$ to $R_{314}$, $A_{301}$ and $A_2$ are the same as described above.)

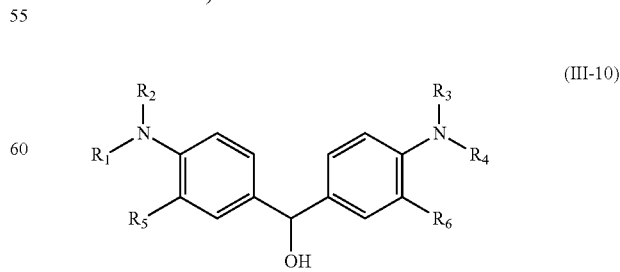

(III-10)

(wherein $R_1$ to $R_6$ are the same as described above.)

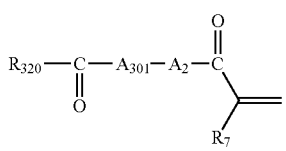

(III-20)

(wherein $R_{320}$ represents a leaving group; and $R_7$, $A_{301}$ and $A_2$ are the same as described above.)

[Reaction between the Compound Represented by the General Formula (III-9) and the Compound Represented by the General Formula (III-10)]

In the reaction between the compound represented by the general formula (III-9) and the compound represented by the general formula (III-10), the compound represented by the general formula (III-9) and the compound represented by the general formula (III-10) may be subjected to a reaction in a solvent, in the presence of an acid, usually at 50 to 80° C., preferably at 60 to 80° C., usually for 1 to 10 hours, and preferably for 1 to 5 hours.

The acid includes sulfuric acid, methane sulfonic acid, trifluoromethane sulfonic acid, para-toluene sulfonic acid, camphor sulfonic acid, and the like, and para-toluene sulfonic acid is preferable. Use amount of the acid is such amount that concentration of a reaction solvent attains 1 to 10 w/v %, preferably 1 to 5 w/v %.

The solvent includes an organic solvent, such as tetrahydrofuran (THF), dioxane, acetone, N,N-dimethylformamide (DMF), N-methyl-2-pyrrolidone (NMP), toluene, cyclohexane, dichloromethane, chloroform, and the like, and among them, THF, toluene, and the like, are preferable. They may be used alone, or in combination of two or more kinds thereof as appropriate. Use amount of the reaction solvent is usually 1 to 50 times volume, and preferably 1 to 20 times volume, relative to total volume of the compound represented by the general formula (III-9) and the compound represented by the general formula (III-10).

Use amount of the compound represented by the general formula (III-10) is 1 to 1.5 moles, relative to 1 mole of the compound represented by the general formula (III-9).

In addition, a polymerization inhibitor known per se may be used in the reaction between the compound represented by the general formula (III-9) and the compound represented by the general formula (III-10). The polymerization inhibitor includes, for example, hydroquinone, methoquinone (p-methoxyphenol), para-benzoquinone, phenothiazine, phenylene diamine, and the like. Use amount of the polymerization inhibitor may be in a range usually used in this field.

Preferable specific examples of the compound represented by the general formula (III-9) include a compound represented by the following general formula (III-9').

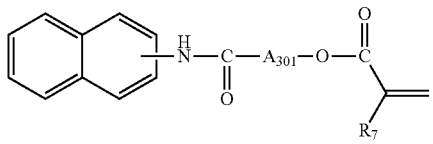

(III-9')

(wherein $R_7$ and $A_{301}$ are the same as described above.)

Preferable combinations of $R_7$ and $A_{301}$ in the general formula (III-9') include those according to combinations described in the compound represented by the general formula (III-1').

Preferable specific examples of the compound represented by general formula (III-10) include a compound represented by the following general formula (III-10').

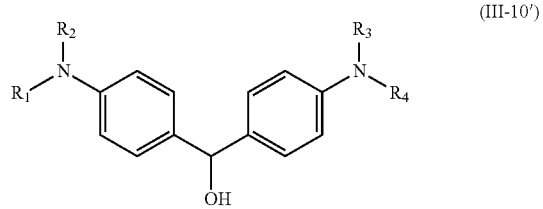

(III-10')

(wherein $R_1$ to $R_4$ are the same as described above.)

Preferable combinations, in $R_1$ to $R_4$ of the general formula (III-10'), include those according to combinations described in the compound represented by the general formula (III-1').

[Production Method for the Compound Represented by the General Formula (III-9)]

The compound represented by the general formula (III-9) can be synthesized, for example, as follows.

That is, it is synthesized by subjecting a compound represented by the following general formula (III-9-1) and a compound represented by the following general formula (III-9-2) to a dehydrogenation reaction, or by subjecting the compound represented by the following general formula (III-9-1) and a compound represented by the following general formula (III-9-3) to a dehydration reaction.

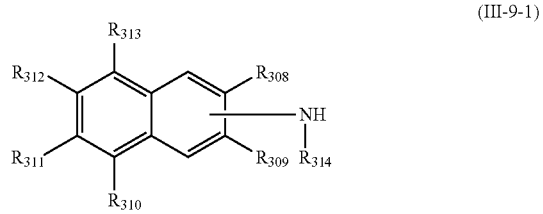

(III-9-1)

(wherein $R_{308}$ to $R_{314}$ are the same as described above.)

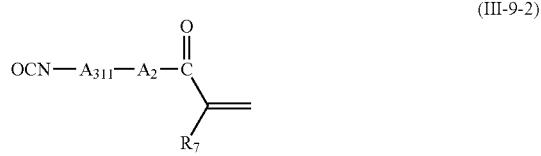

(III-9-2)

(wherein $R_7$ and $A_2$ are the same as described above. $A_{311}$ represents an alkylene group having 1 to 21 carbon atoms which has at least one group of —O—, —OCO—, —COO— or an arylene group in the chain, and also has a hydroxy group as a substituent, an alkylene group having 1 to 21 carbon atoms which has at least one group of —O—, —OCO—, —COO— or an arylene group in the chain, an alkylene group having 1 to 21 carbon atoms which has a hydroxy group as a substituent, or an alkylene group having 1 to 21 carbon atoms.)

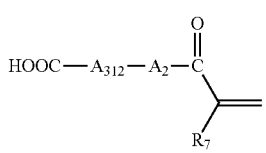

(III-9-3)

(wherein $R_7$ and $A_2$ are the same as described above. $A_{312}$ represents an alkylene group having 1 to 21 carbon atoms which has at least one group of —$N(R_{315})$—, —O—, —OCO—, —COO— or an arylene group in the chain, and also has a hydroxy group as a substituent, an alkylene group having 1 to 21 carbon atoms which has at least one group of —$N(R_{315})$—, —O—, —OCO—, —COO— or an arylene group in the chain, an alkylene group having 1 to 21 carbon atoms which has a hydroxy group as a substituent, or an alkylene group having 1 to 21 carbon atoms.)

The alkylene group having 1 to 21 carbon atoms which has at least one group of —O—, —OCO—, —COO— or an arylene group in the chain, and also has a hydroxy group as a substituent, in $A_{311}$ of the compound represented by the general formula (III-9-2), includes a group represented by the following general formula (6-1') (a group excluding the —$N(R_{315})$— group from the general formula (6-1)), as well as the groups represented by the general formulae (6-3) and (6-4), described in the item of $A_{301}$, and the like. Specific examples thereof include the ones according to the group represented by the general formula (6-1), as well as the ones described by the groups represented by the general formulae (6-3) and (6-4).

—$R_{351}$—$(CH_2)_{p301}$— (6-1')

(wherein $R_{351}$ and p301 are the same as described above.)

The alkylene group having 1 to 21 carbon atoms which has at least one group of —O—, —OCO—, —COO— or an arylene group in the chain, in $A_{311}$ of the compound represented by the general formula (III-9-2), includes the groups represented by the general formulae (III-7-5) to (III-7-6), described in the item of $A_{301}$, and the like, and specific examples thereof also include the same ones.

The alkylene group having 1 to 21 carbon atoms which has a hydroxy group as a substituent, and the alkylene group having 1 to 21 carbon atoms, in $A_{311}$ of the compound represented by the general formula (III-9-2), include those described in the item of $A_{301}$, and specific examples thereof also include the same ones.

"An alkylene group having 1 to 21 carbon atoms which has at least one group of —$N(R_{315})$—, —O—, —OCO—, —COO— or an arylene group in the chain, and also has a hydroxy group as a substituent", "an alkylene group having 1 to 21 carbon atoms which has at least one group of —$N(R_{315})$—, —O—, —OCO—, —COO— or an arylene group in the chain", "an alkylene group having 1 to 21 carbon atoms which has a hydroxy group as a substituent" and "an alkylene group having 1 to 21 carbon atoms", in $A_{312}$ of the compound represented by the general formula (III-9-3), include the same ones as described in the item of $A_{301}$, and specific examples thereof also include the same ones.

The reaction between the compound represented by the general formula (III-9-1), and the compound represented by the general formula (III-9-2) or the general formula (III-9-3) may be carried out, in a solvent, usually at 20 to 50° C., preferably at 30 to 45° C., usually for 10 to 180 minutes, and preferably for 10 to 60 minutes.

The solvent includes the same one as the solvent to be used in the method for subjecting the rhodamine compound of the general formula (I-I), and the compound of the general formula (I-II) to a reaction, and the preferable one is also the same.

They may be used alone, or in combination of two or more kinds thereof as appropriate. Use amount of the reaction solvent is usually 1 to 50 times volume, and preferably 1 to 20 times volume, relative to total volume of the compound represented by the general formula (III-9-1), and the compound represented by the general formula (III-9-2) or the general formula (III-9-3).

Use amount of the compound represented by the general formula (III-9-2) or the general formula (III-9-3) is usually 1 to 2 moles, and preferably 1 to 1.5 moles, relative to 1 mole of the compound represented by the general formula (III-9-1).

[Reaction between the Aminonaphthalene and the Compound Represented by a General Formula (III-10), and the Compound Represented by a General Formula (III-20)]

The reaction scheme is shown below.

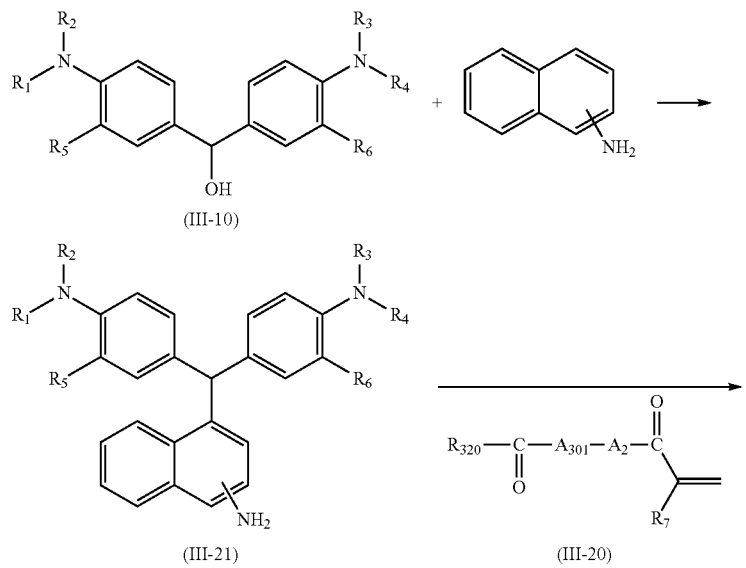

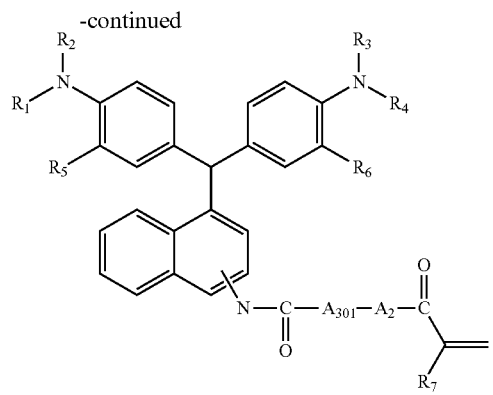

In the reaction between the aminonaphthalene and the compound represented by the general formula (III-10), the aminonaphthalene and the compound represented by the general formula (III-10) may be subjected to a reaction in an acid aqueous solution, usually at 60 to 100° C., preferably at 80 to 100° C., usually for 1 to 10 hours, and preferably for 1 to 5 hours.

The acid aqueous solution includes a hydrochloric acid aqueous solution, a sulfuric acid aqueous solution, a nitric acid aqueous solution, and the like, and among them, the hydrochloric acid aqueous solution is preferable. Concentration of the acid aqueous solution is usually 1 to 40%, and preferably 5 to 10%.

In this case, use amount of the compound represented by the general formula (III-10) is 1 to 1.5 moles, relative to 1 mole of the aminonaphthalene.

As the aminonaphthalene, 1-aminonaphthalene is preferable. Preferable specific examples of the compound represented by the general formula (III-10) include the compound represented by the general formula (III-10').

Reaction between the compound (the compound represented by the general formula (III-21)), obtained by subjecting the aminonaphthalene and the compound represented by the general formula (III-10) to a reaction, and the compound represented by the general formula (III-20) may be carried out in a solvent, usually at −20 to 50° C., preferably at 0 to 30° C., usually for 1 to 10 hours, and preferably for 1 to 2 hours.

The solvent includes an organic solvent, such as tetrahydrofuran (THF), dioxane, acetone, N,N-dimethylformamide (DMF), N-methyl-2-pyrrolidone (NMP), toluene, cyclohexane, dichloromethane, chloroform, and the like, and among them, THF, toluene, and the like, are preferable. They may be used alone, or in combination of two or more kinds thereof as appropriate. Use amount of the reaction solvent is usually 1 to 50 times volume, and preferably 1 to 20 times volume, relative to total volume of the compound represented by the general formula (III-21) and the compound represented by the general formula (III-20).

Use amount of the compound represented by the general formula (III-20) is 1 to 1.5 moles, relative to 1 mole of the compound represented by the general formula (III-21).

A polymerization inhibitor known per se may be used in the reaction between the compound represented by the general formula (III-21) and the compound represented by the general formula (III-20). The polymerization inhibitor includes, for example, hydroquinone, methoquinone (p-methoxyphenol), para-benzoquinone, phenothiazine, phenylene diamine, and the like. Use amount of the polymerization inhibitor may be in a range usually used in this field.

A leaving group represented by $R_{320}$ of the general formula (III-20) includes, for example, a carbonyloxyalkyl group, such as a carbonyloxymethyl group, a carbonyloxyethyl group, a carbonyloxy-n-propyl group, a carbonyloxyisopropyl group, a carbonyloxy-n-butyl group, a carbonyloxyisobutyl group, a carbonyloxy-tert-butyl group, and the like, and among them, the carbonyloxyisobutyl group, the carbonyloxyisopropyl group, and the like, are preferable, and the carbonyloxyisobutyl group is more preferable.

Preferable specific examples of the compound represented by the general formula (III-20) include a compound represented by the following general formula (III-20').

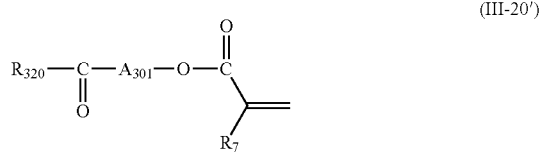

(wherein $R_{320}$, $R_7$ and $A_{301}$ are the same as described above.)

Preferable combinations of $R_7$ and $A_{301}$ in the general formula (III-20') include those according to combinations described in the compound represented by the general formula (III-1').

The compound represented by the general formula (III-20) can be synthesized by a condensation reaction with a chloroformate known per se. That is, a compound represented by the following general formula (III-20-1) and a compound represented by the following general formula (III-20-2) may be subjected to a reaction, in a solvent, in the presence of a base, usually at 10 to 30° C. It should be noted that $R_7$, $A_{301}$, $A_2$ and $R_{320}$ in the general formula (III-20-1) are the same as described above.

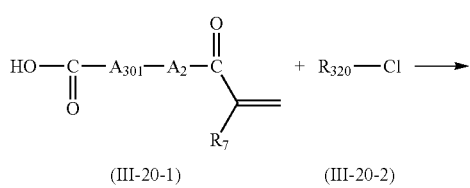

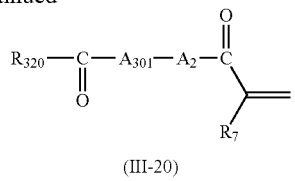

(III-20)

The base in the synthesis of the compound represented by the general formula (III-20) includes, for example, ammonia, ethylamine, diethylamine, pyridine, trimethylamine, quinuclidine, aniline, pyridine, pyrrol, and the like, and trimethylamine, and the like, is preferable. Use amount thereof is usually 1 to 1.5 moles, relative to 1 mole of the compound represented by the general formula (III-20).

The solvent in the synthesis of the compound represented by the general formula (III-20) includes the same one as the solvent described in the reaction between the aminonaphthalene and the compound represented by the general formula (III-10).

[Oxidation Reaction]

The oxidation reaction in the production method for the compound represented by the general formula (III) is carried out with the compound which is obtained by subjecting, the compound, obtained by subjecting the compound represented by the general formula (III-9) and the compound represented by the general formula (III-10) to a reaction, or the compound, obtained by subjecting the aminonaphthalene and the compound represented by the general formula (III-10) to a reaction, to a reaction with the compound represented by the general formula (III-20) (hereinafter, this may be abbreviated as the triarylmethane-type compound of the production method of the present invention), in the presence of an oxidation agent, in a solvent.

The oxidation reaction is usually carried out at 10 to 40° C., preferably 20 to 30° C., for 1 to 48 hours, and preferably 6 to 24 hours.

The oxidation agent includes, for example, an organic oxidation agent, such as chloranil, dichlorodicyanobenzoquinone and N-2,4,6-trinitrophenyl-N',N'-diphenylhydrazine; an inorganic oxidation agent, such as lead dioxide, manganese dioxide, potassium permanganate, potassium chromate, selenium dioxide. In addition, it can be carried out in a system where chloranil, a metallic complex, and hydrogen peroxide are combined. A quinone-type oxidation agent is preferable from the standpoint of handling easiness, and among them, chloranil is preferable.

Use amount of the oxidation agent is 1 to 5 moles, and preferably 1 to 2 moles, relative to 1 mole of the triarylmethane-type compound of the production method of the present invention.

In the oxidation reaction, it is preferable to be carried out via a chloride salt, in the coexistence with hydrochloric acid. Use amount of the hydrochloric acid is usually 1 to 50 moles, and preferably 1 to 10 moles, relative to 1 mole of the triarylmethane-type compound of the present invention.

The solvent to be used in the oxidation reaction includes the same one as the solvent to be used in the reaction between the compound represented by the general formula (III-9-1) and the compound represented by the general formula (III-9-2), and the preferable one is also the same. Use amount thereof is usually 1 to 50 times volume, and preferably 1 to 20 times volume, relative to total volume of the triarylmethane-type compound of the production method of the present invention.

[Salt Exchange Reaction]

The salt exchange reaction in the production method for the compound represented by the general formula (III) may be carried out by making the salt of the anion containing the aryl group having the electron-withdrawing substituent, or the halogenated alkyl group of the present invention, contacted in a solvent with the triarylmethane-type compound of the production method of the present invention, which was subjected to the oxidation reaction.

The salt exchange reaction is carried out, usually at 10 to 50° C., preferably at 20 to 30° C., usually for 1 to 10 hours, and preferably for 1 to 6 hours.

The salt of the anion, containing the aryl group having the electron-withdrawing substituent, the sulfonyl group having the electron-withdrawing substituent, or the halogenated alkyl group includes a sodium salt, a potassium salt, a lithium salt, and the like, of the anion, and the potassium salt or the lithium salt is preferable. Use amount of the salt of the anion containing the aryl group having the electron-withdrawing substituent, the sulfonyl group having the electron-withdrawing substituent, or the halogenated alkyl group of the present invention, is usually 1 mole, relative to 1 mole of the triarylmethane-type compound of the production method of the present invention, which was subjected to the oxidation reaction.

In the production method for the compound represented by the general formula (III), the oxidation reaction and the salt exchange reaction may be carried out sequentially, as a one-step reaction. In this case, after the oxidation reaction, the salt of the anion containing the aryl group having the electron-withdrawing substituent, the sulfonyl group having the electron-withdrawing substituent, or the halogenated alkyl group may be added in equal mole, and the reaction may be carried out at the temperature and for the time of the salt exchange reaction.

2-4. On the Compound Represented by the General Formula (IV)

Next, explanation will be given on specific compounds of the compound represented by the general formula (IV), as the compound having the cationic triarylmethane-type dye derivative and the ethylenically unsaturated group, and a production method, and the like.

(1) Compound Represented by the General Formula (IV)

The compound having the cationic triarylmethane-type dye derivative and the ethylenically unsaturated group of the present invention specifically includes a compound represented by the following general formula (IV) other than the compound represented by the general formula (III).

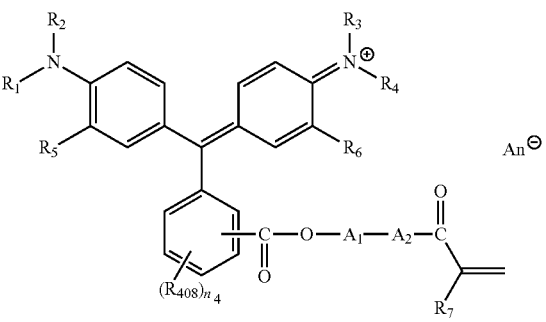

(IV)

[where, in the general formula (IV), $R_1$ to $R_7$, $A_1$, $A_2$ and $An^-$ are the same as those in the general formula (I); $n_4$ pieces of $R_{408}$ each independently represent a halogen atom, an alkyl group having 1 to 21 carbon atoms, an aryl group having 6 to 10 carbon atoms, a hydroxy group, a nitro group, a sulfo group, or an alkoxy group having 1 to 3 carbon atoms; and $n_4$ represents an integer of 0 to 4.]

Specific examples and preferable ones of the alkyl group having 1 to 30 carbon atoms, the hydroxyalkyl group having 1 to 6 carbon atoms, the sulfoalkyl group having 1 to 6 carbon atoms, the carboxyalkyl group having 2 to 7 carbon atoms, the cyanoalkyl group having 2 to 7 carbon atoms, the alkoxyalkyl group having 2 to 6 carbon atoms, the halogenoalkyl group having 1 to 6 carbon atoms, the phenyl group having or not having a substituent, or the benzyl group having or not having a substituent, in $R_1$ to $R_4$ of the general formula (IV), are the same as those described in $R_1$ to $R_4$ of the general formula (II).

$R_1$ to $R_4$ in the general formula (IV) are preferably an alkyl group having 1 to 30 carbon atoms, and more preferably an alkyl group having 1 to 6 carbon atoms. Specifically, a methyl group, an ethyl group, a propyl group, an isopropyl group, a butyl group, a pentyl group and a hexyl group are preferable, the methyl group, the ethyl group, and the propyl group are more preferable, and the methyl group and the ethyl group are particularly preferable.

$R_5$ and $R_6$ of the general formula (IV) represent a hydrogen atom or a methyl group, and the hydrogen atom is preferable.

In addition, $R_7$ of the general formula (IV) represents a hydrogen atom or a methyl group, and the methyl group is preferable.

Further, the halogen atom, in $R_{408}$ of the general formula (IV), represents a fluorine atom, a chlorine atom, a bromine atom, an iodine atom, and the like, and among them, the bromine atom is preferable.

The alkyl group having 1 to 21 carbon atoms, in $R_{408}$ of the general formula (IV), includes the same one as the alkyl group having 1 to 21 carbon atoms, in $R_{308}$ to $R_{313}$ of the general formula (III), and the preferable one is also the same.

The aryl group having 6 to 10 carbon atoms, in $R_{408}$ of the general formula (IV), includes a phenyl group, a naphthyl group, and the like, and the phenyl group is preferable.

In addition, the alkoxy group having 1 to 3 carbon atoms, in $R_{408}$ of the general formula (IV), includes a methoxy group, an ethoxy group, an n-propoxy group, an isopropoxy group, and the like.

In addition, as $R_{408}$ of the general formula (IV), a halogen atom, a hydroxy group, a nitro group, and the alkoxy group having 1 to 3 carbon atoms, are preferable.

Further, $n_4$ of the general formula (IV) is preferably 1 to 4, and more preferably 0.

The arylene group in "an alkylene group having 1 to 21 carbon atoms which has at least one group selected from —O—, —OCO—, —COO— and an arylene group in the chain" and "an alkylene group having 1 to 21 carbon atoms which has at least one group selected from —O—, —OCO—, —COO— and an arylene group in the chain, and also has a hydroxy group as a substituent", in $A_1$ of the general formula (IV), includes a phenylene group, and a naphthylene group, and the phenylene group is preferable.

The alkylene group having 1 to 21 carbon atoms, in "an alkylene group having 1 to 21 carbon atoms which has at least one group selected from —O—, —OCO—, —COO— and an arylene group in the chain", "an alkylene group having 1 to 21 carbon atoms which has at least one group selected from —O—, —OCO—, —COO— and an arylene group in the chain, and also has a hydroxy group as a substituent", "an alkylene group having 1 to 21 carbon atoms which has a hydroxy group as a substituent" and "an alkylene group having 1 to 21 carbon atoms", in $A_1$ of the general formula (IV), includes the same one as "an alkylene group having 1 to 21 carbon atoms which has at least one group selected from —O—, —OCO—, —COO—, —NHCO—, —CONH—, —NHCONH— and an arylene group in the chain", in $A_{1-2}$ of the general formula (1-3), and the preferable one is also the same.

"An alkylene group having 1 to 21 carbon atoms which has at least one group selected from —O—, —OCO—, —COO— and an arylene group in the chain", in $A_1$ of the general formula (IV), includes groups represented by the following general formulae (IV-21-1) and (IV-21-2), and the like.

—$(R_{451}$—O$)_{h401}$—$R_{452}$—    (IV-21-1)

(wherein $R_{451}$ and $R_{452}$ each independently represent a linear or branched alkylene group having 1 to 4 carbon atoms; $h_{401}$ represents an integer of 1 to 9; provided that total number of carbon atoms in the formula is 1 to 21.)

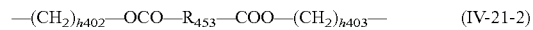

—$(CH_2)_{h402}$—OCO—$R_{453}$—COO—$(CH_2)_{h403}$—    (IV-21-2)

(wherein $R_{453}$ represents a phenylene group or an alkylene group having 1 to 7 carbon atoms; $h_{402}$ and $h_{403}$ each independently represent an integer of 1 to 3.)

The linear or branched alkylene group having 1 to 4 carbon atoms, in $R_{451}$ and $R_{452}$ of the general formula (IV-21-1), specifically includes, for example, a methylene group, an ethylene group, a methylmethylene group, a propylene group, a methylethylene group, a butylene group, a methylpropylene group, and the like, and the ethylene group and the methylethylene group are preferable.

The group represented by the general formula (VI-21-1) specifically includes, for example, —$CH_2CH_2$—O—$CH_2CH_2$—, —$(CH_2CH_2$—O$)_2$—$CH_2CH_2$—, —$(CH_2CH_2$—O$)_3$—$CH_2CH_2$—, —$(CH_2CH_2$—O$)_4$—$CH_2CH_2$—, —$(CH_2CH_2$—O$)_5$—$CH_2CH_2$—, —$(CH_2CH_2$—O$)_6$—$CH_2CH_2$—, —$(CH_2CH_2$—O$)_7$—$CH_2CH_2$—, —$(CH_2CH_2$—O$)_8$—$CH_2CH_2$—, —$(CH_2CH_2$—O$)_9$—$CH_2CH_2$—, —$CH_2CH(CH_3)$—O—$CH_2CH(CH_3)$—, —$(CH_2CH(CH_3)$—O$)_2$—$CH_2CH(CH_3)$—, —$(CH_2CH(CH_3)$—O$)_3$—$CH_2CH(CH_3)$—, —$(CH_2CH(CH_3)$—O$)_4$—$CH_2CH(CH_3)$—, —$(CH_2CH(CH_3)$—O$)_5$—$CH_2CH(CH_3)$—, —$(CH_2CH(CH_3)$—O$)_6$—$CH_2CH(CH_3)$—, —$CH(CH_3)CH_2$—O—$CH(CH_3)CH_2$—, —$(CH(CH_3)CH_2$—O$)_2$—$CH(CH_3)CH_2$—, —$(CH(CH_3)CH_2$—O$)_3$—$CH(CH_3)CH_2$—, —$(CH(CH_3)CH_2$—O$)_4$—$CH(CH_3)CH_2$—, —$(CH(CH_3)CH_2$—O$)_5$—$CH(CH_3)CH_2$—, —$(CH(CH_3)CH_2$—O$)_6$—$CH(CH_3)CH_2$—, —$CH(CH_3)CH_2$—O—$CH_2CH(CH_3)$—, and the like.

The alkylene group having 1 to 7 carbon atoms, in $R_{453}$ of the general formula (IV-21-2), specifically includes, for example, a methylene group, an ethylene group, a propylene group, a butylene group, a pentylene group, a hexylene group, a heptylene group, a cyclobutylene group, a cyclopentylene group, a cyclohexylene group, a cycloheptylene group, and the like.

The group represented by the general formula (VI-21-2) specifically includes, for example, —$CH_2$—O—CO—$CH_2$—CO—O—$CH_2$—, —$CH_2$—O—CO—$(CH_2)_2$—CO—O—$CH_2$—, —$CH_2$—O—CO—$(CH_2)_3$—CO—O—$CH_2$—, —$CH_2$—O—CO—$(CH_2)_4$—CO—O—$CH_2$—, —$CH_2$—O—CO—$(CH_2)_5$—CO—O—$CH_2$—, —$CH_2$—O—CO—$(CH_2)_6$—CO—O—$CH_2$—, —$CH_2$—O—CO—$(CH_2)_7$—CO—O—$CH_2$—, —$(CH_2)_2$—O—CO—$CH_2$—CO—O—$(CH_2)_2$—, —$(CH_2)_2$—O—CO—$(CH_2)_2$—CO—O—$(CH_2)_2$—, —$(CH_2)_2$—O—CO—$(CH_2)_3$—CO—O—

—(CH$_2$)$_2$—, —(CH$_2$)$_2$—O—CO—(CH$_2$)$_4$—CO—O—(CH$_2$)$_2$—, —(CH$_2$)$_2$—O—CO—(CH$_2$)$_5$—CO—O—(CH$_2$)$_2$—, —(CH$_2$)$_2$—O—CO—(CH$_2$)$_6$—CO—O—(CH$_2$)$_2$—, —(CH$_2$)$_2$—O—CO—(CH$_2$)$_7$—CO—O—(CH$_2$)$_2$—, —(CH$_2$)$_3$—O—CO—CH$_2$—CO—O—(CH$_2$)$_3$—, —(CH$_2$)$_3$—O—CO—(CH$_2$)$_2$—CO—O—(CH$_2$)$_3$—, —(CH$_2$)$_3$—O—CO—(CH$_2$)$_3$—CO—O—(CH$_2$)$_3$—, —(CH$_2$)$_3$—O—CO—(CH$_2$)$_4$—CO—O—(CH$_2$)$_3$—, —(CH$_2$)$_3$—O—CO—(CH$_2$)$_5$—CO—O—(CH$_2$)$_3$—, —(CH$_2$)$_3$—O—CO—(CH$_2$)$_6$—CO—O—(CH$_2$)$_3$—, —(CH$_2$)$_3$—O—CO—(CH$_2$)$_7$—CO—O—(CH$_2$)$_3$—, —CH$_2$—O—CO—C$_6$H$_4$—CO—O—CH$_2$—, —(CH$_2$)$_2$—O—CO—C$_6$H$_4$—CO—O—(CH$_2$)$_2$—, —(CH$_2$)$_3$—O—CO—C$_6$H$_4$—CO—O—(CH$_2$)$_3$—, —CH$_2$—O—CO—C$_6$H$_{10}$—CO—O—CH$_2$—, —(CH$_2$)$_2$—O—CO—C$_6$H$_{10}$—CO—O—(CH$_2$)$_2$—, —(CH$_2$)$_3$—O—CO—C$_6$H$_{10}$—CO—O—(CH$_2$)$_3$—, and the like, and among them, —CH$_2$—O—CO—CH$_2$—CO—O—CH$_2$—, —CH$_2$—O—CO—(CH$_2$)$_2$—CO—O—CH$_2$—, —CH$_2$—O—CO—(CH$_2$)$_3$—CO—O—CH$_2$—, —CH$_2$—O—CO—(CH$_2$)$_4$—CO—O—CH$_2$—, —CH$_2$—O—CO—(CH$_2$)$_5$—CO—O—CH$_2$—, —CH$_2$—O—CO—(CH$_2$)$_6$—CO—O—CH$_2$—, —CH$_2$—O—CO—(CH$_2$)$_7$—CO—O—CH$_2$—, —(CH$_2$)$_2$—O—CO—CH$_2$—CO—O—(CH$_2$)$_2$—, —(CH$_2$)$_2$—O—CO—(CH$_2$)$_2$—CO—O—(CH$_2$)$_2$—, —(CH$_2$)$_2$—O—CO—(CH$_2$)$_3$—CO—O—(CH$_2$)$_2$—, —(CH$_2$)$_2$—O—CO—(CH$_2$)$_4$—CO—O—(CH$_2$)$_2$—, —(CH$_2$)$_2$—O—CO—(CH$_2$)$_5$—CO—O—(CH$_2$)$_2$—, —(CH$_2$)$_2$—O—CO—(CH$_2$)$_6$—CO—O—(CH$_2$)$_2$—, —(CH$_2$)$_2$—O—CO—(CH$_2$)$_7$—CO—O—(CH$_2$)$_2$—, —(CH$_2$)$_3$—O—CO—CH$_2$—CO—O—(CH$_2$)$_3$—, —(CH$_2$)$_3$—O—CO—(CH$_2$)$_2$—CO—O—(CH$_2$)$_3$—, —(CH$_2$)$_3$—O—CO—(CH$_2$)$_3$—CO—O—(CH$_2$)$_3$—, —(CH$_2$)$_3$—O—CO—(CH$_2$)$_4$—CO—O—(CH$_2$)$_3$—, —(CH$_2$)$_3$—O—CO—(CH$_2$)$_5$—CO—O—(CH$_2$)$_3$—, —(CH$_2$)$_3$—O—CO—(CH$_2$)$_6$—CO—O—(CH$_2$)$_3$— and —(CH$_2$)$_3$—O—CO—(CH$_2$)$_7$—CO—O—(CH$_2$)$_3$— are preferable, —(CH$_2$)$_2$—O—CO—CH$_2$—CO—O—(CH$_2$)$_2$—, —(CH$_2$)$_2$—O—CO—(CH$_2$)$_2$—CO—O—(CH$_2$)$_2$—, —(CH$_2$)$_2$—O—CO—(CH$_2$)$_3$—CO—O—(CH$_2$)$_2$—, —(CH$_2$)$_2$—O—CO—(CH$_2$)$_4$—CO—O—(CH$_2$)$_2$—, —(CH$_2$)$_2$—O—CO—(CH$_2$)$_5$—CO—O—(CH$_2$)$_2$—, —(CH$_2$)$_2$—O—CO—(CH$_2$)$_6$—CO—O—(CH$_2$)$_2$— and —(CH$_2$)$_2$—O—CO—(CH$_2$)$_7$—CO—O—(CH$_2$)$_2$— are more preferable, and —(CH$_2$)$_2$—O—CO—(CH$_2$)$_2$—CO—O—(CH$_2$)$_2$— is particularly preferable.

"An alkylene group having 1 to 21 carbon atoms which has at least one group selected from —O—, —OCO—, —COO— and an arylene group in the chain, and also has a hydroxy group as a substituent", in A$_1$ of the general formula (IV), includes, for example, groups represented by the following general formulae (IV-22-1) and (IV-22-2), and the like.

$$-R_{454}-(CH_2)_{h404}- \quad (IV\text{-}22\text{-}1)$$

(wherein R$_{454}$ represents an arylene group having 6 to 10 carbon atoms which has a hydroxy group as a substituent; and h$_{404}$ represents an integer of 1 to 4.)

$$-R_{455}-Y_{401}-(CH_2)_{h405}- \quad (IV\text{-}22\text{-}2)$$

(wherein R$_{455}$ represents an alkylene group having 1 to 7 carbon atoms which has a hydroxy group as a substituent, or an arylene group having 6 to 10 carbon atoms which has a hydroxy group as a substituent; Y$_{401}$ represents —O—, —OCO— or —COO—; and h$_{405}$ represents an integer of 2 to 4.)

The arylene group having 6 to 10 carbon atoms which has a hydroxy group as a substituent, in R$_{454}$ of the general formula (IV-22-1), includes a hydroxyphenylene group, a dihydroxyphenylene group, a hydroxynaphthylene group, a dihydroxynaphthylene group, and the like.

Preferable specific examples of the group represented by the general formula (IV-22-1) include, for example, —C$_6$H$_3$(OH)—CH$_2$—, —C$_6$H$_3$(OH)—(CH$_2$)$_2$—, —C$_6$H$_3$(OH)—(CH$_2$)$_3$—, —C$_6$H$_3$(OH)—(CH$_2$)$_4$—, —C$_6$H$_2$(OH)$_2$—CH$_2$—, —C$_6$H$_2$(OH)$_2$—(CH$_2$)$_2$—, —C$_6$H$_2$(OH)$_2$—(CH$_2$)$_3$—, —C$_6$H$_2$(OH)$_2$—(CH$_2$)$_4$—, and the like.

The alkylene group having 1 to 7 carbon atoms which has a hydroxy group as a substituent, in R$_{455}$ of the general formula (IV-22-2), includes a hydroxymethylene group, a hydroxyethylene group, a hydroxypropylene group, a hydroxybutylene group, a hydroxypentylene group, a hydroxyhexylene group, a hydroxycyclobutylene group, a hydroxycyclopentylene group, a hydroxycyclohexylene group, a hydroxycycloheptylene group, and the like.

In addition, the arylene group having 6 to 10 carbon atoms which has a hydroxy group as a substituent, in R$_{455}$ of the general formula (IV-22-2), includes the same one as the arylene group having 6 to 10 carbon atoms which has a hydroxy group as a substituent, in R$_{454}$ of the general formula (IV-22-1).

Preferable specific examples of the group represented by the general formula (IV-22-2) include, for example, —CH$_2$—CH(OH)—CH$_2$—O—(CH$_2$)$_2$—, —CH$_2$—CH(OH)—CH$_2$—O—(CH$_2$)$_3$—, —CH$_2$—CH(OH)—CH$_2$—O—(CH$_2$)$_4$—, —CH$_2$—CH(OH)—CH$_2$—OCO—(CH$_2$)$_2$—, —CH$_2$—CH(OH)—CH$_2$—OCO—(CH$_2$)$_3$—, —CH$_2$—CH(OH)—CH$_2$—OCO—(CH$_2$)$_4$—, —CH$_2$—CH(OH)—CH$_2$—OCO—(CH$_2$)$_2$—, —CH$_2$—CH(OH)—CH$_2$—OCO—(CH$_2$)$_3$—, —CH$_2$—CH(OH)—CH$_2$—OCO—(CH$_2$)$_4$—, and the like.

"An alkylene group having 1 to 21 carbon atoms which has a hydroxy group as a substituent", in A$_1$ of the general formula (IV), includes a group represented by the following general formula (IV-23-1), and the like.

$$-R_{456}-(CH_2)_{h406}- \quad (IV\text{-}23\text{-}1)$$

(wherein R$_{456}$ represents an alkylene group having 1 to 7 carbon atoms which has a hydroxy group as a substituent; and h$_{406}$ represents an integer of 1 to 4.)

The alkylene group having 1 to 7 carbon atoms which has a hydroxy group as a substituent, in R$_{456}$ of the general formula (IV-23-1), includes the same one as the alkylene group having 1 to 7 carbon atoms which has a hydroxy group as a substituent, in R$_{455}$ of the general formula (IV-22-2).

The group represented by the general formula (IV-23-1) specifically includes, for example, —CH$_2$—CH(OH)—CH$_2$—, —CH$_2$—CH(OH)—(CH$_2$)$_2$—, —CH$_2$—CH(OH)—(CH$_2$)$_3$—, —CH$_2$—CH(OH)—(CH$_2$)$_4$—, —C$_6$H$_9$(OH)—CH$_2$—, —C$_6$H$_9$(OH)—(CH$_2$)$_2$—, —C$_6$H$_9$(OH)—(CH$_2$)$_3$—, —C$_6$H$_9$(OH)—(CH$_2$)$_4$—, and the like.

A$_1$ in the general formula (IV) is preferably an alkylene group having 1 to 21 carbon atoms. Among them, a methylene group, an ethylene group, a propylene group, a butylene group, a pentylene group, a hexylene group, and the like, are preferable, the methylene group, the ethylene group, the propylene group, and the like, are preferable, and the ethylene group is particularly preferable.

In addition, A$_2$ in the general formula (IV) is preferably —O—.

A group represented by the following general formula (IV-1-1) bonding to the phenyl group in the fundamental skeleton of the triarylmethane derivative, in the general formula (IV), may be located at any of an ortho position, a meta position or a para position of the phenyl group, and the para position is preferable.

Specifically, such one is preferable where the group represented by the general formula (IV-1-1) bonds to the phenyl group in the fundamental skeleton of the triarylmethane derivative, as a compound represented by the following general formula (IV-1-2).

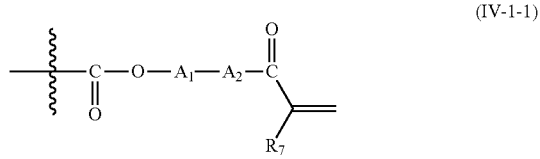

(IV-1-1)

(wherein $R_7$, $A_1$ and $A_2$ are the same as described above.)

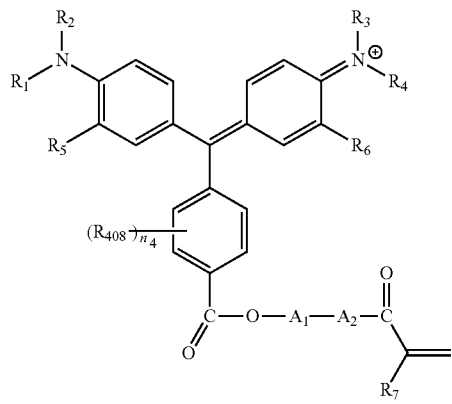

(IV-1-2)

(wherein $R_1$ to $R_7$, $R_{408}$, n4, $A_1$, $A_2$ and $An^-$ are the same as described above.)

Preferable specific examples of the compound of the present invention include a compound represented by the following general formula (IV').

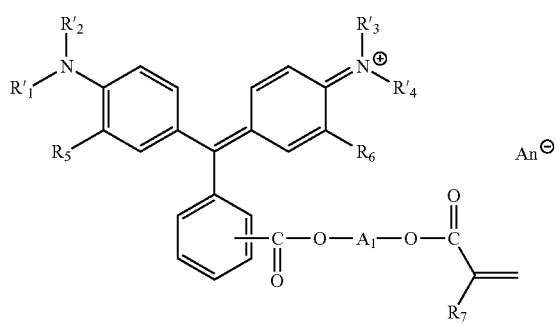

(IV')

(wherein $R'_1$ to $R'_4$ each independently represent an alkyl group having 1 to 30 carbon atoms; $R_5$ to $R_7$, $A_1$ and $An^-$ are the same as described above.)

The alkyl group having 1 to 30 carbon atoms, in $R'_1$ to $R'_4$ of the general formula (IV'), includes the same one as the alkyl group having 1 to 30 carbon atoms, in $R_1$ to $R_4$ of the general formula (IV), and the preferable one is also the same.

In addition, $R'_1$ to $R'_4$ in the general formula (IV') are preferably an alkyl group having 1 to 6 carbon atoms. Specifically, a methyl group, an ethyl group, a propyl group, an isopropyl group, a butyl group, a pentyl group, and a hexyl group are preferable, and the methyl group, the ethyl group, and the propyl group are more preferable, and the methyl group and the ethyl group are particularly preferable.

Preferable specific examples among the compound represented by the general formula (IV') include a compound represented by the following general formula (IV").

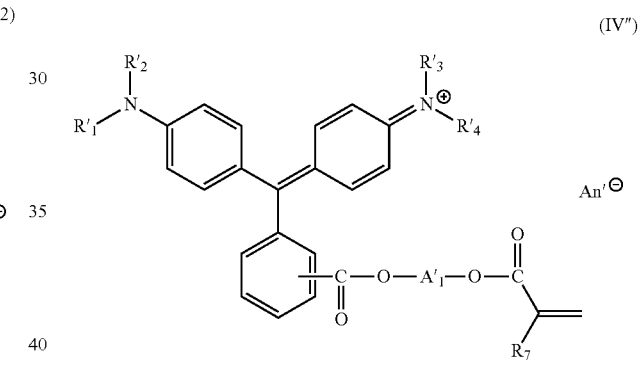

(IV")

(wherein $A'_1$ represents an alkylene group having 1 to 21 carbon atoms; $An'^-$ represents an anion containing an aryl group having a halogeno group, a sulfonyl group having a halogeno group, or a halogenated alkyl group; and $R'_1$ to $R'_4$ and $R_7$ are the same as described above.)

The alkylene group having 1 to 21 carbon atoms, in $A'_1$ of the general formula (IV"), includes the same one as the alkylene group having 1 to 21 carbon atoms, in $A_1$ of the general formula (IV), and the preferable one is also the same.

In addition, the anion containing the aryl group having a halogeno group, the sulfonyl group having a halogeno group, or the halogenated alkyl group, represented by $An'^-$ of the general formula (IV"), is the same one as $An'^-$ of the general formula (II"), and the preferable one is also the same.

Preferable combinations of $R'_1$ to $R'_4$, $R_7$ and $A'_1$ in the general formula (IV") include, for example, those described in the following Table 15.

TABLE 15

| $R_1'$ | $R_2'$ | $R_3'$ | $R_4'$ | $R_7$ | $A_1'$ |
|---|---|---|---|---|---|
| hydrogen atom | hydrogen atom | hydrogen atom | hydrogen atom | hydrogen atom or methyl group | ethylene group |
| hydrogen atom | methyl group | methyl group | hydrogen atom | hydrogen atom or methyl group | ethylene group |
| hydrogen atom | ethyl group | ethyl group | hydrogen atom | hydrogen atom or methyl group | ethylene group |
| hydrogen atom | n-propyl group | n-propyl group | hydrogen atom | hydrogen atom or methyl group | ethylene group |
| hydrogen atom | isopropyl group | isopropyl group | hydrogen atom | hydrogen atom or methyl group | ethylene group |
| methyl group | methyl group | methyl group | methyl group | hydrogen atom or methyl group | ethylene group |
| methyl group | ethyl group | ethyl group | methyl group | hydrogen atom or methyl group | ethylene group |
| methyl group | n-propyl group | n-propyl group | methyl group | hydrogen atom or methyl group | ethylene group |
| methyl group | isopropyl group | isopropyl group | methyl group | hydrogen atom or methyl group | ethylene group |
| ethyl group | ethyl group | ethyl group | ethyl group | hydrogen atom or methyl group | methylene group |
| ethyl group | ethyl group | ethyl group | ethyl group | hydrogen atom or methyl group | ethylene group |
| ethyl group | ethyl group | ethyl group | ethyl group | hydrogen atom or methyl group | propylene group |
| ethyl group | n-propyl group | n-propyl group | ethyl group | hydrogen atom or methyl group | ethylene group |
| ethyl group | isopropyl group | isopropyl group | ethyl group | hydrogen atom or methyl group | ethylene group |
| n-propyl group | n-propyl group | n-propyl group | n-propyl group | hydrogen atom or methyl group | ethylene group |

In addition, $An'^-$ to be used together with the combinations in the Table 15 includes the following ones.

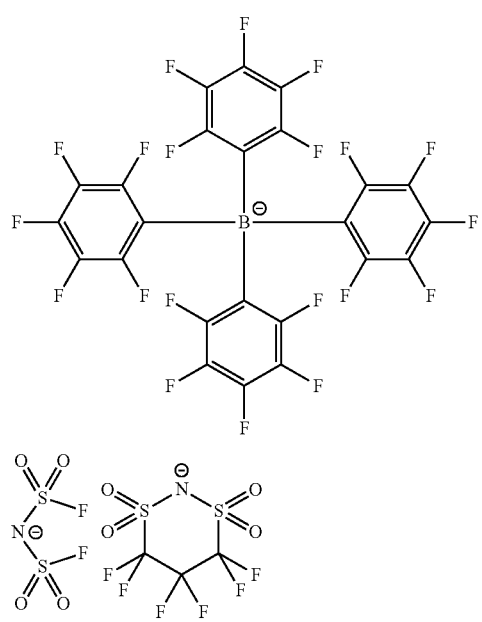

(2) Production Method for the Compound Represented by the General Formula (IV)

The compound represented by the general formula (IV) of the present invention is produced by carrying out the following reactions [IV-1] to [IV-4] sequentially.

Reaction [IV-1]: A compound represented by the following general formula (IV-31) and a compound represented by the following general formula (IV-32) are subjected to a reaction.

Reaction [IV-2]: The compound obtained in the reaction [IV-1] is further subjected to a reaction with a compound represented by the following general formula (IV-33) to obtain a compound represented by the following general formula (IV-34).

Reaction [IV-3]: The compound represented by the general formula (IV-34) and a compound represented by the following general formula (IV-35) are subjected to a reaction in the presence of a dehydration condensation agent to obtain a triarylmethane-type compound represented by the following general formula (IV-36).

Reaction [IV-4]: The triarylmethane-type compound represented by the general formula (IV-36) is subjected to an oxidation reaction and a salt exchange reaction to obtain the compound represented by the general formula (IV).

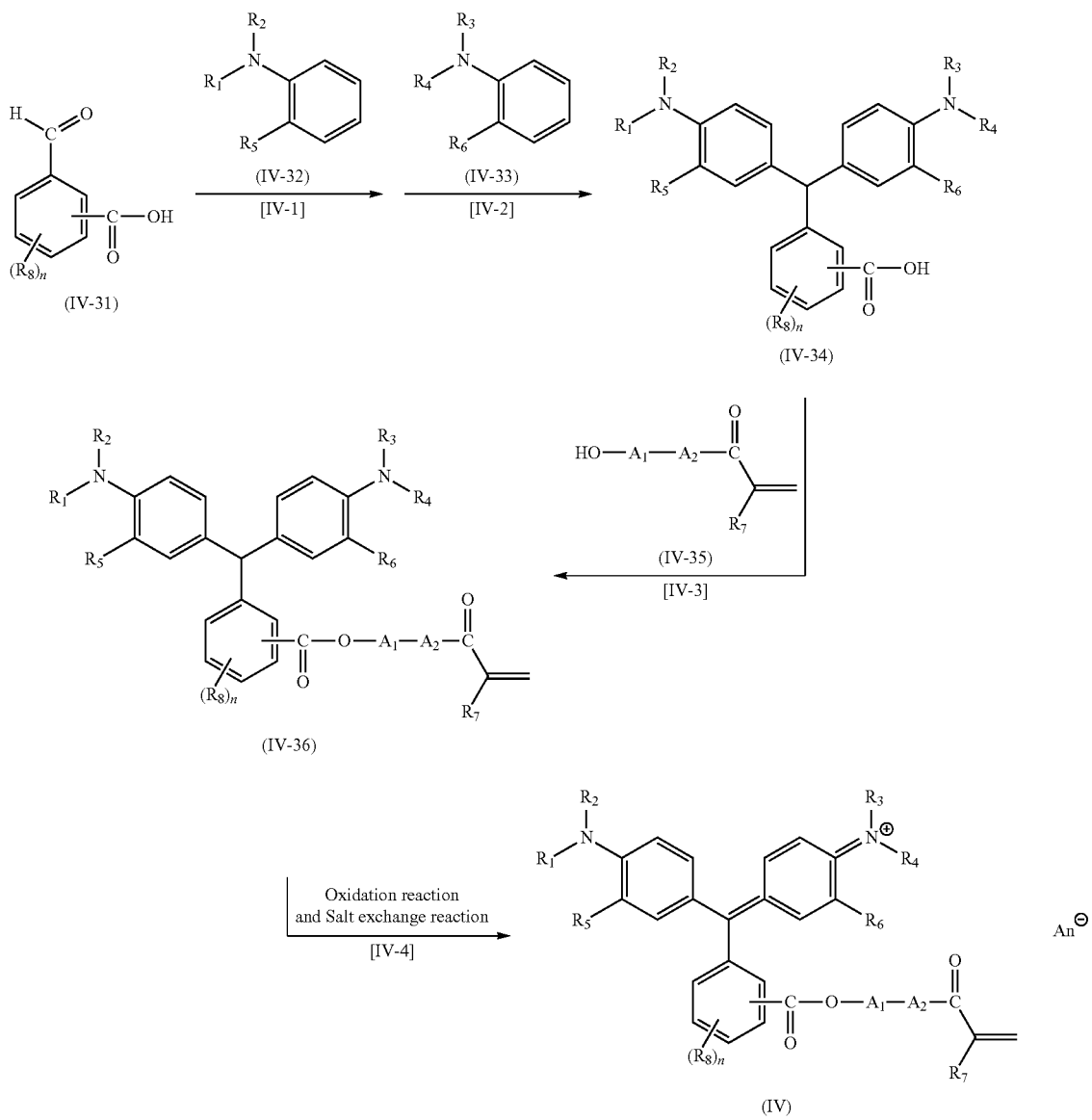

(wherein $R_1$ to $R_{408}$, n4, $A_1$, $A_2$ and $An^-$ are the same as described above.)

In the reaction [IV-1], the compound represented by the general formula (IV-31), and the compound represented by the general formula (IV-32) may be subjected to a reaction, in a solvent, in the presence of an acid catalyst, usually at 80 to 150° C., preferably at 100 to 130° C., usually for 1 to 24 hours, and preferably for 5 to 15 hours.

The acid catalyst includes sulfuric acid, methane sulfonic acid, trifluoromethane sulfonic acid, para-toluene sulfonic acid, camphor sulfonic acid, and the like, and para-toluene sulfonic acid is preferable. Use amount of the acid catalyst is usually 0.1 to 10 equivalents, and preferably 0.5 to 2 equivalents, relative to mole number of the compound represented by the general formula (IV-31).

The solvent includes an organic solvent, such as ketones, for example, diethyl ketone, methyl isobutyl ketone (MIBK), and the like; ethers, for example, diisopropyl ether, and the like, and among them, MIBK is preferable. They may be used alone, or in combination of two or more kinds thereof as appropriate. Use amount of the reaction solvent is usually 1 to 20 times, and preferably 1 to 5 times, relative to total weight of the compound represented by the general formula (IV-31) and the compound represented by the general formula (IV-32).

Use amount of the compound represented by the general formula (IV-32) is usually 1 to 3 equivalents, and preferably 1 to 2 equivalents, relative to mole number of the compound represented by the general formula (IV-31).

Specific examples of the compound represented by the general formula (IV-31) include the following ones.

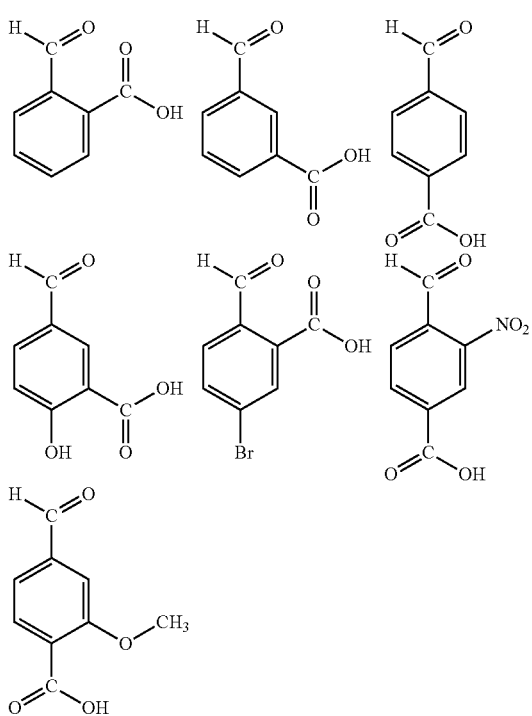

The compound represented by the general formula (IV-32) includes, for example, N-methylaniline, N-ethylaniline, N-propylaniline, N,N-dimethylaniline, N,N-diethylaniline, N,N-dipropylaniline, N,N-dimethyl-o-toluidine, N,N-diethyl-o-toluidine, N,N-dipropyl-o-toluidine, and the like, and N-methylaniline, N-ethylaniline, N-propylaniline, N,N-dimethylaniline, N,N-diethylaniline and N,N-dipropylaniline are preferable, and N,N-diethylaniline is more preferable.

In the reaction [IV-2], the compound obtained in the reaction [IV-1], and the compound represented by the general formula (IV-33) may be subjected to a reaction under reaction conditions similar to the reaction conditions (the reaction solvent, the acid catalyst, the reaction temperature, reaction time, each use amount) in the reaction [IV-1].

Specific examples of the compound represented by the general formula (IV-33) include the same ones as the specific examples of the compound represented by the general formula (IV-32), and the preferable ones are also the same.

In the reactions [IV-1] and [IV-2], in the case where the compound represented by the general formula (IV-32) and the compound represented by the general formula (IV-33) are the same compound, the compound represented by the general formula (IV-34) may be obtained in one-time reaction operation by the addition of the compound represented by the general formula (IV-32) and the compound represented by the general formula (IV-33) at the same time. In this case, each use amount of the compound represented by the general formula (IV-32) and the compound represented by the general formula (IV-33) is the same as the use amount of the compound represented by the general formula (IV-32), and preferable use amount is also the same. In addition, reaction conditions (a reaction solvent, an acid catalyst, a reaction temperature, reaction time, each use amount) may be set the same as the reaction conditions in the reaction [IV-1].

In the reaction [IV-3], the compound represented by the general formula (IV-34) and a compound represented by the following general formula (IV-35) may be subjected to a reaction in a solvent, in the presence of a dehydration condensation agent, usually at 0 to 80° C., preferably at 10 to 50° C., usually for 1 to 24 hours, and preferably for 3 to 18 hours.

The solvent includes the same one as the solvent to be used in the method for subjecting the rhodamine compound represented by the general formula (I-I) and the compound represented by the general formula (I-II) to a reaction, and the preferable one is also the same. They may be used alone, or in combination of two or more kinds thereof as appropriate. Use amount of the reaction solvent is usually 1 to 50 times, and preferably 5 to 10 times, relative to total weight of the compound represented by the general formula (IV-34) and the compound represented by the general formula (IV-35).

The dehydration condensation agent includes the same one as the dehydration condensation agent to be used in the method for subjecting the rhodamine compound represented by the general formula (I-I) and the compound represented by the general formula (I-II) to a reaction, and the preferable one is also the same. Use amount of the dehydration condensation agent is usually 1 to 20 equivalents, and preferably 1 to 10 equivalents, relative to mole number of the compound represented by the general formula (IV-34).

In the reaction [IV-3], a catalyst, such as dimethylaminopyridine, may be used to enhance efficiency of the dehydration condensation agent. Use amount of the catalyst is usually 0.1 to 10 equivalents, relative to mole number of the compound represented by the general formula (IV-34).

Use amount of the compound represented by the general formula (IV-35) is usually 1 to 2 equivalents, and preferably 1 to 1.5 equivalents, relative to mole number of the compound represented by the general formula (IV-34).

Preferable specific examples of the compound represented by the general formula (IV-35) include, for example, the following ones.

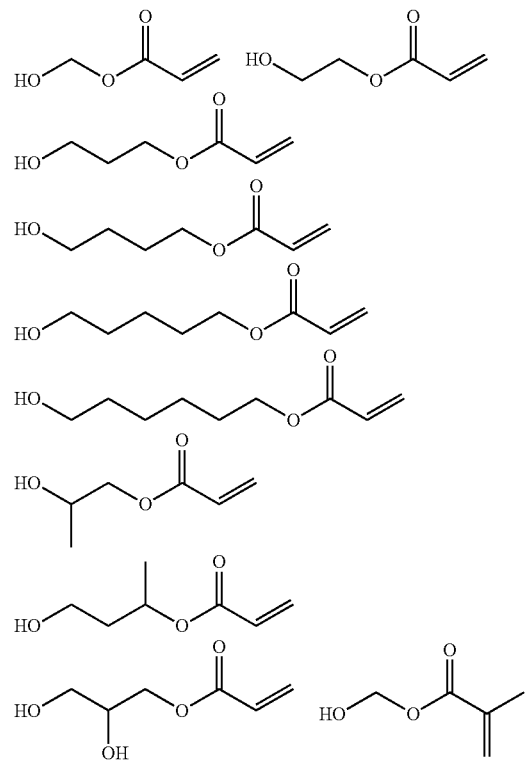

-continued

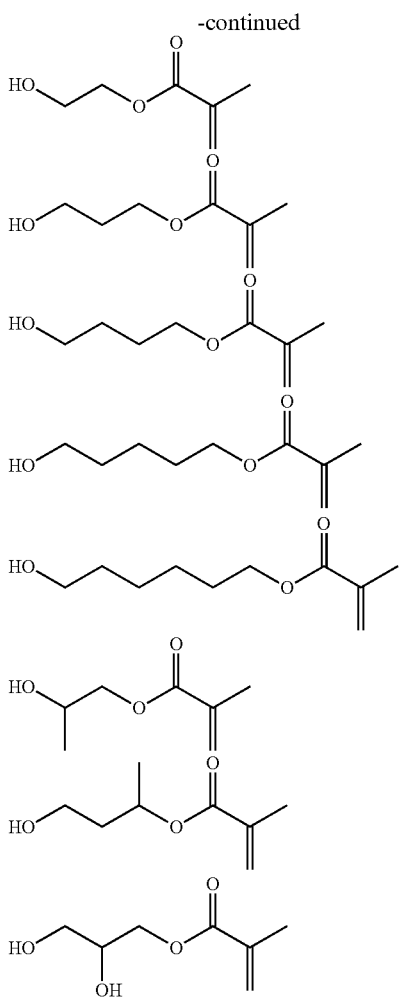

[Oxidation Reaction]

In the oxidation reaction in the reaction [IV-4], the triarylmethane-type compound represented by the general formula (IV-36) may be subjected to a reaction, in a solvent, in the presence of an oxidation agent, usually at 0 to 80° C., preferably at 10 to 50° C., usually for 1 to 36 hours, and preferably for 6 to 24 hours.

The oxidation agent includes the same one as the one described in the item of "oxidation reaction" in the production method for the compound represented by the general formula (III), and the preferable one is also the same. Use amount of the oxidation agent is usually 1 to 5 equivalents, and preferably 1 to 2 equivalents, relative to mole number of the triarylmethane-type compound represented by the general formula (IV-36).

In the oxidation reaction, it is preferable to be carried out via a chloride salt, in the coexistence with hydrochloric acid. Use amount of the hydrochloric acid is usually 1 to 50 equivalents, and preferably 1 to 10 equivalents, relative to mole number of the triarylmethane-type compound represented by the general formula (IV-36).

The solvent to be used in the oxidation reaction includes the same one as the solvent to be used in the reaction [IV-3], and the preferable one is also the same. Use amount of the reaction solvent is usually 1 to 100 times, and preferably 30 to 70 times, relative to total weight of the triarylmethane-type compound represented by the general formula (IV-36).

[Salt Exchange Reaction]

The salt exchange reaction, in the reaction [IV-4], may be carried out by making the salt of the anion of the present invention contacted, in a solvent, with the triarylmethane-type compound represented by the general formula (IV-36), which was subjected to the oxidation reaction.

The salt exchange reaction is carried out, usually at 0 to 80° C., preferably at 10 to 50° C., usually for 1 to 24 hours, and preferably for 1 to 8 hours.

The salt of the anion of the present invention in the salt exchange reaction includes a sodium salt, a potassium salt, a lithium salt, and the like, of the anion of the present invention, and the potassium salt or the lithium salt is preferable. Use amount of the salt of the anion of the present invention is usually 1 to 2 equivalents, and preferably 1 to 1.5 equivalents, relative to mole number of the triarylmethane-type compound represented by the general formula (IV-36), which was subjected to the oxidation reaction.

In the reaction [IV-4], the oxidation reaction and the salt exchange reaction may be carried out sequentially, as a one-step reaction. In this case, after the oxidation reaction, the salt of the anion of the present invention may be added to the reaction solution, in an amount of the above-described range, and the reaction may be carried out at the temperature and for the time of the salt exchange reaction.

Reaction pressure in the reactions [IV-1] to [IV-4] is not especially limited, as long as the series of the reactions is carried out without delay, and the reactions may be carried out, for example, under normal pressure.

The resulting reactants and products obtained after the reactions [IV-1] to [IV-4] may be isolated, as needed, by a general post-treatment operation and purification operation usually carried out in this field. Specifically, for example, the resulting reactants and products may be isolated by carrying out filtration, washing, extraction, concentration under reduced pressure, recrystallization, distillation, column chromatography, or the like.

2-5. On the Compound Represented by the General Formula (V)

Next, explanation will be given on specific compounds of the compound represented by the general formula (V), as the compound having the cationic cyanine-type dye derivative and the ethylenically unsaturated group, and a production method, and the like.

(1) Compound Represented by the General Formula (V)

The compound having the cationic cyanine-type dye derivative of the present invention and the ethylenically unsaturated group, as described above, includes specifically a compound represented by the following general formula (V).

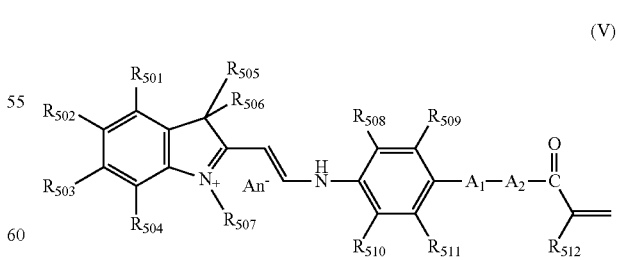

(V)

[where, in the general formula (V), $A_1$, $A_2$ and $An^-$ are the same as those in the general formula (I); $R_{501}$ to $R_{504}$ and $R_{508}$ to $R_{511}$ each independently represent a hydrogen atom, a nitro group, a halogeno group, a cyano group, an amide group, a carboxy group, an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, or an arylcarbonyl group having 7 to 10 carbon atoms. $R_{505}$ and $R_{506}$ each independently represent a hydrogen atom, an alkyl group having 1 to 6 carbon atoms, an arylalkyl group having 7 to 13 carbon atoms, or a phenylalkyl group having 7 to 9 carbon atoms, which has an alkyl group having 1 to 6 carbon atoms, a nitro group, a halogeno group or a cyano group, as a substituent of the phenyl group. $R_{507}$ represents a hydrogen atom, an alkyl group having 1 to 6 carbon atoms, an arylalkyl group having 7 to 13 carbon atoms, an alkyl group having 1 to 6 carbon atoms, which has an alkoxy group having 1 to 6 carbon atoms, a hydroxy group, a carboxy group, a halogeno group, a cyano group, an amide group, or an alkyloxycarbonyl group having 2 to 4 carbon atoms, as a substituent, or a phenylalkyl group having 7 to 9 carbon atoms, which has an alkoxy group having 1 to 6 carbon atoms, a halogeno group, or an amide group, as a substituent of the phenyl group. $R_{512}$ represents a hydrogen atom or a methyl group.]

The alkyl group having 1 to 6 carbon atoms, in $R_{501}$ to $R_{504}$ and $R_{508}$ to $R_{511}$ of the general formula (V), is the same one as the alkyl group having 1 to 6 carbon atoms, in $R_9$ of the general formula (II), and the preferable one is also the same.

The alkoxy group having 1 to 6 carbon atoms, in $R_{501}$ to $R_{504}$ and $R_{508}$ to $R_{511}$ of the general formula (V), may be the linear, branched or cyclic one, and the linear one is preferable. The number of carbon atoms thereof is preferably 1 to 3. It specifically includes, for example, a methoxy group, an ethoxy group, a propoxy group, a butoxy group, a t-butoxy group, a hexyloxy group, and the like, and the methoxy group, the ethoxy group, the propoxy group, and the like, are preferable.

The alkyloxycarbonyl group having 2 to 4 carbon atoms, in $R_{501}$ to $R_{504}$ and $R_{508}$ to $R_{511}$ of the general formula (V), may be the linear, branched or cyclic one, and the linear one is preferable. It specifically includes, for example, a methyloxycarbonyl group, an ethyloxycarbonyl group, a propyloxycarbonyl group, and the like.

In addition, the alkylcarbonyloxy group having 2 to 4 carbon atoms, in $R_{501}$ to $R_{504}$ and $R_{508}$ to $R_{511}$ of the general formula (V), may be the linear, branched or cyclic one, and the linear one is preferable. It specifically includes, for example, a methylcarbonyloxy group, an ethylcarbonyloxy group, a propylcarbonyloxy group, and the like.

Further, the arylcarbonyl group having 7 to 10 carbon atoms, in $R_{501}$ to $R_{504}$ and $R_{508}$ to $R_{511}$ of the general formula (V), includes, for example, a phenylcarbonyl group, a naphthylcarbonyl group, and the like, and the phenylcarbonyl group is preferable.

Preferable specific examples of $R_{501}$ to $R_{504}$ of the general formula (V) each independently include a hydrogen atom or an alkyl group having 1 to 6 carbon atoms, and among them, the hydrogen atom is preferable, and the case where all of them are hydrogen atoms is preferable.

In addition, preferable specific examples of $R_{508}$ to $R_{511}$ of the general formula (V) each independently include a hydrogen atom or an alkyl group having 1 to 6 carbon atoms, and among them, the hydrogen atom is preferable, and the case where all of them are hydrogen atoms is preferable.

The alkyl group having 1 to 6 carbon atoms, in $R_{505}$ and $R_{506}$ of the general formula (V), includes the same one as the alkyl group having 1 to 6 carbon atoms in $R_9$ of the general formula (II), and the preferable one is also the same.

In addition, the arylalkyl group having 7 to 13 carbon atoms in $R_{505}$ and $R_{506}$ of the general formula (V) includes, for example, a benzyl group, a phenylethyl group, a phenylpropyl group, a naphthylmethyl group, a naphthylethyl group, a naphthylpropyl group, and the like, and the benzyl group is preferable.

The alkyl group having 1 to 6 carbon atoms, as the substituent of the phenyl group, in $R_{505}$ and $R_{506}$ of the general formula (V), includes the same one as the alkyl group having 1 to 6 carbon atoms, in $R_5$ of the general formula (V), and the preferable one is also the same.

In addition, the halogeno group as the substituent of the phenyl group, in $R_{505}$ and $R_{506}$ of the general formula (V), includes a fluoro group, a chloro group, a bromo group and an iodo group.

The phenylalkyl group of the phenylalkyl group having 7 to 9 carbon atoms which has a substituent, in $R_{505}$ and $R_{506}$ of the general formula (V), includes a benzyl group, a phenylethyl group, a phenylpropyl group, and the like, and the benzyl group is preferable. It should be noted that the 7 to 9 carbon atoms do not contain the number of carbon atoms of the substituent. In the present specification, similarly hereafter, the number of carbon atoms of a group having a substituent represents number which does not contain the number of carbon atoms of the substituent.

In addition, the phenylalkyl group having 7 to 9 carbon atoms which has a substituent, in $R_{505}$ and $R_{506}$ of the general formula (V), specifically includes, for example, a methylbenzyl group, an ethylbenzyl group, a propylbenzyl group, a nitrobenzyl group, a dinitrobenzyl group, a fluorobenzyl group, a chlorobenzyl group, a bromobenzyl group, an iodobenzyl group, a cyanobenzyl group, an amidebenzyl group, and the like.

Preferable specific examples of $R_{505}$ and $R_{506}$ of the general formula (V) each independently include a hydrogen atom or an alkyl group having 1 to 6 carbon atoms, and among them, a methyl group, an ethyl group and a propyl group are preferable, and the case where both of them are the methyl groups is particularly preferable.

The alkyl group having 1 to 6 carbon atoms, in $R_{507}$ of the general formula (V), includes the same one as the alkyl group having 1 to 6 carbon atoms, in $R_5$ of the general formula (V), and the preferable one is also the same.

In addition, the arylalkyl group having 7 to 13 carbon atoms, in $R_{507}$ of the general formula (V), includes the same one as the arylalkyl group having 7 to 13 carbon atoms in $R_5$ and $R_6$ of the general formula (V), and the preferable one is also the same.

The alkoxy group having 1 to 6 carbon atoms, as the substituent of the alkyl group having 1 to 6 carbon atoms, in $R_{507}$ of the general formula (V), includes the same one as the alkoxy group having 1 to 6 carbon atoms, in $R_{501}$ to $R_{504}$ and $R_{508}$ to $R_{511}$ of the general formula (V), and the preferable one is also the same.

In addition, the halogeno group, as the substituent of the alkyl group having 1 to 6 carbon atoms, in $R_{507}$ of the general formula (V), includes a fluoro group, a chloro group, a bromo group and an iodo group.

The alkyloxycarbonyl group having 2 to 4 carbon atoms, as the substituent of the alkyl group having 1 to 6 carbon atoms, in $R_{507}$ of the general formula (V), may be the linear, branched or cyclic one, and the linear one is preferable. It specifically includes, for example, a methyloxycarbonyl group, an ethyloxycarbonyl group, a propyloxycarbonyl group, and the like.

In addition, the alkyl group of the alkyl group having 1 to 6 carbon atoms which has a substituent, in $R_{507}$ of the general formula (V), includes the same one as the alkyl group having 1 to 6 carbon atoms, in $R_{505}$ of the general formula (V), and the preferable one is also the same.

The alkyl group having 1 to 6 carbon atoms which has a substituent, in $R_{507}$ of the general formula (V), specifically includes, for example, a methoxymethyl group, an ethoxymethyl group, a propoxymethyl group, a methoxyethyl group, an ethoxyethyl group, a propoxyethyl group, a hydroxymethyl group, a hydroxyethyl group, a hydroxypropyl group, a carboxymethyl group, a carboxyethyl group, a carboxypropyl group, a fluoromethyl group, a fluoroethyl group, a fluoropropyl group, a chloromethyl group, a chloroethyl group, a chloropropyl group, a bromomethyl group, a bromoethyl group, a bromopropyl group, an iodomethyl group, an iodoethyl group, an iodopropyl group, a cyanomethyl group, a cyanoethyl group, a cyanopropyl group, an amidemethyl group, an amideethyl group, an amidepropyl group, a methyloxycarbonylmethyl group, a methyloxycarbonylethyl group, an ethyloxycarbonylmethyl group and an ethyloxycarbonylethyl group.

The alkoxy group having 1 to 6 carbon atoms, as the substituent of the phenylalkyl group having 7 to 9 carbon atoms, in $R_{507}$ of the general formula (V), includes the same one as the alkoxy group having 1 to 6 carbon atoms, in $R_{501}$ to $R_{504}$ and $R_{508}$ to $R_{511}$ of the general formula (V), and the preferable one is also the same.

In addition, the halogeno group as the substituent of the phenylalkyl group having 7 to 9 carbon atoms, in $R_{507}$ of the general formula (V), includes a fluoro group, a chloro group, a bromo group and an iodo group.

Further, the phenylalkyl group of the phenylalkyl group having 7 to 9 carbon atoms, in $R_{507}$ of the general formula (V), includes a benzyl group, a phenylethyl group, a phenylpropyl group, and the like, and the benzyl group is preferable.

The phenylalkyl group having 7 to 9 carbon atoms which has a substituent, in $R_{507}$ of the general formula (V), includes a methoxybenzyl group, an ethoxybenzyl group, a propyloxybenzyl group, a fluorobenzyl group, a chlorobenzyl group, a bromobenzyl group, an iodobenzyl group, an amidebenzyl group, and the like.

In addition, $R_{507}$ of the general formula (V) is preferably an alkyl group having 1 to 6 carbon atoms, and among them, a methyl group, an ethyl group and an n-propyl group are preferable.

The arylene group which the alkylene group having 1 to 21 carbon atoms has in the chain, in $A_1$ of the general formula (V), includes a phenylene group and a naphthylene group, and the phenylene group is preferable.

In addition, the alkylene group having 1 to 21 carbon atoms in "an alkylene group having 1 to 21 carbon atoms which has at least one group selected from —O—, —OCO—, —COO— and an arylene group in the chain", "an alkylene group having 1 to 21 carbon atoms which has at least one group selected from —O—, —OCO—, —COO— and an arylene group in the chain, and also has a hydroxy group as a substituent", "an alkylene group having 1 to 21 carbon atoms which has a hydroxy group as a substituent" and "an alkylene group having 1 to 21 carbon atoms", in $A_1$ of the general formula (V), includes the same one as the alkylene group having 1 to 21 carbon atoms, in $A_1$ of the general formula (II), and the preferable one is also the same.

"An alkylene group having 1 to 21 carbon atoms, which has at least one group selected from —O—, —OCO—, —COO— and an arylene group in the chain", in $A_1$ of the general formula (V), includes, for example, groups represented by the following general formulae (V-6-1) to (V-6-4), and the like.

$$—R_{551}—X_{501}—R_{551}— \quad (V\text{-}6\text{-}1)$$

(wherein two $R_{551}$ each independently represent an alkylene group having 1 to 10 carbon atoms; $X_{501}$ represents —O—, —OCO—, COO— or an arylene group.)

$$—R_{551}—X_{501}—R_{551}—X_{501}—R_{551}— \quad (V\text{-}6\text{-}2)$$

(wherein three $R_{551}$ each independently represent the same one as described above; $X_1$ is the same as described above.)

$$—R_{551}—(C_2H_4O)_{p507}—R_{551}— \quad (V\text{-}6\text{-}3)$$

(wherein two $R_{551}$ each independently represent the same one as described above; p507 represents an integer of 1 to 9.)

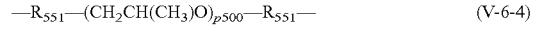

$$—R_{551}—(CH_2CH(CH_3)O)_{p500}—R_{551}— \quad (V\text{-}6\text{-}4)$$

(wherein two $R_{551}$ each independently represent the same one as described above; p509 represents an integer of 1 to 9.)

The alkylene group having 1 to 10 carbon atoms, in $R_{551}$ of the general formula (V-6-1), is preferably the one having 1 to 6 carbon atoms, and more preferably the one having 1 to 3 carbon atoms. It specifically includes, for example, a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, a methylpentylene group, an n-heptylene group, an n-octylene group, an n-nonylene group, an n-decylene group, a cyclopentylene group, a cyclohexylene group, a cycloheptylene group, and the like; and the methylene group, the ethylene group and the propylene group are more preferable, and the ethylene group is particularly preferable.

The group represented by the general formula (V-6-1) includes specifically, for example, the following general formulae (wherein $X_{511}$ represents —O—, —OCO—, COO— or an arylene group.).

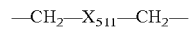
—CH$_2$—X$_{511}$—CH$_2$—

—CH$_2$—X$_{511}$—C$_2$H$_4$—

—CH$_2$—X$_{511}$—C$_3$H$_6$—

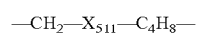
—CH$_2$—X$_{511}$—C$_4$H$_8$—

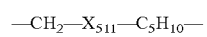
—CH$_2$—X$_{511}$—C$_5$H$_{10}$—

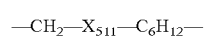
—CH$_2$—X$_{511}$—C$_6$H$_{12}$—

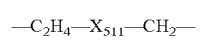
—C$_2$H$_4$—X$_{511}$—CH$_2$—

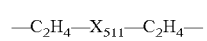
—C$_2$H$_4$—X$_{511}$—C$_2$H$_4$—

—C$_2$H$_4$—X$_{511}$—C$_3$H$_6$—

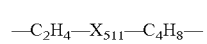
—C$_2$H$_4$—X$_{511}$—C$_4$H$_8$—

—C$_2$H$_4$—X$_{511}$—C$_5$H$_{10}$—

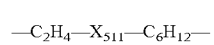
—C$_2$H$_4$—X$_{511}$—C$_6$H$_{12}$—

—C$_3$H$_6$—X$_{511}$—CH$_2$—

—C$_3$H$_6$—X$_{511}$—C$_2$H$_4$—

—C$_3$H$_6$—X$_{511}$—C$_4$H$_8$—

—C$_3$H$_6$—X$_{511}$—C$_5$H$_{10}$—

—$C_3H_6$—$X_{511}$—$C_6H_{12}$—

—$C_2H_4$—$X_{511}$—$C_6H_{10}$—

—$C_3H_6$—$X_{511}$—$C_6H_{10}$—

More specific preferable examples of the group represented by the general formula (V-6-1) include those of the following formulae.

—$CH_2$—OCO—$CH_2$—

—$CH_2$—OCO—$C_2H_4$—

—$CH_2$—OCO—$C_3H_6$—

—$CH_2$—OCO—$C_4H_8$—

—$CH_2$—OCO—$C_5H_{10}$—

—$CH^2$—OCO—$C_6H_{12}$—

—$C_2H_4$—OCO—$CH_2$—

—$C_2H_4$—OCO—$C_2H_4$—

—$C_2H_4$—OCO—$C_3H_6$—

—$C_2H_4$—OCO—$C_4H_8$—

—$C_2H_4$—OCO—$C_5H_{10}$—

—$C_2H_4$—OCO—$C_6H_{12}$—

—$C_3H_6$—OCO—$CH_2$—

—$C_3H_6$—OCO—$C_2H_4$—

—$C_3H_6$—OCO—$C_4H_8$—

—$C_3H_6$—OCO—$C_5H_{10}$—

—$C_3H_6$—OCO—$C_6H_{12}$—

—$C_2H_4$—OCO—$C_6H_{10}$—

—$C_3H_6$—OCO—$C_6H_{10}$—

Preferable specific examples of the group represented by the general formula (V-6-2) include, for example, the following general formulae (wherein $X_{511}$ each independently represent —O—, —OCO—, COO— or a phenylene group.).

—$CH_2$—$X_{511}$—$C_2H_4$—$X_{511}$—$CH_2$—

—$CH_2$—$X_{511}$—$C_2H_4$—$X_{511}$—$C_2H_4$—

—$C_2H_4$—$X_{511}$—$C_2H_4$—$X_{511}$—$CH_2$—

—$C_2H_4$—$X_{511}$—$C_2H_4$—$X_{511}$—$C_2H_4$—

—$C_2H_4$—$X_{511}$—$C_2H_4$—$X_{511}$—$C_3H_6$—

—$C_2H_4$—$X_{511}$—$C_2H_4$—$X_{511}$—$C_4H_8$—

—$C_2H_4$—$X_{511}$—$C_2H_4$—$X_{511}$—$C_5H_{10}$—

—$C_2H_4$—$X_{511}$—$C_2H_4$—$X_{511}$—$C_6H_{12}$—

—$C_3H_6$—$X_{511}$—$C_2H_4$—$X_{511}$—$CH_2$—

—$C_3H_6$—$X_{511}$—$C_2H_4$—$X_{511}$—$C_2H_4$—

—$C_3H_6$—$X_{511}$—$C_2H_4$—$X_{511}$—$C_3H_6$—

—$C_3H_6$—$X_{511}$—$C_2H_4$—$X_{511}$—$C_4H_8$—

—$C_3H_6$—$X_{511}$—$C_2H_4$—$X_{511}$—$C_5H_{10}$—

—$C_3H_6$—$X_{511}$—$C_2H_4$—$X_{511}$—$C_6H_{12}$—

—$C_4H_8$—$X_{511}$—$C_2H_4$—$X_{511}$—$CH_2$—

—$C_4H_8$—$X_{511}$—$C_2H_4$—$X_{511}$—$C_2H_4$—

—$C_4H_8$—$X_{511}$—$C_2H_4$—$X_{511}$—$C_3H_6$—

—$C_4H_8$—$X_{511}$—$C_2H_4$—$X_{511}$—$C_4H_8$—

—$C_4H_8$—$X_{511}$—$C_2H_4$—$X_{511}$—$C_5H_{10}$—

—$C_4H_8$—$X_{511}$—$C_2H_4$—$X_{511}$—$C_6H_{12}$—

—$C_5H_{10}$—$X_{511}$—$C_2H_4$—$X_{511}$—$CH_2$—

—$C_5H_{10}$—$X_{511}$—$C_2H_4$—$X_{511}$—$C_2H_4$—

—$C_5H_{10}$—$X_{511}$—$C_2H_4$—$X_{511}$—$C_3H_6$—

—$C_5H_{10}$—$X_{511}$—$C_2H_4$—$X_{511}$—$C_4H_8$—

—$C_5H_{10}$—$X_{511}$—$C_2H_4$—$X_{511}$—$C_5H_{10}$—

—$C_5H_{10}$—$X_{511}$—$C_2H_4$—$X_{511}$—$C_6H_{12}$—

—$C_6H_{12}$—$X_{511}$—$C_2H_4$—$X_{511}$—$CH_2$—

—$C_6H_{12}$—$X_{511}$—$C_2H_4$—$X_{511}$—$C_2H_4$—

—$C_6H_{12}$—$X_{511}$—$C_2H_4$—$X_{511}$—$C_3H_6$—

—$C_6H_{12}$—$X_{511}$—$C_2H_4$—$X_{511}$—$C_4H_8$—

—$C_6H_{12}$—$X_{511}$—$C_2H_4$—$X_{511}$—$C_5H_{10}$—

—$C_6H_{12}$—$X_{511}$—$C_2H_4$—$X_{511}$—$C_6H_{12}$—

—$CH_2$—$X_{511}$—$C_3H_6$—$X_{511}$—$CH_2$—

—$C_2H_4$—$X_{511}$—$C_3H_6$—$X_{511}$—$C_2H_4$—

—$C_2H_4$—$X_{511}$—$C_3H_6$—$X_{511}$—$C_3H_6$—

—$C_2H_4$—$X_{511}$—$C_3H_6$—$X_{511}$—$C_4H_8$—

—$C_2H_4$—$X_{511}$—$C_3H_6$—$X_{511}$—$C_5H_{10}$—

—$C_2H_4$—$X_{511}$—$C_3H_6$—$X_{511}$—$C_6H_{12}$—

—$C_3H_6$—$X_{511}$—$C_3H_6$—$X_{511}$—$C_2H_4$—

—$C_3H_6$—$X_{511}$—$C_3H_6$—$X_{511}$—$C_3H_6$—

—$C_3H_6$—$X_{511}$—$C_3H_6$—$X_{511}$—$C_4H_8$—

—$C_3H_6$—$X_{511}$—$C_3H_6$—$X_{511}$—$C_5H_{10}$—

—$C_3H_6$—$X_{511}$—$C_3H_6$—$X_{511}$—$C_6H_{12}$—

—$C_4H_8$—$X_{511}$—$C_3H_6$—$X_{511}$—$C_4H_8$—

—$C_5H_{10}$—$X_{511}$—$C_3H_6$—$X_{511}$—$C_5H_{10}$—

—$C_6H_{12}$—$X_{511}$—$C_3H_6$—$X_{511}$—$C_6H_{12}$—

—$C_2H_4$—$X_{511}$—$CH_2$—$X_{511}$—$C_2H_4$—

—$C_2H_4$—$X_{511}$—$C_4H_8$—$X_{511}$—$C_2H_4$—

—$C_2H_4$—$X_{511}$—$C_5H_{10}$—$X_{511}$—$C_2H_4$—

—$C_2H_4$—$X_{511}$—$C_6H_{12}$—$X_{511}$—$C_2H_4$—

—$C_2H_4$—$X_{511}$—$C_6H_{10}$—$X_{511}$—$C_2H_4$—

More specific preferable examples of the group represented by the general formula (V-6-2) include the following formulae.

—$CH_2$—OCO—$C_2H_4$—COO—$C_2H_4$—

—$CH_2$—OCO—$C_3H_6$—COO—$C_3H_6$—

—$C_4H_8$—OCO—$C_2H_4$—COO—$CH_2$—

—$C_4H_8$—OCO—$C_2H_4$—COO—$C_2H_4$—

—$C_4H_8$—OCO—$C_2H_4$—COO—$C_3H_6$—

—$C_4H_8$—OCO—$C_2H_4$—COO—$C_4H_8$—

—$C_4H_8$—OCO—$C_2H_4$—COO—$C_5H_{10}$—

—$C_4H_8$—OCO—$C_2H_4$—COO—$C_6H_{12}$—

—$C_5H_{10}$—OCO—$C_2H_4$—COO—$CH_2$—

—$C_5H_{10}$—OCO—$C_2H_4$—COO—$C_2H_4$—

—$C_5H_{10}$—OCO—$C_2H_4$—COO—$C_3H_6$—

—$C_5H_{10}$—OCO—$C_2H_4$—COO—$C_4H_8$—

—$C_5H_{10}$—OCO—$C_2H_4$—COO—$C_5H_{10}$—

—$C_5H_{10}$—OCO—$C_2H_4$—COO—$C_6H_{12}$—

—$C_6H_{12}$—OCO—$C_2H_4$—COO—$CH_2$—

—$C_6H_{12}$—OCO—$C_2H_4$—COO—$C_2H_4$—

—$C_6H_{12}$—OCO—$C_2H_4$—COO—$C_3H_6$—

—$C_6H_{12}$—OCO—$C_2H_4$—COO—$C_4H_8$—

—$C_6H_{12}$—OCO—$C_2H_4$—COO—$C_5H_{10}$—

—$C_6H_{12}$—OCO—$C_2H_4$—COO—$C_6H_{12}$—

—$CH^2$—OCO—$C_3H_6$—COO—$CH_2$—

—$C_2H_4$—OCO—$C_3H_6$—COO—$C_2H_4$—

—$C_2H_4$—OCO—$C_3H_6$—COO—$C_3H_6$—

—$C_2H_4$—OCO—$C_3H_6$—COO—$C_4H_8$—

—$C_2H_4$—OCO—$C_3H_6$—COO—$C_5H_{10}$—

—$C_2H_4$—OCO—$C_3H_6$—COO—$C_6H_{12}$—

—$C_3H_6$—OCO—$C_3H_6$—COO—$C_2H_4$—

—$C_3H_6$—OCO—$C_3H_6$—COO—$C_3H_6$—

—$C_3H_6$—OCO—$C_3H_6$—COO—$C_4H_8$—

—$C_3H_6$—OCO—$C_3H_6$—COO—$C_5H_{10}$—

—$C_3H_6$—OCO—$C_3H_6$—COO—$C_6H_{12}$—

—$C_4H_8$—OCO—$C_3H_6$—COO—$C_4H_8$—

—$C_5H_{10}$—OCO—$C_3H_6$—COO—$C_5H_{10}$—

—$C_6H_{12}$—OCO—$C_3H_6$—COO—$C_6H_{12}$—

—$C_2H_4$—OCO—$CH_2$—COO—$C_2H_4$—

—$C_2H_4$—OCO—$C_4H_8$—COO—$C_2H_4$—

—$C_2H_4$—OCO—$C_5H_{10}$—COO—$C_2H_4$—

—$C_2H_4$—OCO—$C_6H_{12}$—COO—$C_2H_4$—

—$C_2H_4$—OCO—$C_6H_{10}$—COO—$C_2H_4$—

Preferable specific examples of the group represented by the general formula (V-6-3) include, for example, the following general formulae (wherein p507 is the same as described above.).

—$CH_2$—$(C_2H_4O)_{p507}$—$CH_2$—

—$CH_2$—$(C_2H_4O)_{p507}$—$C_2H_4$—

—$CH_2$—$(C_2H_4O)_{p507}$—$C_3H_6$—

—$C_2H_4$—$(C_2H_4O)_{p507}$—$CH_2$—

—$C_2H_4$—$(C_2H_4O)_{p507}$—$C_2H_4$—

—$C_2H_4$—$(C_2H_4O)_{p507}$—$C_3H_6$—

—$C_2H_4$—$(C_2H_4O)_{p507}$—$C_4H_8$—

—$C_2H_4$—$(C_2H_4O)_{p507}$—$C_5H_{10}$—

—$C_2H_4$—$(C_2H_4O)_{p507}$—$C_6H_{12}$—

—$C_2H_4$—$(C_2H_4O)_{p507}$—$CH_2$—

—$C_2H_4$—$(C_2H_4O)_{p507}$—$C_2H_4$—

—$C_2H_4$—$(C_2H_4O)_{p507}$—$C_3H_6$—

—$C_3H_6$—$(C_2H_4O)_{p507}$—$CH_2$—

—$C_3H_6$—$(C_2H_4O)_{p507}$—$C_2H_4$—

—$C_3H_6$—$(C_2H_4O)_{p507}$—$C_3H_6$—

Preferable specific examples of the group represented by the general formula (6-4) include, for example, the following general formulae (wherein p509 is the same as described above.).

—$CH_2$—$(CH_2CH(CH_3)O)_{009}$—$CH_2$—

—$CH_2$—$(CH_2CH(CH_3)O)_{009}$—$C_2H_4$—

—$CH_2$—$(CH_2CH(CH_3)O)_{009}$—$C_3H_6$—

—$C_2H_4$—$(CH_2CH(CH_3)O)_{p509}$—$CH_2$—

—$C_2H_4$—$(CH_2CH(CH_3)O)_{p509}$—$C_2H_4$—

—$C_2H_4$—$(CH_2CH(CH_3)O)_{p509}$—$C_3H_6$—

—$C_2H_4$—$(CH_2CH(CH_3)O)_{p509}$—$C_4H_8$—

—$C_2H_4$—$(CH_2CH(CH_3)O)_{p509}$—$C_5H_{10}$—

—$C_2H_4$—$(CH_2CH(CH_3)O)_{p500}$—$C_6H_{12}$—

—$C_2H_4$—$(CH_2CH(CH_3)O)_{p500}$—$CH_2$—

—$C_2H_4$—$(CH_2CH(CH_3)O)_{p500}$—$C_2H_4$—

—$C_2H_4$—$(CH_2CH(CH_3)O)_{p500}$—$C_3H_6$—

—$C_3H_6$—$(CH_2CH(CH_3)O)_{p500}$—$CH_2$—

—$C_3H_6$—$(CH_2CH(CH_3)O)_{p500}$—$C_2H_4$—

—$C_3H_6$—$(CH_2CH(CH_3)O)_{p500}$—$C_3H_6$—

"An alkylene group having 1 to 21 carbon atoms which has at least one group selected from —O—, —OCO—, —COO— and an arylene group in the chain, and also has a hydroxy group as a substituent", in $A_1$ of the general formula (V), includes a group represented by the following general formula (V-7-1) or (V-7-2), and the like.

$$—R_{552}—X_{501}—R_{552}— \quad (V\text{-}7\text{-}1)$$

(wherein two $R_{552}$ each independently represent an alkylene group having 1 to 10 carbon atoms, which has a hydroxy group as a substituent, or which does not have a substituent; $X_{501}$ is the same as described above; provided that at least one of the two $R_{552}$ represents an alkylene group having 1 to 6 carbon atoms which has a hydroxy group as a substituent.)

$$—R_{552}—X_1—R_{552}—X_1—R_{552}— \quad (V\text{-}7\text{-}2)$$

(wherein three $R_{552}$ are each independently the same as described above; two $X_1$ are also each independently the same as described above; provided that at least one of the three $R_{552}$ represents an alkylene group having 1 to 10 carbon atoms which has a hydroxy group as a substituent; and total number of carbon atoms in the formula is 21 or less.)

The alkylene group having 1 to 10 carbon atoms, which has a hydroxy group as a substituent, in $R_{552}$ of the general formulae (V-7-1) and (V-7-2), is preferably the one having 1 to 6 carbon atoms, more preferably the one having 1 to 3 carbon atoms, and it is preferably the one having one or two pieces of hydroxy groups.

It specifically includes, for example, a hydroxymethylene group, a hydroxyethylene group, a hydroxypropylene group, a hydroxybutylene group, a hydroxypentylene group, a hydroxyhexylene group, a hydroxymethylpentylene group, a hydroxy-n-heptylene group, a hydroxy-n-octylene group, a hydroxy-n-nonylene group, a hydroxy-n-decylene group, a hydroxycyclopentylene group, a hydroxycyclohexylene group, a dihydroxyethylene group, a dihydroxypropylene group, and the like.

The alkylene group having 1 to 10 carbon atoms which does not have a substituent, in $R_{552}$ of the general formulae (V-7-1) and (V-7-2), includes the same one as the alkylene group having 1 to 10 carbon atoms, in $R_{551}$ of the general formulae (V-6-1) and (V-6-2), and the preferable one is also the same.

In addition, the arylene group, in $X_1$ of the general formulae (V-7-1) and (V-7-2), includes a phenylene group and a naphthylene group, and the phenylene group is preferable.

Preferable specific examples of the group represented by the general formula (V-7-1) include, for example, the following general formulae (wherein $X_{511}$ represents —O—, —OCO—, COO— or a phenylene group.).

—$CH_2$—$X_{511}$—$C_3H_5(OH)$—

—$CH_2$—$X_{511}$—$C_4H_7(OH)$—

—$CH_2$—$X_{511}$—$C_5H_9(OH)$—

—$CH_2$—$X_{511}$—$C_6H_{11}(OH)$—

—$C_2H_4$—$X_{511}$—$C_3H_5(OH)$—

—$C_2H_4$—$X_{511}$—$C_4H_7(OH)$—

—$C_2H_4$—$X_{511}$—$C_5H_9(OH)$—

—$C_2H_4$—$X_{511}$—$C_6H_{11}(OH)$—

—$C_3H_6$—$X_{511}$—$C_3H_5(OH)$—

—$C_3H_6$—$X_{511}$—$C_4H_7(OH)$—

—$C_3H_6$—$X_{511}$—$C_5H_9(OH)$—

—$C_3H_6$—$X_{511}$—$C_6H_{11}(OH)$—

—$C_3H_5(OH)$—$X_{511}$—$CH_2$—

—$C_3H_5(OH)$—$X_{511}$—$C_2H_4$—

—$C_3H_5(OH)$—$X_{511}$—$C_3H_6$—

—$C_3H_5(OH)$—$X_{511}$—$C_4H_8$—

—$C_3H_5(OH)$—$X_{511}$—$C_5H_{10}$—

—$C_3H_5(OH)$—$X_{511}$—$C_6H_{12}$—

—$C_3H_5(OH)$—$X_{511}$—$C_3H_5(OH)$—

—$C_3H_5(OH)$—$X_{511}$—$C_4H_7(OH)$—

—$C_3H_5(OH)$—$X_{511}$—$C_5H_9(OH)$—

—$C_3H_5(OH)$—$X_{511}$—$C_6H_{11}(OH)$—

Preferable specific examples of the group represented by the general formula (V-7-2) include, for example, the following general formulae (wherein $X_{511}$ each independently represent —O—, —OCO—, COO— or a phenylene group.).

—$CH_2$—$X_{511}$—$C_3H_5(OH)$—$X_{511}$—$CH_2$—

—$C_2H_4$—$X_{511}$—$C_3H_5(OH)$—$X_{511}$—$C_2H_4$—

—$C_2H_4$—$X_{511}$—$C_3H_5(OH)$—$X_{511}$—$C_3H_6$—

—$C_2H_4$—$X_{511}$—$C_3H_5(OH)$—$X_{511}$—$C_4H_8$—

—$C_2H_4$—$X_{511}$—$C_3H_5(OH)$—$X_{511}$—$C_5H_{10}$—

—$C_2H_4$—$X_{511}$—$C_3H_5(OH)$—$X_{511}$—$C_6H_{12}$—

—$C_3H_6$—$X_{511}$—$C_3H_5(OH)$—$X_{511}$—$C_2H_4$—

—$C_3H_6$—$X_{511}$—$C_3H_5(OH)$—$X_{511}$—$C_3H_6$—

—$C_3H_6$—$X_{511}$—$C_3H_5(OH)$—$X_{511}$—$C_4H_8$—

—$C_3H_6$—$X_{511}$—$C_3H_5(OH)$—$X_{511}$—$C_5H_{10}$—

—$C_3H_6$—$X_{511}$—$C_3H_5(OH)$—$X_{511}$—$C_6H_{12}$—

—$C_4H_8$—$X_{511}$—$C_3H_5(OH)$—$X_{511}$—$C_4H_8$—

—$C_5H_{10}$—$X_{511}$—$C_3H_5(OH)$—$X_{511}$—$C_5H_{10}$—

—$C_6H_{12}$—$X_{511}$—$C_3H_5(OH)$—$X_{511}$—$C_6H_{12}$—

—$C_2H_4$—$X_{511}$—$C_3H_5(OH)$—$X_{511}$—$C_3H_5(OH)$—

—$C_2H_4$—$X_{511}$—$C_3H_5(OH)$—$X_{511}$—$C_4H_7(OH)$—

—$C_2H_4$—$X_{511}$—$C_3H_5(OH)$—$X_{511}$—$C_5H_9(OH)$—

—C$_2$H$_4$—X$_{511}$—C$_3$H$_5$(OH)—X$_{511}$—C$_6$H$_{511}$(OH)—

—C$_3$H$_6$—X$_{511}$—C$_3$H$_5$(OH)—X$_{511}$—C$_2$H$_3$(OH)—

—C$_3$H$_6$—X$_{511}$—C$_3$H$_5$(OH)—X$_{511}$—C$_3$H$_5$(OH)—

—C$_4$H$_8$—X$_{511}$—C$_3$H$_5$(OH)—X$_{511}$—C$_4$H$_7$(OH)—

—C$_5$H$_{10}$—X$_{511}$—C$_3$H$_5$(OH)—X$_{511}$—C$_5$H$_9$(OH)—

—C$_6$H$_{12}$—X$_{511}$—C$_3$H$_5$(OH)—X$_{511}$—C$_6$H$_{511}$(OH)—

"An alkylene group having 1 to 21 carbon atoms which has a hydroxy group as a substituent", in A$_1$ of the general formula (V), includes, for example, a group represented by the following general formula (V-8), and the like.

—(CH$_2$)$_{p510}$—R$_{556}$—(CH$_2$)$_{p510}$— (V-8)

(wherein R$_{556}$ represents the alkylene group having 1 to 9 carbon atoms which has a hydroxy group as a substituent; p510 represents an integer of 0 to 6.)

(OH)—C$_4$H$_8$—, —C$_2$H$_4$—C$_2$H$_4$(OH)—CH$_2$—, —C$_2$H$_4$—C$_2$H$_4$(OH)—C$_2$H$_4$—, —C$_2$H$_4$—C$_2$H$_4$(OH)—C$_3$H$_6$—, and the like.

As A$_1$ in the general formula (V), the alkylene group having 1 to 21 carbon atoms which has at least one group selected from the group consisting of —O—, —OCO—, —COO— and an arylene group in the chain, or the alkylene group having 1 to 21 carbon atoms is preferable; and among them, the group represented by the general formula (V-6-1), the group represented by the general formula (V-6-2), and the alkylene group having 1 to 21 carbon atoms are more preferable, and the group represented by the general formula (V-6-2), and the alkylene group having 1 to 21 carbon atoms are further preferable.

In addition, A$_2$ is preferably —O—.

Preferable combinations of R$_{501}$ to R$_{512}$, A$_1$ and A$_2$ of the general formula (V) include, for example, those described in the following Table 16.

TABLE 16

| R$_{501}$ to R$_{504}$ | R$_{505}$ | R$_{506}$ | R$_{507}$ | R$_{508}$ to R$_{511}$ | R$_{512}$ | A$_1$ | A$_2$ |
|---|---|---|---|---|---|---|---|
| all —H | —CH$_3$ | —CH$_3$ | —CH$_3$ | all —H | —H or —CH$_3$ | —CH$_2$— | —O— |
| all —H | —CH$_3$ | —CH$_3$ | —CH$_3$ | all —H | —H or —CH$_3$ | —C$_2$H$_4$— | —O— |
| all —H | —CH$_3$ | —CH$_3$ | —CH$_3$ | all —H | —H or —CH$_3$ | —C$_3$H$_6$— | —O— |
| all —H | —CH$_3$ | —CH$_3$ | —CH$_3$ | all —H | —H or —CH$_3$ | —C$_5$H$_{10}$— | —O— |
| all —H | —CH$_3$ | —CH$_3$ | —CH$_3$ | all —H | —H or —CH$_3$ | —C$_6$H$_{12}$— | —O— |
| all —H | —CH$_3$ | —CH$_3$ | —CH$_3$ | all —H | —H or —CH$_3$ | —CH$_2$—OCO—C$_2$H$_4$—COO—CH$_2$— | —O— |
| all —H | —CH$_3$ | —CH$_3$ | —CH$_3$ | all —H | —H or —CH$_3$ | —CH$_2$—OCO—C$_2$H$_4$—COO—C$_2$H$_4$— | —O— |
| all —H | —CH$_3$ | —CH$_3$ | —CH$_3$ | all —H | —H or —CH$_3$ | —C$_2$H$_4$—OCO—C$_2$H$_4$—COO—CH$_2$— | —O— |
| all —H | —CH$_3$ | —CH$_3$ | —CH$_3$ | all —H | —H or —CH$_3$ | —C$_2$H$_4$—OCO—C$_2$H$_4$—COO—C$_2$H$_4$— | —O— |
| all —H | —CH$_3$ | —CH$_3$ | —CH$_3$ | all —H | —H or —CH$_3$ | —C$_2$H$_4$—OCO—C$_2$H$_4$—COO—C$_3$H$_6$— | —O— |
| all —H | —CH$_3$ | —CH$_3$ | —CH$_3$ | all —H | —H or —CH$_3$ | —C$_2$H$_4$—OCO—C$_2$H$_4$—COO—C$_4$H$_8$— | —O— |
| all —H | —CH$_3$ | —CH$_3$ | —CH$_3$ | all —H | —H or —CH$_3$ | —C$_2$H$_4$—OCO—C$_2$H$_4$—COO—C$_5$H$_{10}$— | —O— |
| all —H | —CH$_3$ | —CH$_3$ | —CH$_3$ | all —H | —H or —CH$_3$ | —C$_2$H$_4$—OCO—C$_2$H$_4$—COO—C$_6$H$_{12}$— | —O— |
| all —H | —CH$_3$ | —CH$_3$ | —CH$_3$ | all —H | —H or —CH$_3$ | —C$_3$H$_6$—OCO—C$_2$H$_4$—COO—CH$_2$— | —O— |
| all —H | —CH$_3$ | —CH$_3$ | —CH$_3$ | all —H | —H or —CH$_3$ | —C$_3$H$_6$—OCO—C$_2$H$_4$—COO—C$_2$H$_4$— | —O— |
| all —H | —CH$_3$ | —CH$_3$ | —CH$_3$ | all —H | —H or —CH$_3$ | —C$_3$H$_6$—OCO—C$_2$H$_4$—COO—C$_3$H$_6$— | —O— |

The alkylene group having 1 to 9 carbon atoms which has a hydroxy group as a substituent, in R$_{556}$ of the general formula (V-8), is preferably the one having 1 to 6 carbon atoms, and more preferably the one having 1 to 3 carbon atoms.

It specifically includes, for example, a hydroxymethylene group, a hydroxyethylene group, a hydroxypropylene group, a hydroxymethylethylene group, a hydroxybutylene group, a 1-hydroxymethylpropylene group, a 2-hydroxymethylpropylene group, a hydroxypentylene group, a hydroxymethylbutylene group, a 1,2-di-hydroxymethylpropylene group, a 1-hydroxyethylpropylene group, a hydroxyhexylene group, a hydroxymethylpentylene group, a hydroxy-n-heptylene group, a hydroxy-n-octylene group, a hydroxy-n-nonylene group, a hydroxycyclopentylene group, a hydroxycyclohexylene group, a hydroxycycloheptylene group, and the like; and the hydroxymethylene group, the hydroxyethylene group and the hydroxypropylene group are more preferable, and the hydroxyethylene group is particularly preferable.

The group represented by the general formula (V-8) specifically includes, for example, —CH$_2$—C$_6$H$_9$(OH)—CH$_2$—, —C$_2$H$_4$—C$_6$H$_9$(OH)—C$_2$H$_4$—, —C$_3$H$_6$—C$_6$H$_9$(OH)—C$_3$H$_6$—, —CH$_2$—CH(OH)—C$_2$H$_4$—, —CH$_2$—CH(OH)—C$_3$H$_6$—, —CH$_2$—CH(OH)—C$_4$H$_8$—, —C$_2$H$_4$—CH(OH)—CH$_2$—, —C$_2$H$_4$—CH(OH)—C$_2$H$_4$—, —C$_2$H$_4$—CH(OH)—C$_3$H$_6$—, —CH$_2$—C$_2$H$_4$(OH)—C$_2$H$_4$—, —CH$_2$—C$_2$H$_4$(OH)—C$_3$H$_6$—, —CH$_2$—C$_2$H$_4$ Specific examples and the preferable ones of An$^-$ of the general formula (V) are as described in the anion containing the aryl group having the electron-withdrawing substituent, the sulfonyl group having the electron-withdrawing substituent, or the halogenated alkyl group.

(2) Production Method for the Compound Represented by the General Formula (V)

The compound represented by the general formula (V) of the present invention is produced, for example, by carrying out a salt exchange reaction, after subjecting a compound represented by the following general formula (V-20) to a reaction with a compound represented by the following general formula (V-21), a compound represented by the general formula (V-22) or a compound represented by the general formula (V-23).

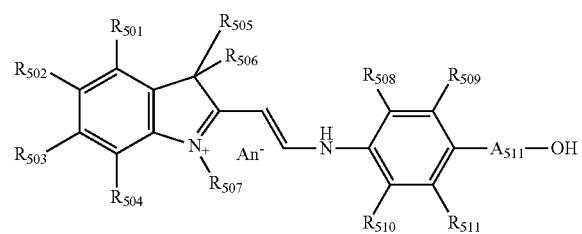

(V-20)

(wherein $R_{501}$ to $R_{511}$ and $An^-$ are the same as described above. $A_{511}$ represents an alkylene group having 1 to 6 carbon atoms, which has a hydroxy group as a substituent, or which does not have a substituent.)

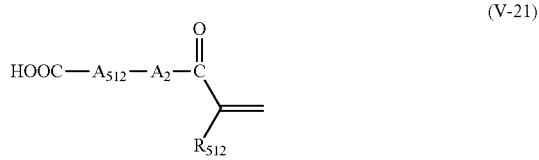

(V-21)

(wherein $R_{512}$ and $A_2$ are the same as described above. $A_{512}$ represents an alkylene group having 1 to 15 carbon atoms which has at least one group selected from —O—, —OCO—, —COO— and an arylene group in the chain, an alkylene group having 1 to 15 carbon atoms which has at least one group selected from —O—, —OCO—, —COO— and an arylene group in the chain, and also has a hydroxy group as a substituent, an alkylene group having 1 to 15 carbon atoms, or an alkylene group having 1 to 15 carbon atoms which has a hydroxy group as a substituent.)

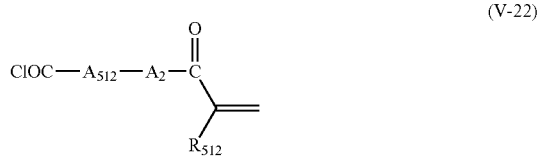

(V-22)

(wherein $R_{512}$, $A_2$ and $A_{512}$ are the same as described above.)

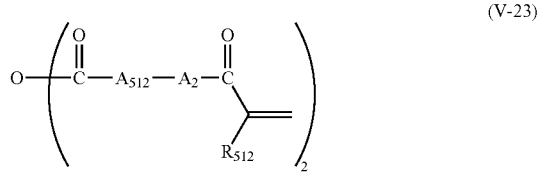

(V-23)

(wherein $R_{512}$, $A_2$ and $A_{512}$ are the same as described above.)

The alkylene group having 1 to 6 carbon atoms which has a hydroxy group as a substituent, in $A_{511}$ of the general formula (V-20), is preferably the one having 1 to 3 carbon atoms, and it is preferably the one having one or two pieces of hydroxy groups.

It specifically includes, for example, a hydroxymethylene group, a hydroxyethylene group, a hydroxypropylene group, a hydroxybutylene group, a hydroxypentylene group, a hydroxyhexylene group, a hydroxycyclopentylene group, a hydroxycyclohexylene group, a dihydroxyethylene group, a dihydroxypropylene group, and the like.

In addition, the alkylene group having 1 to 6 carbon atoms which does not have a substituent, in $A_{511}$ of the general formula (V-20), includes a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, and the like; and the methylene group, the ethylene group and the propylene group are more preferable, and the ethylene group is particularly preferable.

Preferable combinations of $R_{501}$ to $R_{511}$, $An^-$ and $A_{511}$, in the general formula (V-20), include those where the combination of $R_1$ to $R_{511}$ described in Table of the item of the compound of the present invention, $An^-$ represented by the general formula (16), as well as $A_{511}$ selected from a methylene group, an ethylene group and a propylene group, are combined as appropriate.

The compound represented by the general formula (V-20) may be the one commercially available, or the one synthesized by a method known per se.

The alkylene group having 1 to 15 carbon atoms which has at least one group selected from —O—, —OCO—, —COO— and an arylene group in the chain, and also has a hydroxy group as a substituent, in $A_{512}$ of the general formulae (V-21), (V-22) and (V-23), includes, for example, groups represented by the following general formulae (V-6-1') to (V-6-4'), and the like.

(V-6-1')

(wherein two $R_{551}$ each independently represent an alkylene group having 1 to 10 carbon atoms; $X_1$ is the same as described above; provided that total number of carbon atoms in the formula is 15 or less.)

(V-6-2')

(wherein three $R_{551}$ are each independently the same one as described above; $X_{501}$ is the same as described above; provided that total number of carbon atoms in the formula is 15 or less.)

(V-6-3')

(wherein two $R_{551}$ are each independently the same one as described above; p507 represents an integer of 1 to 9; provided that total number of carbon atoms in the formula is 15 or less.)

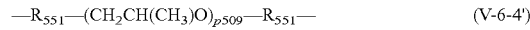

(V-6-4')

(wherein two $R_{551}$ are each independently the same one as described above; p509 represents an integer of 1 to 9; provided that total number of carbon atoms in the formula is 15 or less.)

Preferable specific examples of the group represented by the general formulae (V-6-1') to (V-6-4') include those in accordance with the preferable specific examples of the group represented by the general formulae (V-6-1) to (V-6-4).

The alkylene group having 1 to 15 carbon atoms which has at least one group selected from —O—, —OCO—, —COO— and an arylene group in the chain, in $A_{512}$ of the general formulae (V-21), (V-22) and (V-23), includes, for example, a group represented by the following general formulae (V-7-1') or (V-7-2'), and the like.

(V-7-1')

(wherein $R_{552}$ and $X_{501}$ are the same as described above; provided that total number of carbon atoms in the formula is 15 or less.)

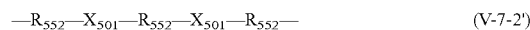

(V-7-2')

(wherein $R_{552}$ and $X_{501}$ are the same as described above; provided that total number of carbon atoms in the formula is 15 or less.)

Preferable specific examples of the group represented by the general formulae (V-7-1') or (V-7-2') include those in accordance with the preferable specific examples of the group represented by the general formulae (V-7-1) or (V-7-2).

The alkylene group having 1 to 15 carbon atoms, in $A_{12}$ of the general formulae (V-21), (V-22) and (V-23), is the linear or branched one, and it is preferably the one having 1 to 6 carbon atoms, and more preferably the one having 1 to 3 carbon atoms.

It specifically includes, for example, a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, a methylpentylene group, an n-heptylene group, an n-octylene group, an n-nonylene group, an n-decylene group, an n-undecylene group, an n-dodecylene group, an n-tridecylene group, an n-tetradecylene group, an n-pentadecylene group, a cyclopentylene group, a cyclohexylene group, a cycloheptylene group, and the like; and the methylene group, the ethylene group, the propylene group, the butylene group, the pentylene group, the hexylene group, and the like, are preferable, the methylene group, the ethylene group and the propylene group are more preferable, and the ethylene group is particularly preferable.

The alkylene group having 1 to 15 carbon atoms which has a hydroxy group as a substituent, in $A_{512}$ of the general formulae (V-21), (V-22) and (V-23), includes, for example, a group represented by the following general formula (V-8'), and the like.

—(CH$_2$)$_{p510}$—R$_{556}$—(CH$_2$)$_{p510}$— (V-8')

(wherein $R_{556}$ represents an alkylene group having 1 to 9 carbon atoms which has a hydroxy group as a substituent; p510 represents an integer of 0 to 6; provided that total number of carbon atoms in the formula is 15 or less.)

Preferable specific examples of the group represented by the general formula (IV-8') include those in accordance with the preferable specific examples of the group represented by the general formula (V-8).

Preferable specific examples of the general formula (V-21) include a group represented by the following general formula (V-21').

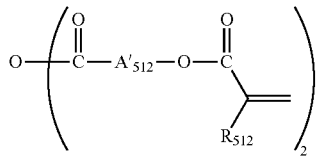

(V-21')

[wherein $R_{512}$ is the same as described above. $A'_{512}$ represents the general formulae (V-6-1'), (V-6-2') or an alkylene group having 1 to 6 carbon atoms.]

The alkylene group having 1 to 6 carbon atoms in $A'_{512}$ includes a methylene group, an ethylene group, a propylene group, a methylethylene group, a butylene group, a 1-methylpropylene group, a 2-methylpropylene group, a pentylene group, a methylbutylene group, a 1,2-dimethylpropylene group, a 1-ethylpropylene group, a hexylene group, and the like; and the methylene group, the ethylene group and the propylene group are more preferable, and the ethylene group is particularly preferable.

Preferable specific examples of the general formula (V-22) include the following general formula (V-22').

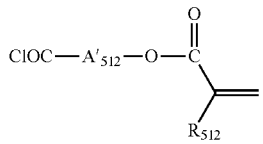

(V-22')

(wherein $R_{512}$ and $A'_{512}$ are the same as described above.)

Preferable specific examples of the general formula (V-23) include the following general formula (V-23').

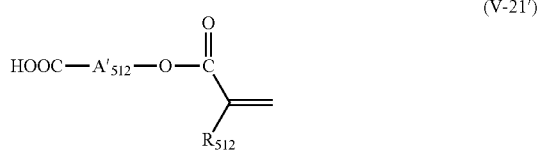

(V-23')

(wherein $R_{512}$ and $A'_{512}$ are the same as described above.)

The reaction between the compound represented by the general formula (V-20) and the compound represented by the general formula (V-21) may be carried out in a solvent, in the presence of a dehydration condensation agent, usually at 10 to 50° C., preferably at 10 to 30° C., usually for 1 to 50 hours, and preferably for 5 to 30 hours.

Use amount of the compound represented by the general formula (V-21) is usually 1 to 5 times mole, and preferably 1 to 2 times mole, relative to the compound represented by the general formula (V-20).

The solvent includes the same one as the solvent to be used in the method for subjecting the rhodamine compound represented by the general formula (I-I) and the compound represented by the general formula (I-II) to a reaction, and the preferable one is also the same.

The dehydration condensation agent includes the same one as the dehydration condensation agent to be used in the method for subjecting the rhodamine compound represented by the general formula (I-I) and the compound represented by the general formula (I-II) to a reaction, and the preferable one is also the same. Use amount of the dehydration condensation agent is 1 to 10 times mole, and preferably 1 to 5 times mole, relative to the compound represented by the general formula (V-22). In the reaction, a catalyst, such as dimethylaminopyridine, may be used to enhance efficiency of the dehydration condensation agent. Use amount of the catalyst is 0.1 to 10 times mole, relative to the compound represented by the general formula (V-22).

The reaction between the compound represented by the general formula (V-20), and the compound represented by the following general formula (V-22) or the compound represented by the general formula (V-23) may be carried out, in a solvent, usually at 60 to 90° C., preferably at 70 to 90° C., usually for 1 to 10 hours, and preferably for 3 to 5 hours. It is preferable that the reaction is carried out in the presence of a molecular sieve. The presence of the molecular sieve makes it possible to adsorb hydrochloric acid gas, which is a by-product, and accelerate the reaction. Use amount of the molecular sieve is usually 1 to 5 times weight, and preferably 1 to 3 times weight of the compound represented by the general formula (V-20).

Use amount of the compound represented by the general formula (V-22) is usually 1 to 5 times mole, and preferably 1 to 3 times mole of the compound represented by the general formula (V-20).

In addition, the solvent includes the same one as the solvent to be used in the reaction between the compound represented by the general formula (V-20) and the compound represented by the general formula (V-21).

The salt exchange reaction, in the production method for the compound represented by the general formula [V], may be carried out by making a salt of the anion of the present invention contacted, in a solvent, with the compound obtained by subjecting the compound represented by the general formula (V-20), and the compound represented by the general formula (V-21), the compound represented by the general formula (V-22) or the general formula (V-23), to a reaction.

In addition, the salt exchange reaction is carried out usually at 10 to 50° C., preferably at 20 to 30° C., for 0.1 to 10 hours, and preferably for 0.1 to 6 hours. The solvent to be used in this case includes the same one as the solvent to be used in the reaction between the compound represented by the general formula (V-20) and the compound represented by the general formula (V-21).

The salt of the anion of the present invention includes, a sodium salt, a potassium salt, a lithium salt, and the like, of the anion; and the potassium salt and the lithium salt are preferable. Use amount of the salt of the anion of the present invention is usually 1 to 2 mole amount, and preferably 1 to 1.5 mole amount, relative to 1 mole of the compound represented by the general formula (V-20).

The production method of the present invention is carried out specifically, for example, in the case when the compound represented by the general formula (V-20) and the compound represented by the general formula (V-21) are subjected to a reaction, first of all, by subjecting the compound represented by the general formula (V-20), and the compound represented by the general formula (V-21) in 1 to 2 times mole of the compound represented by the general formula (V-20), to a reaction; in the presence of dimethylaminopyridine, in 0.1 to 1 time mole of the compound represented by the general formula (V-20), and carbodiimides, in 1 to 5 times mole of the compound represented by the general formula (V-20); in a solvent of a halogenated hydrocarbon, such as chloromethane, methylene chloride, chloroform, carbon tetrachloride, dichloroethane, trichloroethane and chlorobenzene; at 10 to 30° C., for 5 to 30 hours. Subsequently, for example, a lithium salt of the boron represented by the general formula (16), in 1 to 2 times mole of the compound represented by the general formula (V-20), is added to the resulting reaction product; and they are subjected to a reaction in a solvent of a halogenated hydrocarbon, such as chloromethane, methylene chloride, chloroform, carbon tetrachloride, dichloroethane, trichloroethane and chlorobenzene; at 10 to 50° C., for 0.1 to 6 hours; to obtain the compound represented by the general formula [V].

In addition, the production method of the present invention may be carried out by subjecting the compound represented by the general formula (V-20) to the salt exchange reaction, followed by subjecting the salt-exchanged compound represented by the general formula (V-20), and the compound represented by the general formula (V-21), the compound represented by the general formula (V-22) or the compound represented by the general formula (V-23), to a reaction.

The salt exchange reaction in this case may be carried out by making a salt of the anion of the present invention contacted, in a solvent, with the compound represented by the general formula (V-20). The salt of the anion of the present invention, the solvent, reaction conditions, and the like, which are used herein, include the same one as those in the salt exchange reaction.

In addition, reaction conditions or other conditions of the reaction between the compound represented by the general formula (V-20), after the salt exchange reaction, and the compound represented by the general formula (V-21); the reaction between the compound represented by the general formula (V-20), after the salt exchange reaction, and the compound represented by the general formula (V-22); as well as the reaction between the compound represented by the general formula (V-20), after the salt exchange reaction, and the compound represented by the general formula (V-23); are the same as in the production method of the present invention.

The production method of the present invention is specifically carried out, for example, in the case when the compound represented by the general formula (V-20) and the compound represented by the general formula (V-22) are subjected to a reaction, first of all, by the addition of the lithium salt of boron represented by the general formula (16), in 1 to 2 times mole of the compound represented by the general formula (V-20), to the compound represented by the general formula (V-20); in a solvent of a halogenated hydrocarbon, such as chloromethane, methylene chloride, chloroform, carbon tetrachloride, dichloroethane, trichloroethane and chlorobenzene; and by subjecting to reaction at 10 to 50° C., for 0.1 to 6 hours. Subsequently, the resulting salt-exchanged compound represented by the general formula (V-20), and the compound represented by the general formula (V-21), in 1 to 2 times mole of the general formula (V-20), are subjected to a reaction in a solvent of a halogenated hydrocarbon, such as chloromethane, methylene chloride, chloroform, carbon tetrachloride, dichloroethane, trichloroethane and chlorobenzene; at 70 to 90° C., for 3 to 5 hours; to obtain the compound represented by the general formula [V].

2-6. On the Compound Represented by a General Formula (VI)

Next, explanation will be given on specific compounds of the compound represented by the general formula (VI), as the compound having the cationic rhodamine derivative and the ethylenically unsaturated group, and a production method, and the like.

(1) Compound Represented by the General Formula (VI)

The compound, having the cationic rhodamine derivative of the present invention and the ethylenically unsaturated group, specifically includes, as described above, the compounds represented by the general formulae (I) and (II), and the compound represented by the next general formula (VI).

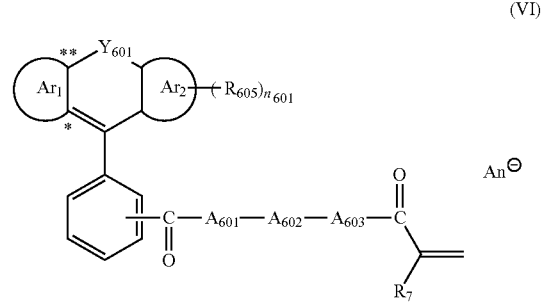

[where, in the general formula (VI), $R_7$ and $An^-$ are the same as those in the general formula (I); $A_{601}$ represents —O— or a group represented by the following general formula (VI-2-1),

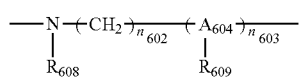
(VI-2-1)

(wherein $R_{608}$ and $R_{609}$ each independently represent a hydrogen atom, or an alkyl group having 1 to 12 carbon atoms; $A_{604}$ represents a nitrogen atom, or a group represented by the following general formula (VI-2-2);

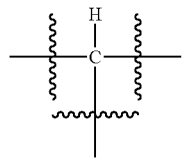
(VI-2-2)

$n_{602}$ represents an integer of 0 to 3; $R_{608}$ and $R_{609}$ may form a cyclic structure of a 5 to 6 membered ring together with —N—$(CH_2)_{n602}$-$(A_{604})_{n603}$- bonding thereto, and when the cyclic structure of the 5 to 6 membered ring is formed by $R_{608}$, $R_{609}$ and —N—$(CH_2)_{n602}$-$(A_{604})_{n603}$-, $n_{603}$ represents 1, and when the cyclic structure of the 5 to 6 membered ring is not formed, $n_{603}$ represents 0 or 1.)

$A_{602}$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_{603}$ represents —$NR_{610}$— or —O—; $R_{610}$ represents a hydrogen atom, or an alkyl group having 1 to 12 carbon atoms; $n_{601}$ pieces of $R_{605}$ each independently represent a halogen atom, an alkyl group having 1 to 20 carbon atoms, an alkoxy group having 1 to 20 carbon atoms, an alkylthio group having 1 to 20 carbon atoms, or an amino group having or not having a substituent; $Y_{601}$ represents an oxygen atom, a sulfur atom, —$NR_{632}$—, —$BR_{633}$— or —$Si(R_{634})_2$—; $R_{632}$, $R_{633}$ and two pieces of $R_{634}$ represent an alkyl group having 1 to 6 carbon atoms; $Ar_1$ represents a cyclic structure represented by the following general formulae (VI-1-1) to (VI-1-7);

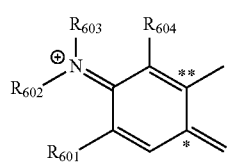
(VI-1-1)

(wherein $R_{601}$ and $R_{604}$ each independently represent a hydrogen atom or a methyl group; $R_{602}$ and $R_{603}$ each independently represent an alkyl group having 1 to 20 carbon atoms; $R_{601}$ and $R_{602}$ together may form an alkylene group having 2 to 4 carbon atoms; $R_{603}$ and $R_{604}$ together may form an alkylene group having 2 to 4 carbon atoms.)

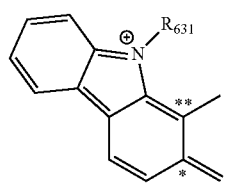
(VI-1-2)

(wherein $R_{631}$ represents an alkyl group having 1 to 20 carbon atoms.)

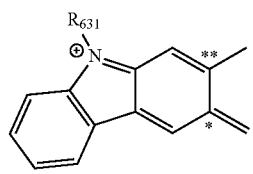
(VI-1-3)

(wherein $R_{631}$ is the same as described above.)

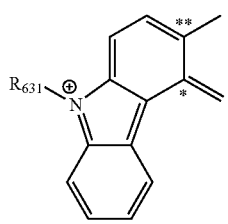
(VI-1-4)

(wherein $R_{631}$ is the same as described above.)

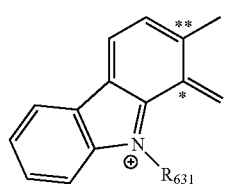
(VI-1-5)

(wherein $R_{631}$ is the same as described above.)

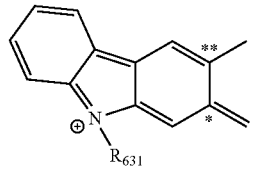
(VI-1-6)

(wherein $R_{631}$ is the same as described above.)

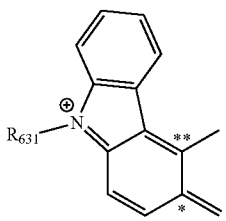

(VI-1-7)

(wherein $R_{631}$ is the same as described above.)

* and ** represent binding positions of each of them; $Ar_2$ represents a benzene ring, a naphthalene ring or an anthracene ring. When $Ar_2$ is the benzene ring, $n_{601}$ represents an integer of 0 to 4, when $Ar_2$ is the naphthalene ring, $n_{601}$ represents an integer of 0 to 6, and when $Ar_2$ is the anthracene ring, $n_{601}$ represents an integer of 0 to 8.]

The alkyl group having 1 to 12 carbon atoms, in $R_{608}$ and $R_{609}$ of the general formula (VI-2-1), may be any of the linear, branched or cyclic ones, and among them, the linear or branched one is preferable. In addition, among the alkyl group having 1 to 12 carbon atoms, the one having 1 to 6 carbon atoms is preferable, and the one having 1 to 3 carbon atoms is more preferable.

It specifically includes, for example, a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, an n-heptyl group, an isoheptyl group, a sec-heptyl group, a tert-heptyl group, a neoheptyl group, a cycloheptyl group, an n-octyl group, an isooctyl group, a sec-octyl group, a tert-octyl group, neooctyl group, a 2-ethylhexyl group, a cyclooctyl group, an n-nonyl group, an isononyl group, a sec-nonyl group, a tert-nonyl group, a neononyl group, a cyclononyl group, an n-decyl group, an isodecyl group, a sec-decyl group, a tert-decyl group, a neodecyl group, a cyclodecyl group, an n-undecyl group, a cycloundecyl group, an n-dodecyl group, a cyclododecyl group, a cyclohexylmethyl group, a 1-cyclohexylethyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 1-adamantyl group, a 2-adamantyl group, and the like; and the methyl group, the ethyl group, the n-propyl group, the isopropyl group, the n-butyl group, the isobutyl group, the sec-butyl group, the tert-butyl group, the cyclobutyl group, the n-pentyl group, the isopentyl group, the sec-pentyl group, the tert-pentyl group, the neopentyl group, the 2-methylbutyl group, the 1,2-dimethylpropyl group, the 1-ethylpropyl group, the cyclopentyl group, the n-hexyl group, the isohexyl group, the sec-hexyl group, the tert-hexyl group, the neohexyl group, the 2-methylpentyl group, the 1,2-dimethylbutyl group, the 2,3-dimethylbutyl group, the 1-ethylbutyl group and the cyclohexyl group are preferable, and the methyl group, the ethyl group, the n-propyl group and the isopropyl group are more preferable.

$R_{608}$ and $R_{609}$ in the general formula (VI-2-1) are preferably a hydrogen atom and an alkyl group having 1 to 3 carbon atoms, and more preferably the hydrogen atom. Specifically, the hydrogen atom, the methyl group, the ethyl group, the n-propyl group, the isopropyl group, and the like, are preferable, and the hydrogen atom is more preferable.

$A_{604}$ of the general formula (VI-2-1) is preferably the group represented by the formula (2-2).

In the case where $R_{608}$ and $R_{609}$ of the general formula (VI-2-1) form a cyclic structure of a 5 to 6 membered ring together with —N—$(CH_2)_{n602}$-$(A_4)_{n603}$- bonding thereto, $n_{603}$ is 1, and the cyclic structure is the one represented by the following general formula (VI-2-3).

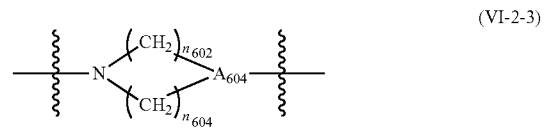

(VI-2-3)

(wherein $n_{604}$ represents an integer of 0 to 4; $A_{604}$ and $n_{602}$ are the same as described above; provided that $n_{602}+n_{604}$ is an integer of 3 to 4.)

In the case where the cyclic structure represented by the general formula (VI-2-3) is formed, $n_{602}$ in the general formula (VI-2-1) is preferably 2, and in the case where the cyclic structure represented by the general formula (VI-2-3) is not formed, it is preferably 0.

In the case where the cyclic structure represented by the general formula (VI-2-3) is formed, $n_{603}$ in the general formula (VI-2-1) represents 1, and in the case where the cyclic structure represented by the general formula (VI-2-3) is not formed, it is preferably 0.

In the general formula (VI-2-3), $n_{604}$ is preferably 2.

The cyclic structure represented by the general formula (VI-2-3) represents a 5 to 6 membered ring, and the 6 membered ring is preferable.

Specific examples of the cyclic structure represented by the general formula (VI-2-3) include, for example, the following ones.

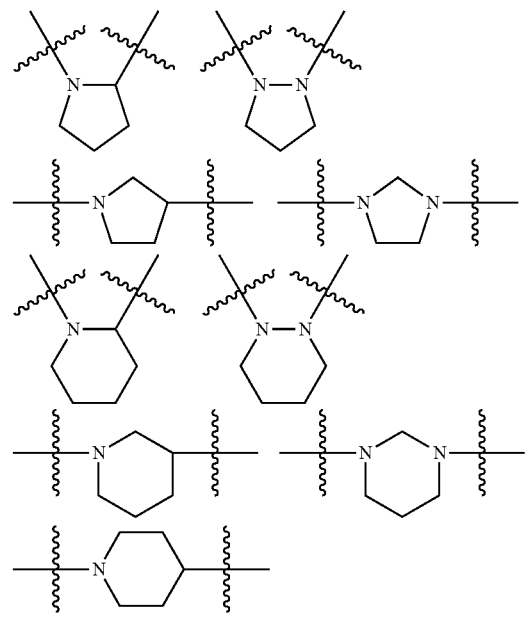

-continued

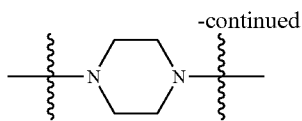

Among the specific examples, the following ones are preferable.

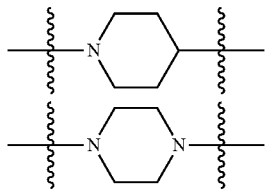

The alkylene group having 1 to 21 carbon atoms, in "an alkylene group having 1 to 21 carbon atoms which has at least one group selected from —O—, —OCO—, —COO—, —NHCO—, —CONH—, —NHCONH— and an arylene group in the chain", "an alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", "an alkylene group having 1 to 21 carbon atoms which has a hydroxy group as a substituent" and "an alkylene group having 1 to 21 carbon atoms", in $A_{602}$ of the general formula (VI), includes the same one as the alkylene group having 1 to 21 carbon atoms, in $A_1$ of the general formula (II), and the preferable one is also the same.

The arylene group in "an alkylene group having 1 to 21 carbon atoms which has at least one group selected from —O—, —OCO—, —COO—, —NHCO—, —CONH—, —NHCONH— and an arylene group in the chain" and "an alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", in $A_{602}$ of the general formula (VI), includes the one having 6 to 10 carbon atoms, and includes specifically, a phenylene group, a naphthylene group, and the like.

"An alkylene group having 1 to 21 carbon atoms which has at least one group selected from —O—, —OCO—, —COO—, —NHCO—, —CONH—, —NHCONH— and an arylene group in the chain", in $A_{602}$ of the general formula (VI), includes, for example, groups represented by the following general formulae (VI-21-1) to (VI-21-5), and the like.

—($R_{651}$—O—)$_{h601}$—$R_{652}$— (VI-21-1)

(wherein $R_{651}$ and $R_{652}$ each independently represent a linear or branched alkylene group having 1 to 4 carbon atoms; $h_{601}$ represents an integer of 1 to 9; provided that total number of carbon atoms is 2 to 21.)

—(CH$_2$)$_{h602}$—OCO—(CH$_2$)$_{h603}$— (VI-21-2)

(wherein $h_{602}$ and $h_{603}$ each independently represent an integer of 1 to 10.)

—(CH$_2$)$_{h604}$—OCO—$R_{653}$—COO—(CH$_2$)$_{h605}$— (VI-21-3)

(wherein $R_{653}$ represents a phenylene group, or an alkylene group having 1 to 7 carbon atoms; $h_{604}$ and $h_{605}$ each independently represent an integer of 1 to 3.)

—(CH$_2$)$_{h606}$-$A_{605}$-(CH$_2$)$_{h607}$— (VI-21-4)

(wherein $A_{605}$ represents —NHCO—, —CONH— or —NHCONH—; $h_{606}$ and $h_{607}$ each independently represent an integer of 1 to 10.)

—(CH$_2$)$_{h608}$—O—CONH—(CH$_2$)$_{h609}$— (VI-21-5)

(wherein $h_{608}$ and $h_{609}$ each independently represent an integer of 1 to 10.)

The linear or branched alkylene group having 1 to 4 carbon atoms, in $R_{651}$ and $R_{652}$ of the general formula (VI-21-1), specifically includes, for example, a methylene group, an ethylene group, a trimethylene group, a propylene group, a tetramethylene group, a 1-methyltrimethylene group, a 2-methyltrimethylene group, a 1,2-dimethylethylene group, a 1,1-dimethylethylene group, an ethylethylene group, and the like, and the ethylene group and the propylene group are preferable.

In the general formula (VI-21-2), $h_{602}$ is preferably an integer of 1 to 3, and more preferably 2.

In the general formula (VI-21-2), $h_{603}$ is preferably 2.

The alkylene group having 1 to 7 carbon atoms, in $R_{653}$ of the general formula (VI-21-3), specifically includes, for example, a methylene group, an ethylene group, a trimethylene group, a tetramethylene group, a pentamethylene group, a hexamethylene group, an n-heptylene group, a cyclobutylene group, a cyclopentylene group, a cyclohexylene group, a cycloheptylene group, and the like.

The case where $h_{604}$ and $h_{605}$ are the same is preferable, in $h_{604}$ and $h_{605}$ of the general formula (VI-21-3), and in addition, an integer of 1 to 3 is preferable, and 2 is more preferable.

$A_{605}$ of the general formula (VI-21-4) is preferably —NHCONH—.

The case where $h_{606}$ and $h_{607}$ are the same is preferable, in $h_{606}$ and $h_{607}$ of the general formula (VI-21-4), and 2 is more preferable.

The case where $h_{608}$ and $h_{609}$ are the same is preferable, in $h_{608}$ and $h_{609}$ of the general formula (VI-21-5), and an integer of 1 to 4 is preferable.

The group represented by the general formula (VI-21-1) includes specifically, for example, —CH$_2$CH$_2$—O—CH$_2$CH$_2$—, —(CH$_2$CH$_2$—O)$_2$—CH$_2$CH$_2$—, —(CH$_2$CH$_2$—O)$_3$—CH$_2$CH$_2$—, —(CH$_2$CH$_2$—O)$_4$—CH$_2$CH$_2$—, —(CH$_2$CH$_2$—O)$_5$—CH$_2$CH$_2$—, —(CH$_2$CH$_2$—O)$_6$—CH$_2$CH$_2$—, —(CH$_2$CH$_2$—O)$_7$—CH$_2$CH$_2$—, —(CH$_2$CH$_2$—O)$_8$—CH$_2$CH$_2$—, —(CH$_2$CH$_2$—O)$_9$—CH$_2$CH$_2$—, —CH$_2$CH(CH$_3$)—O—CH$_2$CH(CH$_3$)—, —(CH$_2$CH(CH$_3$)—O)$_2$—CH$_2$CH(CH$_3$)—, —(CH$_2$CH(CH$_3$)—O)$_3$—CH$_2$CH(CH$_3$)—, —(CH$_2$CH(CH$_3$)—O)$_4$—CH$_2$CH(CH$_3$)—, —(CH$_2$CH(CH$_3$)—O)$_5$—CH$_2$CH(CH$_3$)—, —(CH$_2$CH(CH$_3$)—O)$_6$—CH$_2$CH(CH$_3$)—, —CH(CH$_3$)CH$_2$—O—CH(CH$_3$)CH$_2$—, —(CH(CH$_3$)CH$_2$—O)$_2$—CH(CH$_3$)CH$_2$—, —(CH(CH$_3$)CH$_2$—O)$_3$—CH(CH$_3$)CH$_2$—, —(CH(CH$_3$)CH$_2$—O)$_4$—CH(CH$_3$)CH$_2$—, —(CH(CH$_3$)CH$_2$—O)$_5$—CH(CH$_3$)CH$_2$—, —(CH(CH$_3$)CH$_2$—O)$_6$—CH(CH$_3$)CH$_2$—, —CH(CH$_3$)CH$_2$—O—CH$_2$CH(CH$_3$)—, and the like.

The group represented by the general formula (VI-21-2) includes specifically, for example, —CH$_2$—O—CO—(CH$_2$)$_2$—, —(CH$_2$)$_2$—O—CO—(CH$_2$)$_2$—, —(CH$_2$)$_3$—O—CO—(CH$_2$)$_2$—, and the like.

The group represented by the general formula (VI-21-3) includes specifically, for example, —CH$_2$—O—CO—CH$_2$—CO—O—CH$_2$—, —CH$_2$—O—CO—(CH$_2$)$_2$—CO—O—CH$_2$—, —CH$_2$—O—CO—(CH$_2$)$_3$—CO—O—CH$_2$—, —CH$_2$—O—CO—(CH$_2$)$_4$—CO—O—CH$_2$—, —CH$_2$—O—CO—(CH$_2$)$_5$—CO—O—CH$_2$—, —CH$_2$—O—CO—(CH$_2$)$_6$—CO—O—CH$_2$—, —CH$_2$—O—CO—

$-(CH_2)_7-CO-O-CH_2-$, $-(CH_2)_2-O-CO-CH_2-CO-O-(CH_2)_2-$, $-(CH_2)_2-O-CO-(CH_2)_2-CO-O-(CH_2)_2-$, $-(CH_2)_2-O-CO-(CH_2)_3-CO-O-(CH_2)_2-$, $-(CH_2)_2-O-CO-(CH_2)_4-CO-O-(CH_2)_2-$, $-(CH_2)_2-O-CO-(CH_2)_5-CO-O-(CH_2)_2-$, $-(CH_2)_2-O-CO-(CH_2)_6-CO-O-(CH_2)_2-$, $-(CH_2)_2-O-CO-(CH_2)_7-CO-O-(CH_2)_2-$, $-(CH_2)_3-O-CO-CH_2-CO-O-(CH_2)_3-$, $-(CH_2)_3-O-CO-(CH_2)_2-CO-O-(CH_2)_3-$, $-(CH_2)_3-O-CO-(CH_2)_3-CO-O-(CH_2)_3-$, $-(CH_2)_3-O-CO-(CH_2)_4-CO-O-(CH_2)_3-$, $-(CH_2)_3-O-CO-(CH_2)_5-CO-O-(CH_2)_3-$, $-(CH_2)_3-O-CO-(CH_2)_6-CO-O-(CH_2)_3-$, $-(CH_2)_3-O-CO-(CH_2)_7-CO-O-(CH_2)_3-$, $-CH_2-O-CO-C_6H_4-CO-O-CH_2-$, $-(CH_2)_2-O-CO-C_6H_4-CO-O-(CH_2)_2-$, $-(CH_2)_3-O-CO-C_6H_4-CO-O-(CH_2)_3-$, $-CH_2-O-CO-C_6H_{10}-CO-O-CH_2-$, $-(CH_2)_2-O-CO-C_6H_{10}-CO-O-(CH_2)_2-$, $-(CH_2)_3-O-CO-C_6H_{10}-CO-O-(CH_2)_3$, —and the like.

Among them, $-CH_2-O-CO-CH_2-CO-O-CH_2-$, $-CH_2-O-CO-(CH_2)_2-CO-O-CH_2-$, $-CH_2-O-CO-(CH_2)_3-CO-O-CH_2-$, $-CH_2-O-CO-(CH_2)_4-CO-O-CH_2-$, $-CH_2-O-CO-(CH_2)_5-CO-O-CH_2-$, $-CH_2-O-CO-(CH_2)_6-CO-O-CH_2-$, $-CH_2-O-CO-(CH_2)_7-CO-O-CH_2-$, $-(CH_2)_2-O-CO-CH_2-CO-O-(CH_2)_2-$, $-(CH_2)_2-O-CO-(CH_2)_2-CO-O-(CH_2)_2-$, $-(CH_2)_2-O-CO-(CH_2)_3-CO-O-(CH_2)_2-$, $-(CH_2)_2-O-CO-(CH_2)_4-CO-O-(CH_2)_2-$, $-(CH_2)_2-O-CO-(CH_2)_5-CO-O-(CH_2)_2-$, $-(CH_2)_2-O-CO-(CH_2)_6-CO-O-(CH_2)_2-$, $-(CH_2)_2-O-CO-(CH_2)_7-CO-O-(CH_2)_2-$, $-(CH_2)_3-O-CO-CH_2-CO-O-(CH_2)_3-$, $-(CH_2)_3-O-CO-(CH_2)_2-CO-O-(CH_2)_3-$, $-(CH_2)_3-O-CO-(CH_2)_3-CO-O-(CH_2)_3-$, $-(CH_2)_3-O-CO-(CH_2)_4-CO-O-(CH_2)_3-$, $-(CH_2)_3-O-CO-(CH_2)_5-CO-O-(CH_2)_3-$, $-(CH_2)_3-O-CO-(CH_2)_6-CO-O-(CH_2)_3-$ and $-(CH_2)_3-O-CO-(CH_2)_7-CO-O-(CH_2)_3-$ are preferable, $-(CH_2)_2-O-CO-CH_2-CO-O-(CH_2)_2-$, $-(CH_2)_2-O-CO-(CH_2)_2-CO-O-(CH_2)_2-$, $-(CH_2)_2-O-CO-(CH_2)_3-CO-O-(CH_2)_2-$, $-(CH_2)_2-O-CO-(CH_2)_4-CO-O-(CH_2)_2-$, $-(CH_2)_2-O-CO-(CH_2)_5-CO-O-(CH_2)_2-$, $-(CH_2)_2-O-CO-(CH_2)_6-CO-O-(CH_2)_2-$ and $-(CH_2)_2-O-CO-(CH_2)_7-CO-O-(CH_2)_2-$ are more preferable, and $-(CH_2)_2-O-CO-(CH_2)_2-CO-O-(CH_2)_2-$ is particularly preferable.

The group represented by the general formula (VI-21-4) includes specifically, for example, $-CH_2-NHCO-CH_2-$, $-(CH_2)_2-NHCO-(CH_2)_2-$, $-(CH_2)_3-NHCO-(CH_2)_3-$, $-(CH_2)_4-NHCO-(CH_2)_4-$, $-CH_2-CONH-CH_2-$, $-CONH-(CH_2)_2-$, $-(CH_2)_3-CONH-(CH_2)_3-$, $-(CH_2)_4-CONH-(CH_2)_4-$, $-CH_2-NHCONH-CH_2-$, $-(CH_2)_2-NHCONH-(CH_2)_2-$, $-(CH_2)_3-NHCONH-(CH_2)_3-$, $-(CH_2)_4-NHCONH-(CH_2)_4-$, $-(CH_2)_5-NHCONH-(CH_2)_5-$, $-(CH_2)_6-NHCONH-(CH_2)_6-$, $-(CH_2)_7-NHCONH-(CH_2)_7-$, $-(CH_2)_8-NHCONH-(CH_2)_8-$, $-(CH_2)_9-NHCONH-(CH_2)_9-$, $-(CH_2)_{10}-NHCONH-(CH_2)_{10}-$, and the like.

Among them, $-CH_2-NHCONH-CH_2-$, $-(CH_2)_2-NHCONH-(CH_2)_2-$, $-(CH_2)_3-NHCONH-(CH_2)_3-$, $-(CH_2)_4-NHCONH-(CH_2)_4-$, $-(CH_2)_5-NHCONH-(CH_2)_5-$, $-(CH_2)_6-NHCONH-(CH_2)_6-$, $-(CH_2)_7-NHCONH-(CH_2)_7-$, $-(CH_2)_8-NHCONH-(CH_2)_8-$, $-(CH_2)_9-NHCONH-(CH_2)_9-$ and $-(CH_2)_{10}-NHCONH-(CH_2)_{10}-$ are preferable, and $-(CH_2)_2-NHCONH-(CH_2)_2-$ is more preferable.

The group represented by the general formula (VI-21-5) includes specifically, for example, $-CH_2-O-CONH-CH_2-$, $-(CH_2)_2-O-CONH-(CH_2)_2-$, $-(CH_2)_3-O-CONH-(CH_2)_3-$, $-(CH_2)_4-O-CONH-(CH_2)_4-$, and the like.

"An alkylene group having 1 to 21 carbon atoms which has at least one group selected from —O—, —OCO—, —COO—, —NHCO—, —CONH—, —NHCONH— and an arylene group in the chain, and also has a hydroxy group as a substituent", in $A_{602}$ of the general formula (VI), includes, for example, groups represented by the following general formulae (VI-22-1) to (VI-22-2), and the like.

$$-R_{654}-(CH_2)_{h610}- \qquad (VI\text{-}22\text{-}1)$$

(wherein $R_{654}$ represents an arylene group having 6 to 10 carbon atoms which has a hydroxy group as a substituent; $h_{610}$ represents an integer of 1 to 4.)

$$-R_{655}\text{-}A_{606}\text{-}(CH_2)_{h611}- \qquad (VI\text{-}22\text{-}2)$$

(wherein $R_{655}$ represents an alkylene group having 1 to 7 carbon atoms which has a hydroxy group as a substituent, or an arylene group having 6 to 10 carbon atoms which has a hydroxy group as a substituent; $A_{606}$ represents —O—, —OCO—, —COO—, —NHCO—, —CONH— or —NHCONH—; $h_{611}$ represents an integer of 2 to 4.)

The arylene group having 6 to 10 carbon atoms which has a hydroxy group as a substituent, in $R_{654}$ of the general formula (VI-22-1), includes a hydroxyphenylene group, a dihydroxyphenylene group, a hydroxynaphthylene group, a dihydroxynaphthylene group, and the like.

The alkylene group having 1 to 7 carbon atoms which has a hydroxy group as a substituent, in $R_{655}$ of the general formula (VI-22-2), includes a hydroxymethylene group, a hydroxyethylene group, a hydroxytrimethylene group, a hydroxytetramethylene group, a hydroxypentamethylene group, a hydroxyhexamethylene group, a hydroxyheptylene group, a hydroxycyclobutylene group, a hydroxycyclopentylene group, a hydroxycyclohexylene group, a hydroxycycloheptylene group, and the like.

The arylene group having 6 to 10 carbon atoms which has a hydroxy group as a substituent, in $R_{655}$ of the general formulae (VI-22-2), includes the same one as the arylene group having 6 to 10 carbon atoms which has a hydroxy group as a substituent, in $R_{654}$ of the general formulae (VI-22-1).

Preferable specific examples of the group represented by the general formula (VI-22-1) include, for example, $-C_6H_3(OH)-CH_2-$, $-C_6H_3(OH)-(CH_2)_2-$, $-C_6H_3(OH)-(CH_2)_3-$, $-C_6H_3(OH)-(CH_2)_4-$, $-C_6H_2(OH)_2-CH_2-$, $-C_6H_2(OH)_2-(CH_2)_2-$, $-C_6H_2(OH)_2-(CH_2)_3-$, $-C_6H_2(OH)_2-(CH_2)_4-$, and the like.

Preferable specific examples of the group represented by the general formula (VI-22-2) include, for example, $-CH(OH)-CH_2-O-(CH_2)_2-$, $-CH(OH)-CH_2-O-(CH_2)_3-$, $-CH(OH)-CH_2-O-(CH_2)_4-$, $-CH(OH)-CH_2-OCO-(CH_2)_2-$, $-CH(OH)-CH_2-OCO-(CH_2)_3-$, $-CH(OH)-CH_2-OCO-(CH_2)_4-$, $-CH(OH)-CH_2-COO-(CH_2)_2-$, $-CH(OH)-CH_2-COO-(CH_2)_3-$, $-CH(OH)-CH_2-COO-(CH_2)_4-$, $-CH(OH)-CH_2-NHCO-(CH_2)_2-$, $-CH(OH)-CH_2-NHCO-(CH_2)_3-$, $-CH(OH)-CH_2-NHCO-(CH_2)_4-$, $-CH(OH)-CH_2-CONH-(CH_2)_2-$, $-CH(OH)-CH_2-CONH-(CH_2)_3-$, $-CH(OH)-CH_2-CONH-(CH_2)_4-$, $-CH(OH)-CH_2-NHCONH-$ $(CH_2)_2$—, —CH(OH)—$CH_2$—NHCONH—$(CH_2)_3$—, —CH(OH)—$CH_2$—NHCONH—$(CH_2)_4$—, and the like.

"An alkylene group having 1 to 21 carbon atoms which has a hydroxy group as a substituent", in $A_{602}$ of the general formulae (VI) includes, for example, a group represented by the following general formula (VI-23-1), and the like.

$$-R_{656}-(CH_2)_{h612}- \quad (VI\text{-}23\text{-}1)$$

(wherein $R_{656}$ represents an alkylene group having 1 to 7 carbon atoms which has a hydroxy group as a substituent; $h_{612}$ represents an integer of 1 to 4.)

The alkylene group having 1 to 7 carbon atoms which has a hydroxy group as a substituent, in $R_{656}$ of the general formula (VI-23-1), includes the same one as the alkylene group having 1 to 7 carbon atoms which has a hydroxy group as a substituent, in $R_{655}$ of the general formula (VI-22-2).

The group represented by the general formula (VI-23-1) includes specifically, for example, —$C_6H_9(OH)$—$CH_2$—, —$C_6H_9(OH)$—$(CH_2)_2$—, —$C_6H_9(OH)$—$(CH_2)_3$—, —$C_6H_9(OH)$—$(CH_2)_4$—, —CH(OH)—$CH_2$—, —CH(OH)—$(CH_2)_2$—, —CH(OH)—$(CH_2)_3$—, —CH(OH)—$(CH_2)_4$—, and the like.

In the case where $A_{601}$ in the general formula (VI) is —O—, $A_{602}$ in the general formula (VI) is preferably the alkylene group having 1 to 21 carbon atoms.

Among them, a methylene group, an ethylene group, a trimethylene group, a tetramethylene group, a pentamethylene group, a hexamethylene group, and the like, are preferable, the methylene group, the ethylene group and the trimethylene group are more preferable, and the ethylene group is particularly preferable.

In the case where $A_{601}$ in the general formula (VI) is the group represented by the general formula (VI-21), $A_2$ in the general formula (VI) is preferably the alkylene group having 1 to 21 carbon atoms, which has at least one group selected from —O—, —OCO—, —COO—, —NHCO—, —CONH—, —NHCONH— and an arylene group in the chain.

Among them, the groups represented by the general formulae (VI-21-3) and (VI-21-4) are preferable, and more specifically, —$CH_2$—O—CO—$CH_2$—CO—O—$CH_2$—, —$CH_2$—O—CO—$(CH_2)_2$—CO—O—$CH_2$—, —$CH_2$—O—CO—$(CH_2)_3$—CO—O—$CH_2$—, —$CH_2$—O—CO—$(CH_2)_4$—CO—O—$CH_2$—, —$CH_2$—O—CO—$(CH_2)_5$—CO—O—$CH_2$—, —$CH_2$—O—CO—$(CH_2)_6$—CO—O—$CH_2$—, —$CH_2$—O—CO—$(CH_2)_7$—CO—O—$CH_2$—, —$(CH_2)_2$—O—CO—$CH_2$—CO—O—$(CH_2)_2$—, —$(CH_2)_2$—O—CO—$(CH_2)_2$—CO—O—$(CH_2)_2$—, —$(CH_2)_2$—O—CO—$(CH_2)_3$—CO—O—$(CH_2)_2$—, —$(CH_2)_2$—O—CO—$(CH_2)_4$—CO—O—$(CH_2)_2$—, —$(CH_2)_2$—O—CO—$(CH_2)_5$—CO—O—$(CH_2)_2$—, —$(CH_2)_2$—O—CO—$(CH_2)_6$—CO—O—$(CH_2)_2$—, —$(CH_2)_2$—O—CO—$(CH_2)_7$—CO—O—$(CH_2)_2$—, —$(CH_2)_3$—O—CO—$CH_2$—CO—O—$(CH_2)_3$—, —$(CH_2)_3$—O—CO—$(CH_2)_2$—CO—O—$(CH_2)_3$—, —$(CH_2)_3$—O—CO—$(CH_2)_3$—CO—O—$(CH_2)_3$—, —$(CH_2)_3$—O—CO—$(CH_2)_4$—CO—O—$(CH_2)_3$—, —$(CH_2)_3$—O—CO—$(CH_2)_5$—CO—O—$(CH_2)_3$—, —$(CH_2)_3$—O—CO—$(CH_2)_6$—CO—O—$(CH_2)_3$—, —$(CH_2)_3$—O—CO—$(CH_2)_7$—CO—O—$(CH_2)_3$—, —$CH_2$—NHCONH—$CH_2$—, —$(CH_2)_2$—NHCONH—$(CH_2)_2$—, —$(CH_2)_3$—NHCONH—$(CH_2)_3$—, —$(CH_2)_4$—NHCONH—$(CH_2)_4$—, —$(CH_2)_5$—NHCONH—$(CH_2)_5$—, —$(CH_2)_6$—NHCONH—$(CH_2)_6$—, —$(CH_2)_7$—NHCONH—$(CH_2)_7$—, —$(CH_2)_8$—NHCONH—$(CH_2)_8$—, —$(CH_2)_9$—NHCONH—$(CH_2)_9$—, and —$(CH_2)_{10}$—NHCONH—$(CH_2)_{10}$— are preferable, and —$(CH_2)_2$—O—CO—$CH_2$—CO—O—$(CH_2)_2$—, —$(CH_2)_2$—O—CO—$(CH_2)_2$—CO—O—$(CH_2)_2$—, —$(CH_2)_2$—O—CO—$(CH_2)_3$—CO—O—$(CH_2)_2$—, —$(CH_2)_2$—O—CO—$(CH_2)_4$—CO—O—$(CH_2)_2$—, —$(CH_2)_2$—O—CO—$(CH_2)_5$—CO—O—$(CH_2)_2$—, —$(CH_2)_2$—O—CO—$(CH_2)_6$—CO—O—$(CH_2)_2$—, —$(CH_2)_2$—O—CO—$(CH_2)_7$—CO—O—$(CH_2)_2$—, —$CH_2$—NHCONH—$CH_2$—, —$(CH_2)_2$—NHCONH—$(CH_2)_2$—, —$(CH_2)_3$—NHCONH—$(CH_2)_3$—, —$(CH_2)_4$—NHCONH—$(CH_2)_4$—, —$(CH_2)_5$—NHCONH—$(CH_2)_5$—, —$(CH_2)_6$—NHCONH—$(CH_2)_6$—, —$(CH_2)_7$—NHCONH—$(CH_2)_7$—, —$(CH_2)_8$—NHCONH—$(CH_2)_8$—, —$(CH_2)_9$—NHCONH—$(CH_2)_9$— and —$(CH_2)_{10}$—NHCONH—$(CH_2)_{10}$— are more preferable, and —$(CH_2)_2$—O—CO—$(CH_2)_2$—CO—O—$(CH_2)_2$— and —$(CH_2)_2$—NHCONH—$(CH_2)_2$— are particularly preferable.

The alkyl group having 1 to 12 carbon atoms, in $R_{610}$ in $A_{603}$ of the general formula (VI), includes the same one as the alkyl group having 1 to 12 carbon atoms, in $R_{608}$ and $R_{609}$ of the general formula (VI-21), and the preferable one is also the same.

As $R_{610}$ in $A_{603}$ of the general formula (VI), a hydrogen atom, a methyl group, an ethyl group, a propyl group and an isopropyl group are preferable, and the hydrogen atom is more preferable.

In addition, as $A_{603}$ in the general formula (VI), —O— is preferable.

The halogen atom in $R_{605}$ of the general formula (VI) includes, for example, a fluorine atom, a chlorine atom, a bromine atom, an iodine atom, and the like, and among them, the fluorine atom is preferable.

The alkyl group having 1 to 20 carbon atoms, in $R_{605}$ of the general formula (VI), may be any of the linear, branched or cyclic one, and among them, the linear or branched one is preferable. In addition, among the alkyl group having 1 to 20 carbon atoms, the one having 1 to 12 carbon atoms is preferable, the one having 1 to 6 carbon atoms is more preferable, and the one having 1 to 3 carbon atoms is particularly preferable.

It specifically includes, for example, a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, an n-heptyl group, an isoheptyl group, a sec-heptyl group, a tert-heptyl group, a neoheptyl group, a cycloheptyl group, an n-octyl group, an isooctyl group, a sec-octyl group, a tert-octyl group, a neooctyl group, a 2-ethylhexyl group, a cyclooctyl group, an n-nonyl group, an isononyl group, a sec-nonyl group, a tert-nonyl group, a neononyl group, a cyclononyl group, an n-decyl group, an isodecyl group, a sec-decyl group, a tert-decyl group, a neodecyl group, a cyclodecyl group, an n-undecyl group, a cycloundecyl group, an n-dodecyl group, a cyclododecyl group, an n-tridecyl group, an isotridecyl group, an n-tetradecyl group, an isotetradecyl group, an n-pentadecyl group, an isopentadecyl group, an n-hexadecyl group, an isohexadecyl group, an n-heptadecyl group, an isoheptadecyl group, an n-octadecyl group, an isooctadecyl group, an n-nonadecyl group, an isononadecyl group, an n-eicosyl group, an isoeicosyl group, a cyclohexylmethyl group, a 1-cyclohexylethyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 1-adamantyl group, a 2-adamantyl group, and the like; and the methyl group, the ethyl group, the n-propyl group, the isopropyl group, the n-butyl group, the isobutyl group, the sec-butyl group, the tert-butyl group, the cyclobutyl group, the n-pentyl group, the isopentyl group, the sec-pentyl group, the tert-pentyl group, the neopentyl group, the 2-methylbutyl group, the 1,2-dimethylpropyl group, the 1-ethylpropyl group, the cyclopentyl group, the n-hexyl group, the isohexyl group, the sec-hexyl group, the tert-hexyl group, the neohexyl group, the 2-methylpentyl group, the 1,2-dimethylbutyl group, the 2,3-dimethylbutyl group, the 1-ethylbutyl group and the cyclohexyl group are preferable; and the methyl group, the ethyl group, the n-propyl group and the isopropyl group are more preferable.

The alkoxy group having 1 to 20 carbon atoms, in $R_{605}$ of the general formula (VI), may be any of the linear, branched or cyclic one, and among them, the linear or branched one is preferable. In addition, among the alkoxy group having 1 to 20 carbon atoms, the one having 1 to 12 carbon atoms is preferable, the one having 1 to 6 carbon atoms is more preferable, and the one having 1 to 3 carbon atoms is particularly preferable. It specifically includes, for example, a methoxy group, an ethoxy group, an n-propoxy group, an isopropoxy group, an n-butoxy group, an isobutoxy group, a sec-butoxy group, a tert-butoxy group, a cyclobutoxy group, an n-pentyloxy group, an isopentyloxy group, a sec-pentyloxy group, a tert-pentyloxy group, a neopentyloxy group, a 2-methylbutoxy group, a 1,2-dimethylpropoxy group, a 1-ethylpropoxy group, a cyclopentyloxy group, an n-hexyloxy group, an isohexyloxy group, a sec-hexyloxy group, a tert-hexyloxy group, a neohexyloxy group, a 2-methylpentyloxy group, a 1,2-dimethylbutoxy group, a 2,3-dimethylbutoxy group, a 1-ethylbutoxy group, a cyclohexyloxy group, an n-heptyloxy group, an isoheptyloxy group, a sec-heptyloxy group, a tert-heptyloxy group, a neoheptyloxy group, a cycloheptyloxy group, an n-octyloxy group, an isooctyloxy group, a sec-octyloxy group, a tert-octyloxy group, a neooctyloxy group, a 2-ethylhexyloxy group, a cyclooctyloxy group, an n-nonyloxy group, an isononyloxy group, a sec-nonyloxy group, a tert-nonyloxy group, a neononyloxy group, a cyclononyloxy group, an n-decyloxy group, an isodecyloxy group, a sec-decyloxy group, a tert-decyloxy group, a neodecyloxy group, a cyclodecyloxy group, an n-undecyloxy group, a cycloundecyloxy group, an n-dodecyloxy group, a cyclododecyloxy group, an n-tridecyloxy group, an isotridecyloxy group, an n-tetradecyloxy group, an isotetradecyloxy group, an n-pentadecyloxy group, an isopentadecyloxy group, an n-hexadecyloxy group, an isohexadecyloxy group, an n-heptadecyloxy group, an isoheptadecyloxy group, an n-octadecyloxy group, an isooctadecyloxy group, an n-nonadecyloxy group, an isononadecyloxy group, an n-eicosyloxy group, an isoeicosyloxy group, and the like; and the methoxy group, the ethoxy group, the n-propoxy group, the isopropoxy group, the n-butoxy group, the isobutoxy group, the sec-butoxy group, the tert-butoxy group, the cyclobutoxy group, the n-pentyloxy group, the isopentyloxy group, the sec-pentyloxy group, the tert-pentyloxy group, the neopentyloxy group, the 2-methylbutoxy group, the 1,2-dimethylpropoxy group, the 1-ethylpropoxy group, the cyclopentyloxy group, the n-hexyloxy group, the isohexyloxy group, the sec-hexyloxy group, the tert-hexyloxy group, the neohexyloxy group, the 2-methylpentyloxy group, the 1,2-dimethylbutoxy group, the 2,3-dimethylbutoxy group, the 1-ethylbutoxy group and the cyclohexyloxy group are preferable; and the methoxy group, the ethoxy group, the n-propoxy group and the isopropoxy group is more preferable.

The alkylthio group having 1 to 20 carbon atoms, in $R_{605}$ of the general formula (VI), may be any of the linear, branched or cyclic one, and among them, the linear or branched one is preferable. In addition, among the alkylthio group having 1 to 20 carbon atoms, the one having 1 to 12 carbon atoms is preferable, the one having 1 to 6 carbon atoms is more preferable, and the one having 1 to 3 carbon atoms is particularly preferable.

It specifically includes, for example, a methylthio group, an ethylthio group, an n-propylthio group, an isopropylthio group, an n-butylthio group, an isobutylthio group, a sec-butylthio group, a tert-butylthio group, a cyclobutylthio group, an n-pentylthio group, an isopentylthio group, a sec-pentylthio group, a tert-pentylthio group, a neopentylthio group, a 2-methylbutylthio group, a 1,2-dimethylpropylthio group, a 1-ethylpropylthio group, a cyclopentylthio group, an n-hexylthio group, an isohexylthio group, a sec-hexylthio group, a tert-hexylthio group, a neohexylthio group, a 2-methylpentylthio group, a 1,2-dimethylbutylthio group, a 2,3-dimethylbutylthio group, a 1-ethylbutylthio group, a cyclohexylthio group, an n-heptylthio group, an isoheptylthio group, a sec-heptylthio group, a tert-heptylthio group, a neoheptylthio group, a cycloheptylthio group, an n-octylthio group, an isooctylthio group, a sec-octylthio group, a tert-octylthio group, a neooctylthio group, a 2-ethylhexylthio group, a cyclooctylthio group, an n-nonylthio group, an isononylthio group, a sec-nonylthio group, a tert-nonylthio group, a neononylthio group, a cyclononylthio group, an n-decylthio group, an isodecylthio group, a sec-decylthio group, a tert-decylthio group, a neodecylthio group, a cyclodecylthio group, an n-undecylthio group, a cycloundecylthio group, an n-dodecylthio group, a cyclododecylthio group, an n-tridecylthio group, an isotridecylthio group, an n-tetradecylthio group, an isotetradecylthio group, an n-pentadecylthio group, an isopentadecylthio group, an n-hexadecylthio group, an isohexadecylthio group, an n-heptadecylthio group, an isoheptadecylthio group, an n-octadecylthio group, an isooctadecylthio group, an n-nonadecylthio group, an isononadecylthio group, an n-eicosylthio group, an isoeicosylthio group, and the like; and the methylthio group, the ethylthio group, the n-propylthio group, the isopropylthio group, the n-butylthio group, the isobutylthio group, the sec-butylthio group, the tert-butylthio group, the cyclobutylthio group, the n-pentylthio group, the isopentylthio group, the sec-pentylthio group, the tert-pentylthio group, the neopentylthio group, the 2-methylbutylthio group, the 1,2-dimethylpropylthio group, the 1-ethylpropylthio group, the cyclopentylthio group, the n-hexylthio group, the isohexylthio group, the sec-hexylthio group, the tert-hexylthio group, the neohexylthio group, the 2-methylpentylthio group, the 1,2-dimethylbutylthio group, the 2,3-dimethylbutylthio group, the 1-ethylbutylthio group and the cyclohexylthio group are preferable, and the methylthio group, the ethylthio group, the n-propylthio group and the isopropylthio group are more preferable.

The amino group having the substituent, in $R_{605}$ of the general formula (VI), has one to two pieces, preferably two pieces of substituents. The substituent includes, for example, a halogen atom, an alkyl group having 1 to 20 carbon atoms, an arylalkyl group having 7 to 13 carbon atoms, and the like.

The halogen atom in the substituent of the amino group having the substituent, in $R_{605}$ of the general formula (VI), includes, for example, a fluorine atom, a chlorine atom, a bromine atom, an iodine atom, and the like, and among them, the fluorine atom is preferable.

The alkyl group having 1 to 20 carbon atoms in the substituent of the amino group having the substituent, in $R_{605}$ of the general formula (VI), includes the same one as the alkyl group having 1 to 20 carbon atoms, in $R_{605}$ of the general formula (VI), and the preferable one is also the same.

The arylalkyl group having 7 to 13 carbon atoms in the substituent of the amino group having the substituent, in $R_{605}$ of the general formula (VI), is preferably a phenylalkyl group having 7 to 9 carbon atoms. It specifically includes, for example, a benzyl group, a phenylethyl group, a phenylpropyl group, a naphthylmethyl group, a naphthylethyl group, a naphthylpropyl group, and the like; and the benzyl group, the phenylethyl group and the phenylpropyl group are preferable, and the benzyl group is more preferable.

The amino group having the substituent, in $R_{605}$ of the general formula (VI), is preferably the amino group which has the arylalkyl group having 7 to 13 carbon atoms, and more preferably the amino group which has the arylalkyl group having 7 to 9 carbon atoms. It specifically includes, for example, a benzylamino group, a phenylethylamino group, a phenylpropylamino group, a dibenzylamino group, a bis(phenylethyl)amino group, a bis(phenylpropyl)amino group, and the like; and the dibenzylamino group is preferable.

$R_{605}$ of the general formula (VI) is preferably a halogen atom, an alkyl group having 1 to 20 carbon atoms, and an amino group having a substituent; and a halogen atom, an alkyl group having 1 to 12 carbon atoms, and the amino group having an arylalkyl group having 7 to 13 carbon atoms are more preferable; and a halogen atom, an alkyl group having 1 to 6 carbon atoms, and an amino group having a phenylalkyl group having 7 to 9 carbon atoms are further preferable. It specifically includes a fluorine atom, a methyl group, an ethyl group, an n-propyl group, an isopropyl group, an n-butyl group, an isobutyl group, a sec-butyl group, a tert-butyl group, a dibenzylamino group, and the like, are more preferable, and the fluorine atom, the methyl group, the ethyl group and the dibenzylamino group are particularly preferable.

$Y_{601}$ in the general formula (1) is preferably an oxygen atom, —$NR_{632}$—, —$BR_{633}$— and —$Si(R_{634})_2$—; more preferably the oxygen atom, —$BR_{633}$— and —$Si(R_{634})_2$—; further preferably the oxygen atom and —$Si(R_{634})_2$—; and particularly preferably the oxygen atom. It specifically includes, for example, an oxygen atom, an sulfur atom, —$NCH_3$—, —$NC_2H_5$—, —$NC_3H_7$—, —$BCH_3$—, —$BC_2H_5$—, —$BC_3H_7$—, —$Si(CH_3)_2$—, —$Si(C_2H_5)_2$—, —$Si(C_3H_7)_2$—, and the like; and the oxygen atom, the sulfur atom, —$NCH_3$—, —$BCH_3$— and —$Si(CH_3)_2$— are preferable; the oxygen atom, —$NCH_3$—, —$BCH_3$— and —$Si(CH_3)_2$— are more preferable; the oxygen atom, —$BCH_3$— and —$Si(CH_3)_2$— are further preferable; and the oxygen atom is particularly preferable.

$R_{601}$ and $R_{604}$ of the general formula (VI-1-1) are preferably a hydrogen atom.

The alkyl group having 1 to 20 carbon atoms, in $R_{602}$ and $R_{603}$ of the general formula (VI-1-1), includes the same one as the alkyl group having 1 to 20 carbon atoms, in $R_{605}$ of the general formula (VI-1), and the preferable one is also the same.

The alkylene group having 2 to 4 carbon atoms in the case where "an alkylene group having 2 to 4 carbon atoms is formed together with $R_{601}$ and $R_{602}$" and in the case where "an alkylene group having 2 to 4 carbon atoms is formed together with $R_{603}$ and $R_{604}$" may be any of the linear or branched one, and it specifically includes, for example, an ethylene group, a trimethylene group, a propylene group, a tetramethylene group, a 1-methyltrimethylene group, a 2-methyltrimethylene group, a 1,2-dimethylethylene group, a 1,1-dimethylethylene group, an ethylethylene group, and the like, and the ethylene group, the trimethylene group and the tetramethylene group are preferable, and the trimethylene group is more preferable.

Specific examples of the cyclic structure represented by the general formula (VI-1-1), in the case where "$R_{601}$ and $R_{602}$ together form an alkylene group having 2 to 4 carbon atoms", and/or in the case where "$R_{603}$ and $R_{604}$ together form an alkylene group having 2 to 4 carbon atoms", in the general formula (VI-1-1), include, for example, the following ones.

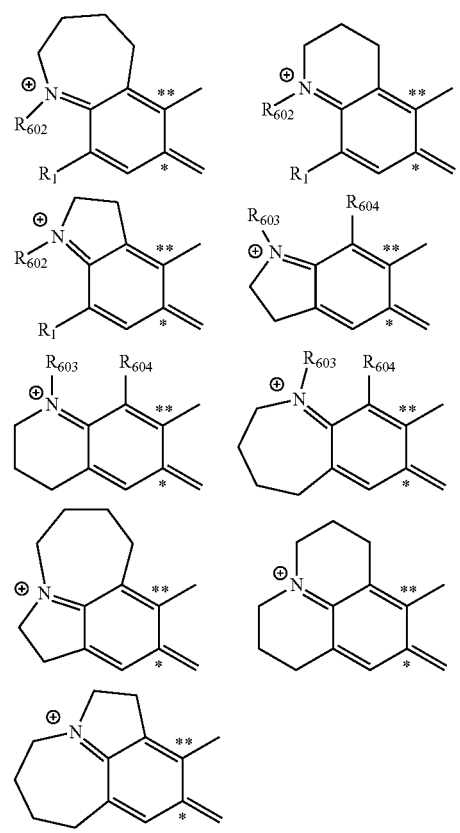

(wherein $R_{601}$ to $R_{604}$, * and ** are the same as described above.)

Among the specific examples, the following ones are preferable.

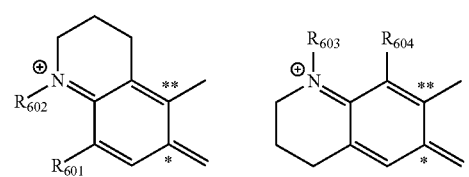

-continued

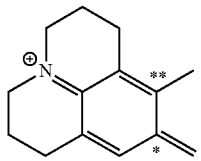

(wherein $R_{601}$ to $R_{604}$, * and ** are the same as described above.)

Among the specific examples, the following one is more preferable.

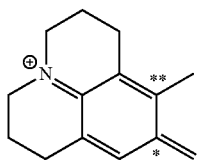

(wherein * and ** are the same as described above.)

The alkyl group having 1 to 20 carbon atoms, in $R_{631}$ of the general formulae (VI-1-2) to (VI-1-7), includes the same one as the alkyl group having 1 to 20 carbon atoms, in $R_{605}$ of the general formula (VI-1), and the preferable one is also the same.

As $Ar_1$ of the general formula (VI-1), the cyclic structure represented by the general formula (VI-1-1) is preferable.

In addition, * and ** in the general formula (VI-1) correspond to * and ** in the general formulae (VI-1-1) to (VI-1-7), and indicate that the groups represented by the general formulae (VI-1-1) to (VI-1-7) are bonded to positions represented by * and ** of the compound represented by the general formula (VI-1). Specifically, they are represented by the following structures.

(VI-1)/(VI-1-1)

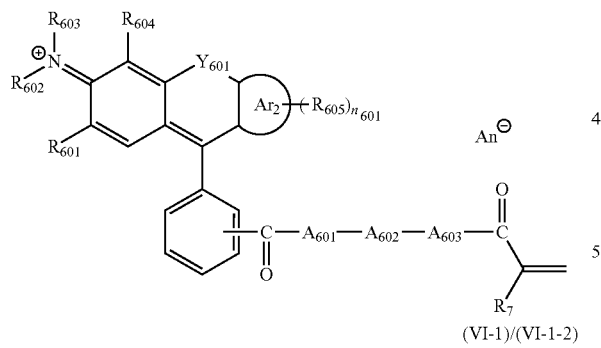

(VI-1)/(VI-1-2)

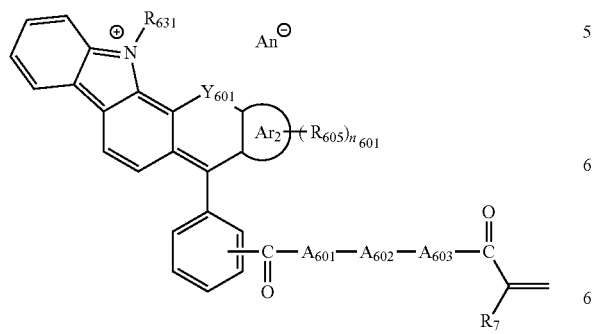

(VI-1)/(VI-1-3)

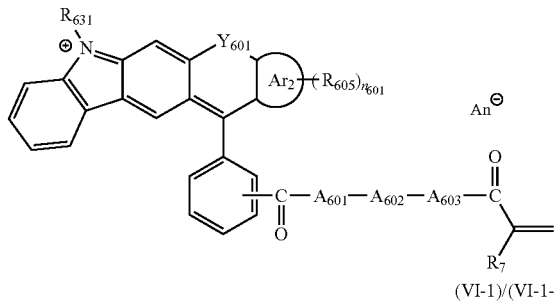

(VI-1)/(VI-1-4)

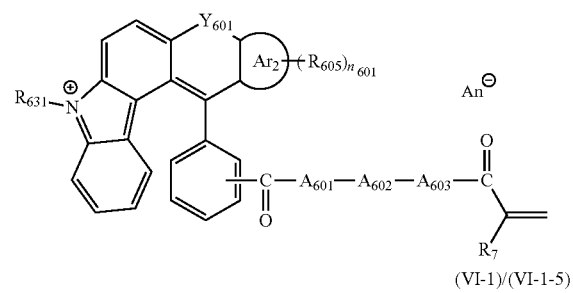

(VI-1)/(VI-1-5)

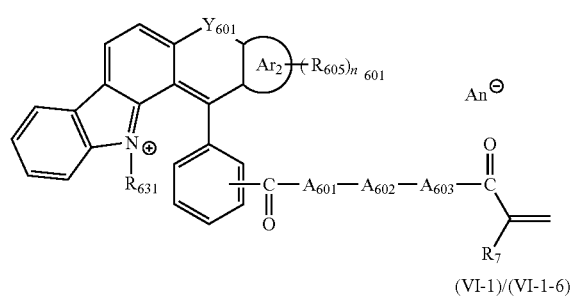

(VI-1)/(VI-1-6)

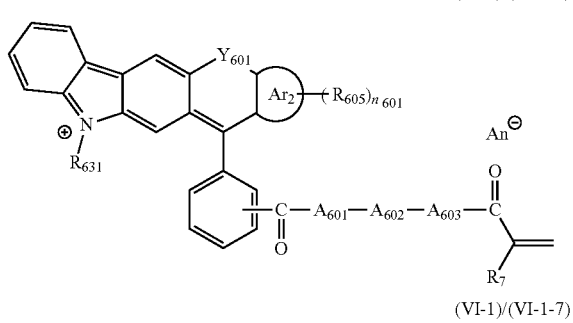

(VI-1)/(VI-1-7)

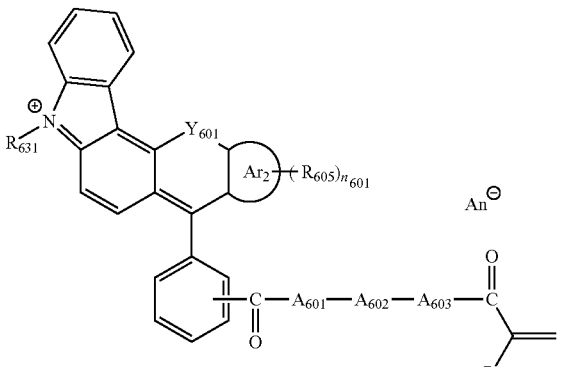

(wherein $R_{601}$ to $R_{606}$, $R_{631}$, $Y_{601}$, $An^-$, $Ar_2$ and $n_{601}$ are the same as described above.)

Ar$_2$ of the general formula (VI-1) is preferably a benzene ring and a naphthalene ring, and the naphthalene ring is more preferable.

In the general formula (VI-1), $n_{601}$ is preferably an integer of 0 to 2, and more preferably 1 or 2, in the case where Ar$_2$ is the benzene ring; and it is preferably 0 or 1, more preferably 0, in the case where Ar$_2$ is the naphthalene ring and the anthracene ring.

In the case where Ar$_2$ of the general formula (VI-1) is the benzene ring, the general formula (VI-1) is represented a compound represented by the following general formula (VI-10-1).

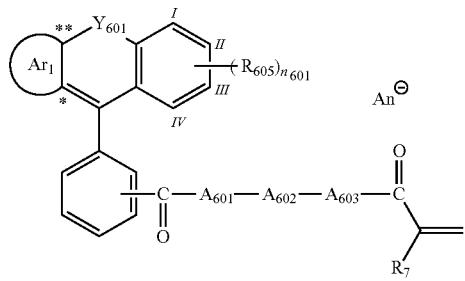

(VI-10-1)

(wherein I to IV represent substitutable positions of $R_{605}$; $R_{605}$, $R_{606}$, $Y_{601}$, An$^-$, Ar$_1$ and $n_{601}$ are the same as described above.)

In the general formula (VI-10-1), $n_{601}$ pieces of $R_{605}$ may be located at any of I to IV positions of the benzene ring; and in the case where $n_{601}$ is 1, it is preferable that $R_{605}$ is located at the III position, and in the case where $n_{601}$ is 2, it is preferable that $R_{605}$ is located at the II position and the IV position.

In the case where Ar$_2$ of the general formula (VI-1) is the naphthalene ring, the general formula (VI-1) is represented by compounds represented by the following general formulae (VI-10-2) to (VI-10-4).

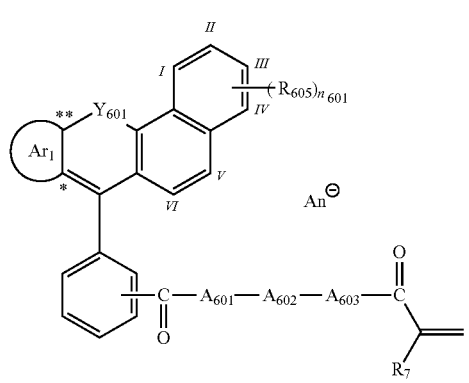

(VI-10-2)

(VI-10-3)

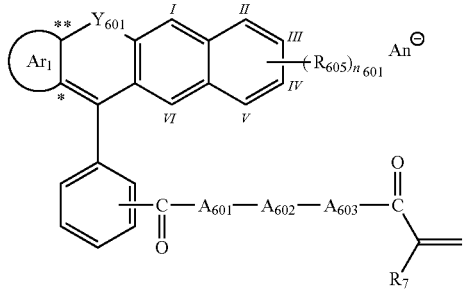

(VI-10-4)

(wherein I to VI represent substitutable positions of $R_{605}$; $R_{605}$, $R_{606}$, $Y_{601}$, An$^-$, Ar$_1$ and $n_{601}$ are the same as described above.)

Positions of $n_{601}$ pieces of $R_{605}$ in the general formula (VI-10-2) may be any of I to VI positions of the naphthalene ring, and it is preferable to be located at IV and VI positions.

In addition, positions of $n_{601}$ pieces of $R_{605}$ in the general formula (VI-10-3) may be any of I to VI positions of the naphthalene ring, and it is preferable to be located at I, IV and V positions.

Further, positions of $n_{601}$ pieces of $R_{605}$ in the general formula (VI-10-4) may be any of I to VI positions of the naphthalene ring, and it is preferable to be located at II and IV positions.

In the case where Ar$_2$ of the general formula (VI-1) is the anthracene ring, the general formula (VI-1) is represented by compounds represented by the following general formulae (VI-10-5) to (VI-10-7).

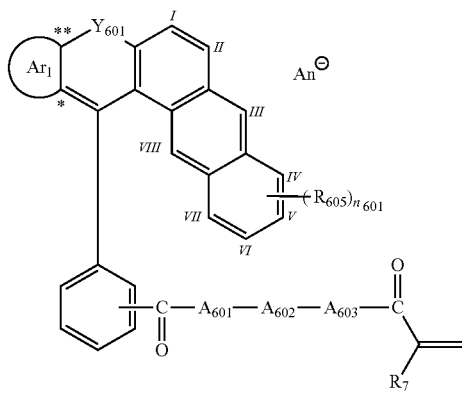

(VI-10-5)

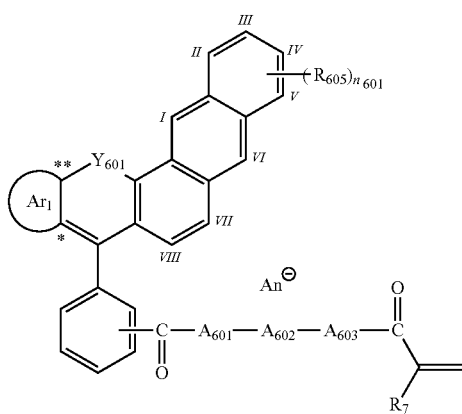

(VI-10-6)

-continued (VI-10-7)

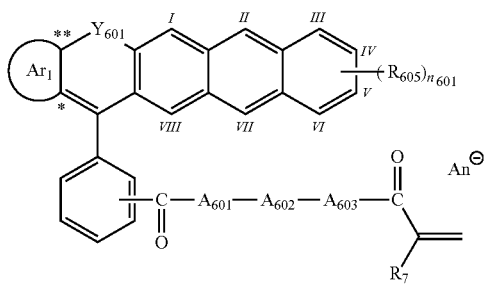

(wherein I to VIII represent substitutable positions of $R_5$; $R_{605}$, $R_{606}$, $Y_{601}$, $An^-$, $Ar_1$ and $n_{601}$ are the same as described above.)

Positions of $n_{601}$ pieces of $R_{605}$ in the general formula (VI-10-5) may be any of I to VI positions of the anthracene ring, and it is preferable to be located at I, V and VI positions.

In addition, positions of $n_{601}$ piece of $R_{605}$s in the general formula (VI-10-6) may be any of I to VI positions of the anthracene ring, and it is preferable to be located at II, V and VII positions.

Further, positions of $n_{601}$ pieces of $R_{605}$ in the general formula (VI-10-7) may be any of I to VI positions of the anthracene ring, and it is preferable to be located at IV and V positions.

Preferable specific examples of the compound represented by the general formula (VI) include compounds represented by the following general formulae (VI-3-2a) to (VI-3-2c), and the compound represented by the general formula (VI-3-2a) is more preferable.

(VI-3-2a)

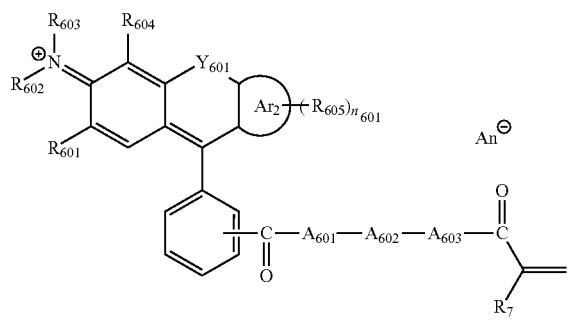

(wherein $R_{601}$ to $R_{605}$, $R_7$, $Y_{601}$, $An^-$, $A_{601}$, $A_{602}$, $A_{603}$, $Ar_2$ and $n_{601}$ are the same as described above.)

(VI-3-2b)

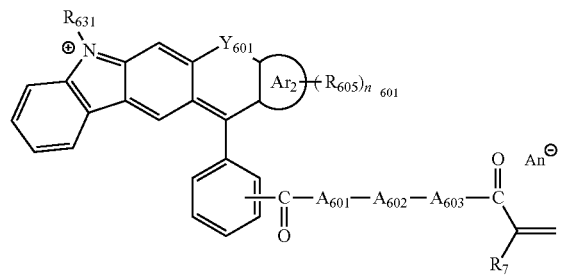

(wherein $R_{605}$, $R_7$, $R_{631}$, $Y_{601}$, $An^-$, $A_{601}$, $A_{602}$, $A_{603}$, $Ar_2$ and $n_{601}$ are the same as described above.)

(VI-3-2c)

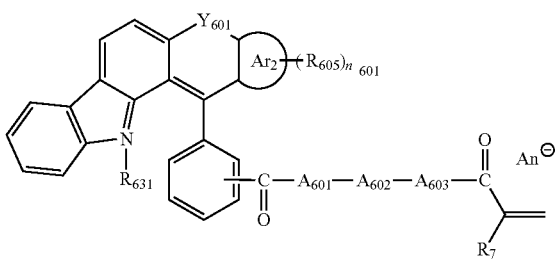

(wherein $R_{605}$, $R_7$, $R_{631}$, $Y_{601}$, $An^-$, $A_{601}$, $A_{602}$, $A_{603}$, $Ar_2$ and $n_{601}$ are the same as described above.)

Preferable specific examples among the compound represented by the general formula (VI-3-2a) include compounds represented by the following general formulae (VI-3-3a) and (VI-3-3b), and the compound represented by the general formula (VI-3-3a) is more preferable.

(VI-3-3a)

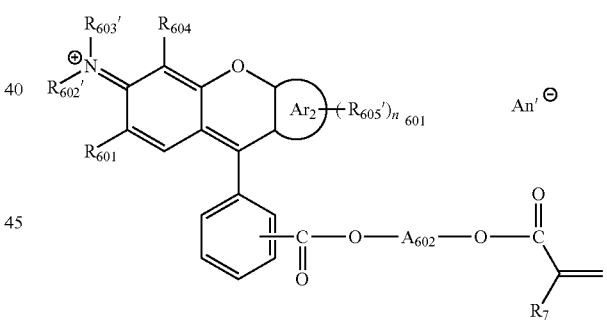

[wherein $R_{602}'$ and $R_{603}'$ represent an alkyl group having 1 to 12 carbon atoms; $R_{601}$ and $R_{602}'$ together may form an alkylene group having 2 to 4 carbon atoms; $R_{603}'$ and $R_{604}$ together may form an alkylene group having 2 to 4 carbon atoms; $R_{605}'$ represents a halogen atom, an alkyl group having 1 to 12 carbon atoms, or an amino group which has an arylalkyl group having 7 to 13 carbon atoms; $An^-$ represents an anion containing an aryl group having a halogeno group, a sulfonyl group having a halogeno group, or a halogenated alkyl group; $R_{601}$, $R_{604}$, $R_7$, $A_{602}$, $Ar_2$ and $n_{601}$ are the same as described above.]

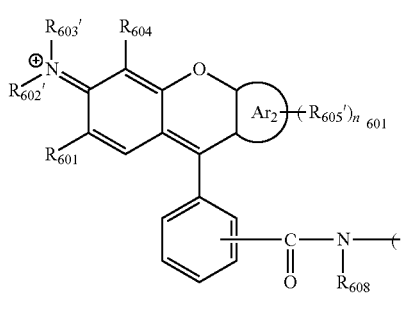

(VI-3-3b)

(wherein $R_{601}$, $R_{602}'$, $R_{603}'$, $R_{604}$, $R_{605}'$, $R_7$, $R_{608}$ to $R_{609}$, $An'^-$, $A_{602}$, $A_{604}$, $Ar_2$ and $n_{601}$ to $n_{602}$ are the same as described above.)

The alkyl group having 1 to 12 carbon atoms, in $R_{602}'$ and $R_{603}'$ of the general formula (VI-3-3a), includes the same one as the alkyl group having 1 to 12 carbon atoms, in $R_{608}$ and $R_{609}$ of the general formula (VI-2-1), and the preferable one is also the same.

The halogen atom, in $R_{605}'$ of the general formula (VI-3-3a), includes a fluorine atom, a chlorine atom, a bromine atom, an iodine atom, and the like, and among them, the fluorine atom is preferable.

In addition, the alkyl group having 1 to 12 carbon atoms, in $R_{605}'$ of the general formula (VI-3-3a), includes the same one as the alkyl group having 1 to 12 carbon atoms, in $R_{608}$ and $R_{609}$ of the general formula (VI-2-1), and the preferable one is also the same.

The arylalkyl group having 7 to 13 carbon atoms of "an amino group which has an arylalkyl group having 7 to 13 carbon atoms", in $R_{605}'$ of the general formula (VI-3-3a), is preferably a phenylalkyl group having 7 to 9 carbon atoms. It specifically includes, for example, a benzyl group, a phenylethyl group, a phenylpropyl group, a naphthylmethyl group, a naphthylethyl group, a naphthylpropyl group, and the like, and the benzyl group, the phenylethyl group and the phenylpropyl group are preferable, and the benzyl group is more preferable.

In addition, the amino group which has an arylalkyl group having 7 to 13 carbon atoms, in $R_{605}'$ of the general formula (VI-3-3a), is preferably a amino group which has a phenylalkyl group having 7 to 9 carbon atoms. It specifically includes, for example, a benzylamino group, a phenylethylamino group, a phenylpropylamino group, a dibenzylamino group, a bis(phenylethyl)amino group, a bis(phenylpropyl)amino group, and the like, and the dibenzylamino group is preferable.

$R_{605}'$ of the general formula (VI-3-3a) is preferably a halogen atom, an alkyl group having 1 to 6 carbon atoms, and an amino group which has a phenylalkyl group having 7 to 9 carbon atoms. Specifically, it is more preferably a fluorine atom, a methyl group, an ethyl group, an n-propyl group, an isopropyl group, an n-butyl group, an isobutyl group, a sec-butyl group, a tert-butyl group and a dibenzylamino group; and particularly preferably, the fluorine atom, the methyl group, the ethyl group and the dibenzylamino group.

The anion containing the aryl group having the halogeno group, the sulfonyl group having the halogeno group, or the halogenated alkyl group, in $An'^-$ of the general formula (VI-3-3a), is the same as $An^-$ of the general formula (II''), and the preferable one is also the same.

Preferable combinations of $R_{601}$, $R_{602}'$, $R_{603}'$, $R_{604}$, $R_{605}'$, $R_7$, $A_{602}$, $Ar_2$ and $n_{601}$ of the general formula (VI-3-3a) include, for example, those described in the following Table 17.

TABLE 17

| $R_{601}$ | $R_{602}'$ | $R_{603}'$ | $R_{604}$ | $R_{605}'$ | $R_7$ | $A_{602}$ | $Ar_2$ | $n_{601}$ |
|---|---|---|---|---|---|---|---|---|
| hydrogen atom | methyl group | methyl group | hydrogen atom | methyl group, ethyl group or n-propyl group | hydrogen atom or methyl group | ethylene group | benzene ring | 1 or 2 |
| | ethyl group | ethyl group | | | | | benzene ring | 1 or 2 |
| | n-propyl group | n-propyl group | | | | | benzene ring | 1 or 2 |
| | isopropyl group | isopropyl group | | | | | benzene ring | 1 or 2 |
| | methyl group | methyl group | | fluorine atom | | | benzene ring | 1 |
| | ethyl group | ethyl group | | | | | benzene ring | 1 |
| | n-propyl group | n-propyl group | | | | | benzene ring | 1 |
| | isopropyl group | isopropyl group | | | | | benzene ring | 1 |
| | methyl group | methyl group | | dibenzylamino group | | | benzene ring | 1 |
| | ethyl group | ethyl group | | | | | benzene ring | 1 |
| | n-propyl group | n-propyl group | | | | | benzene ring | 1 |
| | isopropyl group | isopropyl group | | | | | benzene ring | 1 |
| | methyl group | methyl group | | — | | | naphthalene ring | 0 |
| | ethyl group | ethyl group | | | | | naphthalene ring | 0 |
| | n-propyl group | n-propyl group | | | | | naphthalene ring | 0 |
| | isopropyl group | isopropyl group | | | | | naphthalene ring | 0 |
| | trimethylene group | trimethylene group | | methyl group, ethyl group or n-propyl group | | | benzene ring | 1 or 2 |
| | trimethylene group | trimethylene group | | fluorine atom | | | benzene ring | 1 |
| | trimethylene group | trimethylene group | | dibenzylamino group | | | benzene ring | 1 |
| | trimethylene group | trimethylene group | | — | | | naphthalene ring | 0 |

In the general formula (VI-3-3b), in the case where the cyclic structure of the 5 to 6 membered ring is not formed by $R_{608}$, $R_{609}$ and —N—$(CH_2)_{n602}$-$(A_{604})_{n603}$-, preferable combinations of $R_{601}$, $R_{602}'$, $R_{603}'$, $R_{604}$, $R_{605}'$, $R_7$, $R_{608}$ to $R_{609}$, $A_{602}$, $A_{604}$, $Ar_2$ and $n_{601}$ to $n_{603}$ include, for example, those described in the following Table 18.

It should be noted that formulae (P) and (Q) in the A column represent groups represented by the following general formulae.

$$-(CH_2)_2-O-CO-(CH_2)_2-CO-O-(CH_2)_2- \quad (P)$$

$$-(CH_2)_2-NHCONH-(CH_2)_2- \quad (Q)$$

TABLE 18

| $R_{601}$ | $R_{602}'$ | $R_{603}'$ | $R_{604}$ | $R_{605}'$ | $R_7$ | $R_{608}$ | $R_{609}$ | $A_{604}$ | $A_{602}$ | $Ar_2$ | $n_{601}$ | $n_{602}$ | $n_{603}$ |
|---|---|---|---|---|---|---|---|---|---|---|---|---|---|
| hydrogen atom | methyl group | methyl group | hydrogen atom | methyl group, ethyl group or n-propyl group | hydrogen atom or methyl group | hydrogen atom | — | — | formula (P) or (Q) | benzene ring | 1 or 2 | 0 | 0 |
|  | ethyl group |  ethyl group |  | | | | | | | benzene ring | 1 or 2 | 0 | 0 |
|  | n-propyl group | n-propyl group |  | | | | | | | benzene ring | 1 or 2 | 0 | 0 |
|  | isopropyl group | isopropyl group |  | | | | | | | benzene ring | 1 or 2 | 0 | 0 |
|  | methyl group | methyl group | fluorine atom | | | | | | | benzene ring | 1 | 0 | 0 |
|  | ethyl group | ethyl group | | | | | | | | benzene ring | 1 | 0 | 0 |
|  | n-propyl group | n-propyl group | | | | | | | | benzene ring | 1 | 0 | 0 |
|  | isopropyl group | isopropyl group | | | | | | | | benzene ring | 1 | 0 | 0 |
|  | methyl group | methyl group | dibenzyl-amino group | | | | | | | benzene ring | 1 | 0 | 0 |
|  | ethyl group | ethyl group | | | | | | | | benzene ring | 1 | 0 | 0 |
|  | n-propyl group | n-propyl group | | | | | | | | benzene ring | 1 | 0 | 0 |
|  | isopropyl group | isopropyl group | | | | | | | | benzene ring | 1 | 0 | 0 |
|  | methyl group | methyl group | — | | | | | | | naphthalene ring | 0 | 0 | 0 |
|  | ethyl group | ethyl group | | | | | | | | naphthalene ring | 0 | 0 | 0 |
|  | n-propyl group | n-propyl group | | | | | | | | naphthalene ring | 0 | 0 | 0 |
|  | isopropyl group | isopropyl group | | | | | | | | naphthalene ring | 0 | 0 | 0 |
|  | trimethylene group | trimethylene group | methyl group, ethyl group or n-propyl group | | | | | | | benzene ring | 1 or 2 | 0 | 0 |
|  | trimethylene group | trimethylene group | fluorine atom | | | | | | | benzene ring | 1 | 0 | 0 |
|  | trimethylene group | trimethylene group | dibenzyl-amino group | | | | | | | benzene ring | 1 | 0 | 0 |
|  | trimethylene group | trimethylene group | — | | | | | | | naphthalene ring | 0 | 0 | 0 |

In the general formula (VI-3-3b), in the case where the cyclic structure of the 5 to 6 membered ring is formed by $R_{608}$, $R_{609}$ and —N—$(CH_2)_{n602}$-$(A_{604})_{n603}$-, preferable combinations of $R_{601}$, $R_{602}'$, $R_{603}'$, $R_{604}$, $R_{605}'$, $R_7$, $R_{608}$ to $R_{609}$, $A_{602}$, $A_{604}$, $Ar_2$ and $n_{601}$ to $n_{603}$ include, for example, those described in the following Table 19.

TABLE 19

| $R_{601}$ | $R_{602}'$ | $R_{603}'$ | $R_{604}$ | $R_{605}'$ | $R_7$ | $R_{608}$ | $R_{609}$ | $A_{604}$ | $A_{602}$ | $Ar_2$ | $n_{601}$ | $n_{602}$ | $n_{603}$ |
|---|---|---|---|---|---|---|---|---|---|---|---|---|---|
| hydrogen atom | methyl group | methyl group | hydrogen atom | methyl group, ethyl group or n-propyl group | hydrogen atom or methyl group | trimethylene group | nitrogen atom or formula (2-2) | methyl group, ethyl group or n-propyl group | benzene ring | 1 or 2 | 2 | 1 |
|  | ethyl group | ethyl group | | | | | | | | benzene ring | 1 or 2 | 2 | 1 |
|  | n-propyl group | n-propyl group | | | | | | | | benzene ring | 1 or 2 | 2 | 1 |
|  | isopropyl group | isopropyl group | | | | | | | | benzene ring | 1 or 2 | 2 | 1 |

TABLE 19-continued

| R601 | R602' | R603' | R604 | R605' | R7 | R608 | R609 | A604 | A602 | Ar2 | n601 | n602 | n603 |
|---|---|---|---|---|---|---|---|---|---|---|---|---|---|
| | methyl group | methyl group | | fluorine atom | | | | | | benzene ring | 1 | 2 | 1 |
| | ethyl group | ethyl group | | | | | | | | benzene ring | 1 | 2 | 1 |
| | n-propyl group | n-propyl group | | | | | | | | benzene ring | 1 | 2 | 1 |
| | isopropyl group | isopropyl group | | | | | | | | benzene ring | 1 | 2 | 1 |
| | methyl group | methyl group | | dibenzyl-amino group | | | | | | benzene ring | 1 | 2 | 1 |
| | ethyl group | ethyl group | | | | | | | | benzene ring | 1 | 2 | 1 |
| | n-propyl group | n-propyl group | | | | | | | | benzene ring | 1 | 2 | 1 |
| | isopropyl group | isopropyl group | | | | | | | | benzene ring | 1 | 2 | 1 |
| | methyl group | methyl group | | — | | | | | | naphthalene ring | 0 | 2 | 1 |
| | ethyl group | ethyl group | | | | | | | | naphthalene ring | 0 | 2 | 1 |
| | n-propyl group | n-propyl group | | | | | | | | naphthalene ring | 0 | 2 | 1 |
| | isopropyl group | isopropyl group | | | | | | | | naphthalene ring | 0 | 2 | 1 |
| trimethylene group | | trimethylene group | | methyl group, ethyl group or n-propyl group | | | | | | benzene ring | 1 or 2 | 2 | 1 |
| trimethylene group | | trimethylene group | | fluorine atom | | | | | | benzene ring | 1 | 2 | 1 |
| trimethylene group | | trimethylene group | | dibenzyl-amino group | | | | | | benzene ring | 1 | 2 | 1 |
| trimethylene group | | trimethylene group | | — | | | | | | naphthalene ring | 0 | 2 | 1 |

In addition, An'⁻ to be used together with the combinations in the Table includes the following ones.

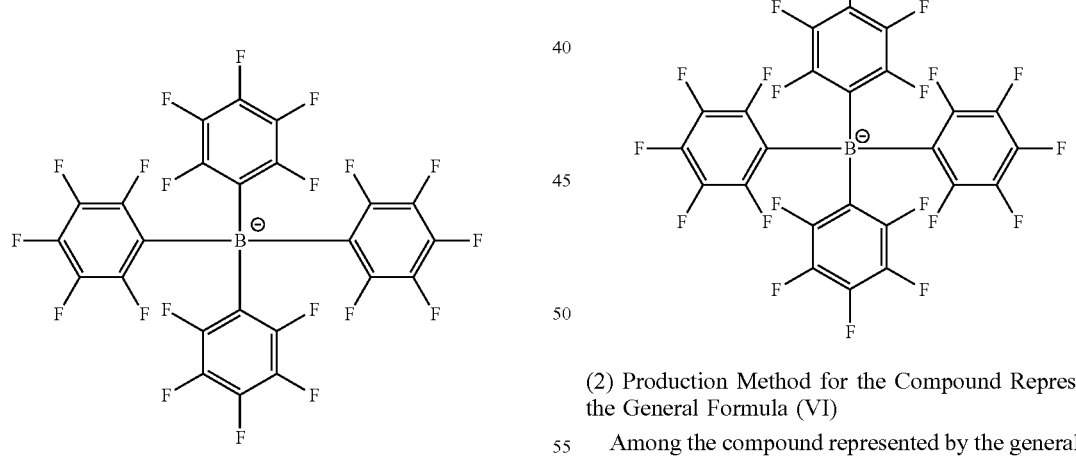

Among the specific examples, the following one is preferable.

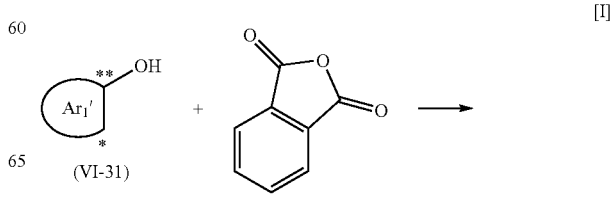

(2) Production Method for the Compound Represented by the General Formula (VI)

Among the compound represented by the general formula (VI), the one, where $Y_1$ is an oxygen atom, can be produced, for example, by a series of methods shown in the following reactions [I] to [IV].

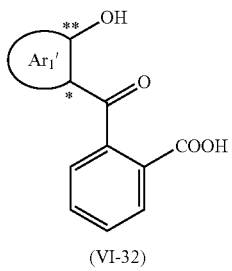

(VI-32)

[wherein Ar$_1$' represents a cyclic structure represented by the following general formula (VI-1-1') and the following formulae (VI-1-2') to (VI-1-7');

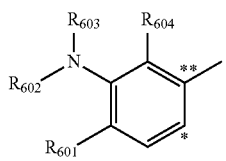

(VI-1-1')

(wherein R$_{601}$ to R$_{604}$ are the same as described above.),

(VI-1-2')

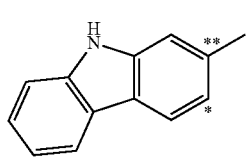

(VI-1-3')

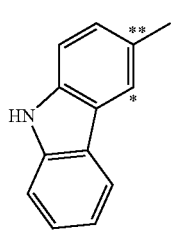

(VI-1-4')

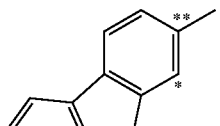

(VI-1-5')

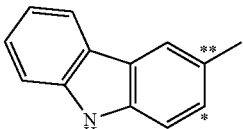

(VI-1-6')

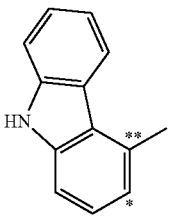

(VI-1-7')

* and ** are the same as described above.].

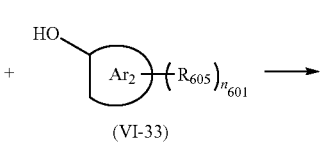

[II]

(VI-32) + (VI-33) → (VI-34)

(wherein n$_{601}$ pieces of R$_{605}$, Ar$_1$', Ar$_2$, n$_{601}$, * and ** are the same as described above.).

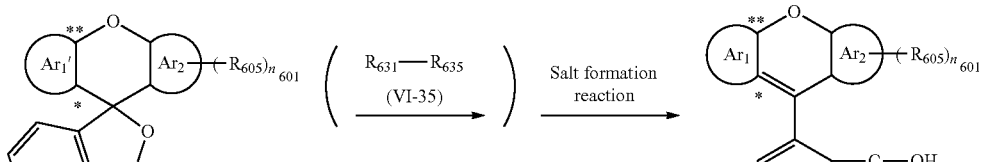

[III]

(VI-34) + R$_{631}$—R$_{635}$ (VI-35) → Salt formation reaction → (VI-36)

(wherein $R_{635}$ represents a halogen atom, a trifluoromethyl sulfonyloxy group, a mesyloxy group (methyl sulfonyloxy group) or a tosyloxy group (p-toluene sulfonyloxy group); $n_{601}$ pieces of $R_{605}$, $R_{631}$, $An^-$, $Ar_1'$, $Ar_2$, $n_{601}$, * and ** are the same as described above.)

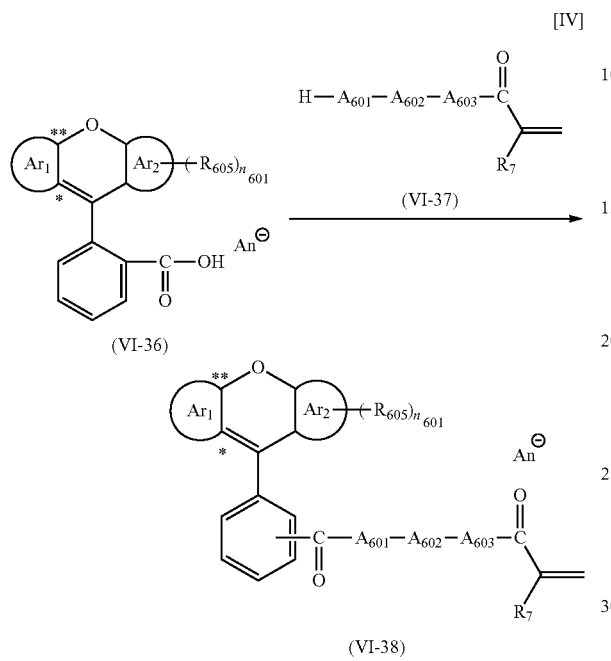

(wherein $n_{601}$ pieces of $R_{605}$, $R_7$, $A_{601}$, $A_{602}$, $A_{603}$, $An^-$, $Ar_1$, $Ar_2$, $n_{601}$, * and ** are the same as described above.).

In the reactions [I] to [IV], firstly by subjecting the compound represented by the general formula (VI-31) and phthalic anhydride to a reaction, the compound represented by the general formula (VI-32) is obtained (the reaction [I]). Next, by subjecting the resulting compound represented by the general formula (VI-32) and the compound represented by the general formula (VI-33) to a reaction, the compound represented by the general formula (VI-34) is obtained (the reaction [II]). Then, after subjecting a reaction between the resulting compound represented by the general formula (VI-34) and the compound represented by the general formula (VI-35) as needed, the salt formation reaction is carried out (the reaction [III]). By subjecting the resulting compound represented by the general formula (VI-36) and the compound represented by the general formula (VI-37) to a reaction, the compound represented by the general formula (VI-38) can be obtained (the reaction [IV]).

As $Ar_1'$ of the general formula (VI-31), the cyclic structure represented by the general formula (VI-1-1') is preferable.

The halogen atom in $R_{635}$ of the general formula (VI-35) includes, for example, a fluorine atom, a chlorine atom, a bromine atom, an iodine atom, and the like, and among them, the iodine atom is preferable.

As $R_{635}$ of the general formula (VI-35), the halogen atom is preferable, and the iodine atom is more preferable.

In the reaction [I], the compound represented by the general formula (VI-31) and phthalic anhydride may be subjected to a reaction in a solvent, usually at 80 to 160° C., preferably at 90 to 120° C., usually for 1 to 24 hours, and preferably for 3 to 10 hours.

The solvent includes the same one as the solvent to be used in the method for subjecting the rhodamine compound represented by the general formula (I-I), and the compound represented by the general formula (I-II) to a reaction, and the preferable one is also the same. They may be used alone, or in combination of two or more kinds thereof as appropriate. Use amount of the reaction solvent is usually 1 to 50 times, and preferably 5 to 10 times, relative to total weight of the compound represented by the general formula (VI-31) and phthalic anhydride.

Use amount of phthalic anhydride is usually 1 to 2 equivalents, and preferably 1 to 1.5 equivalents, relative to mole number of the compound represented by the general formula (IV-31).

Specific examples of the compound represented by the general formula (VI-31) include the following ones.

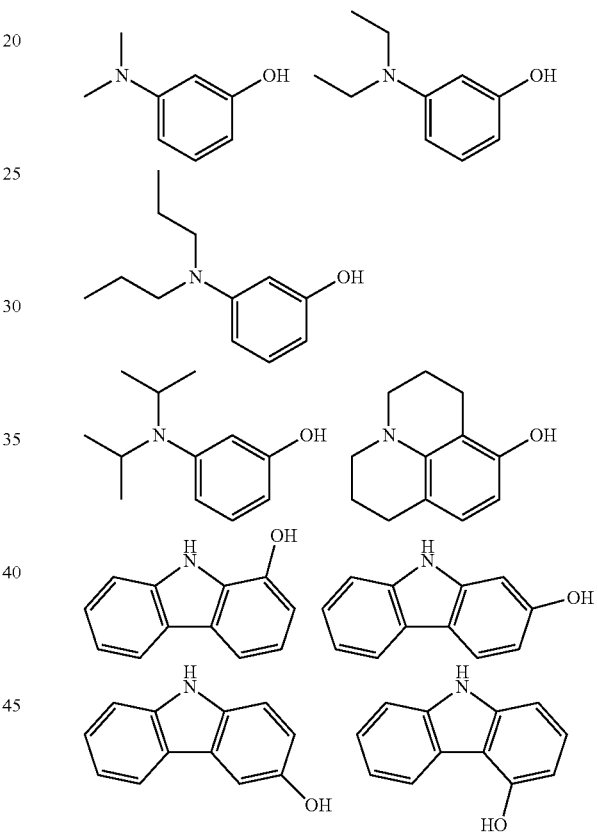

In the reaction [II], the compound represented by the general formula (VI-32) obtained in the reaction [I], and the compound represented by the general formula (VI-33) may be subjected to a reaction, in the presence of an acid catalyst, usually at 70 to 140° C., preferably at 80 to 120° C., usually for 1 to 24 hours, and preferably for 3 to 10 hours.

The acid catalyst includes sulfuric acid, methane sulfonic acid, trifluoromethane sulfonic acid, para-toluene sulfonic acid, camphor sulfonic acid, and the like, and methane sulfonic acid is preferable. Use amount of the acid catalyst is usually 1 to 50 times, preferably 3 to 10 times, relative to total weight of the compound represented by the general formula (VI-32) and the compound represented by the general formula (VI-33).

Use amount of the compound represented by the general formula (VI-33) is usually 1 to 2 equivalents, and preferably 1 to 1.5 equivalents, relative to mole number of the compound represented by the general formula (VI-32).

Specific examples of the compound represented by the general formula (VI-33) include the following ones.

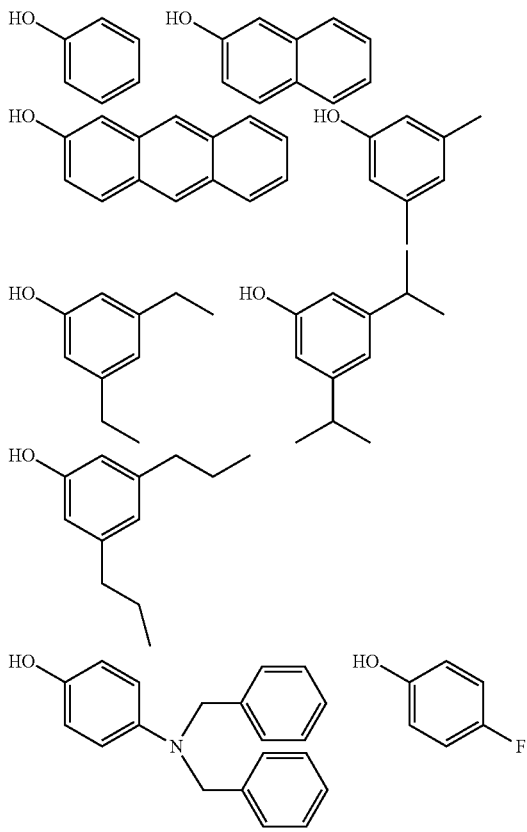

In the reaction [III], (a) in the case where $Ar_1'$ of the compound represented by the general formula (VI-34) is the cyclic structure represented by the general formula (VI-1-1'), the compound represented by the general formula (VI-34) may be subjected to the salt formation reaction, and (b) in the case where $Ar_1'$ of the compound represented by the general formula (VI-34) is the cyclic structure represented by the general formulae (VI-1-2') to (VI-1-7'), after the reaction between the compound represented by the general formula (VI-34) and the compound represented by the general formula (VI-35), the resulting compound may be subjected to the salt formation reaction.

The salt forming reaction in (a) of the reaction [III] is carried out by making a salt of the anion represented by $An^-$ contacted with the compound represented by the general formula (VI-34), in a solvent.

The salt forming reaction is carried out usually at 0 to 80° C., preferably at 10 to 50° C., usually for 1 to 24 hours, and preferably for 2 to 10 hours.

A solvent in the salt forming reaction includes an organic solvent, such as methanol, ethanol, isopropyl alcohol (IPA), tetrahydrofuran(THF), dioxane, N,N-dimethylformamide (DMF), dichloromethane, dichloroethane and ethyl acetate, and among them, ethanol, dichloromethane and ethyl acetate are preferable. They may be used alone, or in combination of two or more kinds thereof as appropriate. Use amount of the reaction solvent is usually 1 to 50 times, and preferably 1 to 15 times, relative to total weight of the compound represented by the general formula (VI-34) and the salt of the anion represented by $An^-$.

The salt of the anion represented by $An^-$ in the salt formation reaction includes a sodium salt, a potassium salt, a lithium salt, and the like, of the anion represented by $An^-$, and the lithium salt is preferable. Use amount of the salt of the anion of the present invention is usually 1 to 2 equivalents, and preferably 1 to 1.5 equivalents, relative to mole number of the compound represented by the general formula (VI-34).

In the salt formation reaction, it is preferable that the compound represented by the general formula (VI-34) and the salt of the anion represented by $An^-$ may be subjected to a reaction in a solvent, in the coexistence with hydrochloric acid, and via a chloride salt. Use amount of the hydrochloric acid is usually 1 to 50 equivalents, and preferably 1 to 10 equivalents, relative to mole number of the compound represented by the general formula (VI-34).

In addition, in the case where the salt of the anion represented by $An^-$ in the salt formation reaction is the chloride salt, the compound represented by the general formula (VI-34) and hydrochloric acid may be subjected to a reaction in the solvent.

The reaction between the compound represented by the general formula (VI-34) and the compound represented by the general formula (VI-35), in (b) of the reaction [III], may be carried out in a solvent, in the presence of a base catalyst, usually at 0 to 80° C., preferably at 10 to 50° C., usually for 1 to 24 hours, and preferably for 2 to 10 hours.

The base catalyst includes an alkali metal, such as potassium and sodium; a hydroxide of an alkali metal or an alkaline-earth metal, such as lithium hydroxide, potassium hydroxide, sodium hydroxide, calcium hydroxide and barium hydroxide; amines, such as triethylene diamine, piperidine, ethylene diamine, diethylene triamine, pyrrolidone and tetrahydroquinoline; and the like. They may be used alone, or in combination of two or more kinds thereof. Use amount of the base catalyst is usually 1 to 50 times, preferably 3 to 10 times, relative to total weight of the compound represented by the general formula (VI-34) and the compound represented by the general formula (VI-35).

The solvent includes an organic solvent, such as methanol, ethanol, isopropyl alcohol (IPA), tetrahydrofuran (THF), dioxane, N,N-dimethylformamide (DMF), dichloromethane, dichloroethane, ethyl acetate; and among them, ethanol, dichloromethane and ethyl acetate are preferable. They may be used alone, or in combination of two or more kinds thereof as appropriate. Use amount of the reaction solvent is usually 1 to 50 times, preferably 1 to 15 times, relative to total weight of the compound represented by the general formula (VI-34) and the compound represented by the general formula (VI-35).

Use amount of the compound represented by the general formula (VI-35) is usually 1 to 2 equivalents, and preferably 1 to 1.5 equivalents, relative to mole number of the compound represented by the general formula (VI-34).

Specific examples of the compound represented by the general formula (VI-35) include, for example, fluoromethane, fluoroethane, 1-fluoropropane, 2-fluoropropane, chloromethane, chloroethane, 1-chloropropane, 2-chloropropane, bromomethane, bromoethane, 1-bromopropane, 2-bromopropane, iodomethane, iodoethane, 1-iodopropane, 2-iodopropane, methyl trifluoromethane sulfonate, ethyl trifluoromethane sulfonate, propyl trifluoromethane sulfonate, methyl mesylate, ethyl mesylate, n-propyl mesylate, isopropyl mesylate, methyl tosylate, ethyl tosylate, n-propyl tosylate, isopropyl tosylate, and the like; and fluoromethane, chloromethane, bromomethane, iodomethane, methyl trifluoromethane sulfonate, methyl mesylate and methyl tosylate are preferable, and iodomethane is more preferable.

The salt formation reaction in (VI-b) of the reaction [III] may be carried out under reaction conditions (a reaction solvent, a reaction temperature, reaction time, each use amount) similar to those in the salt formation reaction in (a) of the reaction [III], except for using the compound obtained by the reaction between the compound represented by the general formula (VI-34) and the compound represented by the general formula (VI-35), instead of the compound represented by the general formula (VI-34) in the salt formation reaction in (a) of the reaction [III].

In the reaction [IV], the compound represented by the general formula (VI-36) and the compound represented by the general formula (VI-37) may be subjected to a reaction in a solvent, in the presence of a dehydration condensation agent, usually at 0 to 80° C., preferably at 10 to 50° C., usually for 1 to 24 hours, and preferably for 3 to 18 hours.

The solvent includes the same one as the solvent to be used in the method for subjecting the rhodamine compound represented by the general formula (I-I) and the compound represented by the general formula (I-II) to a reaction, and the preferable one is also the same. They may be used alone, or in combination of two or more kinds thereof as appropriate.

Use amount of the reaction solvent is usually 1 to 50 times, and preferably 5 to 15 times, relative to total weight of the compound represented by the general formula (VI-36) and the compound represented by the general formula (VI-37).

The dehydration condensation agent includes the same one as the dehydration condensation agent to be used in the method for subjecting the rhodamine compound represented by the general formula (I-I) and the compound represented by the general formula (I-II) to a reaction, and the preferable one is also the same. Use amount of the dehydration condensation agent is usually 1 to 20 equivalents, and preferably 1 to 10 equivalents, relative to mole number of the compound represented by the general formula (VI-36). In the reaction [IV], a catalyst, such as dimethylaminopyridine, may be used to enhance efficiency of the dehydration condensation agent. Use amount of the catalyst is usually 0.1 to 10 equivalents, relative to mole number of the compound represented by the general formula (VI-36).

Use amount of the compound represented by the general formula (VI-37) is usually 1 to 2 equivalents, and preferably 1 to 1.5 equivalents, relative to mole number of the compound represented by the general formula (VI-36).

Specific examples of the compound represented by the general formula (VI-37) include, for example, the following ones.

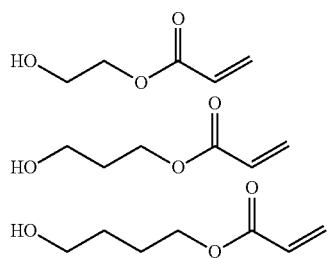

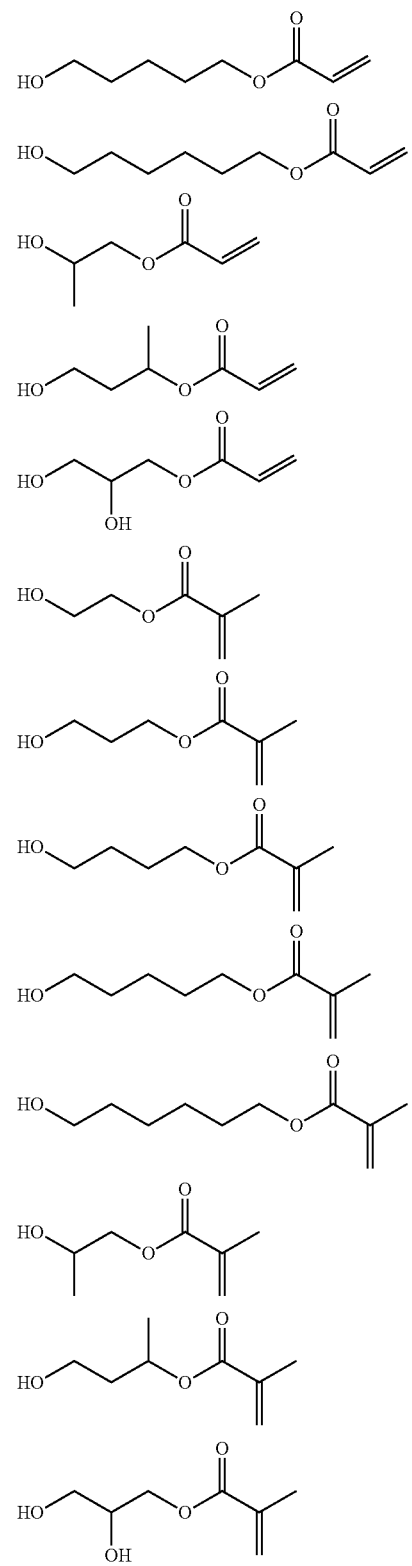

Among the compound represented by the general formula (VI) of the present invention, the one where $Y_{601}$ is a sulfur atom, $-NR_{632}-$, $-BR_{633}-$ or $-Si(R_{634})_2-$ can be produced by a series of methods shown in the following reactions [V], [VI] and [VII].

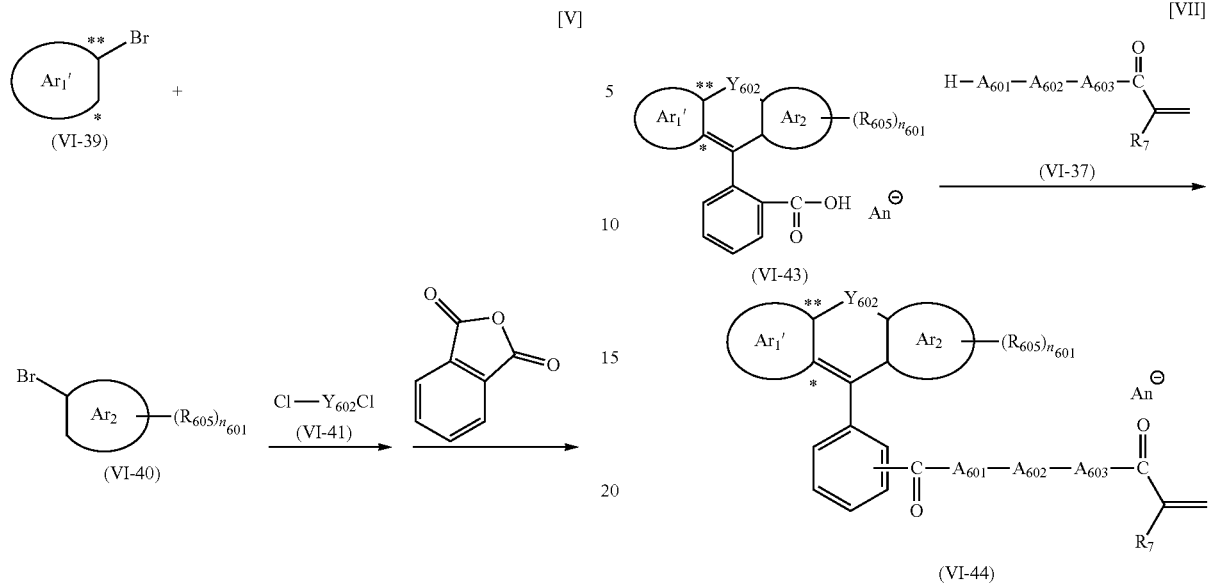

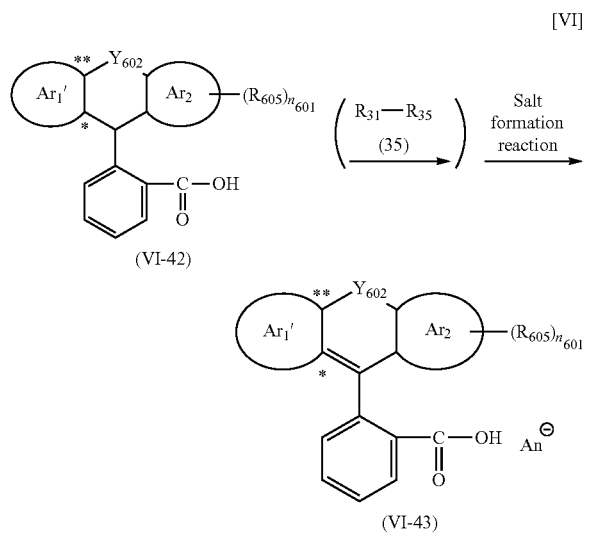

(wherein $Y_{602}$ represents a sulfur atom, —$NR_{632}$—, —$BR_{633}$— or —$Si(R_{634})_2$—; $n_{601}$ pieces of $R_{605}$, $R_{632}$, $R_{633}$, two pieces of $R_{634}$, $Ar_1'$, $Ar_2$, $n_{601}$, * and ** are the same as described above.)

(wherein $n_{601}$ pieces of $R_{605}$, $R_{631}$, $R_{635}$, $Y_{602}$, $An^-$, $Ar_1$, $Ar_1'$, $Ar_2$, $n_{601}$, * and ** are the same as described above.)

(wherein $n_{601}$ pieces of $R_{605}$, $R_7$, $Y_{602}$, $A_{601}$, $A_{602}$, $A_{603}$, $An^-$, $Ar_1$, $Ar_2$, $n_{601}$, * and ** are the same as described above.)

$Y_{602}$ is preferably —$NR_{632}$—, —$BR_{633}$— and —$Si(R_{634})_2$—, and —$BR_{633}$— and —$Si(R_{634})_2$— are more preferable, and —$Si(R_{634})_2$— is particularly preferable. Specifically, it includes, for example, a sulfur atom, —$NCH_3$—, —$NC_2H_5$—, —$NC_3H_7$—, —$BCH_3$—, —$BC_2H_5$—, —$BC_3H_7$—, —$Si(CH_3)_2$—, —$Si(C_2H_5)_2$—, —$Si(C_3H_7)_2$—, and the like, and the sulfur atom, —$NCH_3$—, —$BCH_3$— and —$Si(CH_3)_2$— are preferable, —$BCH_3$— and —$Si(CH_3)_2$— are more preferable, and —$Si(CH_3)_2$— is particularly preferable.

In the reactions [V] to [VII], firstly by subjecting the compound represented by the general formula (VI-39) and the compound represented by the general formula (VI-40) to a reaction, in the presence of the compound represented by the general formula (VI-41), followed by subjecting the resulting compound and phthalic anhydride to a reaction, the compound represented by the general formula (VI-42) is obtained (the reaction [V]). Then, after subjecting a reaction between the compound represented by the general formula (VI-42) and the compound represented by the general formula (VI-35) as needed, the salt formation reaction is carried out (the reaction [VI]). Further, by subjecting the resulting compound represented by the general formula (VI-43) and a compound represented by the following general formula (VI-37) to a reaction, the compound represented by the general formula (VI-44) can be obtained (the reaction [VII]).

In the reaction [V], the compound represented by the general formula (VI-39) and the compound represented by the general formula (VI-40) may be subjected to a reaction in a solvent, in the presence of the compound represented by the general formula (VI-41), usually at 80 to 160° C., preferably at 90 to 120° C., usually for 1 to 24 hours, and preferably for 3 to 10 hours; and subsequently the resulting compound and phthalic anhydride may be subjected to a reaction usually at 80 to 160° C., preferably at 90 to 120° C., usually for 1 to 24 hours, and preferably for 3 to 10 hours.

The solvent includes the same one as the solvent to be used in the method for subjecting the rhodamine compound represented by the general formula (I-I) and the compound represented by the general formula (I-II) to a reaction, and the preferable one is also the same. They may be used alone, or in combination of two or more kinds thereof as appropriate. Use amount of the reaction solvent is usually 1 to 50 times, and preferably 5 to 10 times, relative to weight of the compound represented by the general formula (VI-39).

Specific examples of the compound represented by the general formula (VI-39) include, for example, the following ones.

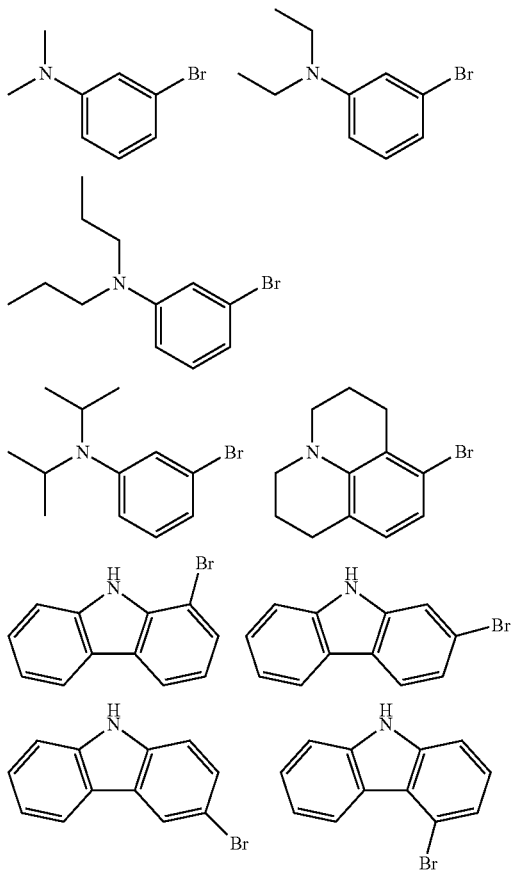

Use amount of the compound represented by the general formula (VI-40) is usually 1 to 2 equivalents, and preferably 1 to 1.5 equivalents, relative to mole number of the compound represented by the general formula (VI-39).

Specific examples of the compound represented by the general formula (VI-40) include, for example, the following ones.

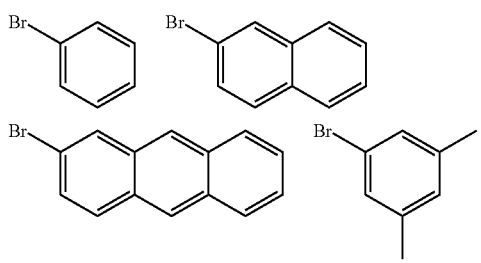

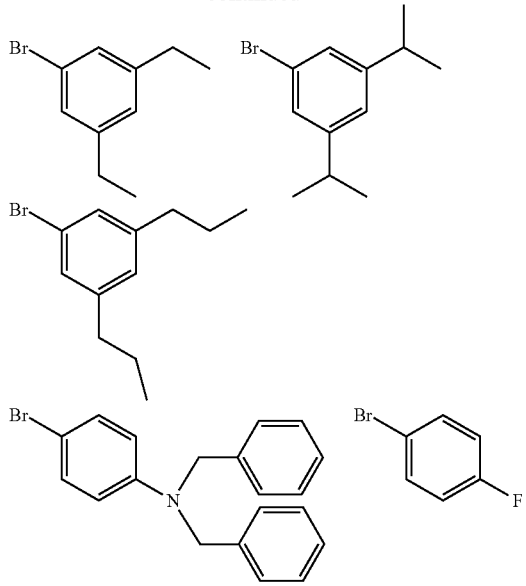

Use amount of the compound represented by the general formula (VI-41) is usually 1 to 2 equivalents, and preferably 1 to 1.5 equivalents, relative to mole number of the compound represented by the general formula (VI-39).

Specific examples of the compound represented by the general formula (VI-41) include, for example, $SCl_2$, $CH_3NCl_2$, $C_2H_5NCl_2$, $C_3H_7NCl_2$, $CH_3BCl_2$, $C_2H_5BCl_2$, $C_3H_7BCl_2$, $(CH_3)_2SiCl_2$, $(C_2H_5)_2SiCl_2$, $(C_3H_7)_2SiCl_2$, and the like.

Use amount of phthalic anhydride is usually 1 to 2 equivalents, and preferably 1 to 1.5 equivalents, relative to mole number of the compound represented by the general formula (VI-39).

In the reaction [VI], (a) in the case where $Ar_1'$ of the compound represented by the general formula (VI-42) is the cyclic structure represented by the general formula (VI-1-1'), the compound represented by the general formula (VI-42) may be subjected to the salt formation reaction, and (b) in the case where $Ar_1'$ of the compound represented by the general formula (VI-42) is the cyclic structure represented by the general formulae (VI-1-2') to (VI-1-7'), after the reaction between the compound represented by the general formula (VI-42) and the compound represented by the general formula (VI-35), the resulting compound may be subjected to the salt formation reaction.

The salt formation reaction in (a) of the reaction [VI] may be carried out similarly as the salt formation reaction in (a) of the reaction [III].

The reaction between the compound represented by the general formula (VI-42) and the compound represented by the general formula (VI-35), in (b) of the reaction [VI], may be carried out under reaction conditions (a reaction solvent, a reaction temperature, reaction time, each use amount) similar to those in the reaction with the compound represented by the general formula (VI-35) in (b) of the reaction [III], except for using the compound represented by the general formula (VI-42), instead of the compound represented by the general formula (VI-34), in the reaction between the compound represented by the general formula (VI-34) and the compound represented by the general formula (VI-35) in (b) of the reaction [III].

The salt formation reaction in (b) of the reaction [VI] may be carried out under reaction conditions (a reaction solvent, a reaction temperature, reaction time, each use amount) similar to those in the salt formation reaction in (a) of the reaction [III], except for using the compound obtained by the reaction between the compound represented by the general formula (VI-42) and the compound represented by the general formula (VI-35), instead of the compound represented by the general formula (VI-34), in the salt formation reaction in (a) of the reaction [III].

In the reaction [VII], the compound represented by the general formula (VI-43) obtained in the reaction [VI], and the compound represented by the general formula (VI-37-3) may be subjected to a reaction, under reaction conditions (a reaction solvent, an acid catalyst, a reaction temperature, reaction time, each use amount) similar to those in the reaction [IV].

Reaction pressure in the reactions [I] to [VII] is not especially limited, as long as the series of the reactions is carried out without delay, and the reactions may be carried out, for example, under normal pressure.

The resulting reactants and products obtained after the reactions [I] to [VII] may be isolated, as needed, by a general post-treatment operation and purification operation usually carried out in this field. Specifically, for example, the resulting reactants and products may be isolated by carrying out filtration, washing, extraction, concentration under reduced pressure, recrystallization, distillation, column chromatography, or the like.

3. Radical Reaction Initiator (C)

A method for subjecting the dye (b) having the radical reactive functional group to a reaction with the polyolefin (A) is not especially limited, as long as it is capable of generating a radical, and the radical reaction initiator (c), such as a peroxide and an azo compound, is usually used.

The radical reaction initiator (c) to be used is not especially limited, and includes, for example, an organic peroxide, an azobis compound and an inorganic peroxide, and among them, the organic peroxide is preferable.

Specific examples of the organic peroxide include benzoyl peroxide, acetyl peroxide, di-tert-butyl peroxide, tert-butyl peroxylaurate, dicumyl peroxide, $\alpha,\alpha'$-bis-tert-butylperoxy-p-diisopropylbenzene, 1,3-bis(tert-butylperoxyisopropyl)benzene, 1,4-bis(tert-butylperoxyisopropyl)benzene, 2,5-dimethyl-2,5-di-tert-butylperoxyhexane, 2,5-dimethyl-2,5-di-tert-butylperoxyhexyne-3,2,5-di-tert-butylperoxyhexane, tert-butyl peroxybenzoate, n-butyl-4,4-bis-tert-butyl peroxyvalerate, octanoyl peroxide, p-menthane hydroperoxide, tert-butylperoxy acetate, and the like, and among them, 2,5-dimethyl-2,5-di(tert-butylperoxy)hexane is preferable.

In addition, specific examples of the azobis compound include azobisisobutyronitrile, 2,2-azobis(2,4,4-trismethylvaleronitrile), 2,2-azobis-(2-cyclopropylpropionitrile), and the like.

Further, specific examples of the inorganic peroxide include potassium persulfate, sodium persulfate, ammonium persulfate, and the like.

These radical initiators may be used alone, or in combination of two or more kinds thereof.

Use amount of the radical initiator is preferably 0.01 to 10 parts by weight, and particularly 0.05 to 2% by weight, relative to 100 parts by weight of the polyolefin, from the standpoint of required properties of the polyolefin resin produced by use of the colored resin matter, reaction efficiency, and the like.

4. Production Method for the Colored Resin

The colored resin of the present invention is produced by subjecting a reactive mixture to a radical reaction (graft reaction), preferably by heating; after mixing the polyolefin (A), the dye (b) having the radical reactive functional group, and the radical reaction initiator (C), to prepare the reactive mixture which contains the polyolefin (A), the dye (b) having the radical reactive functional group, and the radical reaction initiator (C).

Addition order of each of raw materials to obtain the reactive mixture of the present invention is not especially limited, and it is usually desirable that the dye (b) having the radical reactive functional group, and the radical reaction initiator (C) are added sequentially or simultaneously to the polyolefin (A). For example, after making the polyolefin (A) into a molten state, the dye (b) and the radical reaction initiator (C) may be added thereto sequentially or simultaneously.

In addition, the reactive mixture may further contain 1 to 3 kinds of the compounds (D) selected from the group consisting of compounds represented by a general formula (VII), a general formula (VIII), a general formula (IX) and a general formula (X) to be described later, in addition to the dye (b) having the radically reactive functional group.

In the present invention, the graft reaction is carried out under melting of the polyolefin, and it is usually carried out in continuous or batch-style under kneading. As equipment for melting and kneading the polyolefin, a single-screw extruder, a twin-screw extruder, a kneader-type reactor, Banbury mixer, a double-screw mixer, and the like, can be used as appropriate.

In addition, for further enhancing efficiency of the graft reaction, and for obtaining a uncolored modified polyolefin, devolatilizing equipment, such as vacuum venting equipment, is installed at these kneading machine, and the graft reaction product may be processed under reduced pressure to devolatilize non-grafted by-products or non-reacted monomers.

In the production method for the colored resin of the present invention, the graft reaction is carried out, for example, by providing the polyolefin in a molten state, containing either one of the dye (b) and the radical reaction (polymerization) initiator (C), with the other one of the both.

This method contains the following aspects (1) and (2).

(1) An Aspect of Providing the Radical Polymerization Initiator to the Melt-Kneading Polyolefin which Contains the Dye (b)

This aspect includes, for example, the method for mixing the polyolefin and the dye (b) under non-melting condition, in advance, then, providing the resulting mixture to an extruder for melt-kneading, and providing the radical polymerization initiator from a feed port installed at the melting zone of this extruder.

Specific procedure of this aspect (1) is as follows:

(I) From a hopper located upstream of an extruder, preferably a twin-screw extruder, a polyolefin is provided, and the polyolefin is once melted.

(II) From a feed port installed at the melt-kneading zone located downstream from the hopper, the dye (b) is provided, then, the polyolefin and the dye (b) are uniformly melt-kneaded.

(III) From a feed port installed at the graft reaction zone located further downstream from the melt-kneading zone of (II), the radical polymerization initiator is provided, and the graft reaction is carried out while melt-kneading.

(IV) Then, one or more vent ports are installed in the further downstream from the graft reaction zone, and these vent ports are maintained in the higher reduced pressure state, preferably 10 mmHg or higher reduced pressure state, to remove the non-reacted dye (b), which is not grafted to the polyolefin, or other by-products.

(2) An Aspect of Providing the Dye (b) to the Melt-Kneading Polyolefin which Contains the Radical Polymerization Initiator This aspect includes, for example, an aspect of mixing the polyolefin and the radical polymerization initiator under non-melting condition, in advance, then, providing the resulting mixture to an extruder for melt-kneading, and providing the dye (b) from a feed port installed at the melting zone of this extruder.

Specific procedure of this aspect (2) is as follows.
(I) From a hopper located upstream of an extruder, preferably a twin-screw extruder, a polyolefin is provided, and the polyolefin is once melted.
(II) From a feed port installed at the melt-kneading zone located downstream from the hopper, the radical polymerization initiator is provided, then, the polyolefin and the radical initiator are uniformly melt-kneaded.
(III) From a feed port installed at the graft reaction zone located further downstream from the melt-kneading zone, the dye (b) is provided, and the graft reaction is carried out while melt-kneading.
(IV) Then, one or more vent ports are installed in the further downstream from the graft reaction zone, and these vent ports are maintained in the higher reduced pressure state, preferably 10 mmHg or higher reduced pressure state, to remove the non-reacted dye (b), which is not grafted to the polyolefin, or other by-products.

The graft reaction is carried out at temperature equal to or higher than melting point of the polyolefin, and at temperature below that where the polyolefin pyrolyzes violently. Suitable temperature for carrying out the graft reaction is appropriately selected depending on kinds of the polyolefin and kinds of the radical polymerization initiator.

Kneading temperature for carrying out the graft reaction is not especially limited, and kneading is carried out preferably at 80 to 300° C., and further preferably at 100 to 250° C. Specifically, for example, in the case of polyethylene, it is 100 to 200° C., and in the case of polypropylene, it is 130 to 250° C.

Reaction time of melt-graft reaction can be determined as appropriate, depending on a graft reaction temperature, kinds of the dye (b), kinds of the radical polymerization initiator, and desired graft amount, and the like. Specifically, the reaction time is usually 10 seconds to 30 minutes, and further preferably 30 seconds to 15 minutes.

In carrying out the graft reaction, additives, such as an antioxidant, a processing stabilizer and a plasticizer, may be compounded as appropriate, within a range not to interfere with the realization of the object or effect of the present invention.

Amount of the dye (b), contained by being grafted in the colored resin thus obtained by the production method of the present invention, can be determined as appropriate, colored resin depending on kinds of the dye (b) and desired performance of the colored resin.

A mixing ratio (weight ratio) of the polyolefin and the dye (b) is, for example, usually 0.01 to 10 parts by weight, and preferably 0.1 to 5 parts by weight of the dye (b), relative to 100 parts by weight of the polyolefin. When the mixing ratio of the dye (b) is below 0.01 parts by weight, coloring becomes insufficient and the object of the present invention cannot be attained; while when the mixing ratio is over 10 parts by weight, resin performance, such as color migration, could become inferior.

In addition, a mixing ratio (weight ratio) of the polyolefin and the radical polymerization initiator is, for example, usually 0.01 to 10 parts by weight, and preferably 0.1 to 5 parts by weight of radical polymerization initiator, relative to 100 parts by weight of the polyolefin. When the mixing ratio of the radical polymerization initiator is below 0.01 parts by weight, graft polymerization becomes insufficient and the object of the present invention cannot be attained; while when it is over 10 parts by weight, the resin could be broken to generate gelation, and the like, and then, resin performance could become inferior.

In the production method of the present invention, the graft reaction can be carried out in the presence of a polymerization inhibitor. Here, the polymerization inhibitor is concept encompassing a polymerization retarder.

The usable polymerization inhibitor includes a compound having a quinone skeleton, such as p-benzoquinone chloranil, 2,5-dichloro-p-benzoquinone, 2,6-dichloro-p-benzoquinone, tetramethylbenzoquinone, 2,5-dimethyl-p-benzoquinone, methyl-p-benzoquinone and methoxy-p-benzoquinone; a compound having a nitro group, such as 1,3,5-trinitrobenzene, 1-chloro-3-nitrobenzene, o-dinitrobenzene, m-dinitrobenzene, p-dinitrobenzene, 2-nitro-5-cyanothiophene and p-nitrobenzoic acid; a compound having a nitroso group, such as p-nitrosodiphenylamine and p-nitrosodimethylaniline; an inorganic compound, such as $FeCl_3$, $CuCl_2$, $CoCl_3$, $Co(ClO_4)_3$, $Co(NO_3)_3$, $Co_2(SO_4)_3$, $CoBr_3$, $Fe(CN)_3$ and $I_2$; and as other type compounds, phenothiazine, anthracene, 1,2,3,4-dibenzopyrene, hydroquinone, hydroquinone monomethylether, 2,2-diphenyl-1-picrylhydrazyl, 4-hydroxy-2,2,6,6-tetramethyl piperazine-1-oxyl, and the like.

Compounding amount of the polymerization inhibitor is preferably 1% by weight or lower, and particularly 0.05% by weight or lower, relative to the dye (b), in view of efficiency of graft reaction.

5. Graft Polymer (Colored Resin)

The colored resin obtained from the production method for the colored resin of the present invention is a graft polymer, and it has a structure of a graft polymer having the polyolefin (A) as a main chain, and the polymer (B) polymerized one or more of the dye (b) having the radical reactive functional group, as a side chain.

Here, the graft polymer of the present invention indicates a structure having the polyolefin (A) as a main chain, and grafting the polymer (B) at the terminal or the side chain thereof. In addition, in the case where the polyolefin (A) is not linear but branched, the branched part thereof should also be treated as a main chain in the graft polymer of the present invention.

Explanation will be given on the above.

Firstly, the polymer (B), polymerized the dye (b) having the radical reactive functional group, is a single polymer (homopolymer) of the dye (b) having the radical reactive functional group, or the one polymerized 1 to 3 kinds of the compounds (D) selected from the group consisting of compounds represented by the following general formulae (VII), (VIII), (IX) and (X), and the dye (b) having the radical reactive functional group.

(VII)

[where, in the general formula (VII), $R_{11}$ represents a hydrogen atom or a methyl group; $R_{12}$ represents a hydrogen atom, an alkyl group having 1 to 18 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms which has or does not have oxygen, a dialkylaminoalkyl group having 3 to 9 carbon atoms, a fluoroalkyl group having 1 to 18 carbon atoms, an N-alkylenephthalimide group having 9 to 14 carbon atoms, a group represented by the following general formula (VII-I),

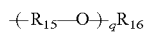                                  (VII-I)

(wherein $R_{15}$ represents an alkylene group having 1 to 3 carbon atoms, which has a hydroxy group as a substituent or no substituent; $R_{16}$ represents a phenyl group which has a hydroxy group as a substituent or no substituent, or an alkyl group having 1 to 3 carbon atoms; q represents an integer of 1 to 3.);
a group represented by the following general formula (VII-II),

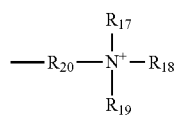                                  (VII-II)

(wherein $R_{17}$ to $R_{19}$ represent an alkyl group having 1 to 3 carbon atoms; $R_{20}$ represents an alkylene group having 1 to 3 carbon atoms.),
or a group represented by the following general formula (VII-III),

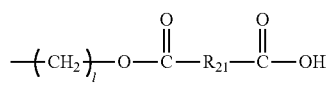                                  (VII-III)

(wherein l represents an integer of 1 to 6; $R_{21}$ represents a phenylene group or a cyclohexylene group.).]

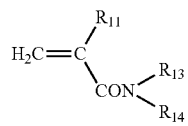                                  (VIII)

[where, in the general formula (VIII), $R_{11}$ represents a hydrogen atom or a methyl group; $R_{13}$ represents a hydrogen atom, or an alkyl group having 1 to 3 carbon atoms; $R_{14}$ represents a hydrogen atom, an alkyl group having 1 to 3 carbon atoms, a dialkylaminoalkyl group having 3 to 9 carbon atoms, or a hydroxyalkyl group having 1 to 6 carbon atoms. $R_{13}$ and $R_{14}$ may form a morpholino group together with a nitrogen atom adjacent thereto.]

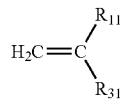                                  (IX)

[where, in the general formula (IX), $R_{11}$ represents a hydrogen atom or a methyl group; $R_{31}$ represents a phenyl group or a pyrrolidino group.]

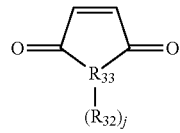                                  (X)

[where, in the general formula (X), $R_{33}$ represents a nitrogen atom or an oxygen atom; j represents 0 when $R_{33}$ is an oxygen atom, and 1 when $R_{33}$ is a nitrogen atom; $R_{32}$ represents a hydrogen atom, an alkyl group having 1 to 20 carbon atoms, a hydroxyalkyl group having 1 to 10 carbon atoms, a halogenated alkyl group having 1 to 10 carbon atoms, an alkylcycloalkyl group having 1 to 10 carbon atoms, a halogenated cycloalkyl group having 6 to 7 carbon atoms, an aryl group having 6 to 10 carbon atoms, an aryl group having 6 to 10 carbon atoms, which has an alkyl group having 1 to 6 carbon atoms as a substituent, or a halogenated aryl group having 6 to 10 carbon atoms.]

In the general formula (VII), $R_{11}$ is preferably a methyl group.

In addition, the alkyl group having 1 to 18 carbon atoms, in $R_{12}$ of the general formula (VII), may be the linear, branched, or cyclic one, and specifically includes, for example, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a 3-methylpentyl group, a 2-methylpentyl group, a 1,2-dimethylbutyl group, an n-heptyl group, an isoheptyl group, a sec-heptyl group, an n-octyl group, an isooctyl group, a sec-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, a cyclopropyl group, a cyclopentyl group, a cyclohexyl group, a cycloheptyl group, a cyclooctyl group, a cyclodecyl group, a cycloundecyl group, a cyclododecyl group, a cyclotetradecyl group, a cyclooctadecyl group, and the like, and among them, the methyl group, the ethyl group, and the like, are preferable.

The hydroxyalkyl group having 1 to 10 carbon atoms, in $R_{12}$ of the general formula (VII), includes, for example, a hydroxymethyl group, a hydroxyethyl group, a hydroxypropyl group, a hydroxybutyl group, a hydroxypentyl group, a hydroxyhexyl group, and the like.

In addition, the aryl group having 6 to 10 carbon atoms, in $R_{12}$ of the general formula (VII), includes a phenyl group, a naphthyl group, and the like.

Further, the arylalkyl group having 7 to 13 carbon atoms, in $R_{12}$ of the general formula (VII), includes, for example, a benzyl group, a phenylethyl group, a phenylpropyl group, a naphthylmethyl group, a naphthylethyl group, a naphthylpropyl group, and the like, and the benzyl group is preferable.

The alkoxyalkyl group having 2 to 9 carbon atoms, in $R_{12}$ of the general formula (VII), includes, for example, a methoxymethyl group, a methoxyethyl group, a methoxypropyl group, a methoxybutyl group, a methoxypentyl group, a methoxyhexyl group, a methoxyheptyl group, a methoxyoctyl group, an ethoxymethyl group, an ethoxyethyl group, an ethoxypropyl group, an ethoxybutyl group, an ethoxypentyl group, an ethoxyhexyl group, an ethoxyheptyl group, a propoxymethyl group, a propoxyethyl group, a propoxypropyl group, a propoxybutyl group, a propoxypentyl group, a propoxyhexyl group, and the like.

In addition, the alkoxyalkoxyalkyl group having 3 to 9 carbon atoms, in $R_{12}$ of the general formula (VII), includes, for example, a methoxymethoxymethyl group, a methoxymethoxyethyl group, a methoxymethoxypropyl group, an ethoxymethoxymethyl group, an ethoxymethoxyethyl group, an ethoxymethoxypropyl group, a propoxymethoxymethyl group, a propoxymethoxyethyl group, a propoxymethoxypropyl group, an ethoxyethoxymethyl group, an ethoxyethoxyethyl group, an ethoxyethoxypropyl group, a propoxyethoxymethyl group, a propoxyethoxyethyl group, a propoxyethoxypropyl group, a propoxypropoxymethyl group, a propoxypropoxyethyl group, and the like.

Further, the aryloxyalkyl group having 7 to 13 carbon atoms, in $R_{12}$ of the general formula (VII), includes, for example, a phenoxymethyl group, a phenoxyethyl group, a phenoxypropyl group, a naphthyloxymethyl group, a naphthyloxyethyl group, a naphthyloxypropyl group, and the like.

The morpholinoalkyl group having 5 to 7 carbon atoms, in $R_{12}$ of the general formula (VII), includes, for example, a morpholinomethyl group, a morpholinoethyl group, a morpholinopropyl group, and the like.

In addition, the trialkylsilyl group having 3 to 9 carbon atoms, in $R_{12}$ of the general formula (VII), includes, for example, a trimethylsilyl group, a triethylsilyl group, a tripropylsilyl group, a dimethylethylsilyl group, a diethylmethylsilyl group, and the like.

Further, the alicyclic hydrocarbon group having 6 to 12 carbon atoms, which has oxygen atom, in $R_{12}$ of the general formula (VII), includes, for example, a dicyclopentenyloxyethyl group, and the like.

The alicyclic hydrocarbon group having 6 to 12 carbon atoms which does not have an oxygen atom, in $R_{12}$ of the general formula (VII), includes, for example, a cyclohexyl group, an isobornyl group, a dicyclopentanyl group, and the like.

In addition, the dialkylaminoalkyl group having 3 to 9 carbon atoms, in $R_{12}$ of the general formula (VII), includes a dimethylaminomethyl group, a dimethylaminoethyl group, a dimethylaminopropyl group, a diethylaminomethyl group, a diethylaminoethyl group, a diethylaminopropyl group, a dipropylaminomethyl group, a dipropylaminoethyl group, a dipropylaminopropyl group, and the like.

In addition, the fluoroalkyl group having 1 to 18 carbon atoms, in $R_{12}$ of the general formula (VII), includes a 2,2,2-trifluoroethyl group, a 2,2,3,3-tetrafluoropropyl group, a 2,2,3,3,4,4-hexafluorobutyl group, a 2,2,3,3,4,4,5,5-octafluoropentyl group, a 3,3,4,4,5,5,6,6,7,7,8,8,9,9,10,10,10-heptadecafluorodecyl; a 2-(heptadecafluorooctyl)ethyl group, and the like.

Further, the N-alkylenephthalimide group having 9 to 14 carbon atoms, in $R_{12}$ of the general formula (VII), includes, for example, a 2-phthalimideethyl group, a 2-tetrahydrophthalimideethyl group, and the like.

The alkylene group having 1 to 3 carbon atoms, which has a hydroxy group as a substituent or no substituent, in $R_{15}$ of the general formula (VII-I), includes a methylene group, an ethylene group, a propylene group, a hydroxymethylene group, a hydroxyethylene group, a 1-hydroxypropylene group, a 2-hydroxypropylene group, and the like, and the ethylene group, the propylene group and the 2-hydroxypropylene group are preferable.

In addition, the phenyl group which has a hydroxy group as a substituent or no substituent, in $R_{16}$ of the general formula (VII-I), includes a hydroxyphenyl group, a phenyl group, and the like.

Further, the alkyl group having 1 to 3 carbon atoms, in $R_{16}$ of the general formula (VII-I), includes a methyl group, an ethyl group, a propyl group, and the like.

Specific examples of the group represented by the general formula (VII-I) include a (4-hydroxyphenoxy)methyl group, a (4-hydroxyphenoxy)ethyl group, a (4-hydroxyphenoxy)propyl group, a 1-hydroxy-1-phenoxymethyl group, a 2-hydroxy-3-phenoxy ethyl group, a 2-hydroxy-3-phenoxypropyl group, a methyltrimethylene glycol group, a methyltriethylene glycol group, a methyltripropylene glycol group, and the like, and among them, the (4-hydroxyphenoxy)methyl group, the 2-hydroxy-3-phenoxypropyl group, the methyltripropylene glycol group, the methyltriethylene glycol group, and the like, are preferable.

The alkyl group having 1 to 3 carbon atoms, in $R_{17}$ to $R_{19}$ of the general formula (VII-II), includes a methyl group, an ethyl group, a propyl group, and the like, and the methyl group is preferable.

In addition, the alkylene group having 1 to 3 carbon atoms, in $R_{20}$ of the general formula (VII-II), includes a methylene group, an ethylene group, a propylene group, and the like.

Further, specific examples of the group represented by the general formula (VII-II) include a trimethylammoniummethyl group, a trimethylammoniumethyl group, a triethylammoniummethyl group, a triethylammoniumethyl group, and the like.

In addition, preferable specific examples of the group represented by the general formula (VII-III) include, for example, the following ones.

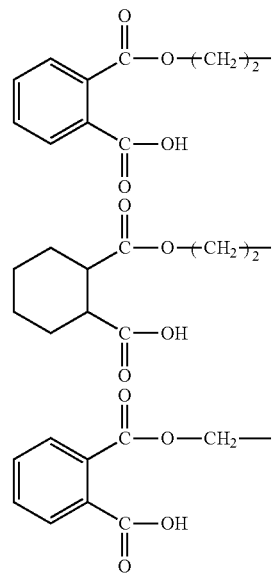

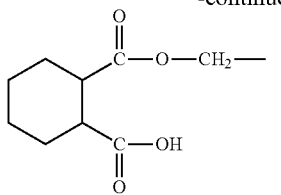

$R_{12}$ of the general formula (VII) is, among the groups, preferably a hydrogen atom, an alkyl group having 1 to 18 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an aryloxyalkyl group having 7 to 13 carbon atoms, the group represented by the general formula (VII-I), and the group represented by the general formula (VII-III); and among them, the hydrogen atom, the alkyl group having 1 to 18 carbon atoms, the hydroxyalkyl group having 1 to 10 carbon atoms, the aryl group having 6 to 10 carbon atoms, the arylalkyl group having 7 to 13 carbon atoms, and the alkoxyalkyl group having 2 to 9 carbon atoms are more preferable, and the hydrogen atom, the arylalkyl group having 7 to 13 carbon atoms, and the group represented by the general formula (VII-III) are more preferable.

In addition, preferable specific examples of the general formula (VII) include acrylic acid, benzyl acrylate, methacrylic acid, benzyl methacrylate, hydroxyethyl methacrylate, methyl methacrylate, and the like; and among them, acrylic acid, benzyl acrylate, methacrylic acid, benzyl methacrylate, and the like, are preferable, and methacrylic acid and benzyl methacrylate are more preferable.

The alkyl group having 1 to 3 carbon atoms, in $R_{13}$ of the general formula (VIII), includes a methyl group, an ethyl group, a propyl group, and the like.

In addition, the alkyl group having 1 to 3 carbon atoms, in $R_{14}$ of the general formula (VIII), includes the same one as $R_{13}$.

In addition, the dialkylaminoalkyl group having 3 to 9 carbon atoms, in $R_{14}$ of the general formula (VIII), includes a dimethylaminomethyl group, a dimethylaminoethyl group, a dimethylaminopropyl group, a diethylaminomethyl group, a diethylaminoethyl group, a diethylaminopropyl group, a dipropylaminomethyl group, a dipropylaminoethyl group, a dipropylaminopropyl group, and the like.

Further, the hydroxyalkyl group having 1 to 6 carbon atoms, in $R_{14}$ of the general formula (VIII), includes a hydroxymethyl group, a hydroxyethyl group, a hydroxypropyl group, a hydroxybutyl group, a hydroxypentyl group, a hydroxyhexyl group, and the like, and the hydroxyethyl group is preferable.

Preferable specific examples of the general formula (VIII) include (meth)acrylamide, N,N-dimethylacrylamide, N,N-diethylacrylamide, hydroxyethyl (meth)acrylamide, 4-acryloyl morpholine, and the like; and among them, (meth)acrylamide, N,N-dimethylacrylamide and N,N-diethylacrylamide are preferable, and N,N-diethylacrylamide is particularly preferable.

Preferable specific examples of the general formula (IX) include styrene, α-methylstyrene, N-vinylpyrrolidone, and the like, and among them, styrene and α-methylstyrene are preferable, and styrene is particularly preferable.

The alkyl group having 1 to 20 carbon atoms, in $R_{32}$ of the general formula (X), may be the linear, branched, or cyclic one, and specifically includes, for example, a methyl group, an ethyl group, an n-propyl group, an isopropyl group, an n-butyl group, an isobutyl group, a tert-butyl group, a 1-methylpropyl group, an n-pentyl group, an isopentyl group, a tert-pentyl group, a neopentyl group, a 1-methylbutyl group, an n-hexyl group, an isohexyl group, a tert-hexyl group, a 3-methylpentyl group, a 2-methylpentyl group, a 1-methylpentyl group, a 1,2-dimethylbutyl group, a cyclohexyl group, an n-heptyl group, an isoheptyl group, a 1-methylhexyl group, an n-octyl group, an isooctyl group, a 1-methylheptyl group, a 2-ethylhexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, a nonadecyl group, an eicosyl group, and the like.

In addition, the hydroxyalkyl group having 1 to 10 carbon atoms, in $R_{32}$ of the general formula (X), includes, for example, a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, and the like.

Further, the halogenated alkyl group having 1 to 10 carbon atoms, in $R_{32}$ of the general formula (X), includes, for example, a chloromethyl group, a chloroethyl group, a chloro-n-propyl group, a chloroisopropyl group, a chloro-n-butyl group, a chloro-tert-butyl group, a chloro-n-pentyl group, a chloro-n-hexyl group, a chloro-n-heptyl group, a chloro-n-octyl group, a chloro-n-nonyl group, a chloro-n-decyl group, a fluoromethyl group, a fluoroethyl group, a fluoro-n-propyl group, a fluoroisopropyl group, a fluoro-n-butyl group, a fluoro-tert-butyl group, a fluoro-n-pentyl group, a fluoro-n-hexyl group, a fluoro-n-heptyl group, a fluoro-n-octyl group, a fluoro-n-nonyl group, a fluoro-n-decyl group, and the like.

The alkylcycloalkyl group having 4 to 10 carbon atoms, in $R_{32}$ of the general formula (X), includes, for example, a methylcyclohexyl group, an ethylcyclohexyl group, a propylcyclohexyl group, a butylcyclohexyl group, and the like.

In addition, the halogenated cycloalkyl group having 6 to 7 carbon atoms, in $R_{32}$ of the general formula (X), includes a chlorocyclohexyl group, a fluorocyclohexyl group, a bromocyclohexyl group, a chlorocycloheptyl group, a fluorocycloheptyl group, a bromocycloheptyl group, and the like.

Further, the aryl group having 6 to 10 carbon atoms, in $R_{32}$ of the general formula (X), includes a phenyl group, a naphthyl group, and the like.

The aryl group having 6 to 10 carbon atoms, which has an alkyl group having 1 to 6 carbon atoms as a substituent, in $R_{32}$ of the general formula (X), includes a methylphenyl group, an ethylphenyl group, an n-propylphenyl group, an n-butylphenyl group, an n-pentylphenyl group, an n-hexylphenyl group, and the like.

In addition, the halogenated aryl group having 6 to 10 carbon atoms, in $R_{32}$ of the general formula (X), includes, for example, a chlorophenyl group, a fluorophenyl group, a chloronaphthyl group, a fluoronaphthyl group, and the like.

Preferable specific examples of the general formula (X) include, for example, maleic anhydride, maleimide, N-methylmaleimide, N-ethylmaleimide, N-butylmaleimide, N-octylmaleimide, N-dodecylmaleimide, N-(2-ethylhexyl)maleimide, N-(2-hydroxyethyl)maleimide, N-(2-chlorohexyl)maleimide, N-cyclohexylmaleimide, N-(2-methylcyclohexyl)maleimide, N-(2-ethylcyclohexyl)maleimide, N-(2-chlorocyclohexyl)maleimide, N-phenylmaleimide, N-(2-methylphenyl)maleimide, N-(2- ethylphenyl)maleimide, N-(2-chlorophenyl)maleimide, and the like, and among them, N-phenylmaleimide is preferable.

Next, explanation will be given on a ratio of monomer units.

For example, a weight ratio of the monomer unit derived from the compound represented by the general formula (I), and the monomer unit derived from the compound represented by the general formula (VII), the general formula (VIII), the general formula (IX) or the general formula (X), may be set as appropriate, depending on kinds of monomer units to be used, and the monomer unit derived from the compound represented by the general formula (I) is usually 1 to 90% by weight, and preferably 5 to 85% by weight, relative to total weight of the resulting polymer (B).

Next, explanation will be given on the production method for the polymer (B) of the present invention.

The polymer (B) of the present invention is, as described above, a single polymer (homopolymer) of the dye (b) having the radical reactive functional group, or the one polymerized 1 to 3 kinds of the compounds (D) selected from the group consisting of the compounds represented by the general formula (VII), the general formula (VIII), the general formula (IX) and the general formula (X), and the dye (b) having the radical reactive functional group.

The polymer (B) of the present invention is produced, for example, as follows.

That is, the polymer (B) of the present invention, as the single polymer (homopolymer) of the dye (b) having the radically reactive functional group, can be obtained by subjecting the compound represented by the general formula (I), obtained as described above, to a polymerization reaction known per se.

In addition, in the case where the polymer (B) of the present invention is a copolymer, in the polymerization reaction, the compound represented by the general formula (I), and 1 to 3 kinds of the compounds (D) represented by the general formula (VII), the general formula (VIII), the general formula (IX) or the general formula (X), may be mixed and then polymerized, so that the ratio of the monomer units, derived from each monomer in the finally obtained polymer, attains as described above.

The polymerization reaction is carried out, for example, as follows.

That is, the compound represented by the general formula (I) having the anion of the present invention, or the compound represented by the general formula (I), and 1 to 3 kinds of the compound represented by the general formula (VII), the general formula (VIII), the general formula (IX) or the general formula (X) are dissolved in 1 to 10 times volume of a suitable solvent, such as toluene, 1,4-dioxane, tetrahydrofuran, isopropanol, methyl ethyl ketone and propylene glycol monomethyl ether acetate, relative to total volume thereof; and in the presence of 0.01 to 30% by weight of a polymerization initiator, such as azoisobutyronitrile, 2,2'-azobis(2,4-dimethylvaleronitrile), 2,2'-azobis(2-methylpropionate), 2,2'-azobis(2-methylbutyronitrile), benzoyl peroxide and lauroyl peroxide, relative to total weight of the dissolved compounds, a reaction may be carried out at 50 to 150° C., for 1 to 48 hours.

In addition, after the reaction, the reaction product may be treated according to a conventional method for polymer acquisition.

6. Resin Composition Containing the Colored Resin

Since the colored resin of the present invention has characteristics that is free from color migration or fading caused by bleed-out after coloring, which is the defect of the dye, without impairing vivid color development and transparency of the dye, by taking advantage of these characteristics, a resin composition of desired color can be prepared by blending one or more kinds of the colored resin of the present invention with a thermoplastic resin, or blending two or more kinds of the colored resin of the present invention.

The thermoplastic resin to be used is not especially limited, and the same kind of a resin as the polyolefin used in the colored resin of the present invention, or a resin with good compatibility is suitable; and particularly, for example, polypropylene, polyethylene, a copolymer of propylene-$\alpha$-olefin such as a copolymer of propylene-ethylene, a copolymer of ethylene-$\alpha$-olefin such as a copolymer of ethylene-propylene, a copolymer of ethylene-vinyl acetate, a copolymer of ethylene-vinyl alcohol, and the like, are preferable.

In addition, a blending ratio of the thermoplastic resin is not especially limited, and is usually 5 to 20,000 parts by weight, relative to 100 parts by weight of the colored resin.

In preparation of blending, any additives, such as a dispersing agent, a filler, a plasticizer, an antioxidant, a UV absorber, a light stabilizer, a flame retardant, an antibacterial agent, an antistatic agent, a copper inhibitor, a metal deactivator, a tackifier, a lubricant, an anti-fogging agent, a preservative, a stabilizer, and the like, or resins may be added within a range not to impair the object of the present invention.

These blended resin composition can be used in various colored molding articles showing unique vivid color development of the dye, as compared with a conventional pigment, in a wide range of applications such as automobiles, household electric appliances, everyday sundries, and the like, by using a conventionally known molding means. Still more, it can be expected that colored products having consistent quality can be supplied stably in an industrial level.

EXAMPLES

The present invention is explained below specifically by Examples, however, the present invention should not be limited to these Examples.

It should be noted that synthesis methods and properties of the dyes of raw materials used in Examples and Comparative Examples, as well as evaluation methods for the resulting colored resin (graft polymer) are as follows.
1. Evaluation Methods
(1) Simplified Elution Test Elution degree was measured by color difference $\Delta E$, based on color measurement after elapsing 100 hr, 150 hr and 200 hr, using a spectrophotometer (manufactured by Gretag Macbeth Co., Ltd.); after putting a compression-molded specimen prepared by a predetermined method, in a methyl ethyl ketone solvent (produced by Wako Pure Chemical Industries, Ltd.), so that the whole surface thereof is soaked therein.

In this case, 100 mL of the solvent was charged in a glass bottle having a suitable size, and the compression-molded specimen, attached with a weight such as a clip, was put therein, so that the whole surface thereof is soaked in the solvent.
(2) Simplified Rubbing Fastness Test A wet-type rubbing test was carried out, by preparing a cloth specimen (20 mm×60 mm) by a predetermined method, soaking this cloth specimen in water, then taking it out, and rubbing it against the compression-molded sheet for the simplified elution test, at room temperature, under condition of an arm load of 1 kg, a one-way length of 100 mm, a speed of 10 mm/s, and ten reciprocations.

It should be noted that a scratch strength testing machine (manufactured by SHINTO Scientific Co., Ltd.), was used for the wet-type rubbing test.

In addition, in the simplified rubbing fastness test, color migration degree was measured by color difference ΔE, based on color measurement using the spectrophotometer (manufactured by Gretag Macbeth Co., Ltd).

2. Used Raw Materials (1) Polyolefin

Polypropylene [trade name: Novatec PP MG03B, produced by Japan Polypropylene Corp.] was used.

(2) Dyes and Pigments

Dyes and pigments of the following (i) to (xiii) were used.

(i) The reactive dye "M-1" (the dye (b) of the present invention): Compound name and a synthesis method for the dye will be described later.
(ii) The reactive dye "M-2" (the dye (b) of the present invention): Compound name and a synthesis method for the dye will be described later.
(iii) The reactive dye "M-3" (the dye (b) of the present invention): Compound name and a synthesis method for the dye will be described later.
(iv) The reactive dye "M-4" (the dye (b) of the present invention): Compound name and a synthesis method for the dye will be described later.
(v) The reactive dye "M-5" (the dye (b) of the present invention): Compound name and a synthesis method for the dye will be described later.
(vi) The reactive dye "M-6" (the dye (b) of the present invention): Compound name and a synthesis method for the dye will be described later.
(vii) The reactive dye "M-7" (the dye (b) of the present invention): Compound name and a synthesis method for the dye will be described later.
(viii) The reactive dye "M-8" (the dye (b) of the present invention): Compound name and a synthesis method for the dye will be described later.
(ix) The dye 1: Sumiplast Red H$_4$GR (produced by Sumika Chemtex Co., Ltd.)
(x) The dye 2: Sumiplast Lemon Yellow HL (produced by Sumika Chemtex Co., Ltd.)
(xi) The pigment 1: 42-117A (produced by Material Technology Trading Corp.)
(xii) The pigment 2: PALIOGEN RED K3911 HD (produced by BASF Japan, Ltd.)
(xiii) The pigment 3: Hostaperm Red EG transp (produced by CLARIANT Japan, Ltd.)

(3) The Radical Polymerization Initiator 2,5-dimethyl-2,5-di(tert-butylperoxy)hexane [trade name: KAYA HEXA AD-40C, produced by KAYAKU AKZO Corp.)] was used.

Synthesis Example 1

(Synthesis of the Raw Material Monomer M-1 of the Reactive Dye):

Into a 2 L round-bottom flask equipped with a stirring apparatus, 47.9 g of rhodamine B (0.10 mol, produced by Wako Pure Chemical Industries, Ltd.), 500 mL of dichloromethane, 15.6 g of hydroxyethyl methacrylate (0.12 mol, produced by Wako Pure Chemical Industries, Ltd.), 4.9 g of 4-dimethylaminopyridine (0.04 mol, produced by Wako Pure Chemical Industries, Ltd.), and 32.6 g of 1-ethyl-3-(3-dimethylarninopropyl)carbodiimide hydrochloride (0.17 mol, produced by Toyobo Co., Ltd.) were added, and subjected to a reaction by stirring at room temperature for 24 hours.

After completion of the reaction, an organic layer was washed with about 500 mL of ion-exchanged water.

Next, 50 g of sodium sulfate was added thereto for dehydration, and 10 mg of p-methoxyphenol (produced by Wako Pure Chemical Industries, Ltd.) was added thereto as a polymerization inhibitor. The solvent was removed under reduced pressure to obtain 44 g (yield: 74.6%) of a red solid.

This was referred to the dye monomer "M-1".

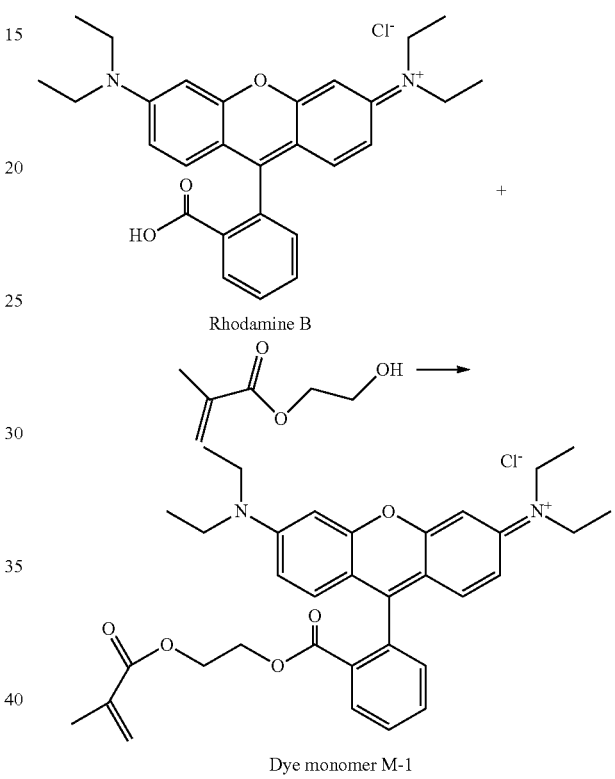

Dye monomer M-1

Synthesis Example 2

(Synthesis of the Reactive Dye M-2):

Into a 500 mL round-bottom flask equipped with a stirring apparatus, 11.8 g (0.020 mol) of the dye monomer M-1, 13.7 g of a lithium salt of tetrakis(pentafluorophenyl)boron(IV) (0.020 mol, produced by Tosoh Finechem Corp.), 150 mL of dichloromethane, and 150 mL of ion-exchanged water were added, and subjected to a salt exchange reaction by stirring at room temperature for 30 minutes.

After completion of the reaction, an organic layer was washed four times with about 150 mL of ion-exchanged water.

Next, 5 mg of p-methoxyphenol (produced by Wako Pure Chemical Industries, Ltd.) was added thereto for concentration under reduced pressure, and 22.8 g (yield: 92.3%) of a red solid was obtained, where a chloride ion of the dye monomer M-1 was exchanged to tetrakis(pentafluorophenyl)boron(IV) anion.

This was referred to the reactive dye "M-2".

Synthesis Example 3

(Synthesis of the Reactive Dye M-3):

The reactive dye M-3 was synthesized by a similar method as in Synthesis Example 2, except for using 4.0 g of 4-nitrobenzene sulfonic acid (0.020 mol, produced by Tokyo Chemical Industry Co., Ltd.), instead of 13.7 g of the lithium salt of tetrakis(pentafluorophenyl)boron(IV).

As a result, 14.4 g (yield: 94.7%) of red viscous liquid was obtained, where the chloride ion of the dye monomer M-1 was exchanged to 4-nitrobenzene sulfonate anion.

This was referred to the reactive dye "M-3".

Synthesis Example 4

(Synthesis of the Reactive Dye M-4):

The reactive dye M-4 was synthesized by a similar method as in Synthesis Example 2, except for using 3.8 g (0.020 mol) of p-toluene sulfonic acid monohydrate, instead of 13.7 g of the lithium salt of tetrakis(pentafluorophenyl)boron(IV).

As a result, 13.6 g (yield: 91.0%) of red viscous liquid was obtained, where the chloride ion of the dye monomer M-1 was exchanged to p-toluene sulfonate anion.

This was referred to the reactive dye "M-4".

Synthesis Example 5

(Synthesis of the Reactive Dye M-5):

(1) Synthesis of a Naphthalene Derivative having a Methacryl Group (Compound 3)

Into a 1 L round-bottom flask equipped with a stirring apparatus, 21.5 g (150 mmol) of 1-aminonaphthalene (Compound 1: produced by Tokyo Chemical Industry Co., Ltd.), 25.6 g (165 mmol) of isocyanatoethyl methacrylate (Compound 2: produced by Wako Pure Chemical Industries, Ltd.), and 450 mL of dichloromethane (produced by Wako Pure Chemical Industries, Ltd.) were added, and after the inside thereof was replaced with nitrogen, they were subjected to a reaction at 40° C. for 15 minutes to generate a white solid. After that, the resulting solution was stirred further at 40° C. for 1 hour, and cooled down to 10° C. The white solid was filtrated and washed with small quantity of dichloromethane. The resulting solid was dried under reduced pressure to obtain 38.3 g (yield: 86%) of a urea substance (Compound 3).

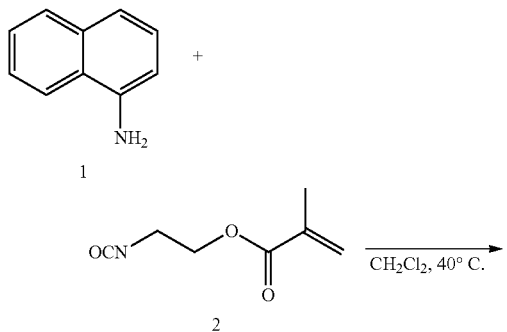

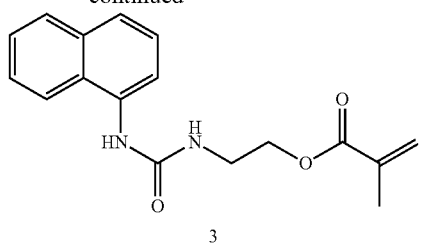

(2) Construction of a Triarylmethane Skeleton

Into a 2 L round-bottom flask equipped with a stirring apparatus, 10 mg of p-methoxyphenol (produced by Wako Pure Chemical Industries, Ltd.), and 17.9 g (60 mmol) of the urea substance (Compound 3) were added, and dissolved by the addition of 1100 mL of THF (produced by Wako Pure Chemical Industries, Ltd.). Into there, 19.5 g (72 mmol) of 4,4'-(dimethylamino)benzhydrol (Compound 4: produced by Tokyo Chemical Industry Co., Ltd.), and 27.4 g (144 mmol) of p-toluene sulfonic acid monohydrate (produced by Wako Pure Chemical Industries, Ltd.) were added, and stirred at 65° C. for 3 hours. After that, the resulting solution was cooled down to 10° C., and then the THF solution was removed by decantation. Dichloromethane and ion-exchanged water were added to a remaining oil component for extraction and washing.

After washing an organic layer with a 2% $K_2CO_3$ aqueous solution, 25% NaOH was added to a water layer, which was extracted by 1 mol/L hydrochloric acid, for neutralization, and the deposited solid was extracted by dichloromethane. After washing the resulting solid with water and drying with sodium sulfate, by concentration under reduced pressure, 20.9 g of a greenish white solid was obtained.

After washing the greenish white solid with THF, by filtration and drying under reduced pressure, 9.1 g of a pale blue solid was obtained. In addition, a deposited solid, obtained by concentration of the filtrate in the filtration, was washed by the addition of THF again. Then, by further filtration and drying under reduced pressure, 2.8 g of a pale blue solid was collected again. By collecting the resulting pale blue solids together, 11.8 g (yield: 36%) of the triarylmethane derivative (Compound 5) was obtained.

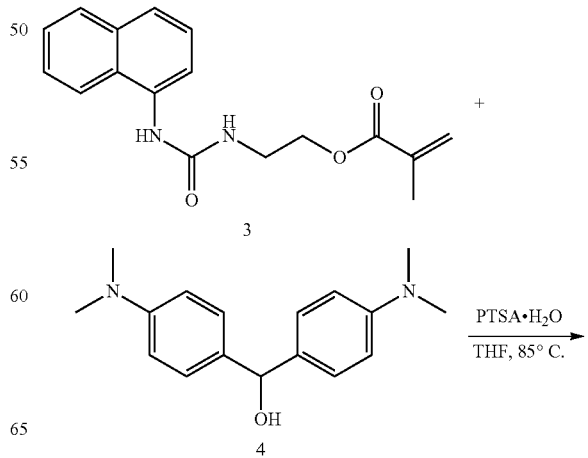

-continued

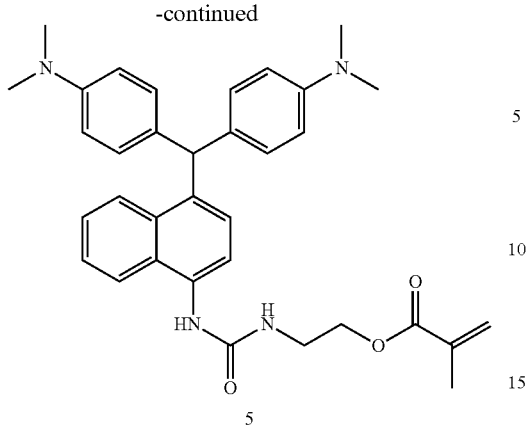

5

-continued

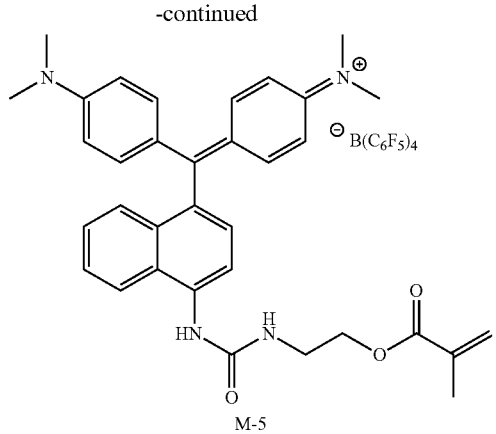

M-5

(3) Oxidation Reaction and Salt Exchange Reaction

Into a 1 L round-bottom flask equipped with a stirring apparatus, 11.0 g (20 mmol) of the triarylmethane derivative (Compound 5), 330 mL of toluene (produced by Wako Pure Chemical Industries, Ltd.), and 330 mL of dichloromethane (produced by Wako Pure Chemical Industries, Ltd.) were added, and then 220 mL (220 mmol) of 1 mol/L hydrochloric acid and 4.9 g (20 mmol) of chloranil (produced by Wako Pure Chemical Industries, Ltd.) were added thereto, and stirred at room temperature for 4 hours.

Next, 14.9 g (20 mmol equivalent) of the lithium salt of tetrakis(pentafluorophenyl)boron(IV) (produced by Tosoh Finechem Corp.) was added thereto, and stirred at room temperature for 12 hours. After that, a water layer was removed by liquid separation, and an organic layer was washed with a 3% $K_2CO_3$ aqueous solution, then washed with water and dried with sodium sulfate. By concentration under reduced pressure, 22.3 g (yield: 91%) of a dark blue solid was obtained. This was referred to the reactive dye "M-5".

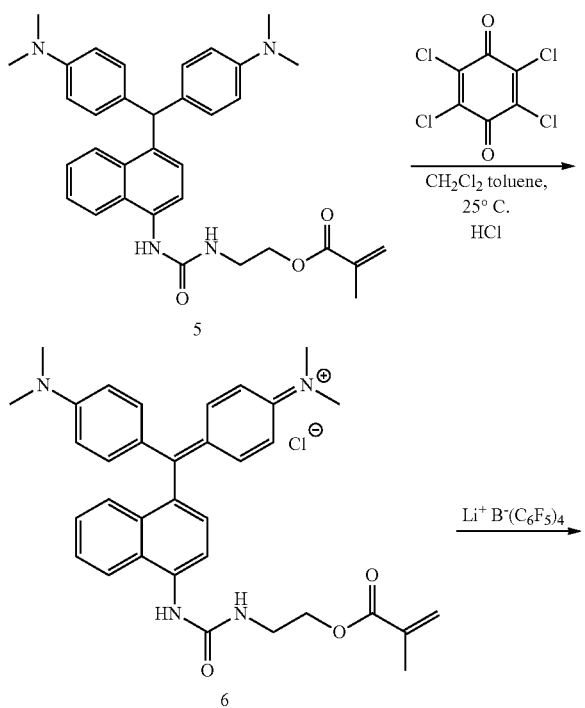

Synthesis Example 6

(Synthesis of the Reactive Dye M-6):

(1) Synthesis of a Triarylmethane Derivative Having a Carboxyl Group (Compound 10)

Into a round-bottom flask equipped with a stirring apparatus and a Dean-Stark apparatus, 5.0 g (33 mmol) of 4-formyl benzoic acid (Compound 7: produced by Wako Pure Chemical Industries, Ltd.), 16.1 g (133 mmol) of N,N-diethylaniline (Compound 8: produced by Wako Pure Chemical Industries, Ltd.), 60 mL of methyl isobutyl ketone (MIBK) (produced by Wako Pure Chemical Industries, Ltd.), and 6.3 g (33 mmol) of p-toluene sulfonic acid monohydrate (PTSA.$H_2O$) (produced by Wako Pure Chemical Industries, Ltd.) were added, and refluxed for 11 hours. Dichloromethane and water were added thereto for extraction, and then an organic layer was collected by washing with water. The solvent was removed by concentration under reduced pressure from the organic layer to obtain green oil. Dichloromethane and 1 mol/L hydrochloric acid were added thereto for extraction of a water layer, and further dichloromethane and 25% sodium hydroxide were added into the water layer for neutralization, to collect the organic layer.

Green oil, obtained by removing the solvent by concentration under reduced pressure, was purified by a silica-gel column chromatography, and the solvent was removed to obtain 9.3 g (yield: 65%) of a triarylmethane derivative (Compound 9) as a green solid.

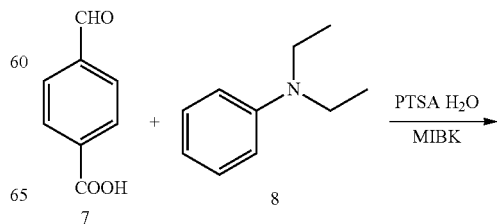

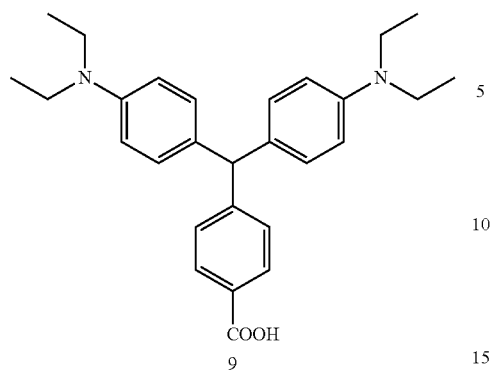

9

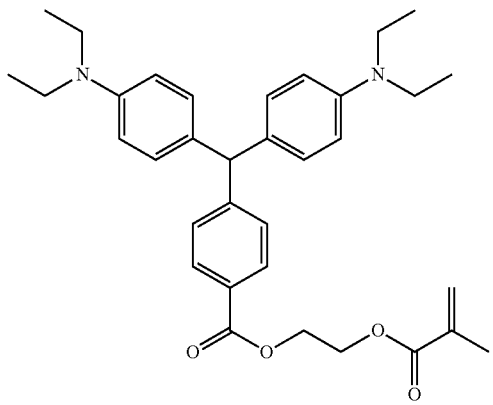

11

(2) Introduction of a Polymerizable Group

In a round-bottom flask equipped with a stirring apparatus, 9.2 g (21.4 mmol) of the triarylmethane derivative (Compound 9), obtained in (1), was dissolved into 92 mL of dichloromethane. Further, 2.8 g (21.4 mmol) of 2-hydroxyethyl methacrylate (Compound 10: produced by Wako Pure Chemical Industries, Ltd.), 0.8 g (6.4 mmol) of 4-dimethylaminopyridine (DMAP) (produced by Wako Pure Chemical Industries, Ltd.), and 4.5 g (23.5 mol) of 1-ethyl-3-(3-dimethylaminopropyl) carbodiimide hydrochloride (WSC) (produced by Toyobo Co., Ltd.) were added thereto, and subjected to a reaction at room temperature for 5 hours.

An organic layer was washed with water, and the solvent was removed by concentration under reduced pressure to obtain yellow oil. The yellow oil was purified by a silica-gel column chromatography to obtain 10.8 g (yield: 93%) of a triarylmethane derivative (Compound 11) as yellow oil state.

(3) Oxidation and Salt Exchange Reaction

Into a round-bottom flask equipped with a stirring apparatus, 4.0 g (7.4 mmol) of the triarylmethane derivative (Compound 11) obtained in (2), 80 mL of toluene, and 120 mL of dichloromethane were added and dissolved, and then 16 g of water and 1.5 g of concentrated hydrochloric acid were added and stirred at room temperature for 10 minutes. Into there, 1.8 g (7.3 mmol) of chloranil (produced by Wako Pure Chemical Industries, Ltd.) was added and stirred at room temperature for 1 hour. Further, 6.0 g (7.2 mmol) of a lithium salt of tetrakis(pentafluorophenyl)boron(IV) (Li-FABA) (produced by Tosoh Finechem Corp.) was added and subjected to a reaction at room temperature for 16 hours.

After completion of the reaction, dichloromethane and 1 mol/L hydrochloric acid were added thereto, for extraction and liquid separation, to obtain an organic layer. This organic layer was washed with water, a saturated aqueous solution of sodium hydrogen carbonate, and water in this order, and then the solvent was removed by concentration under reduced pressure. Dichloromethane was added thereto to remove insolubke substance, and then the solvent was removed by concentration under reduced pressure, and dried to obtain 7.2 g (yield: 79%) of a green solid. This was referred to the reactive dye "M-6".

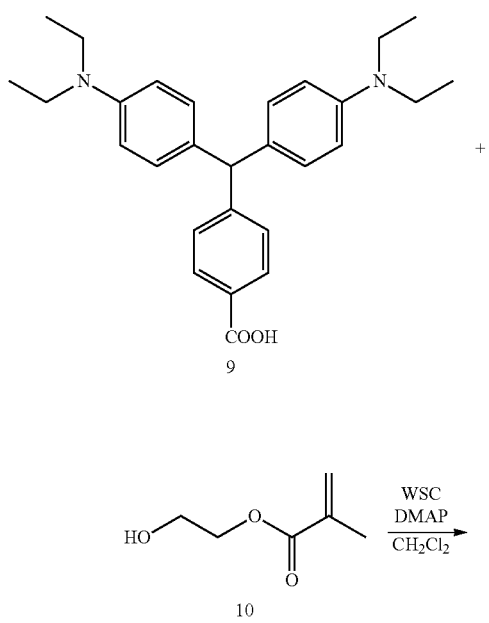

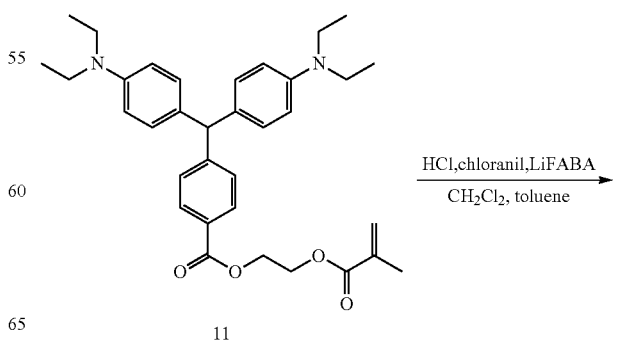

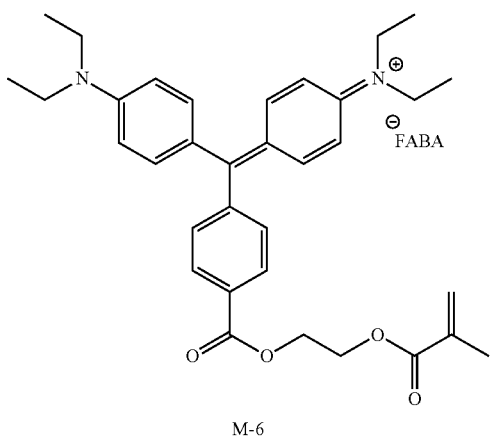

M-6

Synthesis Example 7

(Synthesis of the Reactive Dye M-7):

(1) Synthesis of a Compound of Lactone Form (Compound 14)

Into a round-bottom flask equipped with a stirring apparatus, 54.8 g (175.0 mmol) of 2-(4-diethylamino-2-hydroxybenzoyl)benzoic acid (Compound 12: produced by Tokyo Chemical Industry Co., Ltd.), 25.6 g (210.0 mmol) of p-fluorophenol (Compound 13: produced by Wako Pure Chemical Industries, Ltd.), and 160 mL of methane sulfonic acid (produced by Wako Pure Chemical Industries, Ltd.) were added, and subjected to a reaction at 90° C. for 6 hours. After completion of the reaction, dichloromethane and water were added thereto, and then a 25% aqueous solution of sodium hydroxide was added thereto for neutralization, and subjected to a reaction at room temperature for 1 hour. An organic layer was obtained by liquid separation from the resulting reaction solution, and the organic layer was washed with water. The solvent was removed from the organic layer by concentration under reduced pressure, and dried to obtain 63.8 g (yield: 94%) of the lactone substance (Compound 14) as a white solid.

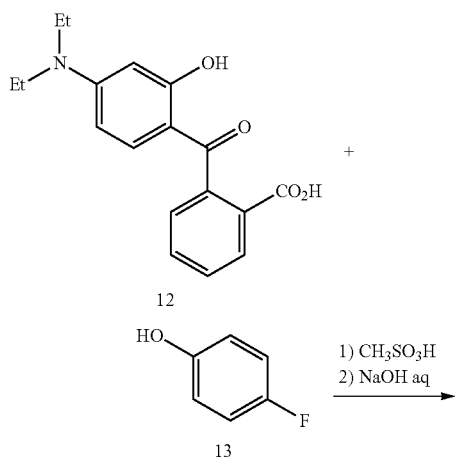

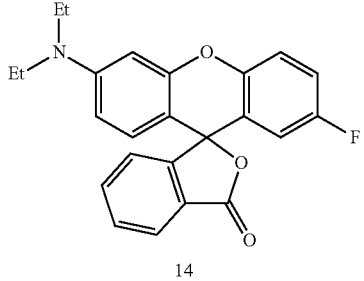

14

(2) Synthesis of a Compound of Carboxylic Acid Form (Compound 15)

Into a round-bottom flask equipped with a stirring apparatus, 31.2 g (80.0 mmol) of the compound of lactone form (Compound 14) obtained in (1), 200 mL (200.0 mmol) of a 1 mol/L of hydrochloric acid aqueous solution (produced by Wako Pure Chemical Industries, Ltd.), 59.7 g (80.0 mmol) of LiFABA (produced by Tosoh Finechem Corp.), 500 mL of ethanol and 100 mL of dichloromethane were added, and subjected to a reaction at room temperature for 3 hours. Next, the reaction solution was diluted with dichloromethane, and then washed with water.

The solvent was removed from the reaction solution by concentration under reduced pressure to obtain 85.5 g (yield: 100%) of the compound of carboxylic acid form having tetrakis(pentafluorophenyl)boron(IV) anion (Compound 15) as a red solid.

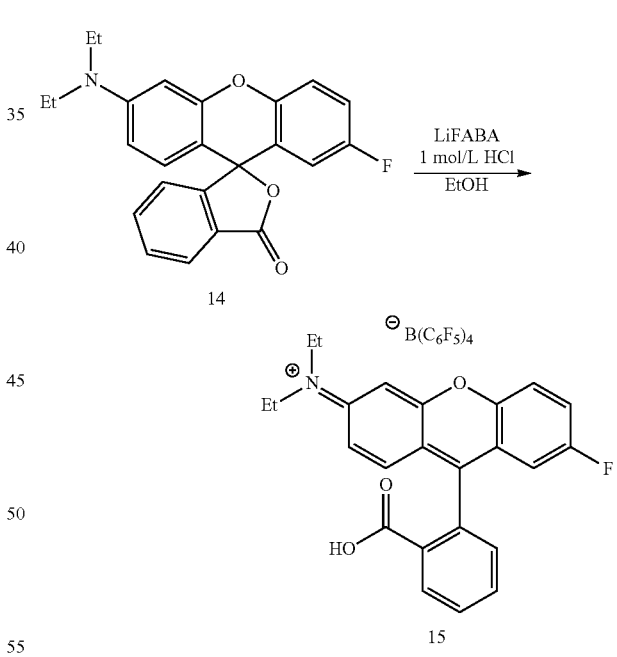

(3) Introduction of a Polymerizable Group

In a round-bottom flask equipped with a stirring apparatus, 82.9 g (77.5 mmol) of the compound of carboxylic acid form (Compound 15), obtained in (2), was dissolved into 580 mL of dichloromethane. Further 12.1 g (93.0 mmol) of 2-hydroxyethyl methacrylate (Compound 16: produced by Wako Pure Chemical Industries, Ltd.), 2.8 g (23.3 mmol) of DMAP (produced by Wako Pure Chemical Industries, Ltd.) and 25.3 g (131.8 mol) of WSC (produced by Toyobo Co., Ltd.) were added and subjected to a reaction at room temperature for 6 hours.

The reaction solution was washed with water, and the solvent was removed from the reaction solution by concentration under reduced pressure to obtain a red solid. The solid was purified by a silica-gel column chromatography to obtain 32.7 g (yield: 36%) of the red solid. This was referred to as the reactive dye "M-7".

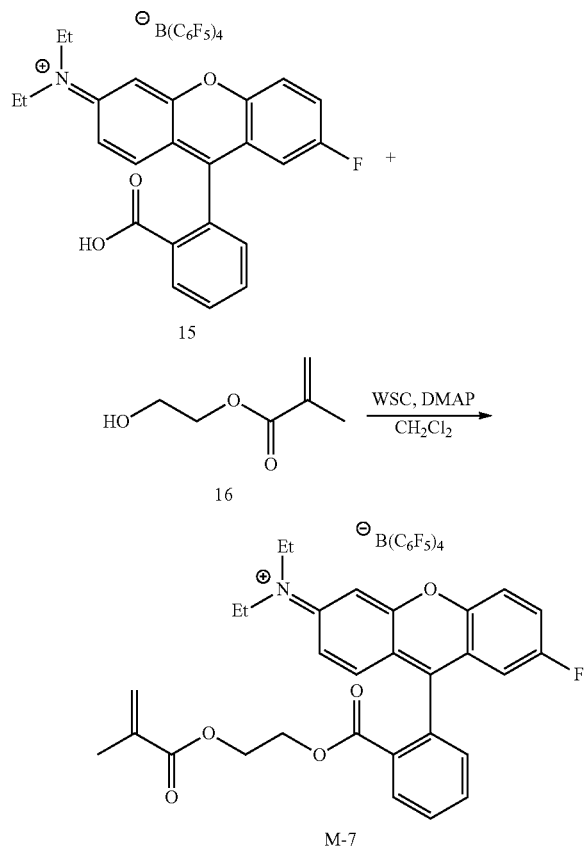

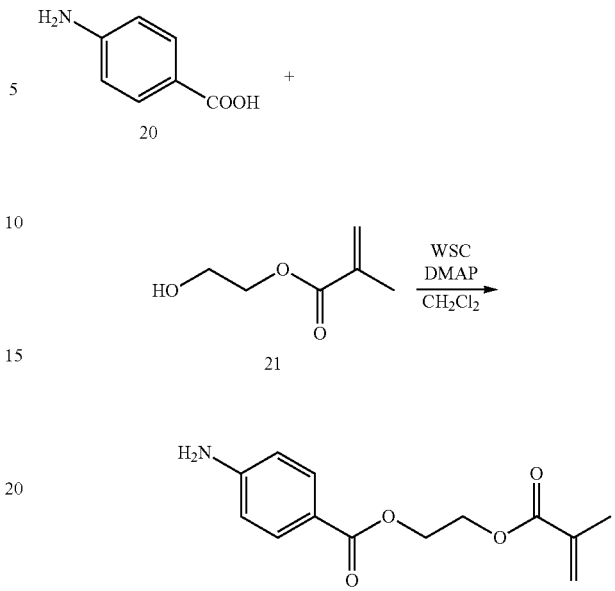

(2) Construction of a Dye Skeleton and Salt Exchange Reaction

Into a round-bottom flask equipped with a stirring apparatus, 2.0 g of 2-(1,3,3,-trimethylindoline-2-ylidene)acetaldehyde (Compound 23) (produced by Wako Pure Chemical Industries, Ltd.), 2.5 g of the compound of ester form (Compound 22) synthesized in (1), and 10 mL of acetic acid (produced by Wako Pure Chemical Industries, Ltd.) were added and subjected to a reaction at 55° C. for 5 hours. After cooling down to room temperature, methylene chloride (produced by Wako Pure Chemical Industries, Ltd.) and a saturated aqueous solution of sodium chloride were added, and stirred at room temperature for 1 hour. An organic layer was washed with water and a sodium bicarbonate aqueous solution. Into there, 7.5 g of a lithium salt of tetrakis(pentafluorophenyl)boron(IV) (produced by Tosoh Finechem Corp.) was added and stirred at room temperature for 0.5 hour.

After washing the reaction solution with water, the solvent was removed by concentration under reduced pressure to obtain 10.9 g (yield: 98%) of a dark orange solid. This was referred to the reactive dye "M-8".

Synthesis Example 8

(1) Introduction of a Polymerizable Group

Into a round-bottom flask equipped with a stirring apparatus, 13.7 g of 4-aminobenzoic acid (Compound 20) (produced by Wako Pure Chemical Industries, Ltd.), 13.7 g of 2-hydroxyethyl methacrylate (Compound 21) (produced by Wako Pure Chemical Industries, Ltd.), 3.7 g of 4-dimethylaminopyridine (produced by Wako Pure Chemical Industries, Ltd.), and 180 mL of methylene chloride (produced by Wako Pure Chemical Industries, Ltd.) were added. Into there, 23.0 g of 1-ethyl-3-(3-dimethylaminopropyl)carbodiimide hydrochloride (produced by Toyobo Co., Ltd.) was added, and subjected to a reaction at −5° C. for 7 hours. After raising temperature up to room temperature, a generated solid was filtrated, and ethyl acetate (produced by Wako Pure Chemical Industries, Ltd.) and water were added thereto for extraction and washing, and then the solvent was removed by concentration under reduced pressure.

The resulting solid was recrystallized with methanol to obtain 9.1 g (yield: 37%) of a compound of ester form (Compound 22) as a white solid.

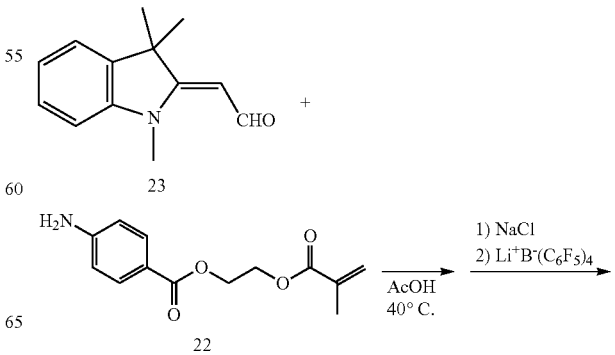

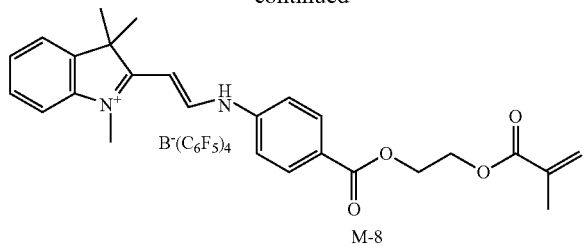

M-8

Examples 1 to 3 and Comparative Examples 1 to 7

The reactive dye "M-2", the reactive dye "M-3", the reactive dye "M-4", the dyes 1 to 3 or the pigments 1 to 3, as a dye or pigment; polypropylene (PP), as a polyolefin; and 2,5-dimethyl-2,5-di(tert-butylperoxy)hexane (KAYA HEXA AD-40C, produced by KAYAKU AKZO Corp.), as a radical polymerization initiator, or Daiwax M (produced by Dainichi Chemical Industry Co., Ltd.), as a dispersing agent; were compounded. Compounding ratio thereof is described in Table 20.

In this case, into Labo Plastomill (manufactured by Toyo Seiki Seisaku-sho, Ltd.), which was adopted as a kneading container, 50 g of PP was put, and then 0.5 g of the reactive dye and further 0.25 g of the radical polymerization initiator were put. Then the raw material mixture was stirred in the Labo Plastomill at 180° C. for 10 minutes under a rotation speed of 70 rpm, to obtain a colored matter.

It should be noted that in Comparative Example 1, the radical polymerization initiator was not used. In addition, in Comparative Examples 2 to 4, the pigments 1 to 3 were used instead of the reactive dye, as well as 0.1 g of Daiwax M (produced by Dainichi Chemical Industry Co., Ltd.) was put as a dispersing agent, instead of the radical polymerization initiator. In addition, in Comparative Examples 5 to 7, the dyes 1 and 2 were used instead of the reactive dye.

Next, the resulting colored matter was crushed finely, and after shaking by hand, a compression-molded specimen and a compression-molded sheet were obtained by a compression molding machine (manufactured by SHINTO Metal Industries Corp.), under conditions of the compression molding machine as heating for 1 minute, pressurization for 1 minute and cooling for 1 minute, and by using a spacer having a thickness of 0.2 mm.

Lastly, as for the resulting compression-molded specimen and compression-molded sheet, the simplified elution test and the simplified rubbing fastness test were carried out, and evaluation results thereof are described in Table 20.

TABLE 20

| Compond composition | Compounding ratio | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| Polyolefin PP | Weight part (50 g) | 100 | 100 | 100 | 100 | 100 | 100 | 100 | 100 | 100 | 100 | 100 |
| Dye/pigment | Weight part (0.5 g) | | | | | | | | | | | |
| Reactive dye M-4 | | 1 | | | 1 | | | | | | | |
| Reactive dye M-2 | | | 1 | | | | | | | | | |
| Reactive dye M-3 | | | | 1 | | | | | | | | |
| Pigment 1 42-117A | | | | | | 1 | | | | | | |
| Pigment 2 PALIOGEN RED | | | | | | | 1 | | | | | |
| Pigment 3 Hostaperm Red | | | | | | | | 1 | | | | |
| Dye 1 MACROLEX Red | | | | | | | | | 1 | | | |
| Dye 2 Sumiplast Red | | | | | | | | | | 1 | | 1 |
| Dye 3 Sumiplast Lemon Yellow | | | | | | | | | | | 1 | |
| Radical polymerization initiator KAYAHEXA AD-40C | Weight part (0.25 g) | 0.5 | 0.5 | 0.5 | — | — | — | — | — | — | — | 0.5 |
| Dispersing agent Diawax M | Weight part (0.05 g) | — | — | — | — | 0.1 | 0.1 | 0.1 | — | — | — | — |
| Evaluation result Simplified elution test Color difference ΔE | | | | | | | | | | | | |
| 100 h elapsed | | 12.88 | 16.38 | 8.07 | 45.93 | 0.50 | 0.83 | 0.26 | 4.04 | 42.18 | 23.40 | 37.80 |
| 150 h elapsed | | 13.74 | 16.36 | 9.13 | 49.14 | 0.32 | 0.73 | 0.32 | 5.28 | 57.78 | 36.68 | 53.43 |
| 200 h elapsed | | 14.75 | 16.31 | 10.08 | 49.79 | 0.51 | 0.76 | 0.23 | 5.38 | 60.19 | 42.34 | 56.79 |
| Simplified rubbing fastness test Color difference ΔE | | 2.97 | 1.10 | 1.94 | 3.07 | 4.40 | 2.39 | 3.37 | 0.51 | 3.96 | 16.49 | 2.54 |

(Evaluation Results and Discussion)

Judging from the results of the simplified elution test or the simplified rubbing fastness test, it is clear that in the case of the colored matters obtained in Examples 1 to 3, the resin and the reactive dye are fixed; because the reactive dye which is used were subjected to the graft polymerization, thus it bonded to the resin and did not elute into a solvent even after elapsing of time.

On the other hand, judging from the results of the simplified elution test or the simplified rubbing fastness test, it is clear that in the case of the colored matters obtained in Comparative Examples 1 to 7, the resin and the dye or the pigment are not bonded; because the dye or the pigment which is used is only mixed in the resin, thus it eluted into the solvent after elapsing of time.

Example 4

1. Preparation of a Sample

The reactive dyes "M-2", "M-5" to "M-8" were used, and polypropylene (PP) was used as the polyolefin. As PP, Wintec PP WFW4 (produced by Japan Polypropylene Corp.) was used.

The raw material prepared above was kneaded using a twin-screw kneading extruder (manufactured by Labotech Inc.), under the following conditions.

Conditions of the twin-screw kneading extruder: test temperature: 220° C., screw rotation speed: 300 rpm 2. Preparation of a Colored Matter Relative to 10 kg of PP, 2 g of the reactive dyes "M-5", "M-8", "M-2" and "M-6", and 2 g of KAYA HEXA AD-40C (produced by KAYAKU AKZO Corp.) as an additive, were put, and mixed and kneaded to obtain the colored matter.

In addition, in the case of the reactive dye "M-7", relative to 10 kg of PP, 4 g of the reactive dye "M-7", and 4 g of KAYA HEXA AD-40C (produced by KAYAKU AKZO Corp.) as an additive, were put, and mixed and kneaded to obtain the colored matter.

A compounding list is shown in the following Table 21.

Comparative Example 8

The colored matter was obtained by mixing and kneading by a similar method as in Example 4, by changing the reactive dye to Sumiplast Red $H_4GR$ (produced by Sumika Chemtex Co., Ltd.) as the dye 1, and without the addition of the additive.

A compounding list is shown in the following Table 21.

TABLE 21

| examination No. | Compound | | | | | | | |
|---|---|---|---|---|---|---|---|---|
| | Reactive dye M-5 | Reactive dye M-8 | Reactive dye M-2 | Reactive dye M-6 | Reactive dye M-7 | Dye 1 | additive | PP |
| | Weight part | | | | | | | wt % |
| Example 4-1 | 0.02 | | | | | | 0.02 | 100 |
| Example 4-2 | | 0.02 | | | | | 0.02 | 100 |
| Example 4-3 | | | 0.02 | | | | 0.02 | 100 |
| Example 4-4 | | | | 0.02 | | | 0.02 | 100 |
| Example 4-5 | | | | | 0.04 | | 0.04 | 100 |
| Comp. Example 8-1 | | | | | | 0.02 | | 100 |

[Evaluation by the Simplified Elution Test]

1. Preparation of a Specimen

In the Example 4 and Comparative Example 8, the resulting colored matter was subjected to injection molding by a 50-ton injection molding machine (manufactured by Nissei Plastic Industrial Co., Ltd.), under the following conditions, to obtain a plate having a size of 90 mm length×50 mm width×2 mm thickness.

Conditions of the injection molding machine: a cylinder temperature of 220° C., a mold temperature of 40° C.

2. Preparation of a Compression-Molded Specimen

The resulting plate was crushed finely, and after shaking by hand, a compression-molded specimen (sheet) was obtained by a compression molding machine (manufactured by SHINTO Metal Industries Corp.), under the following conditions, and by using a spacer having a thickness of 0.2 mm.

Conditions of the compression molding machine: heating for 1 minute, pressurization for 1 minute and cooling for 1 minute.

3. Evaluation by the Simplified Elution Test

The compression-molded sheet prepared above was subjected to color measurement, using a spectrophotometer (manufactured by Gretag Macbeth Co., Ltd.). Elution degree is compared by color difference ΔE, based on color measurement after elapsing 25 hr, 50 hr, 100 hr and 250 hr.

In a glass bottle having a suitable size, 100 mL of the solvent was charged and the compression-molded specimen prepared above, attached with a weight such as a clip, was put therein, so that the whole surface thereof is soaked in the solvent. As the solvent, methyl ethyl ketone (produced by Wako Pure Chemical Industries, Ltd.) was used.

Evaluation results are shown in the following Table 22.

TABLE 22

| | Color difference ΔE | | | |
|---|---|---|---|---|
| examination No. | 25 hr elapsed | 50 hr elapsed | 100 hr elapsed | 250 hr elapsed |
| Example 4-1 | 0.68 | 0.68 | 0.83 | 1.20 |
| Example 4-2 | 2.03 | 2.33 | 2.64 | 2.91 |
| Example 4-3 | 1.16 | 1.06 | 1.28 | 1.14 |
| Example 4-4 | 0.95 | 0.97 | 1.05 | 1.11 |
| Example 4-5 | 0.58 | 0.81 | 0.95 | 1.00 |
| Comp. Example 8-1 | 5.58 | 8.33 | 11.77 | 16.09 |

As is clear from Table 22, it has been understood that, in Example 4 which uses the reactive dye, no color fading is observed even after elapsing 250 hours, and is good.

On the other hand, judging from the results of the simplified elution test, it is clear that, in the colored matter obtained in Comparative Example 8, the resin and the dye are not bonded, because the dye which is used is only simply mixed in the resin, thus it eluted into the solvent after elapsing of time.

From the above results, rationality and significance of elements in the present invention, and superiority of the present invention over conventional technique are clear.

INDUSTRIAL APPLICABILITY

As is clear from the above results, the graft polymer of the present invention and the colored resin composed of the graft polymer are free from color migration or fading caused by bleed-out after coloring, without impairing vivid color development and transparency of the dye.

Therefore, when the colored resin, having such desirable characteristics, is used as a master batch of a thermoplastic resin, in particular a polyolefin-type resin, it can be used in various colored molding articles showing unique vivid color development of the pigment, as compared with a conventional dye, in a wide range of applications such as automobiles, household electric appliances, everyday sundries, and the like. Therefore, industrial value thereof is extremely high.

The invention claimed is:

1. A graft polymer having a polyolefin (A), as a main chain, and a polymer (B) as a side chain,
   the polymer (B) is a polymerized dye (b) having a radical reactive functional group;
   wherein the dye (b) having the radical reactive functional group is a coloring compound having the ethylenically unsaturated group; and
   the coloring compound is a cyanine-type coloring compound, a naphthalocyanine metallic complex-type coloring compound, a dithiol metallic complex-type coloring compound, a naphthoquinone-type coloring compound, an anthraquinone-type coloring compound, an indophenol-type coloring compound, an indoaniline-type coloring compound, a pyrylium-type coloring compound, a thiopyrylium-type coloring compound, a squarylium-type coloring compound, a croconium-type coloring compound, a diphenylmethane-type coloring compound, a triarylmethane-type coloring compound, a triphenylmethane phthalide-type coloring compound, a phenothiazine-type coloring compound, a phenoxazine-type coloring compound, a fluoran-type coloring compound, a thiofluorene-type coloring compound, a xanthene-type coloring compound, an indolyl phthalide-type coloring compound, a spiropyran-type coloring compound, an azaphthalide-type coloring compound, a chromeno pyrazole-type coloring compound, a leucoauramine-type coloring compound, a rhodamine lactam-type coloring compound, a quinazoline-type coloring compound, a diazaxanthene-type coloring compound, a bislactone-type coloring compound, a fluorenone-type coloring compound, a ketone imine-type coloring compound, a methine-type coloring compound, a polymethine-type coloring compound, a thioindigo-type coloring compound, a perylene-type coloring compound, a nitroso-type coloring compound, or a rhodamine-type coloring compound.

2. The graft polymer according to claim 1 obtainable by reacting a reactive mixture containing the polyolefin (A), the dye (b) having a radical reactive functional group, and a radical reaction initiator (C).

3. The graft polymer according to claim 2, wherein the reactive mixture further comprises 1 to 3 kinds of compounds (D) selected from the group consisting of the compounds represented by the general formula (VII), the general formula (VIII), the general formula (IX) and the general formula (X),

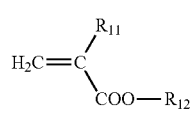
(VII)

where, in the general formula (VII), $R_{11}$ represents a hydrogen atom or a methyl group; $R_{12}$ represents a hydrogen atom, an alkyl group having 1 to 18 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms which has or does not have oxygen, a dialkylaminoalkyl group having 3 to 9 carbon atoms, a fluoroalkyl group having 1 to 18 carbon atoms, an N-alkylenephthalimide group having 9 to 14 carbon atoms, a group represented by the following general formula (VII-I),

(VII-I)

wherein $R_{15}$ represents an alkylene group having 1 to 3 carbon atoms, which has a hydroxy group as a substituent or no substituent; $R_{16}$ represents a phenyl group which has a hydroxy group as a substituent or no substituent, or an alkyl group having 1 to 3 carbon atoms; q represents an integer of 1 to 3, a group represented by the following general formula (VII-II),

(VII-II)

wherein $R_{17}$ to $R_{19}$ represent an alkyl group having 1 to 3 carbon atoms; $R_{20}$ represents an alkylene group having 1 to 3 carbon atoms, or a group represented by the following general formula (VII-III),

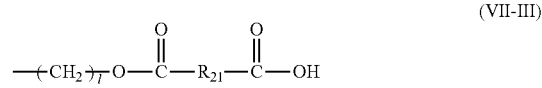
(VII-III)

wherein l represents an integer of 1 to 6; $R_{21}$ represents a phenylene group or a cyclohexylene group,

(VIII)

where, in the general formula (VIII), $R_{11}$ represents a hydrogen atom or a methyl group; $R_{13}$ represents a hydrogen atom, or an alkyl group having 1 to 3 carbon atoms; $R_{14}$ represents a hydrogen atom, an alkyl group having 1 to 3 carbon atoms, a dialkylaminoalkyl group having 3 to 9 carbon atoms, or a hydroxyalkyl group having 1 to 6 carbon atoms; $R_{13}$ and $R_{14}$ may form a morpholino group together with a nitrogen atom adjacent thereto,

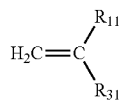

(IX)

where, in the general formula (IX), $R_{11}$ represents a hydrogen atom or a methyl group; $R_{31}$ represents a phenyl group or a pyrrolidino group;

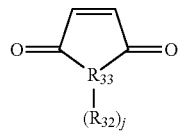

(X)

where, in the general formula (X), $R_{33}$ represents a nitrogen atom or an oxygen atom; j represents 0 when $R_{33}$ is an oxygen atom, and 1 when $R_{33}$ is a nitrogen atom; $R_{32}$ represents a hydrogen atom, an alkyl group having 1 to 20 carbon atoms, a hydroxyalkyl group having 1 to 10 carbon atoms, a halogenated alkyl group having 1 to 10 carbon atoms, an alkylcycloalkyl group having 1 to 10 carbon atoms, a halogenated cycloalkyl group having 6 to 7 carbon atoms, an aryl group having 6 to 10 carbon atoms, an aryl group having 6 to 10 carbon atoms, which has an alkyl group having 1 to 6 carbon atoms as a substituent, or a halogenated aryl group having 6 to 10 carbon atoms.

4. The graft polymer according to claim 2, wherein a mixing ratio (weight ratio) of the polyolefin (A) and the dye (b) having the radical reactive functional group is A:b=100:0.01 to 100:10.

5. The graft polymer according to claim 2, wherein the radical reaction initiator (C) is an organic peroxide or an azo compound.

6. The graft polymer according to claim 5, wherein the radical reaction initiator (C) is an organic peroxide.

7. The graft polymer according to claim 2, wherein a mixing ratio (weight ratio) of the polyolefin (A) and the radical reaction initiator (C) is A:C=100:0.01 to 100:10.

8. The graft polymer according to claim 1, wherein the polyolefin (A) is a homo-polymer or a co-polymer of an α-olefin having 2 to 15 carbon atoms.

9. The graft polymer according to claim 8, wherein the polyolefin (A) is polyethylene, polypropylene or a copolymer of ethylene and propylene.

10. The graft polymer according to claim 1, wherein the dye (b) having the radical reactive functional group is a cationic rhodamine derivative having an ethylenically unsaturated group, a cationic triarylmethane-type dye derivative having an ethylenically unsaturated group, or a cationic cyanine-type dye derivative having an ethylenically unsaturated group.

11. The graft polymer according to claim 10, wherein the dye (b) having the radical reactive functional group is a compound selected from the group consisting of compounds represented by the following general formula (I), the general formula (II), the general formula (III), the general formula (IV), the general formula (V) and the general formula (VI):

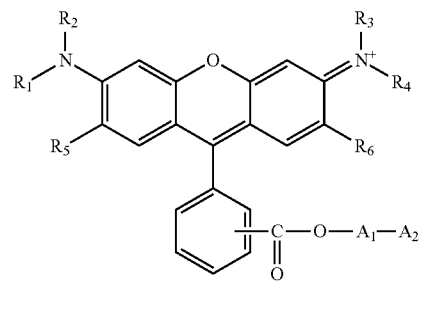

(I)

where, in the general formula (I), $R_1$ to $R_4$ each independently represent a hydrogen atom, an alkyl group having 1 to 30 carbon atoms, a hydroxyalkyl group having 1 to 6 carbon atoms, a sulfoalkyl group having 1 to 6 carbon atoms, a carboxyalkyl group having 2 to 7 carbon atoms, a cyanoalkyl group having 2 to 7 carbon atoms, an alkoxyalkyl group having 2 to 6 carbon atoms, a halogenoalkyl group having 1 to 6 carbon atoms, a phenyl group having or not having a substituent, or a benzyl group having or not having a substituent; $R_5$ to $R_7$ each independently represent a hydrogen atom or a methyl group; $A_1$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_2$ represents —NH— or —O—; and, An⁻ represents an anion,

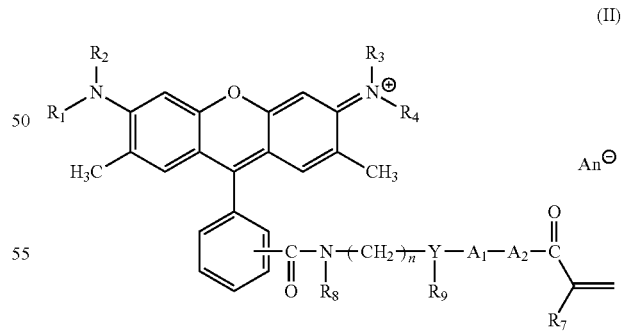

(II)

where, in the general formula (II), $R_1$ to $R_4$, $R_7$, $A_1$, $A_2$ and An⁻ are the same as those in the general formula (I); $R_8$ represents a hydrogen atom, or an alkyl group having 1 to 30 carbon atoms; $R_9$ represents a hydrogen atom, or an alkyl group having 1 to 6 carbon atoms; n represents an integer of 0 to 3; Y represents a nitrogen atom or a group represented by the following general formula (II-1),

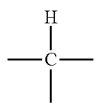

(II-1)

$R_8$ and $R_9$ may form a cyclic structure of a 5 to 6 membered ring together with —N—$(CH_2)_n$Y-bonding thereto,

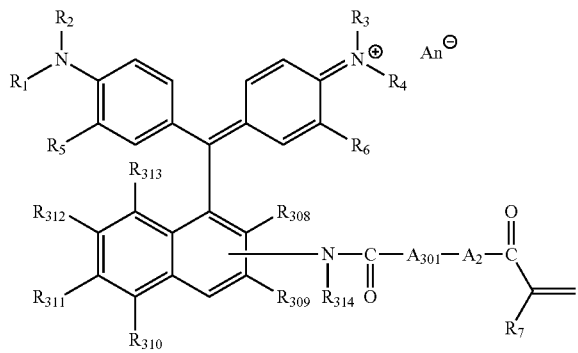

(III)

where, in the general formula (III), $R_1$ to $R_7$, $A_2$ and An⁻ are the same as those in the general formula (I); $R_{314}$ represents a hydrogen atom, an alkyl group having 1 to 30 carbon atoms, a phenyl group having or not having a substituent, a naphthyl group having or not having a substituent, or a benzyl group having or not having a substituent; $R_{308}$ to $R_{313}$ each independently represent an alkyl group having 1 to 21 carbon atoms, an aryl group, a hydroxy group, a nitro group, a sulfo group or an alkoxy group having 1 to 3 carbon atoms; $A_{301}$ represents an alkylene group having 1 to 21 carbon atoms which has at least one group of —N($R_{315}$)—, —O—, —OCO—, —COO— or an arylene group in the chain, and also has a hydroxy group as a substituent, an alkylene group having 1 to 21 carbon atoms which has at least one group of —N($R_{315}$)—, —O—, —OCO—, —COO— or an arylene group in the chain, an alkylene group having 1 to 21 carbon atoms which has a hydroxy group as a substituent, or an alkylene group having 1 to 21 carbon atoms; $R_{315}$ represents a hydrogen atom, an alkyl group having 1 to 30 carbon atoms, a phenyl group having or not having a substituent, a naphthyl group having or not having a substituent, or a benzyl group having or not having a substituent,

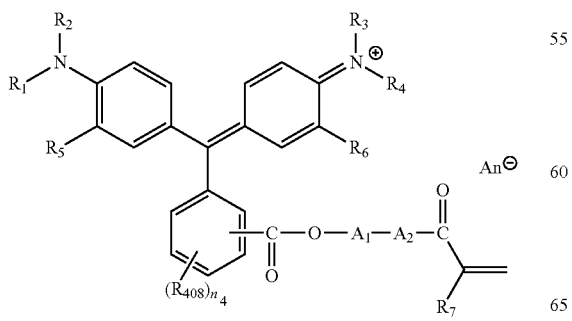

(IV)

where, in the general formula (IV), $R_1$ to $R_7$, $A_1$, $A_2$ and An⁻ are the same as those in the general formula (I); $n_4$ pieces of $R_{408}$ each independently represent a halogen atom, an alkyl group having 1 to 21 carbon atoms, an aryl group having 6 to 10 carbon atoms, a hydroxy group, a nitro group, a sulfo group, or an alkoxy group having 1 to 3 carbon atoms; and $n_4$ represents an integer of 0 to 4,

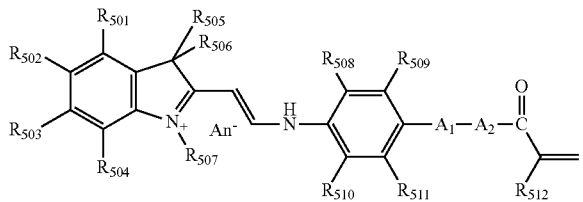

(V)

where, in the general formula (V), $A_1$, $A_2$ and An⁻ are the same as those in the general formula (I); $R_{501}$ to $R_{504}$ and $R_{508}$ to $R_{511}$ each independently represent a hydrogen atom, a nitro group, a halogeno group, a cyano group, an amide group, a carboxy group, an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, or an arylcarbonyl group having 7 to 10 carbon atoms; $R_{505}$ and $R_{506}$ each independently represent a hydrogen atom, an alkyl group having 1 to 6 carbon atoms, an arylalkyl group having 7 to 13 carbon atoms, or a phenylalkyl group having 7 to 9 carbon atoms, which has an alkyl group having 1 to 6 carbon atoms, a nitro group, a halogeno group or a cyano group, as a substituent of the phenyl group; $R_{507}$ represents a hydrogen atom, an alkyl group having 1 to 6 carbon atoms, an arylalkyl group having 7 to 13 carbon atoms, an alkyl group having 1 to 6 carbon atoms, which has an alkoxy group having 1 to 6 carbon atoms, a hydroxy group, a carboxy group, a halogeno group, a cyano group, an amide group, or an alkyloxycarbonyl group having 2 to 4 carbon atoms, as a substituent, or a phenylalkyl group having 7 to 9 carbon atoms, which has an alkoxy group having 1 to 6 carbon atoms, a halogeno group, or an amide group, as a substituent of the phenyl group; $R_{512}$ represents a hydrogen atom or a methyl group,

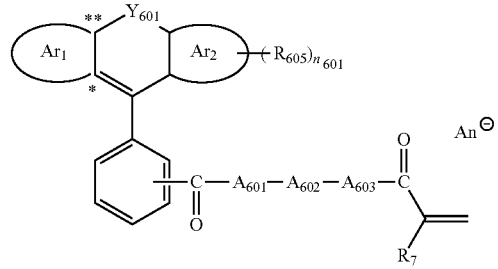

(VI)

where, in the general formula (VI), $R_7$ and An⁻ are the same as those in the general formula (I); $A_{601}$ represents —O— or a group represented by the following general formula (VI-2-1),

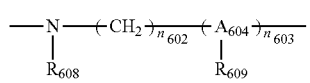
(VI-2-1)

wherein $R_{608}$ and $R_{609}$ each independently represent a hydrogen atom, or an alkyl group having 1 to 12 carbon atoms; $A_{604}$ represents a nitrogen atom, or a group represented by the following general formula (VI-2-2);

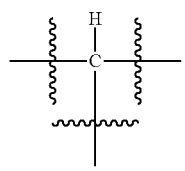
(VI-2-2)

$n_{602}$ represents an integer of 0 to 3; $R_{608}$ and $R_{609}$ may form a cyclic structure of a 5 to 6 membered ring together with —N—(CH$_2$)$_{n602}$-(A$_{604}$)$_{n603}$- bonding thereto, and when the cyclic structure of the 5 to 6 membered ring is formed by $R_{608}$, $R_{609}$ and —N—(CH$_2$)$_{n602}$-(A$_{604}$)$_{n603}$-, $n_{603}$ represents 1, and when the cyclic structure of the 5 to 6 membered ring is not formed, $n_{603}$ represents 0 or 1, $A_{602}$ represents an alkylene group having 1 to 21 carbon atoms which has at least one group selected from the group consisting of —O—, —OCO—, —COO—, —NHCO—, —CONH—, —NHCONH— and an arylene group in the chain, an alkylene group having 1 to 21 carbon atoms which has at least one group selected from the group consisting of —O—, —OCO—, —COO—, —NHCO—, —CONH—, —NHCONH— and an arylene group in the chain, and also has a hydroxy group as a substituent, an alkylene group having 1 to 21 carbon atoms which has a hydroxy group as a substituent, or an alkylene group having 1 to 21 carbon atoms; $A_{603}$ represents —NR$_{610}$— or —O—; $R_{610}$ represents a hydrogen atom, or an alkyl group having 1 to 12 carbon atoms; $n_{601}$ pieces of $R_{605}$ each independently represent a halogen atom, an alkyl group having 1 to 20 carbon atoms, an alkoxy group having 1 to 20 carbon atoms, an alkylthio group having 1 to 20 carbon atoms, or an amino group having or not having a substituent; $Y_{601}$ represents an oxygen atom, a sulfur atom, —NR$_{632}$—, —BR$_{633}$— or —Si(R$_{634}$)$_2$—; $R_{632}$, $R_{633}$ and two pieces of $R_{634}$ represent an alkyl group having 1 to 6 carbon atoms; $Ar_1$ represents a cyclic structure represented by the following general formulae (VI-1-1) to (VI-1-7);

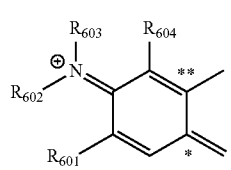
(VI-1-1)

wherein $R_{601}$ and $R_{604}$ each independently represent a hydrogen atom or a methyl group; $R_{602}$ and $R_{603}$ each independently represent an alkyl group having 1 to 20 carbon atoms; $R_{601}$ and $R_{602}$ together may form an alkylene group having 2 to 4 carbon atoms; $R_{603}$ and $R_{604}$ together may form an alkylene group having 2 to 4 carbon atoms,

(VI-1-2)

wherein $R_{631}$ represents an alkyl group having 1 to 20 carbon atoms,

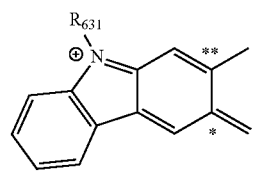
(VI-1-3)

wherein $R_{631}$ is the same as described above,

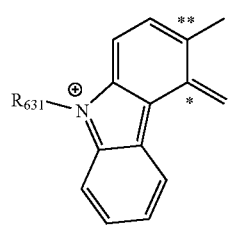
(VI-1-4)

wherein $R_{631}$ is the same as described above,

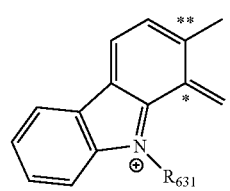
(VI-1-5)

wherein $R_{631}$ is the same as described above,

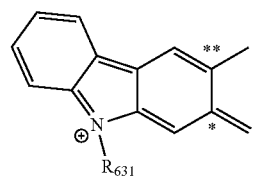
(VI-1-6)

wherein $R_{631}$ is the same as described above,

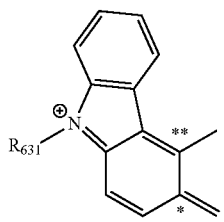

(VI-1-7)

wherein $R_{631}$ is the same as described above,

* and ** represent binding positions of each of them; $Ar_2$ represents a benzene ring, a naphthalene ring or an anthracene ring; when $Ar_2$ is the benzene ring, $n_{601}$ represents an integer of 0 to 4, when $Ar_2$ is the naphthalene ring, $n_{601}$ represents an integer of 0 to 6, and when $Ar_2$ is the anthracene ring, $n_{601}$ represents an integer of 0 to 8.

12. The graft polymer according to claim 1, wherein the polymerized dye (b) having the radical reactive functional group is polymerized by reacting 1 to 3 kinds of compounds (D) selected from the group consisting of compounds represented by the following general formula (VII), the general formula (VIII), the general formula (IX) and the general formula (X), and the dye (b) having the radical reactive functional group,

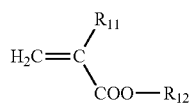

(VII)

where, in the general formula (VII), $R_{11}$ represents a hydrogen atom or a methyl group; $R_{12}$ represents a hydrogen atom, an alkyl group having 1 to 18 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms which has or does not have oxygen, a dialkylaminoalkyl group having 3 to 9 carbon atoms, a fluoroalkyl group having 1 to 18 carbon atoms, an N-alkylenephthalimide group having 9 to 14 carbon atoms, a group represented by the following general formula (VII-I),

(VII-I)

wherein $R_{15}$ represents an alkylene group having 1 to 3 carbon atoms, which has a hydroxy group as a substituent or no substituent; $R_{16}$ represents a phenyl group which has a hydroxy group as a substituent or no substituent, or an alkyl group having 1 to 3 carbon atoms; q represents an integer of 1 to 3, a group represented by the following general formula (VII-II),

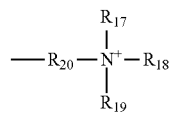

(VII-II)

wherein $R_{17}$ to $R_{19}$ represent an alkyl group having 1 to 3 carbon atoms; $R_{20}$ represents an alkylene group having 1 to 3 carbon atoms, or a group represented by the following general formula (VII-III),

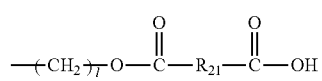

(VII-III)

wherein l represents an integer of 1 to 6; $R_{21}$ represents a phenylene group or a cyclohexylene group,

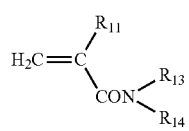

(VIII)

where, in the general formula (VIII), $R_{11}$ represents a hydrogen atom or a methyl group; $R_{13}$ represents a hydrogen atom, or an alkyl group having 1 to 3 carbon atoms; $R_{14}$ represents a hydrogen atom, an alkyl group having 1 to 3 carbon atoms, a dialkylaminoalkyl group having 3 to 9 carbon atoms, or a hydroxyalkyl group having 1 to 6 carbon atoms; $R_{13}$ and $R_{14}$ may form a morpholino group together with a nitrogen atom adjacent thereto,

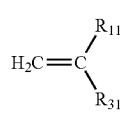

(IX)

where, in the general formula (IX), $R_{11}$ represents a hydrogen atom or a methyl group; $R_{31}$ represents a phenyl group or a pyrrolidino group,

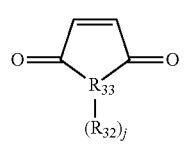

(X)

where, in the general formula (X), $R_{33}$ represents a nitrogen atom or an oxygen atom; j represents 0 when $R_{33}$ is an oxygen atom, and 1 when $R_{33}$ is a nitrogen atom; $R_{32}$ represents a hydrogen atom, an alkyl group having 1 to 20 carbon atoms, a hydroxyalkyl group having 1 to 10 carbon atoms, a halogenated alkyl group having 1 to 10 carbon atoms, an alkylcycloalkyl group having 1 to 10 carbon atoms, a halogenated cycloalkyl group having 6 to 7 carbon atoms, an aryl group having 6 to 10 carbon atoms, an aryl group having 6 to 10 carbon atoms, which has an alkyl group having 1 to 6 carbon atoms as a substituent, or a halogenated aryl group having 6 to 10 carbon atoms.

13. A colored resin consisting of the graft polymer according to claim 1.

14. A resin composition containing the colored resin according to claim 13.

15. The resin composition according to claim 14, wherein the resin composition is for use as a master batch.

16. A production method for a colored resin, which comprises; mixing a polyolefin (A), a dye (b) having a radical reactive functional group, and a radical reaction initiator (C); and subjecting the mixture to a radical reaction; wherein the dye (b) having the radical reactive functional group is a coloring compound having the ethylenically unsaturated group; and the coloring compound is a cyanine-type coloring compound, a naphthalocyanine metallic complex-type coloring compound, a dithiol metallic complex-type coloring compound, a naphthoquinone-type coloring compound, an anthraquinone-type coloring compound, an indophenol-type coloring compound, an indoaniline-type coloring compound, a pyrylium-type coloring compound, a thiopyrylium-type coloring compound, a squarylium-type coloring compound, a croconium-type coloring compound, a diphenylmethane-type coloring compound, a triarylmethane-type coloring compound, a triphenylmethane phthalide-type coloring compound, a phenothiazine-type coloring compound, a phenoxazine-type coloring compound, a fluoran-type coloring compound, a thiofluorene-type coloring compound, a xanthene-type coloring compound, an indolyl phthalide-type coloring compound, a spiropyran-type coloring compound, an azaphthalide-type coloring compound, a chromeno pyrazole-type coloring compound, a leucoauramine-type coloring compound, a rhodamine lactam-type coloring compound, a quinazoline-type coloring compound, a diazaxanthene-type coloring compound, a bislactone-type coloring compound, a fluorenone-type coloring compound, a ketone imine-type coloring compound, a methine-type coloring compound, a polymethine-type coloring compound, a thio-indigo-type coloring compound, a perylene-type coloring compound, a nitroso-type coloring compound, or a rhodamine-type coloring compound.

17. The production method for the colored resin according to claim 16, wherein the method comprises; mixing the polyolefin (A), the dye (b) having the radical reactive functional group, and the radical reaction initiator (C), and further 1 to 3 kinds of compounds (D) selected from the group consisting of the compounds represented by the general formula (VII), the general formula (VIII), the general formula (IX) and the general formula (X); and subjecting the mixture to a radical reaction;

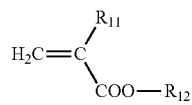

(VII)

where, in the general formula (VII), $R_{11}$ represents a hydrogen atom or a methyl group; $R_{12}$ represents a hydrogen atom, an alkyl group having 1 to 18 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms which has or does not have oxygen, a dialkylaminoalkyl group having 3 to 9 carbon atoms, a fluoroalkyl group having 1 to 18 carbon atoms, an N-alkylenephthalimide group having 9 to 14 carbon atoms, a group represented by the following general formula (VII-I),

(VII-I)

wherein $R_{15}$ represents an alkylene group having 1 to 3 carbon atoms, which has a hydroxy group as a substituent or no substituent; $R_{16}$ represents a phenyl group which has a hydroxy group as a substituent or no substituent, or an alkyl group having 1 to 3 carbon atoms; q represents an integer of 1 to 3, a group represented by the following general formula (VII-II),

(VII-II)

wherein $R_{17}$ to $R_{19}$ represent an alkyl group having 1 to 3 carbon atoms; $R_{20}$ represents an alkylene group having 1 to 3 carbon atoms, or a group represented by the following general formula (VII-III),

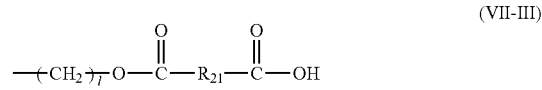

(VII-III)

wherein l represents an integer of 1 to 6; $R_{21}$ represents a phenylene group or a cyclohexylene group,

(VIII)

where, in the general formula (VIII), $R_{11}$ represents a hydrogen atom or a methyl group; $R_{13}$ represents a hydrogen atom, or an alkyl group having 1 to 3 carbon atoms; $R_{14}$ represents a hydrogen atom, an alkyl group having 1 to 3 carbon atoms, a dialkylaminoalkyl group having 3 to 9 carbon atoms, or a hydroxyalkyl group having 1 to 6 carbon atoms; $R_{13}$ and $R_{14}$ may form a morpholino group together with a nitrogen atom adjacent thereto,

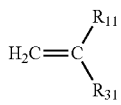 (IX)

where, in the general formula (IX), $R_{11}$ represents a hydrogen atom or a methyl group; $R_{31}$ represents a phenyl group or a pyrrolidino group,

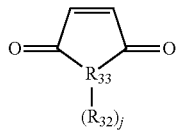 (X)

where, in the general formula (X), $R_{33}$ represents a nitrogen atom or an oxygen atom; j represents 0 when $R_{33}$ is an oxygen atom, and 1 when $R_{33}$ is a nitrogen atom; $R_{32}$ represents a hydrogen atom, an alkyl group having 1 to 20 carbon atoms, a hydroxyalkyl group having 1 to 10 carbon atoms, a halogenated alkyl group having 1 to 10 carbon atoms, an alkylcycloalkyl group having 1 to 10 carbon atoms, a halogenated cycloalkyl group having 6 to 7 carbon atoms, an aryl group having 6 to 10 carbon atoms, an aryl group having 6 to 10 carbon atoms, which has an alkyl group having 1 to 6 carbon atoms as a substituent, or a halogenated aryl group having 6 to 10 carbon atoms.

18. The production method for the colored resin according to claim 16, wherein a reaction temperature of the radical reaction is 80 to 300° C.

19. The production method for the colored resin according to claim 16, wherein a mixing ratio (weight ratio) of the polyolefin (A) and the dye (b) having the radical reactive functional group is A:b=100:0.01 to 100:10.

20. The production method for the colored resin according to claim 16, wherein a mixing ratio (weight ratio) of the polyolefin (A) and the radical reaction initiator (C) is A:C=100:0.01 to 100:10.

* * * * *